(12) United States Patent
Gray et al.

(10) Patent No.: US 12,204,729 B2
(45) Date of Patent: *Jan. 21, 2025

(54) DISPLAY WITH TOUCHLESS INDICATIONS AND METHODS FOR USE THEREWITH

(71) Applicant: SigmaSense, LLC., Wilmington, DE (US)

(72) Inventors: Michael Shawn Gray, Elgin, TX (US); Patrick Troy Gray, Cedar Park, TX (US); Daniel Keith Van Ostrand, Leander, TX (US); Richard Stuart Seger, Jr., Belton, TX (US); Timothy W. Markison, Mesa, AZ (US)

(73) Assignee: SigmaSense, LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,863

(22) Filed: Nov. 29, 2023

(65) Prior Publication Data

US 2024/0103672 A1 Mar. 28, 2024

Related U.S. Application Data

(63) Continuation of application No. 17/658,894, filed on Apr. 12, 2022, now Pat. No. 11,875,005, which is a (Continued)

(51) Int. Cl.
*G06F 3/044* (2006.01)
*G06F 3/041* (2006.01)

(52) U.S. Cl.
CPC ........ *G06F 3/0446* (2019.05); *G06F 3/04166* (2019.05); *G06F 2203/04108* (2013.01)

(58) Field of Classification Search
CPC ......... G06F 1/1637; G06F 2203/04108; G06F 2203/04801; G06F 3/0412; G06F 3/0416;
(Continued)

(56) References Cited

U.S. PATENT DOCUMENTS

| 5,437,178 A | 8/1995 | Esin et al. |
| 6,218,972 B1 | 4/2001 | Groshong |

(Continued)

FOREIGN PATENT DOCUMENTS

| CN | 103995626 A | 8/2014 |
| CN | 104182105 A | 12/2014 |

(Continued)

OTHER PUBLICATIONS

BAKER; How delta-sigma ADCs work, Part 1; Analog Applications Journal; Oct. 1, 2011; 6 pgs.

(Continued)

*Primary Examiner* — Robin J Mishler
(74) *Attorney, Agent, or Firm* — Garlick & Markison; Bruce E. Stuckman

(57) ABSTRACT

A capacitive touch screen display operates by: providing a display configured to render frames of data into visible images; providing a plurality of electrodes integrated into the display to facilitate touch sense functionality based on electrode signals having a drive signal component and a receive signal component; generating, via a plurality of drive-sense circuits coupled to at least some of the plurality of electrodes, a plurality of sensed signals; receiving the plurality of sensed signals; generating capacitance image data associated with the plurality of cross points that includes capacitance variation data corresponding to variations of the capacitance image data from a nominal value; and processing the capacitance image data to determine a touchless indication proximal to the touch screen display based on a touchless indication threshold.

20 Claims, 58 Drawing Sheets

Related U.S. Application Data continuation-in-part of application No. 17/248,473, filed on Jan. 26, 2021, now Pat. No. 11,586,309, which is a continuation of application No. 16/132,131, filed on Sep. 14, 2018, now Pat. No. 10,908,718.

(60) Provisional application No. 63/213,341, filed on Jun. 22, 2021.

(58) Field of Classification Search
CPC .......... G06F 3/04166; G06F 3/041662; G06F 3/0418; G06F 3/0445; G06F 3/0446; G06F 3/04842; G06F 3/0488
See application file for complete search history.

(56) References Cited

U.S. PATENT DOCUMENTS

| | | |
|---|---|---|
| 6,665,013 B1 | 12/2003 | Fossum et al. |
| 7,476,233 B1 | 1/2009 | Wiener et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,537,110 B2 | 9/2013 | Kruglick |
| 8,547,114 B2 | 10/2013 | Kremin |
| 8,587,535 B2 | 11/2013 | Oda et al. |
| 8,625,726 B2 | 1/2014 | Kuan |
| 8,657,681 B2 | 2/2014 | Kim |
| 8,966,400 B2 | 2/2015 | Yeap |
| 8,982,097 B1 | 3/2015 | Kuzo et al. |
| 9,081,437 B2 | 7/2015 | Oda |
| 9,164,641 B1 | 10/2015 | Rowe |
| 9,201,547 B2 | 12/2015 | Elias |
| 10,007,335 B2 | 6/2018 | Lee |
| 10,120,498 B2 | 11/2018 | Gray |
| 10,481,724 B2 | 11/2019 | Choi |
| 10,678,367 B1 | 6/2020 | Gao |
| 10,691,259 B2 | 6/2020 | Kim |
| 2003/0052657 A1 | 3/2003 | Koernle et al. |
| 2005/0235758 A1 | 10/2005 | Kowal et al. |
| 2011/0063154 A1 | 3/2011 | Hotelling et al. |
| 2011/0298745 A1 | 12/2011 | Souchkov |
| 2012/0278031 A1 | 11/2012 | Oda |
| 2013/0278447 A1 | 10/2013 | Kremin |
| 2013/0314342 A1 | 11/2013 | Kim |
| 2014/0132560 A1 | 5/2014 | Huang |
| 2014/0327644 A1 | 11/2014 | Mohindra |
| 2015/0091847 A1 | 4/2015 | Chang |
| 2015/0346889 A1 | 12/2015 | Chen |
| 2016/0188049 A1 | 6/2016 | Yang et al. |
| 2016/0378233 A1 | 12/2016 | Huo |
| 2017/0160852 A1 | 6/2017 | Ahn |
| 2017/0192508 A1 | 7/2017 | Lim |
| 2017/0242502 A1 | 8/2017 | Gray |
| 2017/0242534 A1 | 8/2017 | Gray |
| 2018/0157354 A1 | 6/2018 | Blondin et al. |
| 2018/0260067 A1 | 9/2018 | Choi |
| 2018/0275824 A1 | 9/2018 | Li |
| 2019/0065000 A1 | 2/2019 | Kim |
| 2019/0079623 A1 | 3/2019 | Kim |
| 2020/0089354 A1 | 3/2020 | Gray |
| 2021/0326019 A1 | 10/2021 | Gray |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; Jun. 13, 2023; 7 pgs.

drive-sense circuit 28 display 83 with in-cell touch sensors display 83-1 with on-cell touch sensors

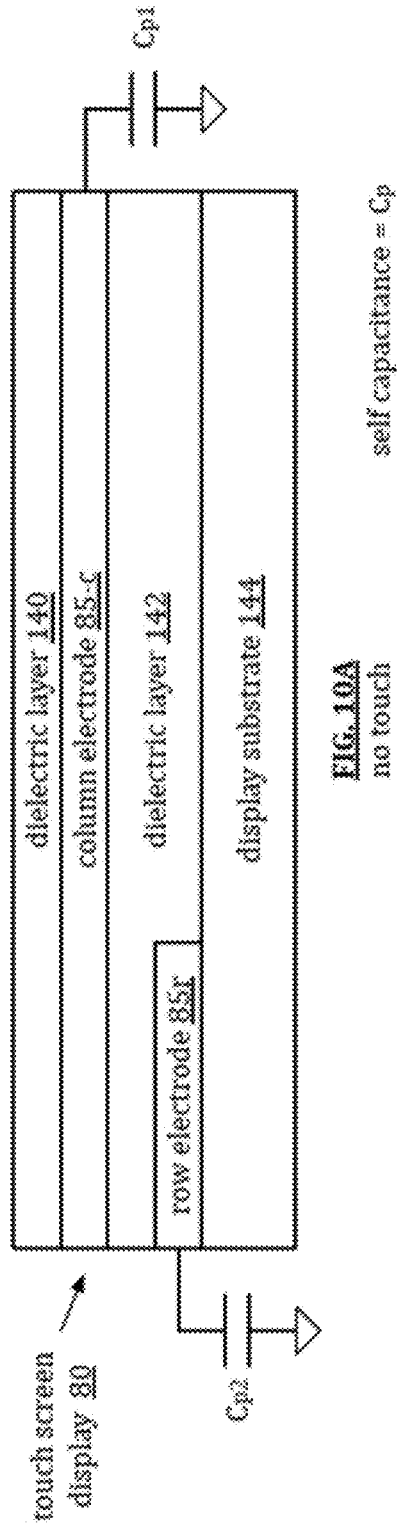
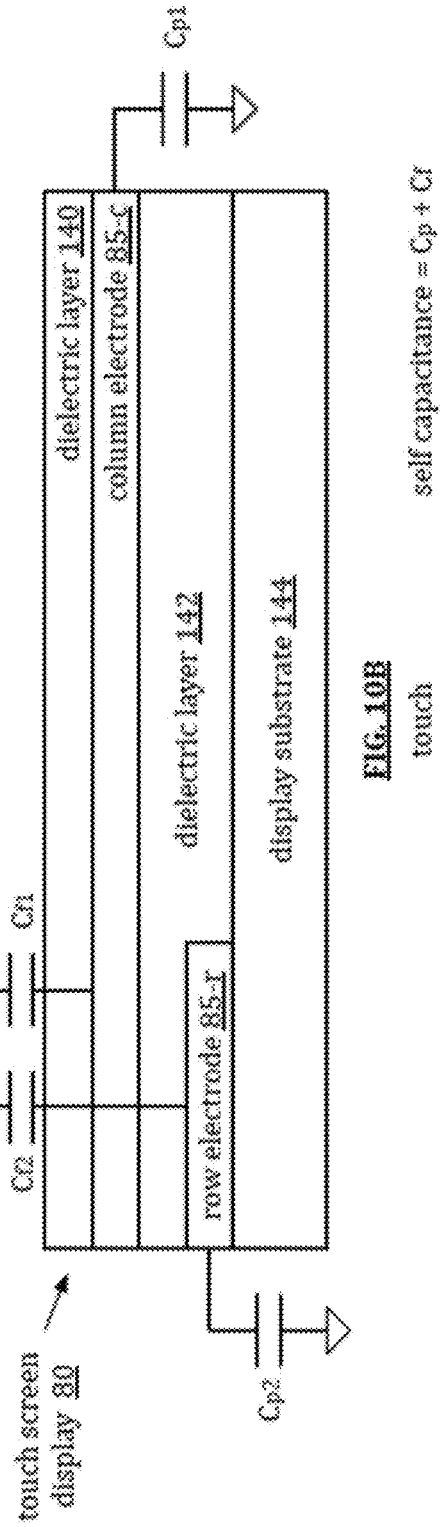

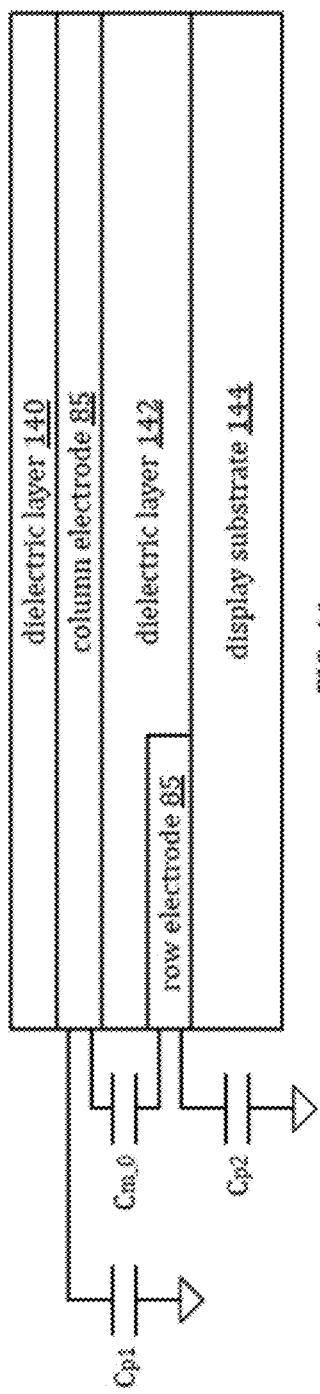
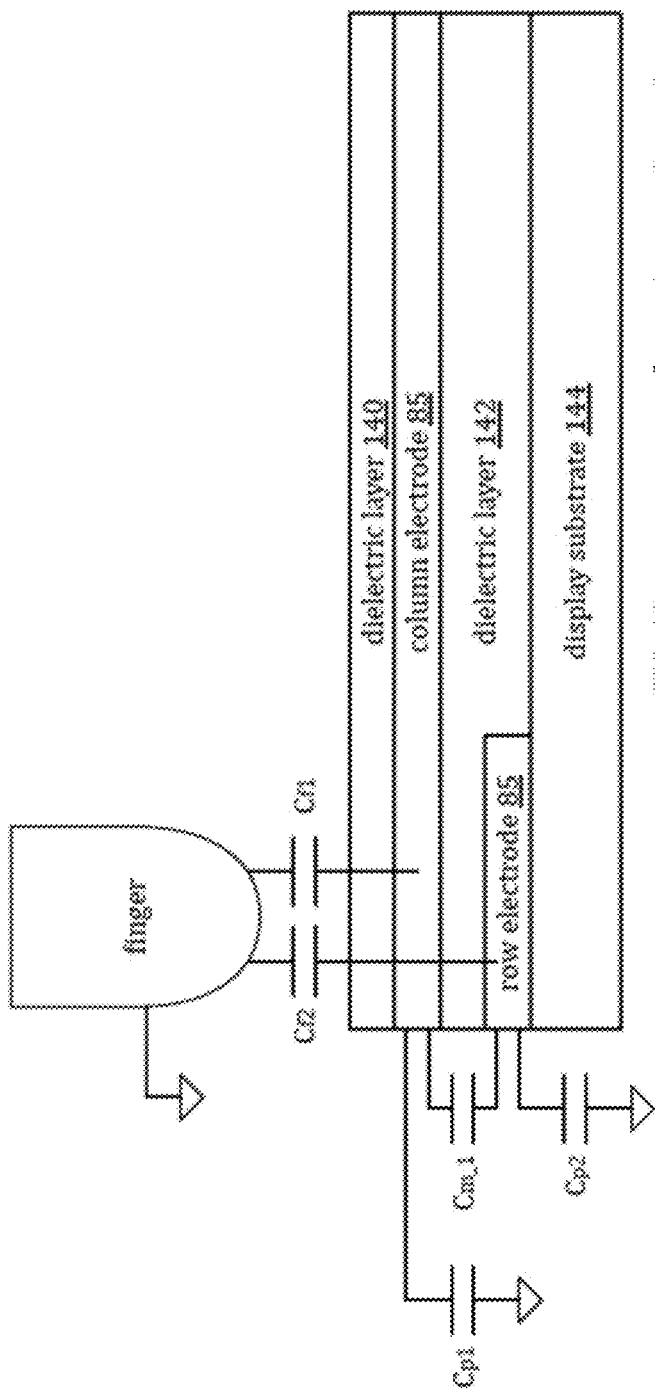

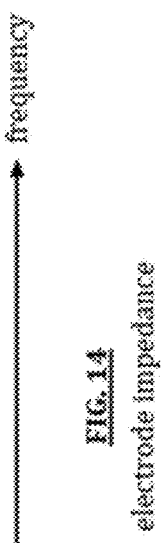
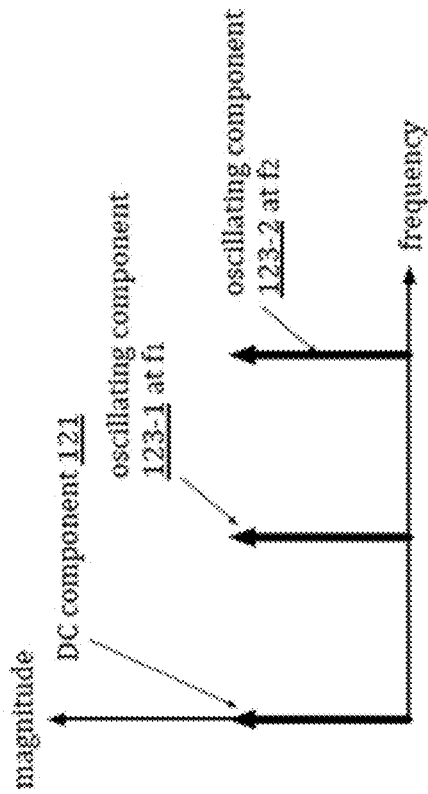
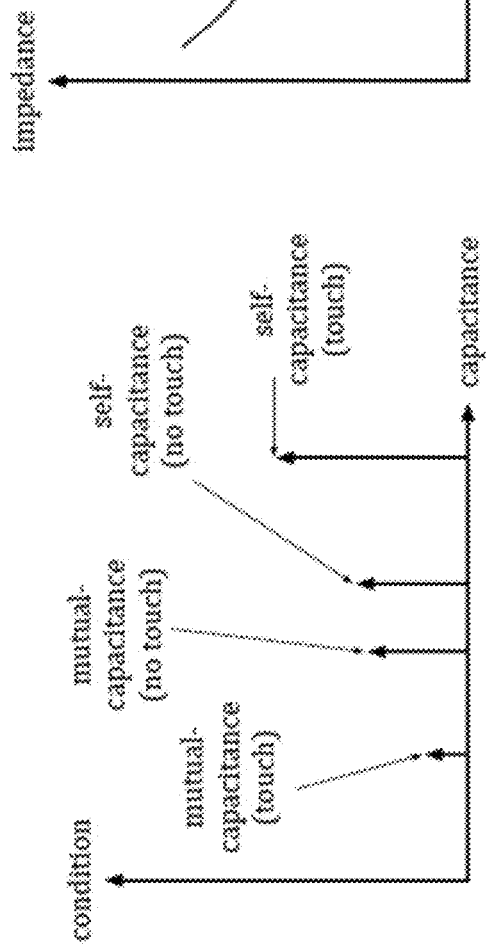
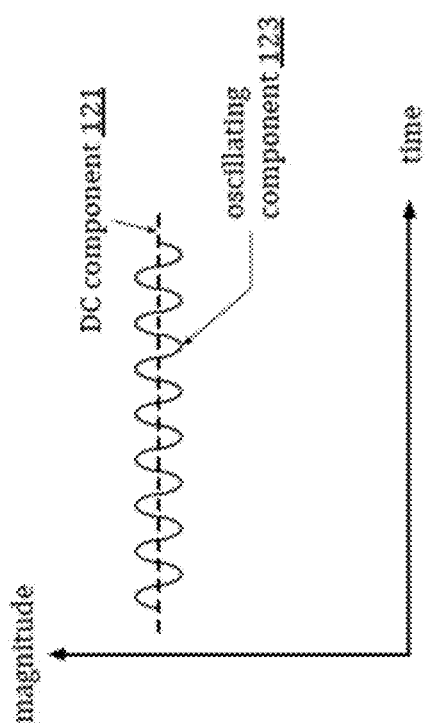

no touch with touch with pen with pen

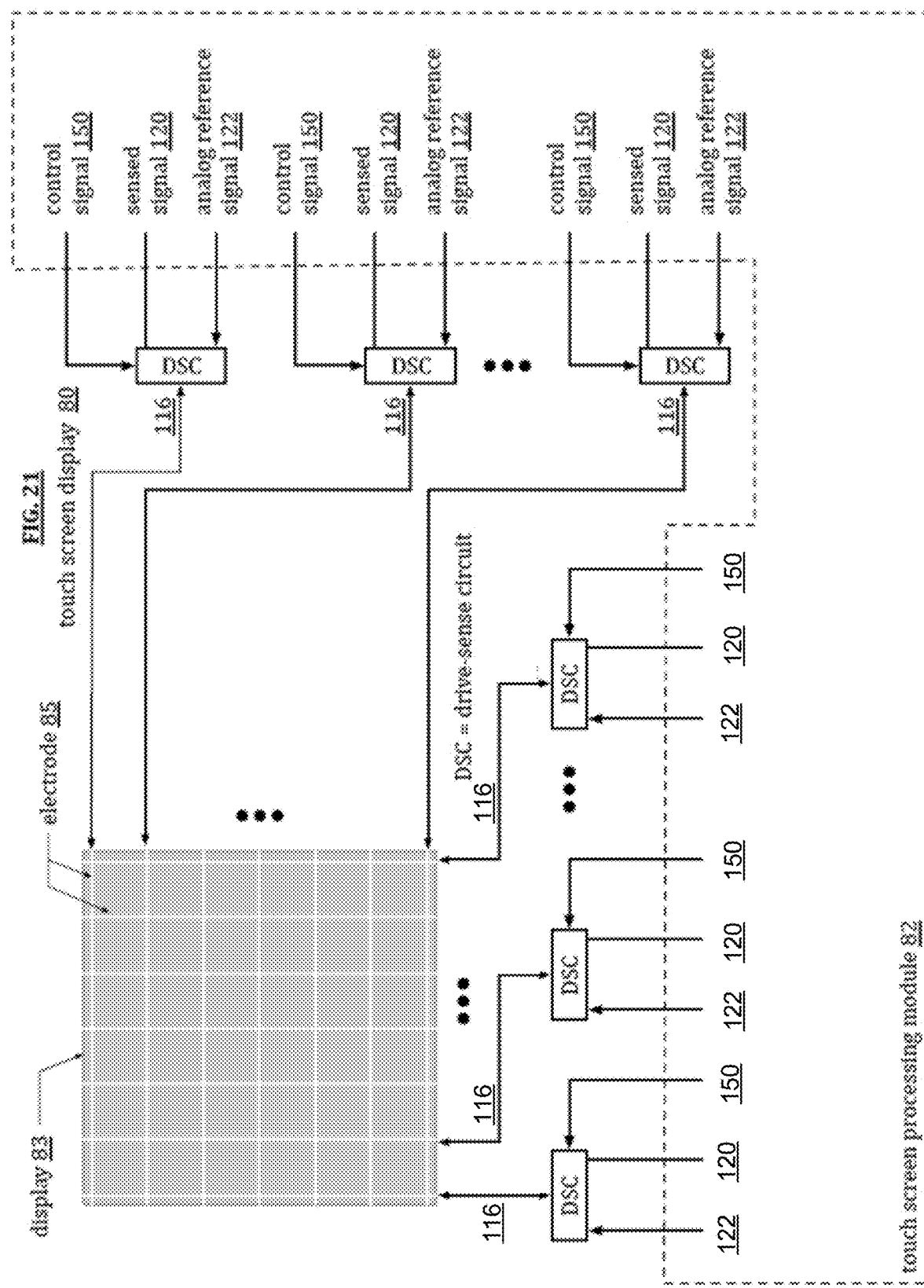

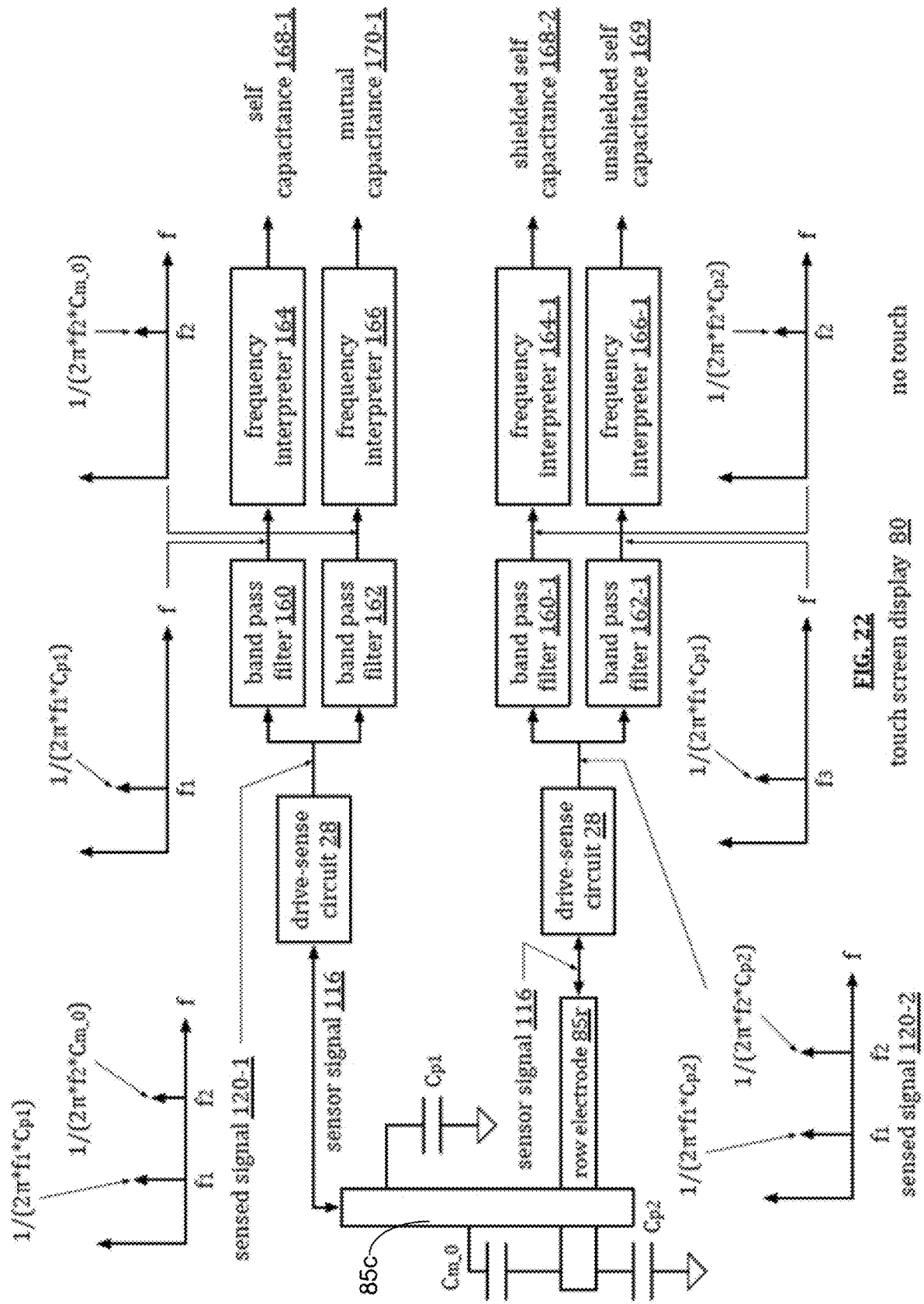

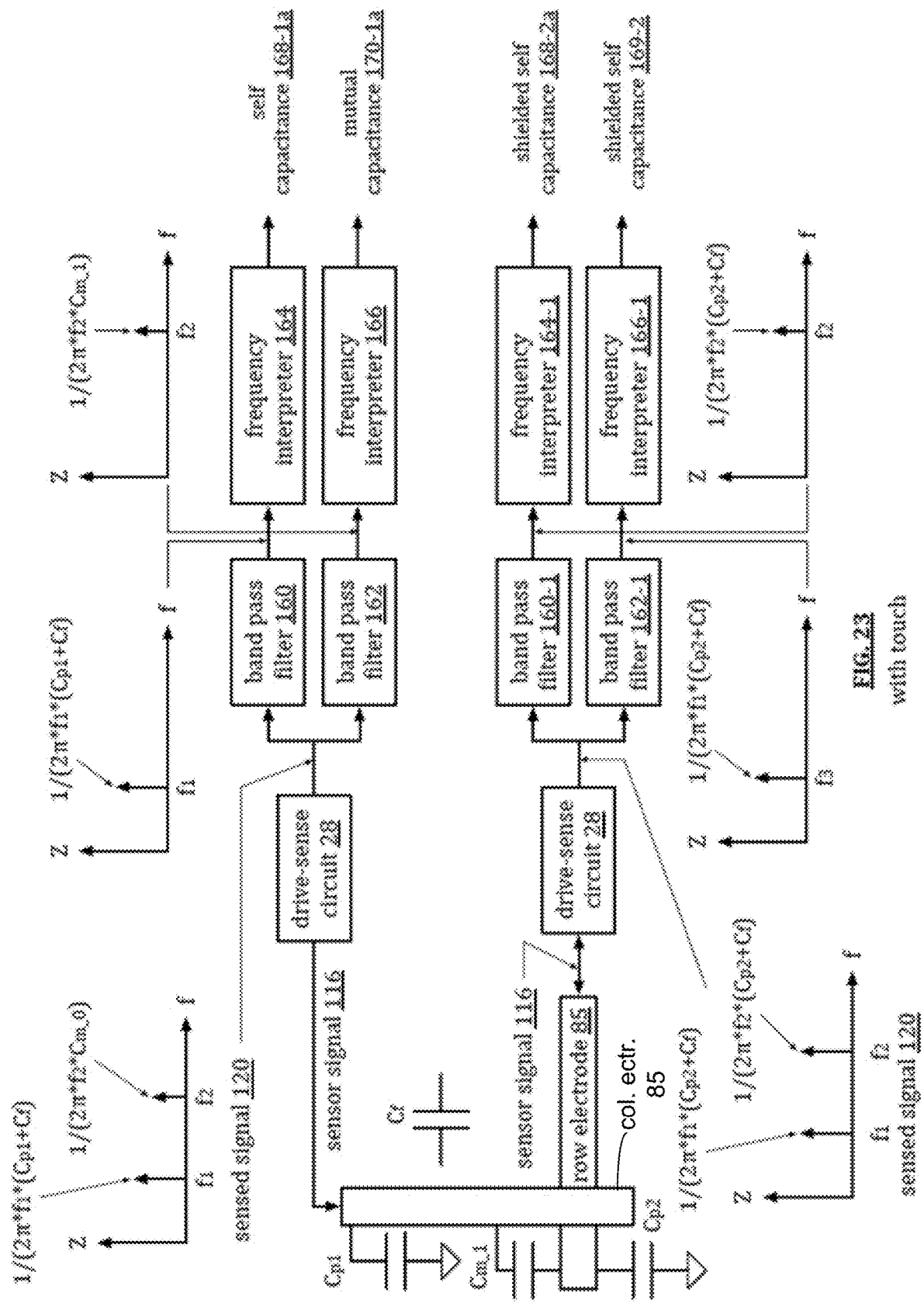
FIG. 23 with touch

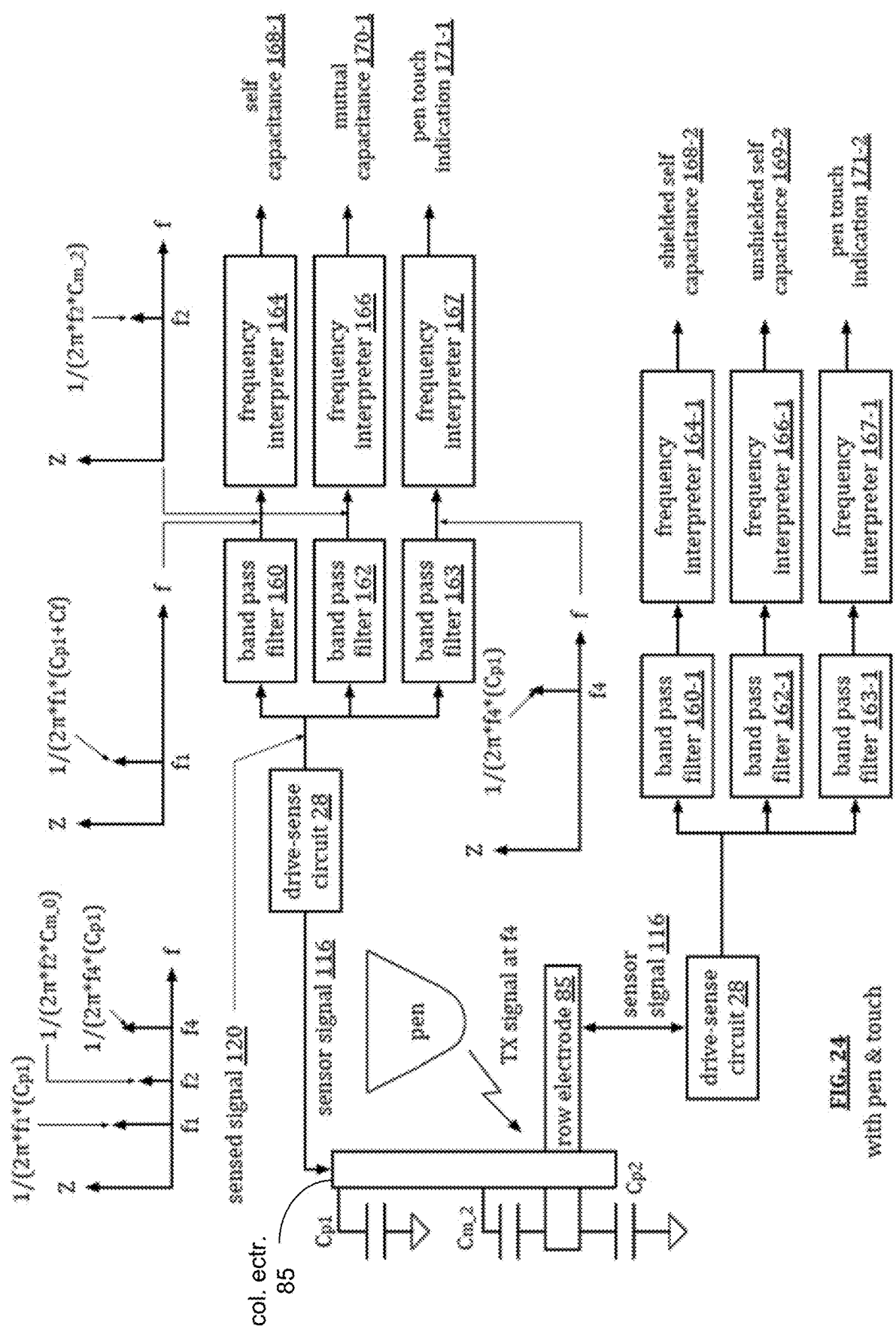

computing device 14-b computing device 14-a

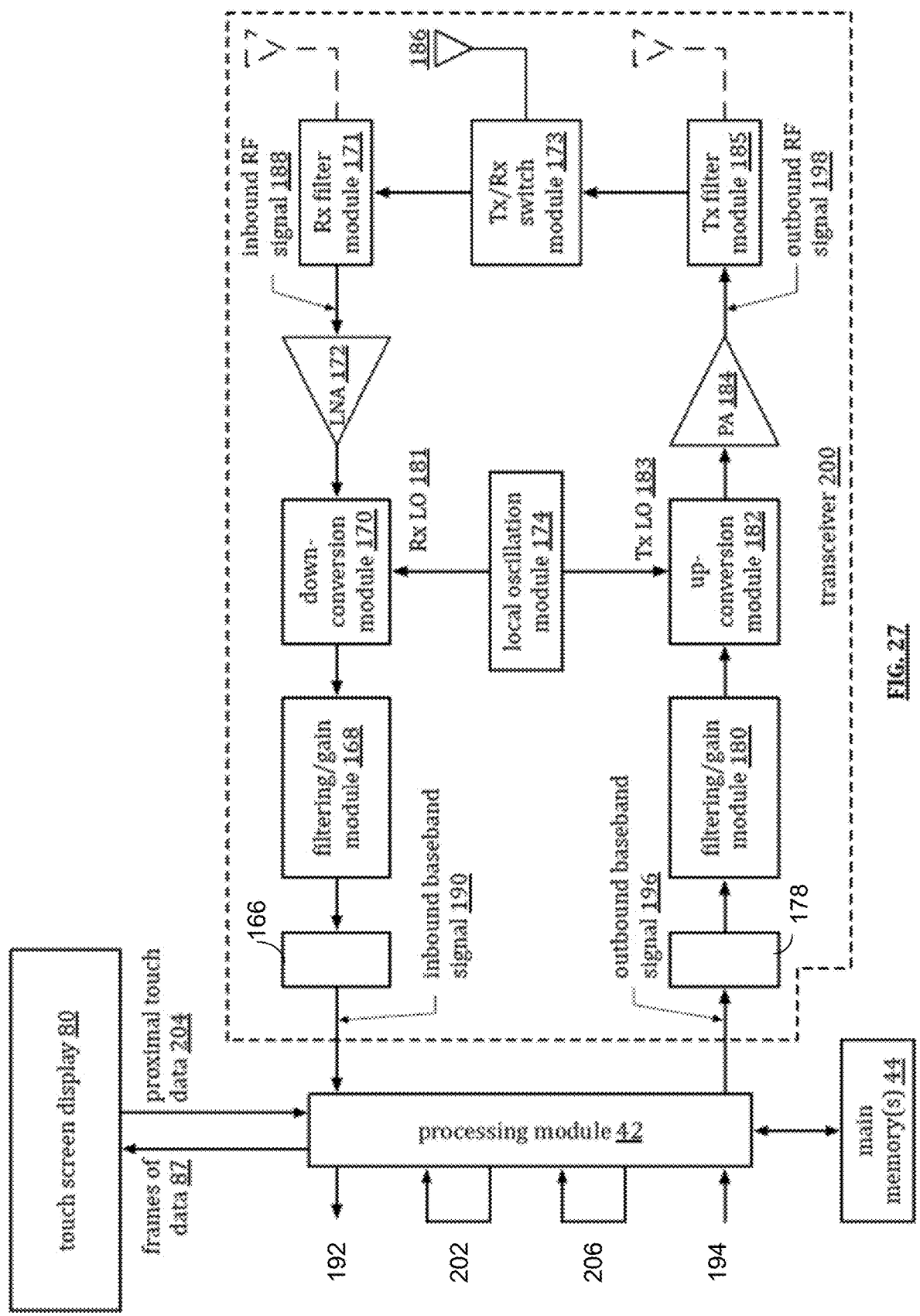

no touch

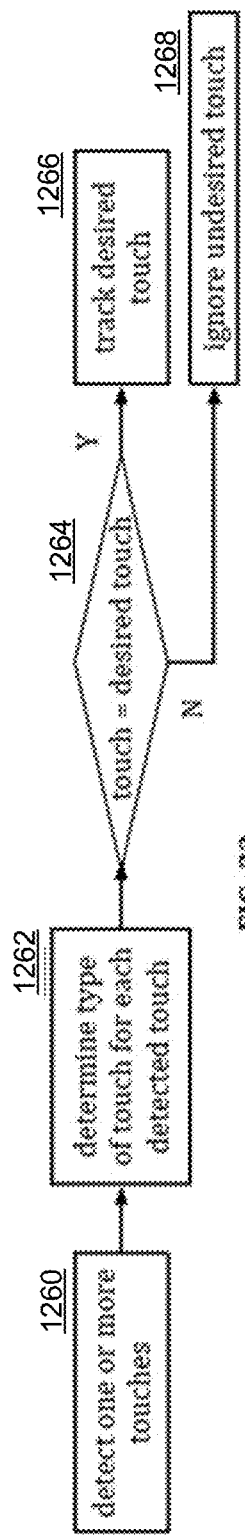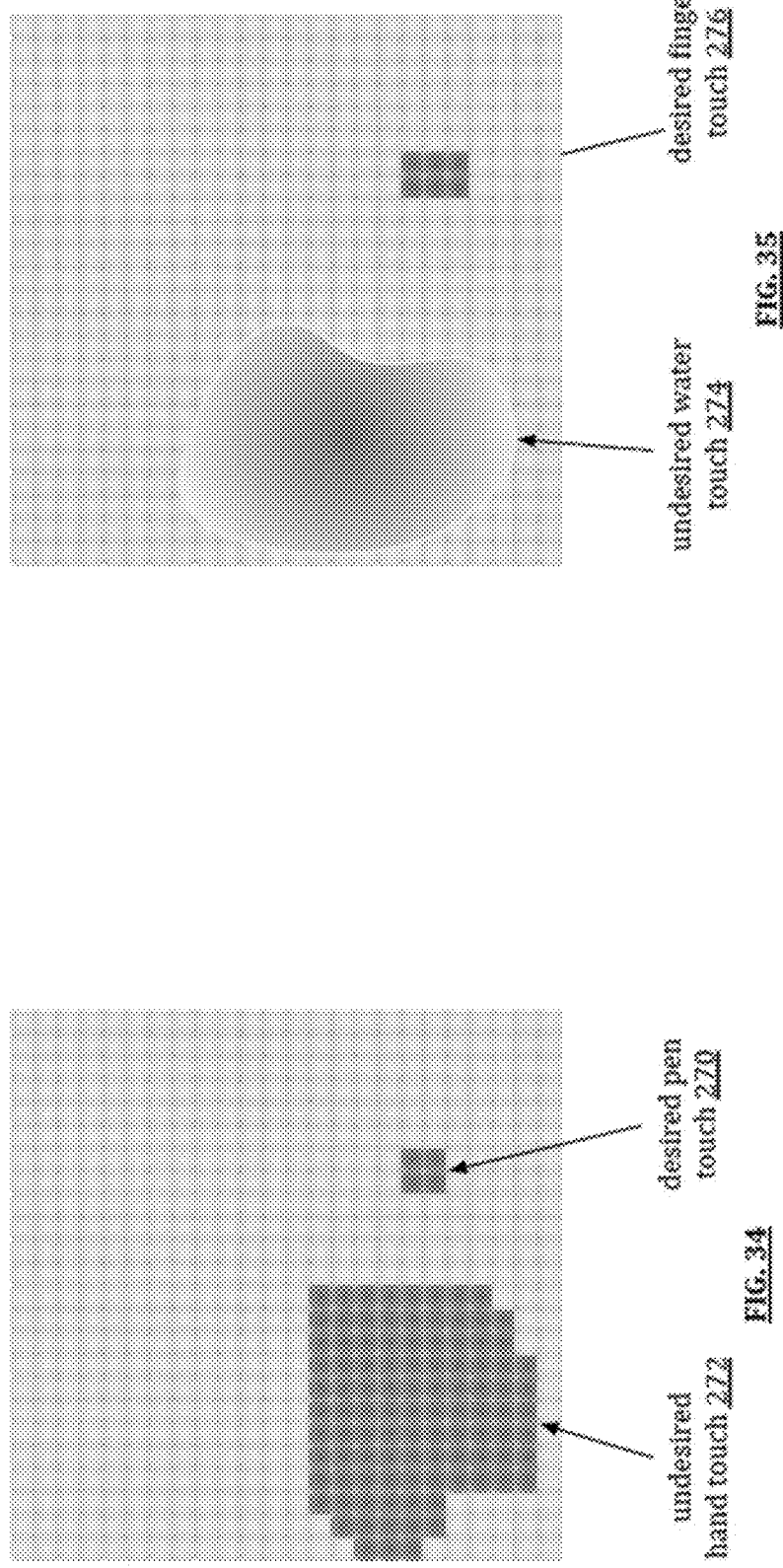

near bezel-less touch screen display 240

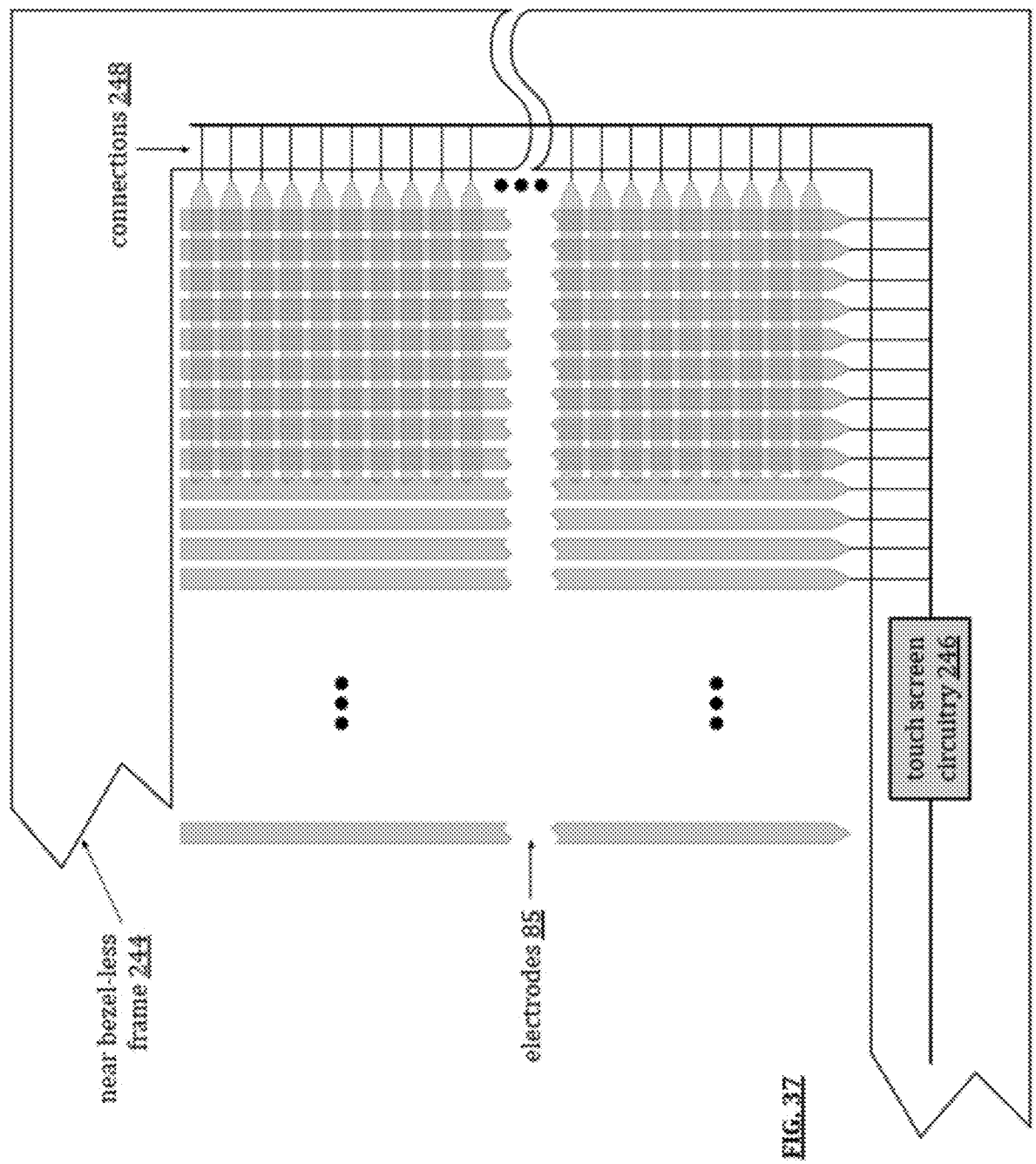

touch screen circuitry 246

DSC = drive-sense circuit

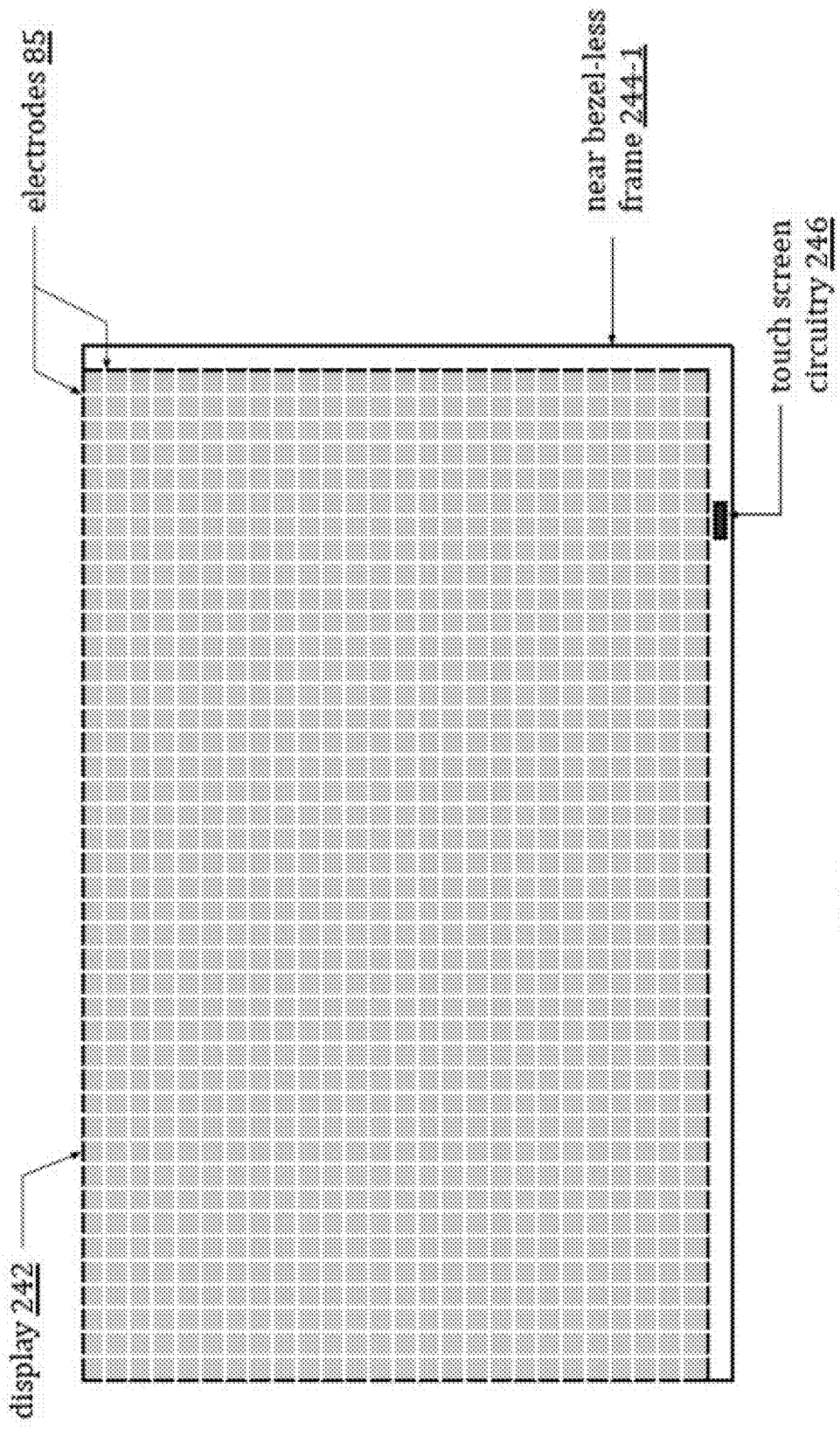

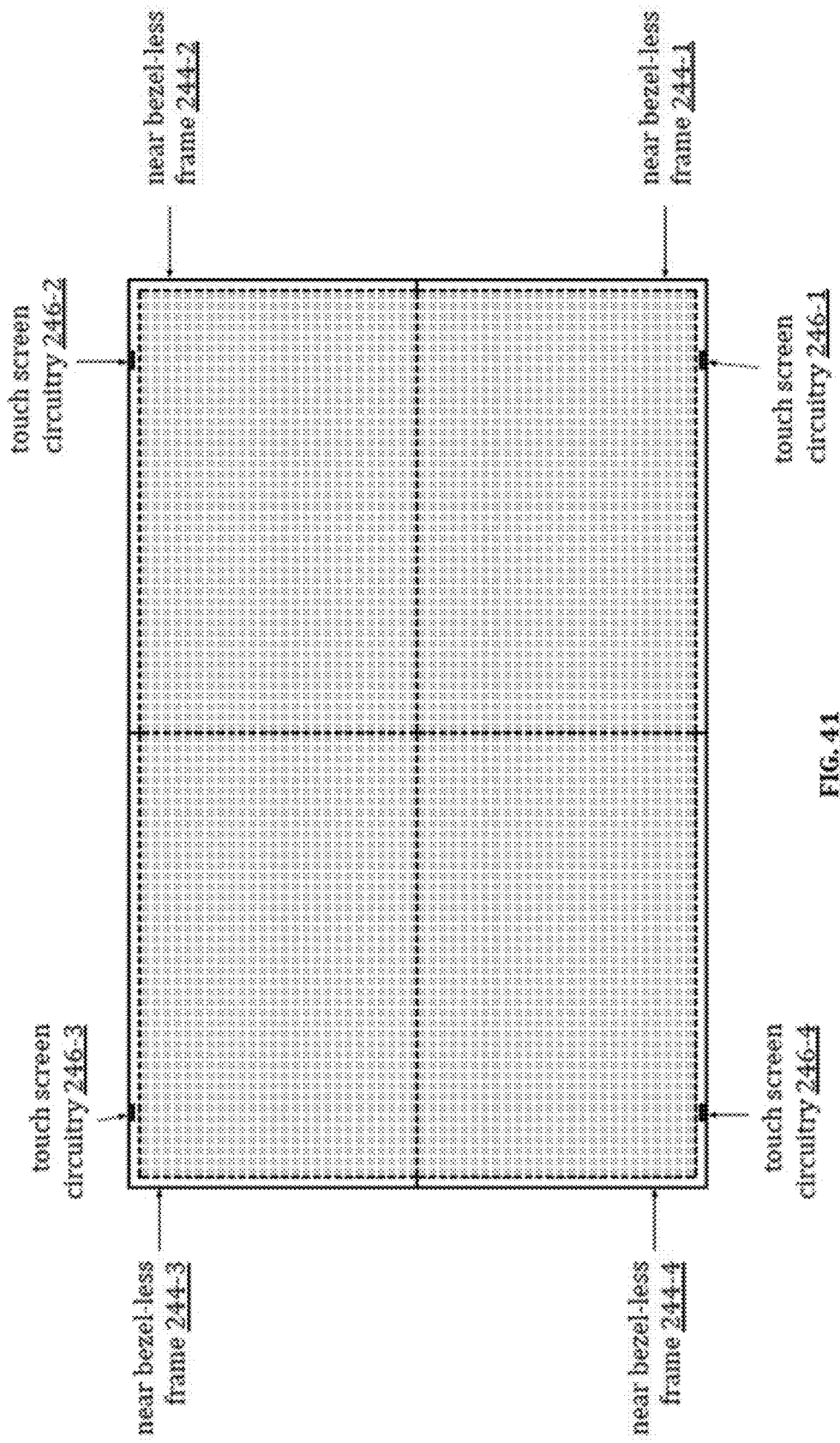

No touch or touchless indication

Touch or touchless indication

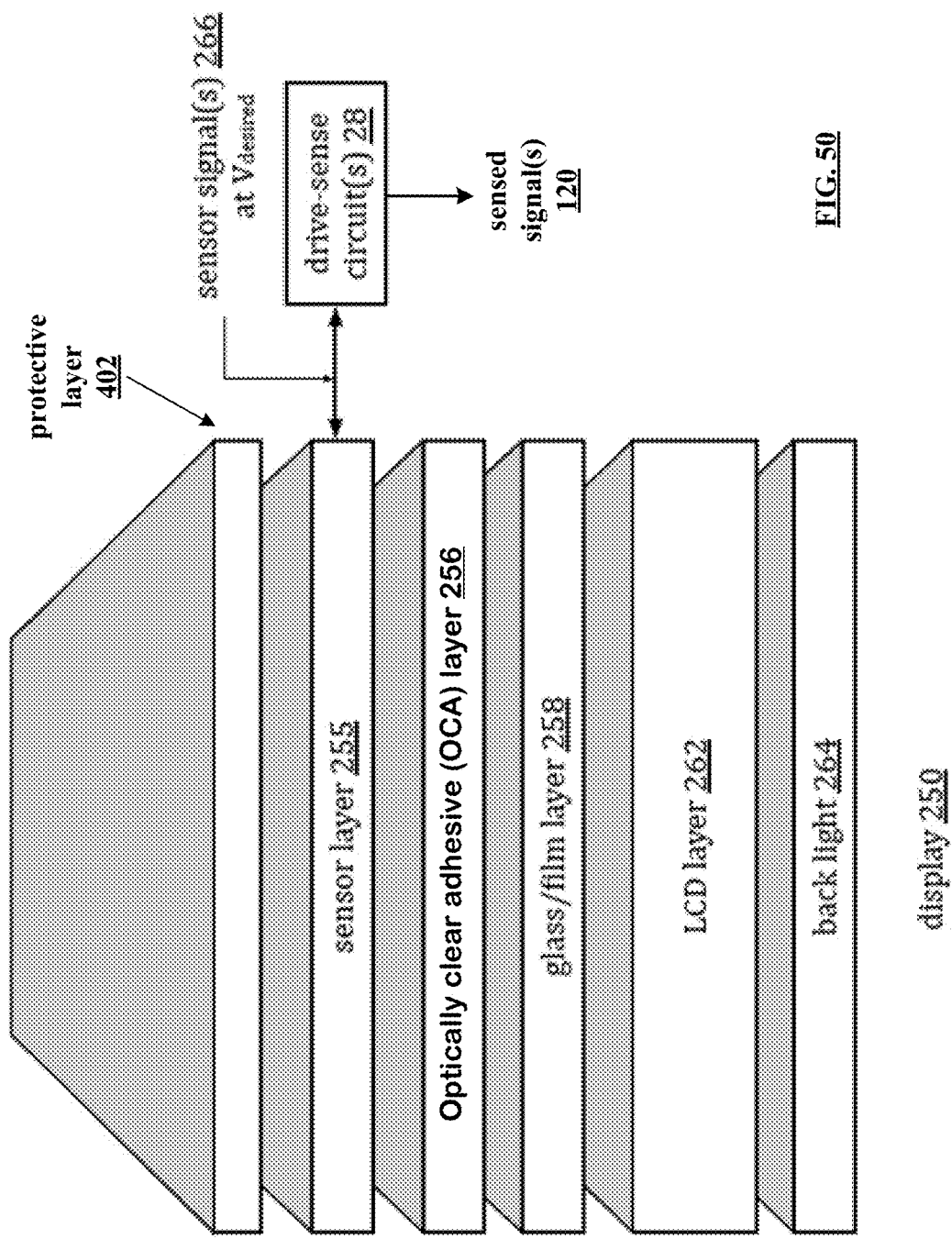

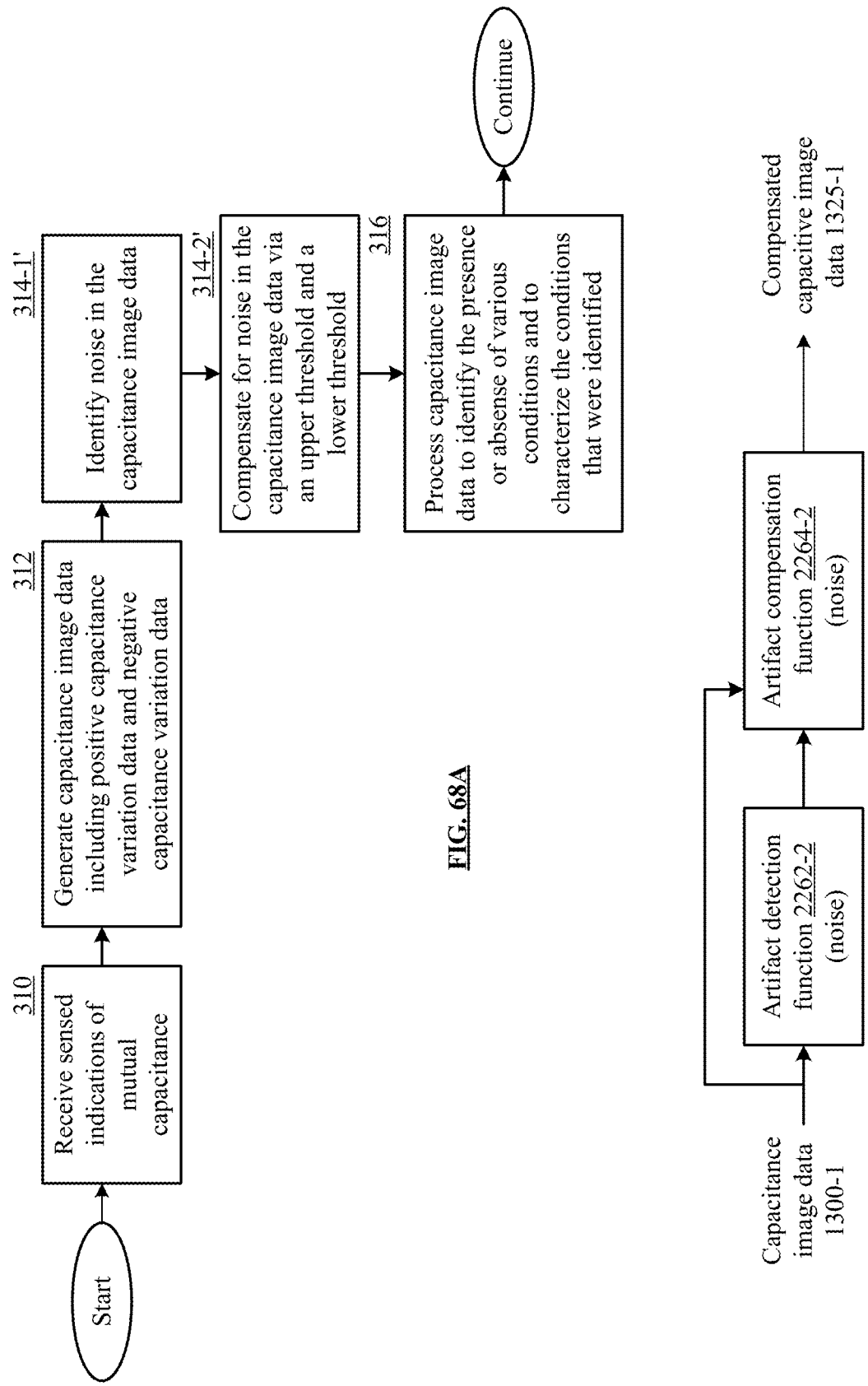

US 12,204,729 B2

DISPLAY WITH TOUCHLESS INDICATIONS AND METHODS FOR USE THEREWITH

CROSS-REFERENCE TO RELATED APPLICATIONS

The present U.S. Utility Patent Application claims priority pursuant to 35 U.S.C. § 120 as a continuation of U.S. Utility application Ser. No. 17/658,894, entitled "TOUCH SCREEN DISPLAY WITH TOUCHLESS INDICATIONS AND METHODS FOR USE THEREWITH", filed Apr. 12, 2022, which claims priority pursuant to 35 U.S.C. § 119(e) to U.S. Provisional Application No. 63/213,341, entitled "TOUCH SCREEN DISPLAY WITH TOUCHLESS INDICATIONS AND METHODS FOR USE THEREWITH", filed Jun. 22, 2021, all of which are hereby incorporated herein by reference in their entirety and made part of the present U.S. Utility Patent Application for all purposes.

U.S. Utility patent application Ser. No. 17/658,894 also claims priority pursuant to 35 U.S.C. § 120 as a continuation-in-part of U.S. Utility application Ser. No. 17/248,473, entitled "LARGE TOUCH SCREEN DISPLAY WITH INTEGRATED ELECTRODES," filed Jan. 26, 2021, issued as U.S. Pat. No. 11,586,309 on Feb. 21, 2023, which is a continuation of U.S. Utility application Ser. No. 16/132,131, entitled "LARGE TOUCH SCREEN DISPLAY WITH INTEGRATED ELECTRODES," filed Sep. 14, 2018, issued as U.S. Pat. No. 10,908,718 on Feb. 2, 2021, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computing and communication devices and more particularly to display screen technologies used therewith.

BRIEF DESCRIPTION OF THE SEVERAL VIEWS OF THE DRAWING(S)

FIG. 9J is a cross section schematic block diagram of an example of a touch screen display with on-cell touch sensors in accordance with the present disclosure;

FIG. 10A is a cross section schematic block diagram of an example of self-capacitance with no-touch on a touch screen display in accordance with the present disclosure;

FIG. 10B is a cross section schematic block diagram of an example of self-capacitance with a touch on a touch screen display in accordance with the present disclosure;

FIG. 11 is a cross section schematic block diagram of an example of self-capacitance and mutual capacitance with no-touch on a touch screen display in accordance with the present disclosure;

FIG. 12 is a cross section schematic block diagram of an example of self-capacitance and mutual capacitance with a touch on a touch screen display in accordance with the present disclosure;

FIG. 13 is an example graph that plots condition verses capacitance for an electrode of a touch screen display in accordance with the present disclosure;

FIG. 14 is an example graph that plots impedance verses frequency for an electrode of a touch screen display in accordance with the present disclosure;

FIG. 15 is a time domain example graph that plots magnitude verses time for an analog reference signal in accordance with the present disclosure;

FIG. 16 is a frequency domain example graph that plots magnitude verses frequency for an analog reference signal in accordance with the present disclosure;

FIG. 18 is a schematic block diagram of an example of a first drive sense circuit coupled to a first electrode and a second drive sense circuit coupled to a second electrode with a finger touch or touchless indication proximal to the electrodes in accordance with the present disclosure;

FIG. 21 is a schematic block diagram of another embodiment of a touch screen display in accordance with the present disclosure;

FIG. 22 is a schematic block diagram of a touchless example of a few drive sense circuits and a portion of the touch screen processing module of a touch screen display in accordance with the present disclosure;

FIG. 23 is a schematic block diagram of a finger touch example of a few drive sense circuits and a portion of the touch screen processing module of a touch screen display in accordance with the present disclosure;

FIG. 24 is a schematic block diagram of a pen touch example of a few drive sense circuits and a portion of the touch screen processing module of a touch screen display in accordance with the present disclosure;

FIG. 27 is a schematic block diagram of another embodiment of a computing device having touch screen display in accordance with the present disclosure;

FIG. 33 is a logic diagram of an embodiment of a method for identifying desired and undesired touches using a capacitance image in accordance with the present disclosure;

FIG. 34 is a schematic block diagram of an example of using capacitance images to identify desired and undesired touches in accordance with the present disclosure;

FIG. 35 is a schematic block diagram of another example of using capacitance images to identify desired and undesired touches in accordance with the present disclosure;

FIG. 37 is a schematic block diagram of another embodiment of a near bezel-less touch screen display in accordance with the present disclosure;

FIG. 40 is a schematic block diagram of another embodiment of a near bezel-less touch screen display in accordance with the present disclosure;

FIG. 41 is a schematic block diagram of another embodiment of multiple near bezel-less touch screen displays in accordance with the present disclosure;

FIG. 50 is a cross section schematic block diagram of another example of a touch screen display in accordance with the present disclosure;

FIG. 51D is a schematic block diagram of another embodiment of a touch sensor device in accordance with the present disclosure;

FIG. 51E is a schematic block diagram of an embodiment of mutual signaling within a touch sensor device in accordance with the present disclosure;

FIG. 53A is a flow diagram of an embodiment of a method in accordance with the present disclosure;

FIG. 53B is a schematic block diagram of an embodiment of an artifact detection function and artifact compensation function in accordance with the present disclosure;

FIG. 54A is a flow diagram of an embodiment of a method in accordance with the present disclosure;

FIG. 54B is a schematic block diagram of an embodiment of an artifact detection function and artifact compensation function in accordance with the present disclosure;

FIG. 55A is a schematic block diagram of an embodiment of a condition detection function in accordance with the present disclosure;

FIG. 57C is a graphical diagram of an embodiment of capacitance image data in accordance with the present disclosure;

FIG. 58 is a pictorial diagram of an embodiment of a surface of a touch screen display in accordance with the present disclosure;

FIG. 59A is a graphical diagram of an embodiment of capacitance image data in accordance with the present disclosure;

FIG. 59B is a graphical diagram of a detected hover region in accordance with the present disclosure;

FIG. 59C is a graphical diagram of an embodiment of capacitance image data in accordance with the present disclosure;

FIG. 61C is a flow diagram of an embodiment of a method in accordance with the present disclosure;

FIG. 62A is a schematic block diagram of an embodiment of an anatomical feature mapping data generator function in accordance with the present disclosure;

FIG. 62B is an illustration of anatomical feature mapping data in accordance with the present disclosure;

FIG. 62C is a flow diagram of an embodiment of a method in accordance with the present disclosure;

FIG. 63A is a schematic block diagram of an embodiment of a touchless indication point identification function in accordance with the present disclosure;

FIGS. 63B-63G are illustrations of example embodiments of touchless indication points in accordance with the present disclosure;

FIG. 63H is a flow diagram of an embodiment of a method in accordance with the present disclosure;

FIG. 64A is a schematic block diagram of an embodiment of a touchless indication display data generator function in accordance with the present disclosure;

FIG. 64B-64H are illustrations of example embodiments of touchless indication display data displayed by a touch screen in accordance with the present disclosure;

FIG. 64H is a flow diagram of an embodiment of a method in accordance with the present disclosure;

FIG. 64J is a flow diagram of an embodiment of a method in accordance with the present disclosure;

FIG. 65A is a schematic block diagram of an embodiment of an initial touchless indication detection function and a maintained touchless indication detection function in accordance with the present disclosure;

FIG. 65B is a flow diagram of an embodiment of a method in accordance with the present disclosure;

FIG. 66A is a schematic block diagram of an embodiment of a touchless gesture detection function in accordance with the present disclosure;

FIG. 66B is an illustration of an example touchless gesture in accordance with the present disclosure;

FIG. 66C is a flow diagram of an embodiment of a method in accordance with the present disclosure;

FIG. 67A is a schematic block diagram of an embodiment of a touchless mode initiation function in accordance with the present disclosure;

FIG. 67B is a flow diagram of an embodiment of a method in accordance with the present disclosure;

FIG. 68A is a schematic block diagram of an embodiment of a touch-based indication detection function and a touchless indication detection function in accordance with the present disclosure;

FIG. 68B is a flow diagram of an embodiment of a method in accordance with the present disclosure;

FIG. 68C is a flow diagram of an embodiment of a method in accordance with the present disclosure;

FIG. 68D is a flow diagram of an embodiment of a method in accordance with the present disclosure;

FIG. 69A is a schematic block diagram of a touchless detection parameter data learning function in accordance with the present disclosure;

FIG. 69B is a flow diagram of an embodiment of a method in accordance with the present disclosure;

FIG. 70A is a schematic block diagram of a touch screen that communicates with at least one server system via a network;

FIG. 70B is a flow diagram of an embodiment of a method in accordance with the present disclosure;

FIG. 71A is a schematic block diagram of a transaction data generator function in accordance with the present disclosure; and FIG. 71B is a flow diagram of an embodiment of a method in accordance with the present disclosure.

DETAILED DESCRIPTION OF THE INVENTION

Figure 1:
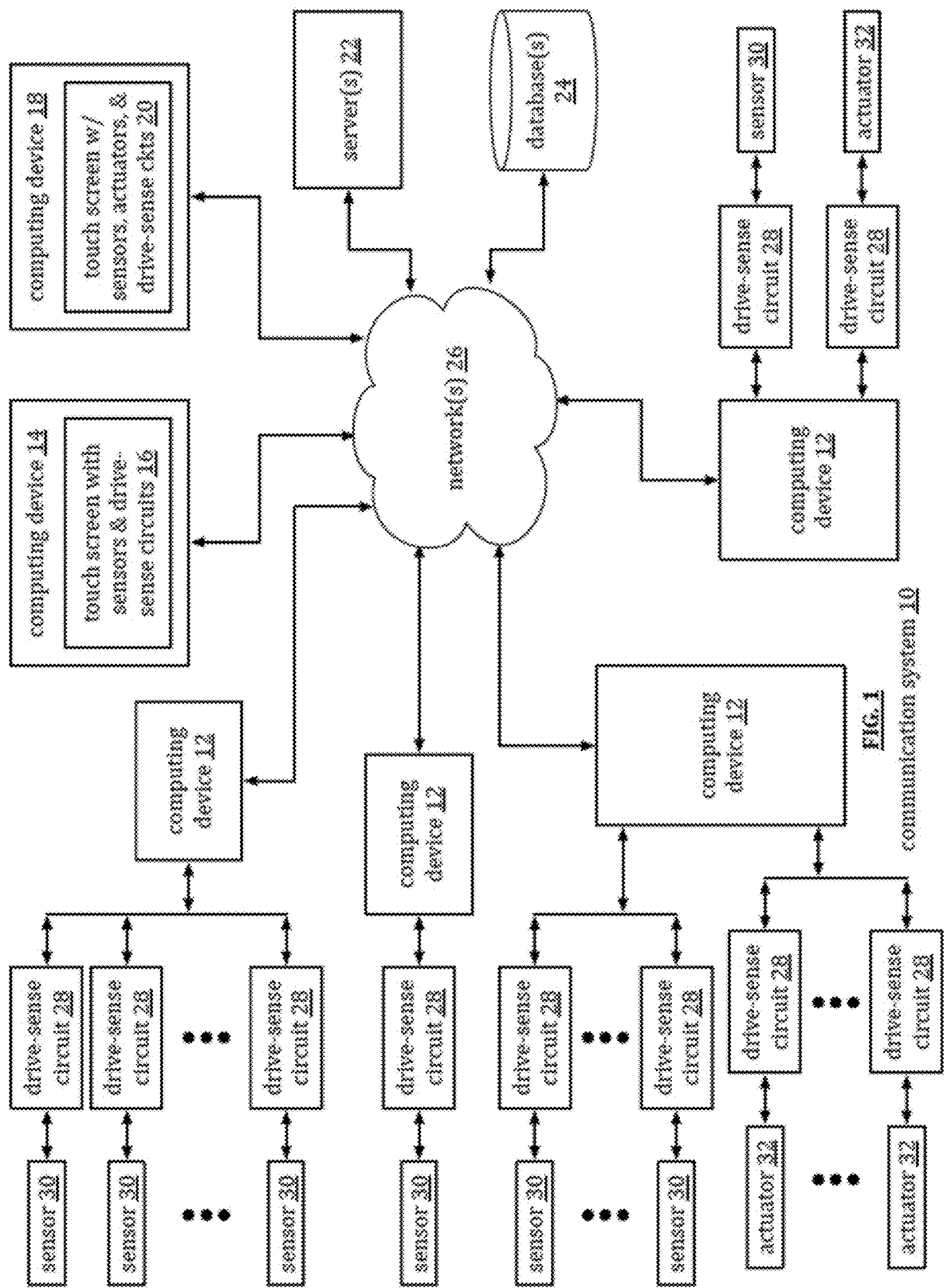
FIG. 1 is a schematic block diagram of an embodiment of a communication system in accordance with the present disclosure.

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to, (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a sensor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device **12-*x* is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-*x*. For example, the sensor 30 may be a piezoelectric microphone and the actuator 32** may be a piezoelectric speaker.

Figure 2:
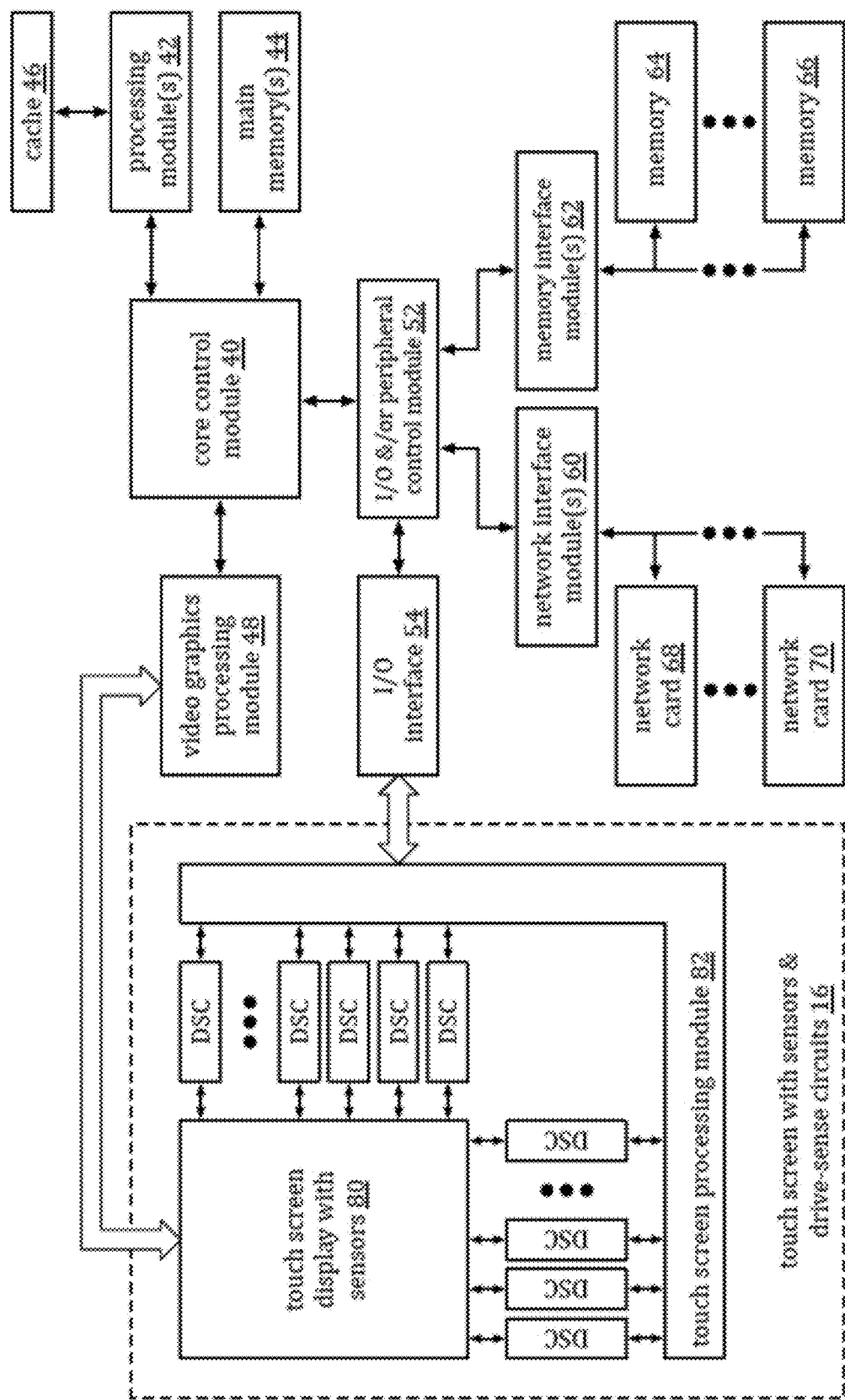
FIG. 2 is a schematic block diagram of an embodiment of a computing device in accordance with the present disclosure.

FIG. 2 is a schematic block diagram of an embodiment of a computing device 12 (e.g., any one of 12-1 through **12-*x*). The computing device 12 includes a touch screen 16, a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52** are one module, such as a chipset, a quick path interconnect (QPI), and/or an ultra-path interconnect (UPI).

The touch screen 16 includes a touch screen display 80, a plurality of sensors 30, a plurality of drive-sense circuits (DSC), and a touch screen processing module 82. In general, the sensors (e.g., electrodes, capacitor sensing cells, capacitor sensors, inductive sensor, etc.) detect a proximal touch of the screen and/or a touchless indication in proximity to the screen. For example, when one or more fingers touches the screen or come in close proximity (e.g. within 1 mm, 2 mm, 3 mm or some other distance threshold), capacitance of sensors proximal to the finger(s) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). As used herein, "touch" or "touch(es)", include one or more proximal touches where finger(s) or other object(s) comes into physical contact with a surface of the touch screen 16 as well as one or more touchless indications where finger(s) or other object(s) come into close proximity with the surface of the touch screen 16. This information is inputted to the processing module 42 for processing as an input. For example, a touch or touchless indication represents a selection of a button on screen, a scroll function, a zoom in-out function, etc.

Each of the main memories 44 includes one or more Random Access Memory (RAM) integrated circuits, or chips. For example, a main memory 44 includes four DDR4 (4th generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

Figure 3:
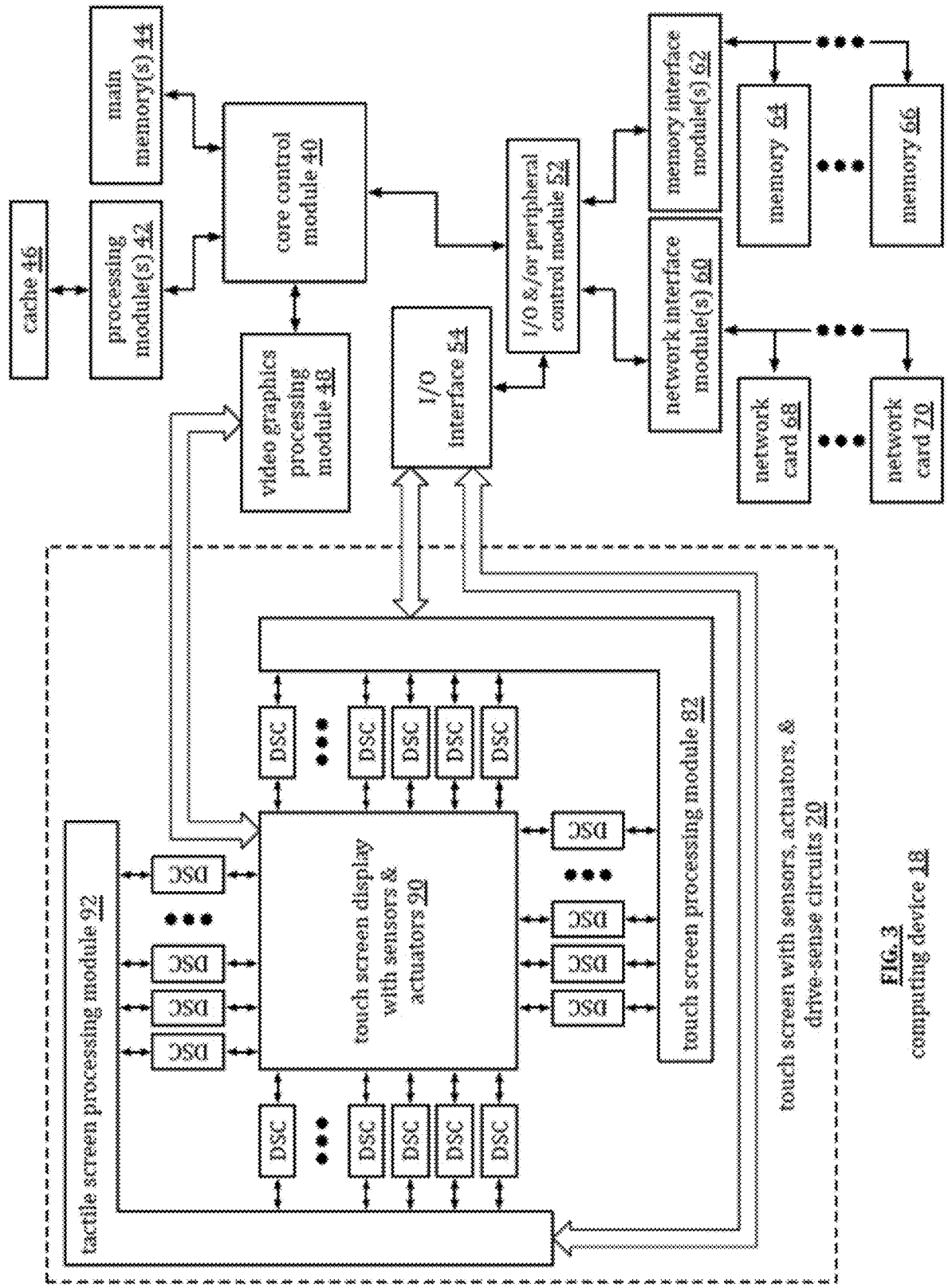
FIG. 3 is a schematic block diagram of another embodiment of a computing device in accordance with the present disclosure.

FIG. 3 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 2 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 4:
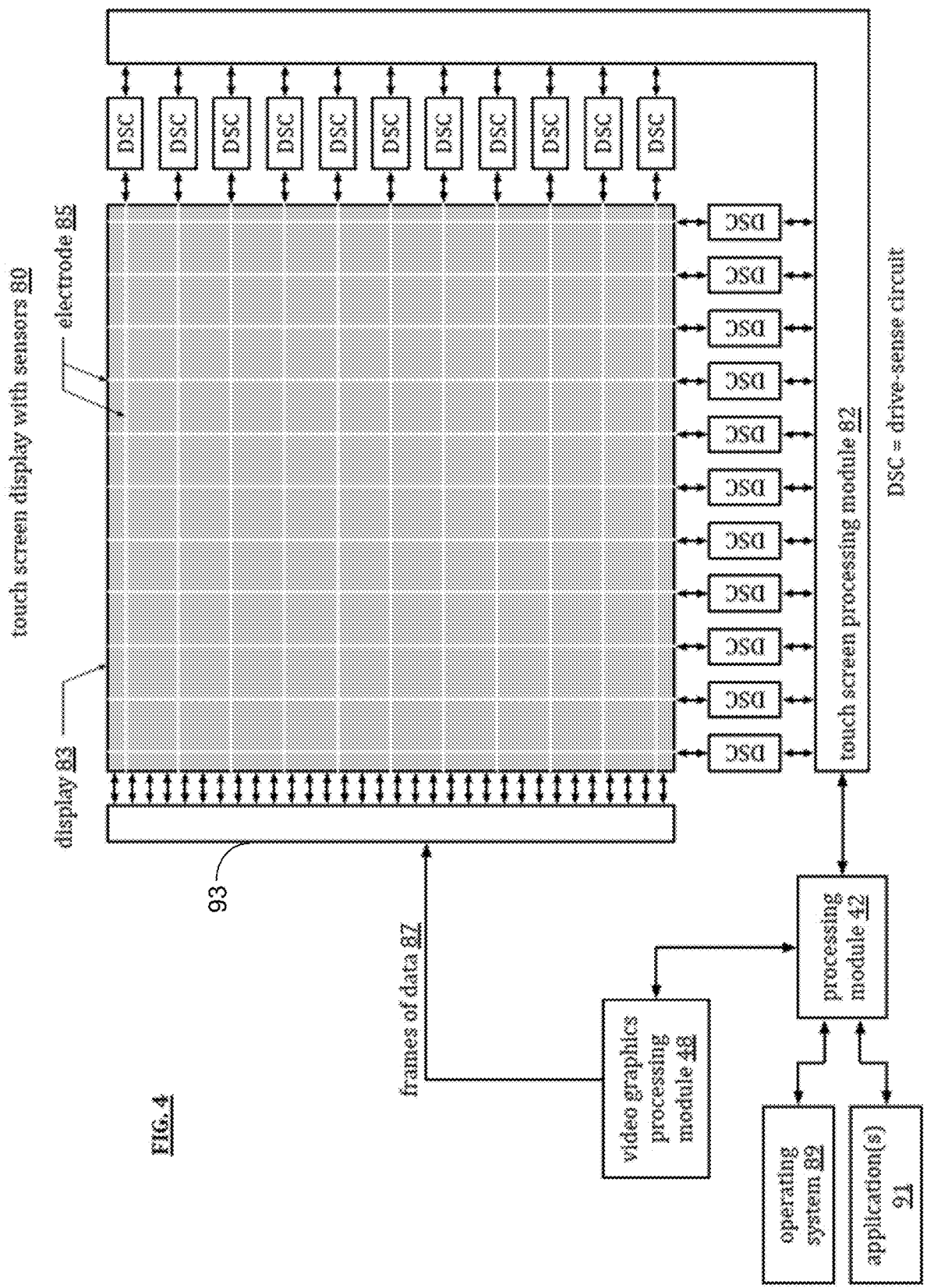
FIG. 4 is a schematic block diagram of an embodiment of a touch screen display in accordance with the present disclosure.

FIG. 4 is a schematic block diagram of an embodiment of a touch screen display 80 that includes a plurality of drive-sense circuits (DSC), a touch screen processing module 82, a display 83, and a plurality of electrodes 85. The touch screen display 80 is coupled to a processing module 42, a video graphics processing module 48, and a display interface 93, which are components of a computing device (e.g., 14-18), an interactive display, or other device that includes a touch screen display. An interactive display functions to provide users with an interactive experience (e.g., touch the screen to obtain information, be entertained, etc.). For example, a store provides interactive displays for customers to find certain products, to obtain coupons, to enter contests, etc.

There are a variety of other devices that include a touch screen display. For example, a vending machine includes a touch screen display to select and/or pay for an item. As another example of a device having a touch screen display is an Automated Teller Machine (ATM). As yet another example, an automobile includes a touch screen display for entertainment media control, navigation, climate control, etc.

The touch screen display 80 includes a large display 83 that has a resolution equal to or greater than full high-definition (HD), an aspect ratio of a set of aspect ratios, and a screen size equal to or greater than thirty-two inches. The following table (Table 1) lists various combinations of resolution, aspect ratio, and screen size for the display 83, but it's not an exhaustive list.

in-cell or on-cell of a layer of the touch screen display. The transparent conductive material, which is substantially transparent and has negligible effect on video quality of the display with respect to the human eye. For instance, an electrode is constructed from one or more of Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the process-

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55A, 60, 65, 70, 75, &/or >80 |
| Full HD | 1920 | 1080 | 1:1 | 16:9 | 32, 40, 43, 50, 55A, 60, 65, 70, 75, &/or >80 |
| HD | 960 | 720 | 4:3 | 16:9 | 32, 40, 43, 50, 55A, 60, 65, 70, 75, &/or >80 |
| HD | 1440 | 1080 | 4:3 | 16:9 | 32, 40, 43, 50, 55A, 60, 65, 70, 75, &/or >80 |
| HD | 1280 | 1080 | 3:2 | 16:9 | 32, 40, 43, 50, 55A, 60, 65, 70, 75, &/or >80 |
| QHD (quad HD) | 2560 | 1440 | 1:1 | 16:9 | 32, 40, 43, 50, 55A, 60, 65, 70, 75, &/or >80 |
| UHD (Ultra HD) or 4K | 3840 | 2160 | 1:1 | 16:9 | 32, 40, 43, 50, 55A, 60, 65, 70, 75, &/or >80 |
| 8K | 7680 | 4320 | 1:1 | 16:9 | 32, 40, 43, 50, 55A, 60, 65, 70, 75, &/or >80 |
| HD and above | 1280->=7680 | 720->=4320 | 1:1, 2:3, etc. | 2:3 | 50, 55A, 60, 65, 70, 75, &/or >80 |

The display 83 is one of a variety of types of displays that is operable to render frames of data into visible images. For example, the display is one or more of a light emitting diode (LED) display, an electroluminescent display (ELD), a plasma display panel (PDP), a liquid crystal display (LCD), an LCD high performance addressing (NPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns. As will be discussed in greater detail with reference to one or more of FIGS. 9-12, the row electrodes are separated from the column electrodes by a dielectric material.

The electrodes 85 are comprised of a transparent conductive material and are in-cell or on-cell with respect to layers of the display. For example, a conductive trace is placed ing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched, capacitance of the electrodes 85 proximal to the touch or touchless indication (i.e., directly or close by) is changed. The DSCs detect the capacitance change for effected electrodes and provide the detected change to the touch screen processing module 82.

The touch screen processing module 82 processes the capacitance change or other electrical characteristic of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 5:
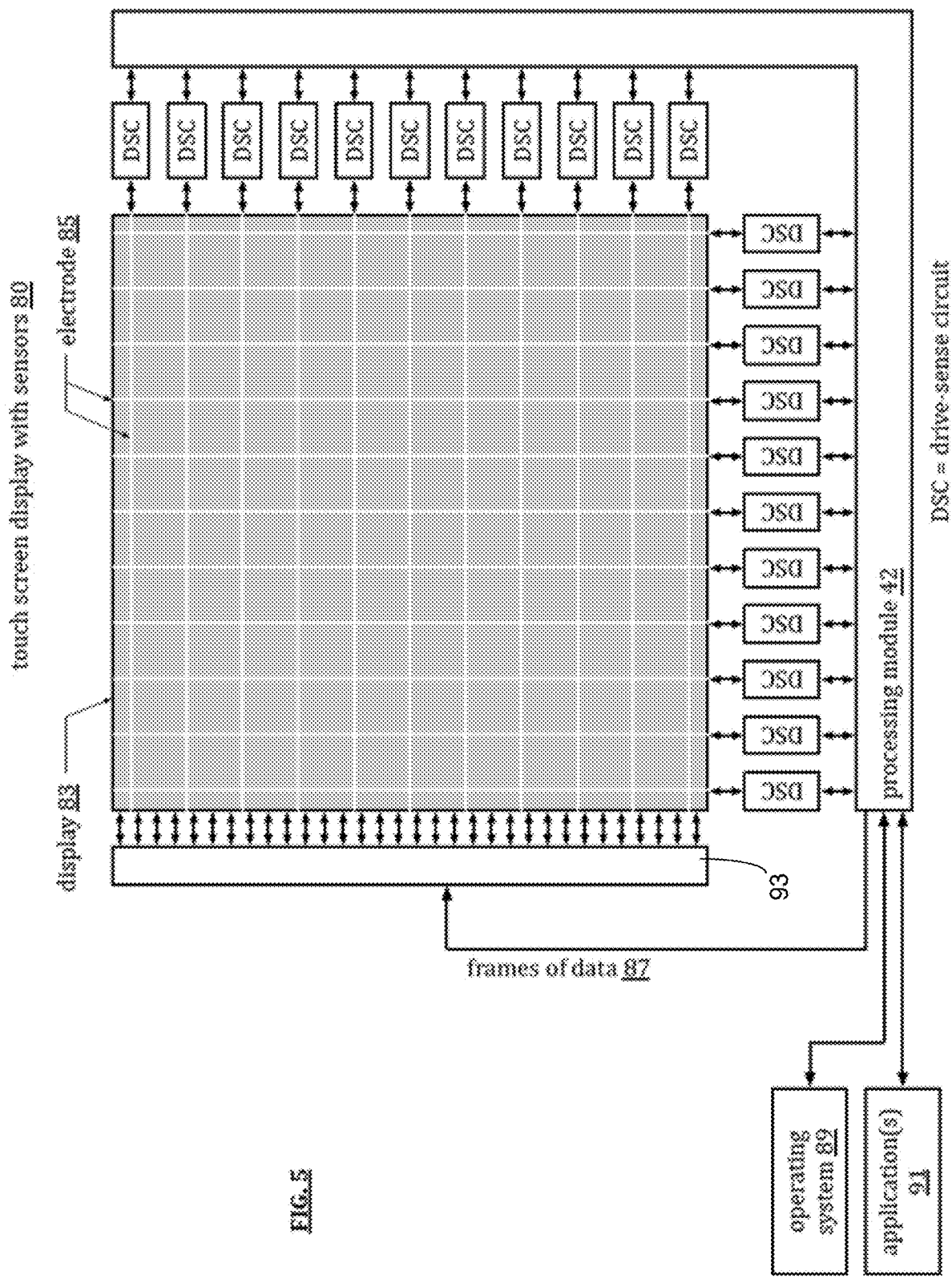
FIG. 5 is a schematic block diagram of another embodiment of a touch screen display in accordance with the present disclosure.

FIG. 5 is a schematic block diagram of another embodiment of a touch screen display 80 that includes a plurality of drive-sense circuits (DSC), the processing module 42, a display 83, and a plurality of electrodes 85. The processing module 42 is executing an operating system 89 and one or more user applications 91 to produce frames of data 87. The processing module 42 provides the frames of data 87 to the display interface 93. The touch screen display 80 operates similarly to the touch screen display 80 of FIG. 4 with the above noted differences.

Figure 6:
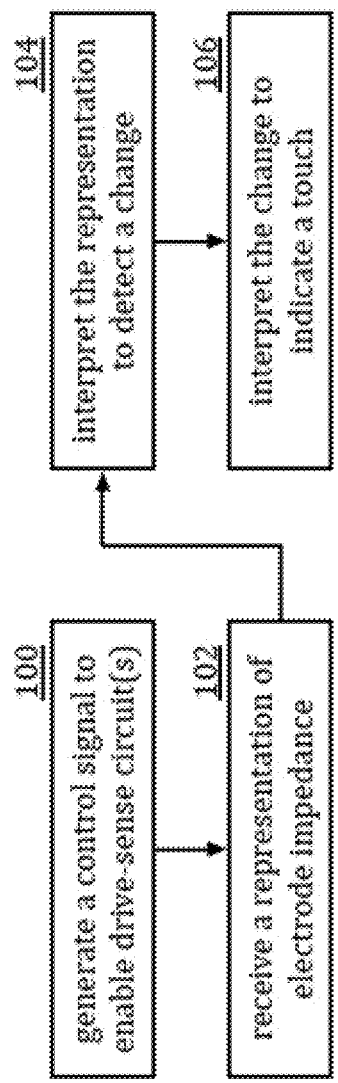
FIG. 6 is a logic diagram of an embodiment of a method for sensing a touch on a touch screen display in accordance with the present disclosure.

FIG. 6 is a logic diagram of an embodiment of a method for sensing a touch on a touch screen display that is executed by one or more processing modules (e.g., 42, 82, and/or 48 of the previous figures). The method begins at step 100 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method continues at step 102 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method continues at step 104 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode. As another example, a decrease in mutual capacitance (e.g., the capacitance between a row electrode and a column electrode) is also indicative of a touch near the electrodes. The processing module does this for each representation of the impedance of the electrode it receives. Note that the representation of the impedance is a digital value, an analog signal, an impedance value, and/or any other analog or digital way of representing a sensor's impedance.

The method continues at step 106 where the processing module interprets the change in the impedance to indicate a touch of the touch screen display in an area corresponding to the electrode. For each change in impedance detected, the processing module indicates a touch. Further processing may be done to determine if the touch is a desired touch or an undesired touch. Such further processing will be discussed in greater detail with reference to one or more of FIGS. 33-35.

Figure 7:
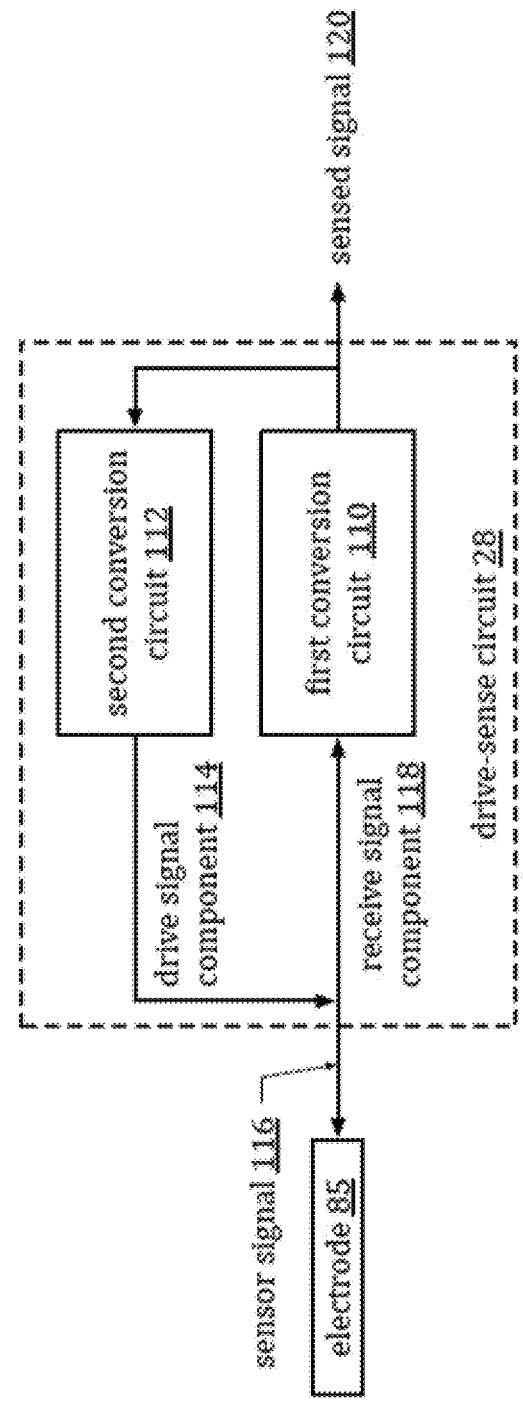
FIG. 7 is a schematic block diagram of an embodiment of a drive sense circuit in accordance with the present disclosure.

FIG. 7 is a schematic block diagram of an embodiment of a drive sense circuit 28 that includes a first conversion circuit 110 and a second conversion circuit 112. The first conversion circuit 110 converts a sensor signal 116 into a sensed signal 120. The second conversion circuit 112 generates the drive signal component 114 from the sensed signal 112. As an example, the first conversion circuit 110 functions to keep the sensor signal 116 substantially constant (e.g., substantially matching a reference signal) by creating the sensed signal 120 to correspond to changes in a receive signal component 118 of the sensor signal. The second conversion circuit 112 functions to generate a drive signal component 114 of the sensor signal based on the sensed signal 120 to substantially compensate for changes in the receive signal component 118 such that the sensor signal 116 remains substantially constant.

In an example, the drive signal 116 is provided to the electrode 85 as a regulated current signal. The regulated current (I) signal in combination with the impedance (Z) of the electrode creates an electrode voltage (V), where $V=I*Z$ and where V, I and Z are complex/vector quantities having a corresponding magnitude and phase. As the impedance (Z) of electrode changes, the regulated current (I) signal is adjusted to keep the electrode voltage (V) substantially unchanged. To regulate the current signal, the first conversion circuit 110 adjusts the sensed signal 120 based on the receive signal component 118, which is indicative of the impedance of the electrode and change thereof. The second conversion circuit 112 adjusts the regulated current based on the changes to the sensed signal 120.

As another example, the drive signal 116 is provided to the electrode 85 as a regulated voltage signal. The regulated voltage (V) signal in combination with the impedance (Z) of the electrode creates an electrode current (I), where $I=V/Z$. As the impedance (Z) of electrode changes, the regulated voltage (V) signal is adjusted to keep the electrode current (I) substantially unchanged. To regulate the voltage signal, the first conversion circuit 110 adjusts the sensed signal 120 based on the receive signal component 118, which is indicative of the impedance of the electrode and change thereof. The second conversion circuit 112 adjusts the regulated voltage based on the changes to the sensed signal 120.

Figure 8:
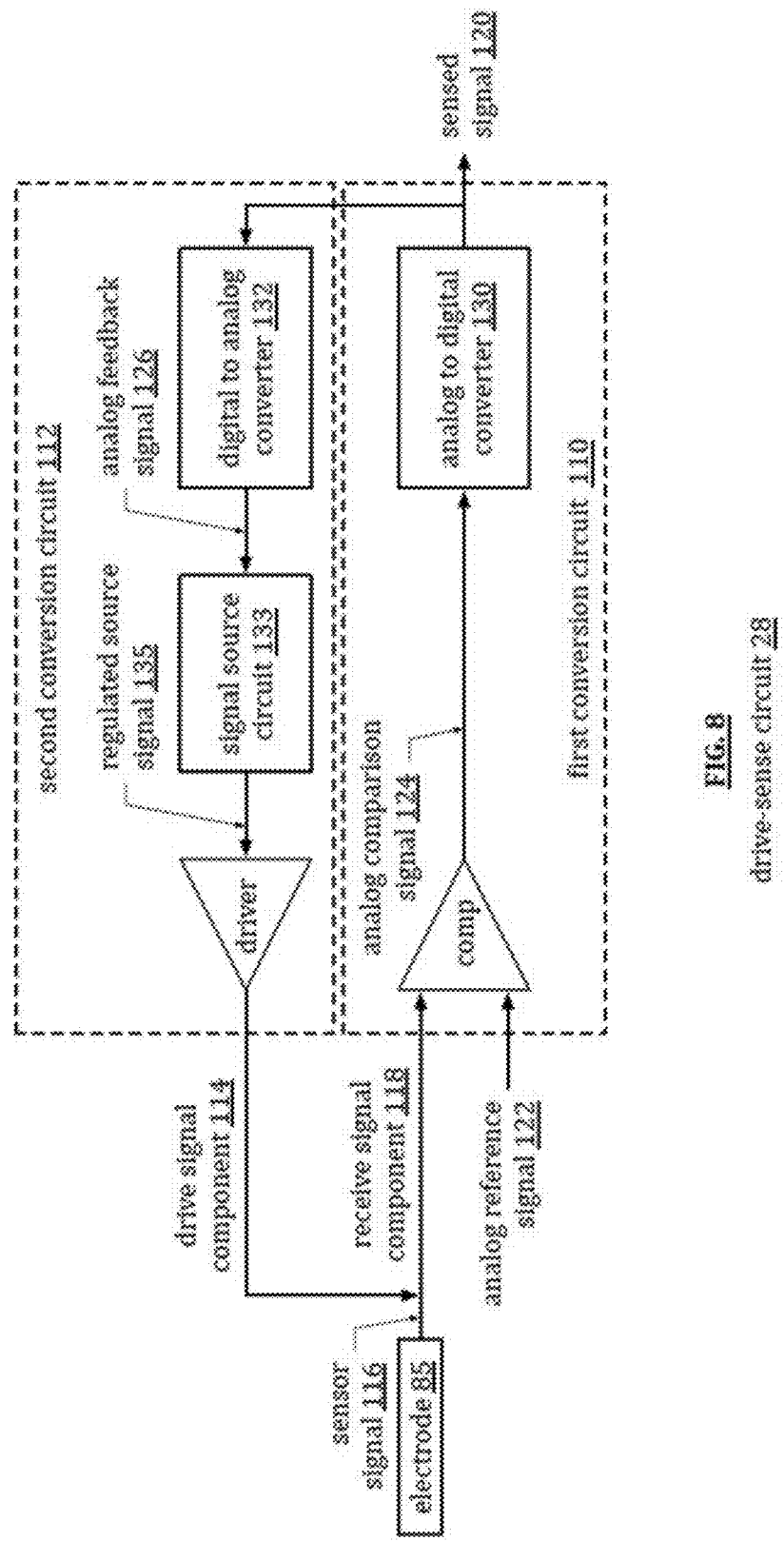
FIG. 8 is a schematic block diagram of another embodiment of a drive sense circuit in accordance with the present disclosure.

FIG. 8 is a schematic block diagram of another embodiment of a drive sense circuit 28 that includes a first conversion circuit 110 and a second conversion circuit 112. The first conversion circuit 110 includes a comparator (comp) and an analog to digital converter 130. The second conversion circuit 112 includes a digital to analog converter 132, a signal source circuit 133, and a driver.

In an example of operation, the comparator compares the sensor signal 116 to an analog reference signal 122 to produce an analog comparison signal 124. The analog reference signal 124 includes a DC component and an oscillating component. As such, the sensor signal 116 will have a substantially matching DC component and oscillating component. An example of an analog reference signal 122 will be described in greater detail with reference to FIG. 15.

The analog to digital converter 130 converts the analog comparison signal 124 into the sensed signal 120. The analog to digital converter (ADC) 130 may be implemented in a variety of ways. For example, the (ADC) 130 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114.

Figure 9A:
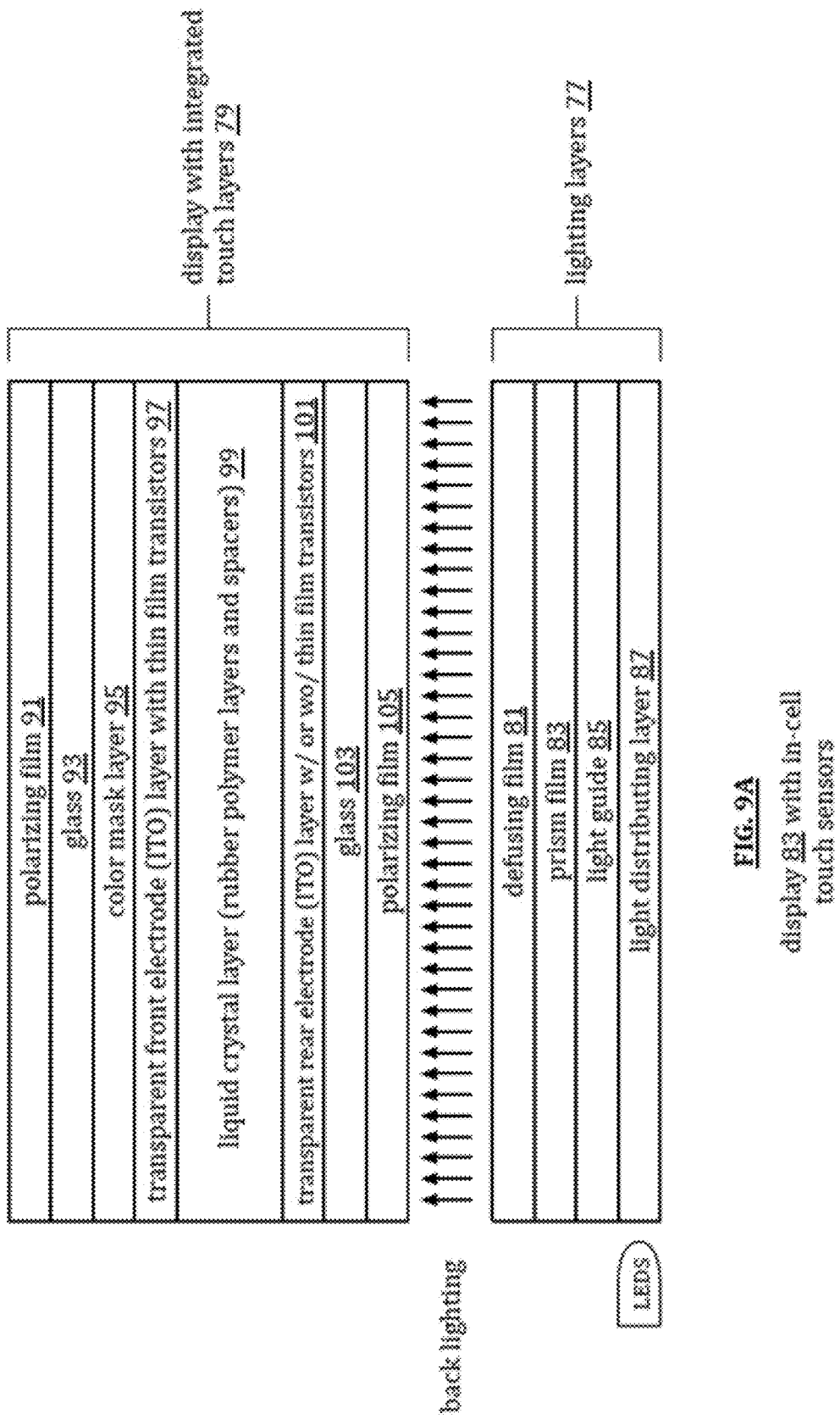
FIG. 9A is a cross section schematic block diagram of an example of a touch screen display with in-cell touch sensors in accordance with the present disclosure.

FIG. 9A is a cross section schematic block diagram of an example of a touch screen display 83 with in-cell touch sensors, which includes lighting layers 77 and display with integrated touch sensing layers 79. The lighting layers 77 include a light distributing layer 87, a light guide layer 85, a prism film layer 83, and a defusing film layer 81. The display with integrated touch sensing layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, and a front polarizing film layer 91. Note that one or more protective layers may be applied over the polarizing film layer 91.

In an example of operation, a row of LEDs (light emitted diodes) projects light into the light distributing player 87, which projects the light towards the light guide 85. The light guide includes a plurality of holes that let's some light components pass at differing angles. The prism film layer 83 increases perpendicularity of the light components, which are then defused by the defusing film layer 81 to provide a substantially even back lighting for the display with integrated touch sense layers 79.

The two polarizing film layers 105 and 91 are orientated to block the light (i.e., provide black light). The front and rear electrode layers 97 and 101 provide an electric field at a sub-pixel level to orientate liquid crystals in the liquid crystal layer 99 to twist the light. When the electric field is off, or is very low, the liquid crystals are orientated in a first manner (e.g., end-to-end) that does not twist the light, thus, for the sub-pixel, the two polarizing film layers 105 and 91 are blocking the light. As the electric field is increased, the orientation of the liquid crystals change such that the two polarizing film layers 105 and 91 pass the light (e.g., white light). When the liquid crystals are in a second orientation (e.g., side by side), intensity of the light is at its highest point.

The color mask layer 95 includes three sub-pixel color masks (red, green, and blue) for each pixel of the display, which includes a plurality of pixels (e.g., 1440×1080). As the electric field produced by electrodes change the orientations of the liquid crystals at the sub-pixel level, the light is twisted to produce varying sub-pixel brightness. The sub-pixel light passes through its corresponding sub-pixel color mask to produce a color component for the pixel. The varying brightness of the three sub-pixel colors (red, green, and blue), collectively produce a single color to the human eye. For example, a blue shirt has a 12% red component, a 20% green component, and 55A % blue component.

The in-cell touch sense functionality uses the existing layers of the display layers 79 to provide capacitance-based sensors. For instance, one or more of the transparent front and rear electrode layers 97 and 101 are used to provide row electrodes and column electrodes. Various examples of creating row and column electrodes from one or more of the transparent front and rear electrode layers 97 and 101 is discussed in some of the subsequent figures.

Figure 9B:
FIG. 9B is a schematic block diagram of an example of a transparent electrode layer with thin film transistors in accordance with the present disclosure.

FIG. 9B is a schematic block diagram of an example of a transparent electrode layer 97 and/or 101 with thin film transistors (TFT). Sub-pixel electrodes are formed on the transparent electrode layer and each sub-pixel electrode is coupled to a thin film transistor (TFT). Three sub-pixels (R—red, G—green, and B—blue) form a pixel. The gates of the TFTs associated with a row of sub-electrodes are coupled to a common gate line. In this example, each of the four rows has its own gate line. The drains (or sources) of the TFTs associated with a column of sub-electrodes are coupled to a common R, B, or G data line. The sources (or drains) of the TFTs are coupled to its corresponding sub-electrode.

In an example of operation, one gate line is activated at a time and RGB data for each pixel of the corresponding row is placed on the RGB data lines. At the next time interval, another gate line is activated and the RGB data for the pixels of that row is placed on the RGB data lines. For 1080 rows and a refresh rate of 60 Hz, each row is activated for about 15 microseconds each time it is activated, which is 60 times per second. When the sub-pixels of a row are not activated, the liquid crystal layer holds at least some of the charge to keep an orientation of the liquid crystals.

Figure 9C:
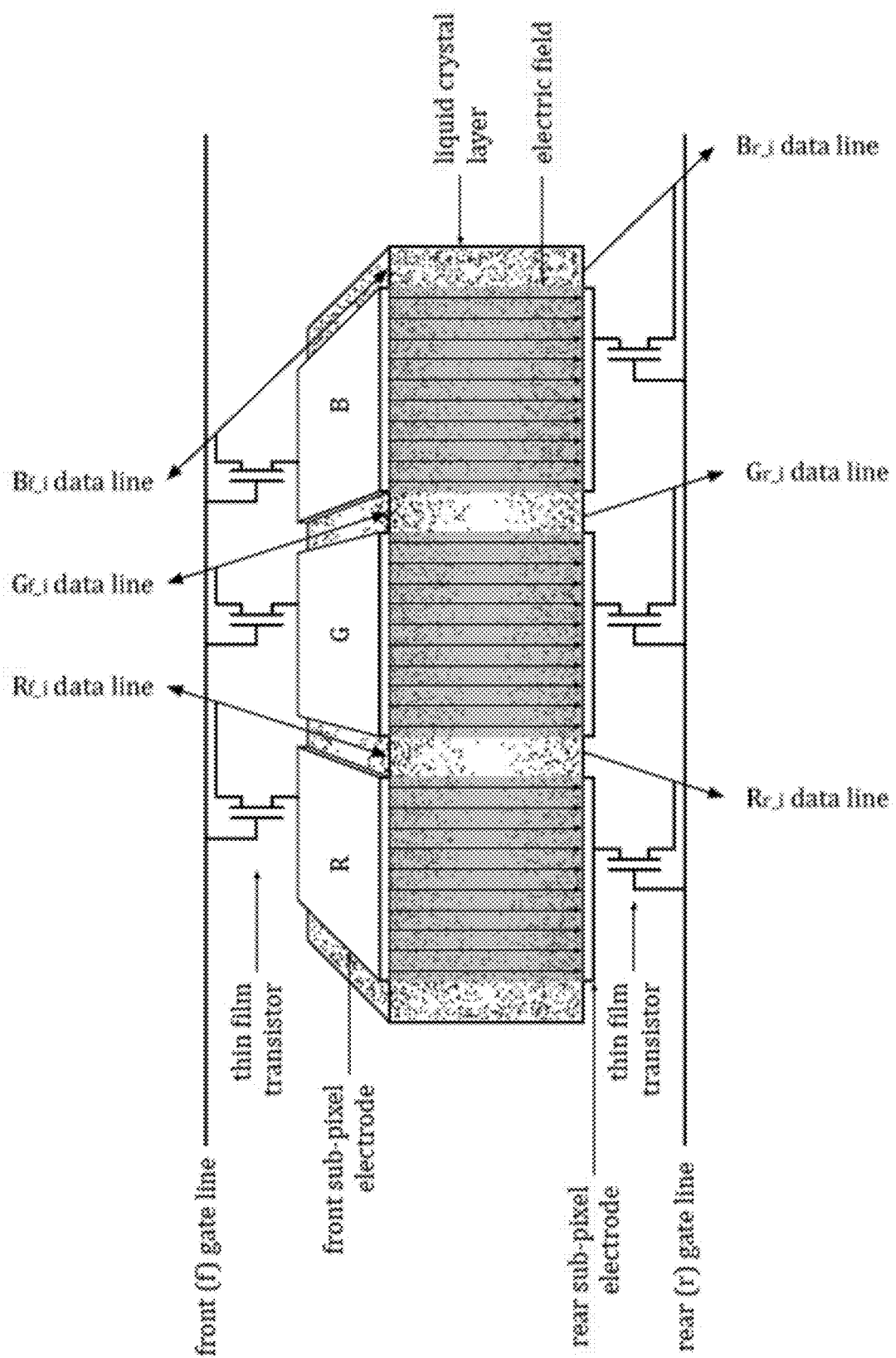
FIG. 9C is a schematic block diagram of an example of a pixel with three sub-pixels in accordance with the present disclosure.

FIG. 9C is a schematic block diagram of an example of a pixel with three sub-pixels (R—red, G—green, and B—blue). In this example, the front sub-pixel electrodes are formed in the front transparent conductor layer 97 and the rear sub-pixel electrodes are formed in the rear transparent conductor layer 101. Each front and rear sub-pixel electrode is coupled to a corresponding thin film transistor. The thin film transistors coupled to the top sub-pixel electrodes are coupled to a front (f) gate line and to front R, G, and B data lines. The thin film transistors coupled to the bottom sub-pixel electrodes are coupled to a rear (f) gate line and to rear R, G, and B data lines.

To create an electric field between related sub-pixel electrodes, a differential gate signal is applied to the front and rear gate lines and differential R, G, and B data signals are applied to the front and rear R, G, and B data lines. For example, for the red (R) sub-pixel, the thin film transistors are activated by the signal on the gate lines. The electric field created by the red sub-pixel electrodes is depending on the front and rear Red data signals. As a specific example, a large differential voltage creates a large electric field, which twists the light towards maximum light passing and increases the red component of the pixel.

The gate lines and data lines are non-transparent wires (e.g., copper) that are positioned between the sub-pixel electrodes such that they are hidden from human sight. The non-transparent wires may be on the same layer as the sub-pixel electrodes or on different layers and coupled using vias.

Figure 9D:
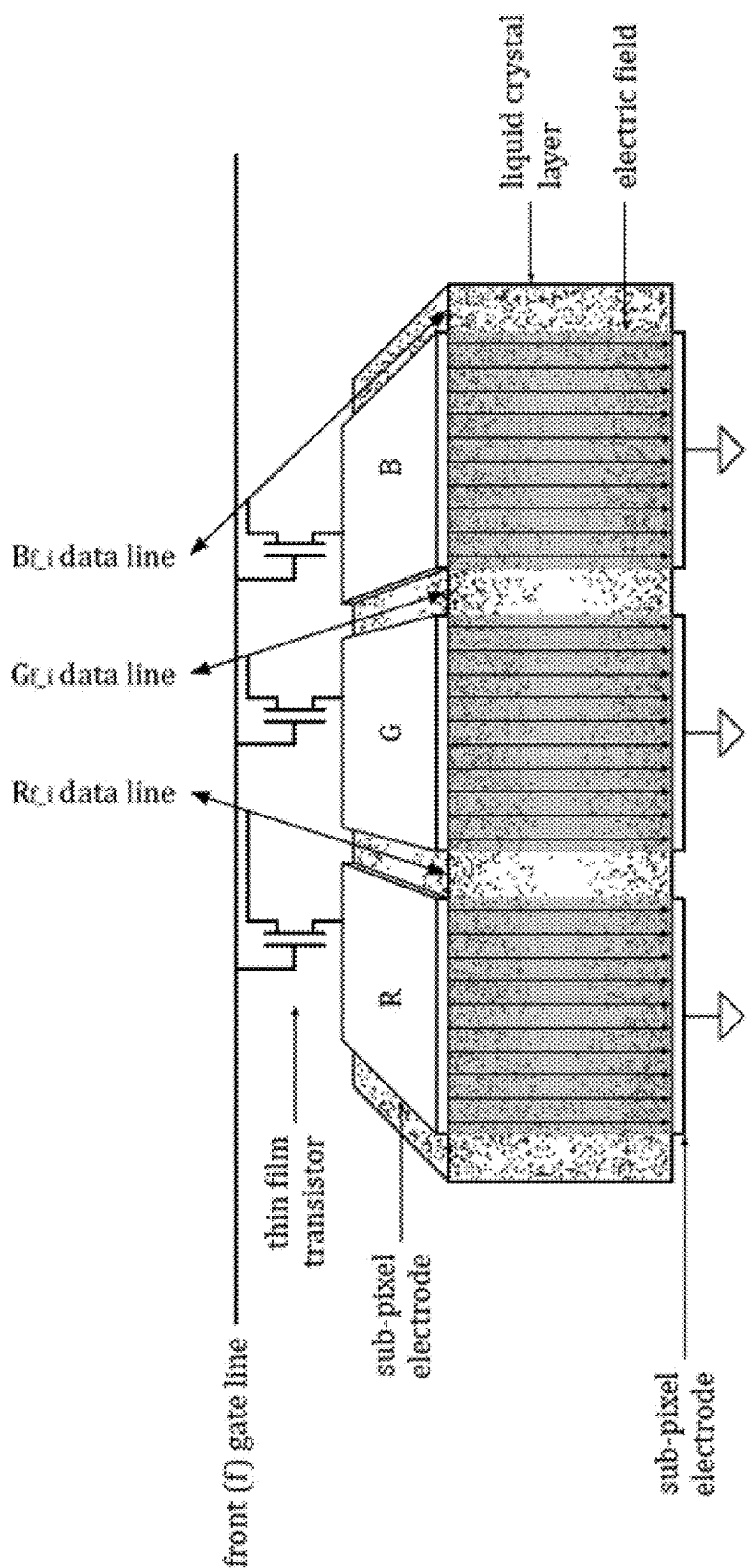
FIG. 9D is a schematic block diagram of another example of a pixel with three sub-pixels in accordance with the present disclosure.

FIG. 9D is a schematic block diagram of another example of a pixel with three sub-pixels (R—red, G—green, and B—blue). In this example, the front sub-pixel electrodes are formed in the front transparent conductor layer 97 and the rear sub-pixel electrodes are formed in the rear transparent conductor layer 101. Each front sub-pixel electrode is coupled to a corresponding thin film transistor. The thin film transistors coupled to the top sub-pixel electrodes are coupled to a front (f) gate line and to front R, G, and B data lines. Each rear sub-pixel electrode is coupled to a common voltage reference (e.g., ground, which may be a common ground plane or a segmented common ground plane (e.g., separate ground planes coupled together to form a common ground plane)).

To create an electric field between related sub-pixel electrodes, a single-ended gate signal is applied to the front gate lines and a single-ended R, G, and B data signals are applied to the front R, G, and B data lines. For example, for the red (R) sub-pixel, the thin film transistors are activated by the signal on the gate lines. The electric field created by the red sub-pixel electrodes is depending on the front Red data signals.

Figure 9E:
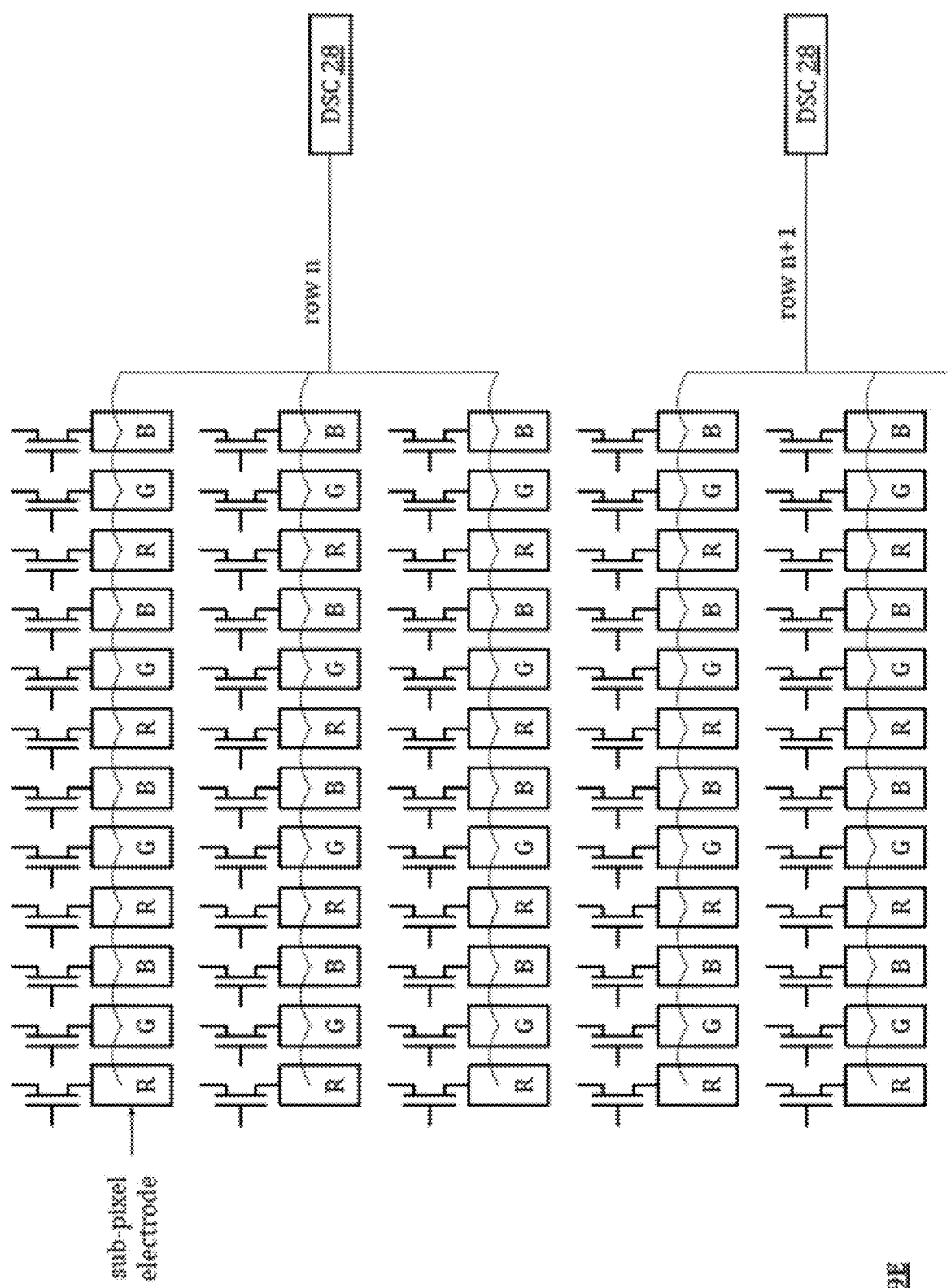
FIG. 9E is a schematic block diagram of an example of sub-pixel electrodes coupled together to form row electrodes of a touch screen sensor in accordance with the present disclosure.

FIG. 9E is a schematic block diagram of an example of sub-pixel electrodes of the front or back electrode layer 97 or 101 coupled together to form row electrodes of a touch screen sensor. In this example, 3 rows of sub-pixel electrodes are coupled together by conductors (e.g., wires, metal traces, vias, etc.) to form one row electrode, which is coupled to a drive sense circuit (DSC) 28. More or less rows of sub-pixel electrodes may be coupled together to form a row electrode.

Figure 9F:
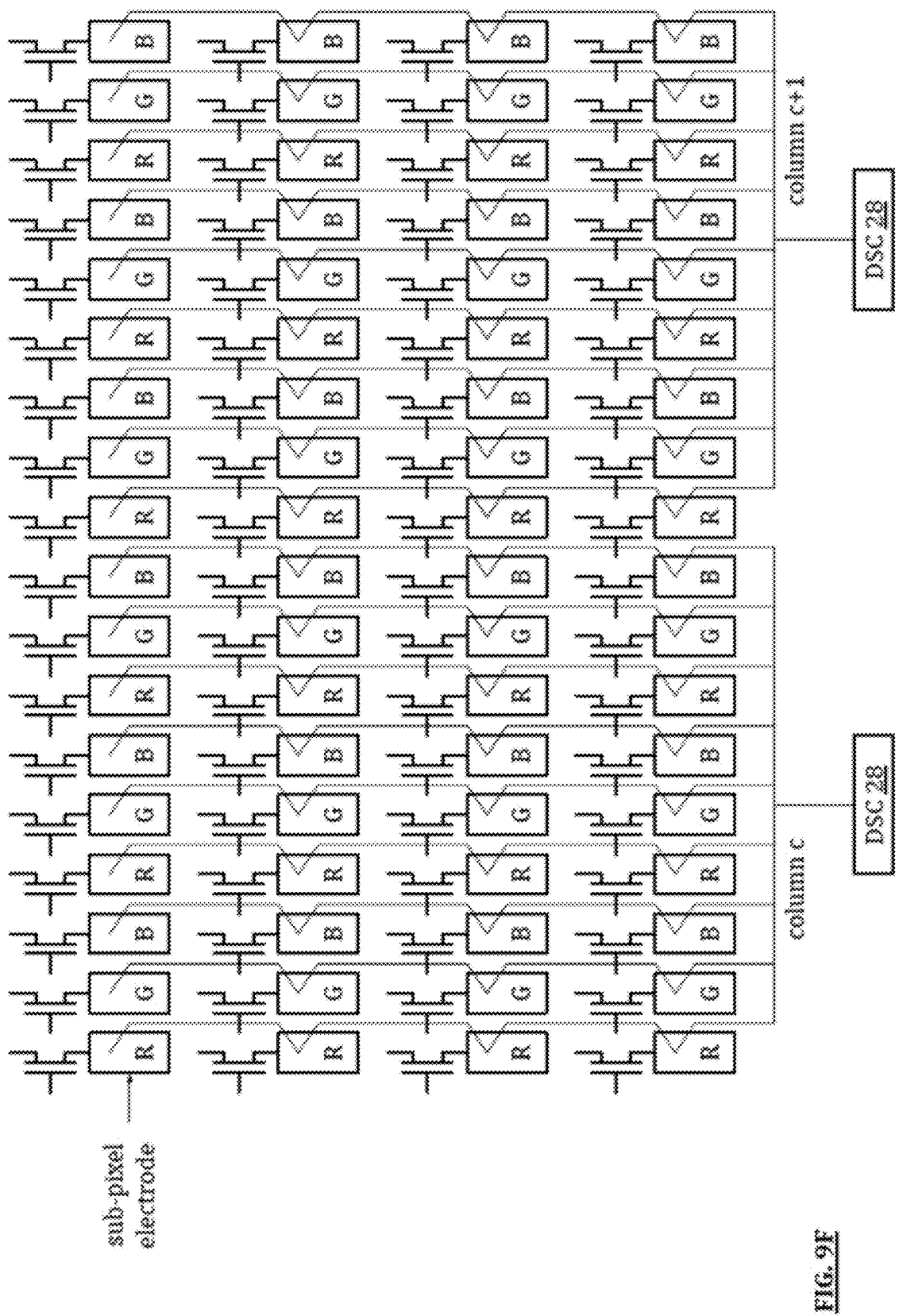
FIG. 9F is a schematic block diagram of an example of sub-pixel electrodes coupled together to form column electrodes of a touch screen sensor in accordance with the present disclosure.

FIG. 9F is a schematic block diagram of an example of sub-pixel electrodes front or back electrode layer 97 or 101 coupled together to form column electrodes of a touch screen sensor. In this example, 9 columns of sub-pixel electrodes are coupled together by conductors (e.g., wires, metal traces, vias, etc.) to form one column electrode, which is coupled to a drive sense circuit (DSC) 28. More or less columns of sub-pixel electrodes may be coupled together to form a column electrode.

With respect to FIGS. 9E and 9F, the row electrodes may be formed on one of the transparent conductor layers 97 or 101 and the column electrodes are formed on the other. In this instance, differential signaling is used for display functionality of sub-pixel electrodes and a common mode voltage is used for touch sensing on the row and column electrodes. This allows for concurrent display and touch sensing operations with negligible adverse effect on display operation.

Figure 9G:
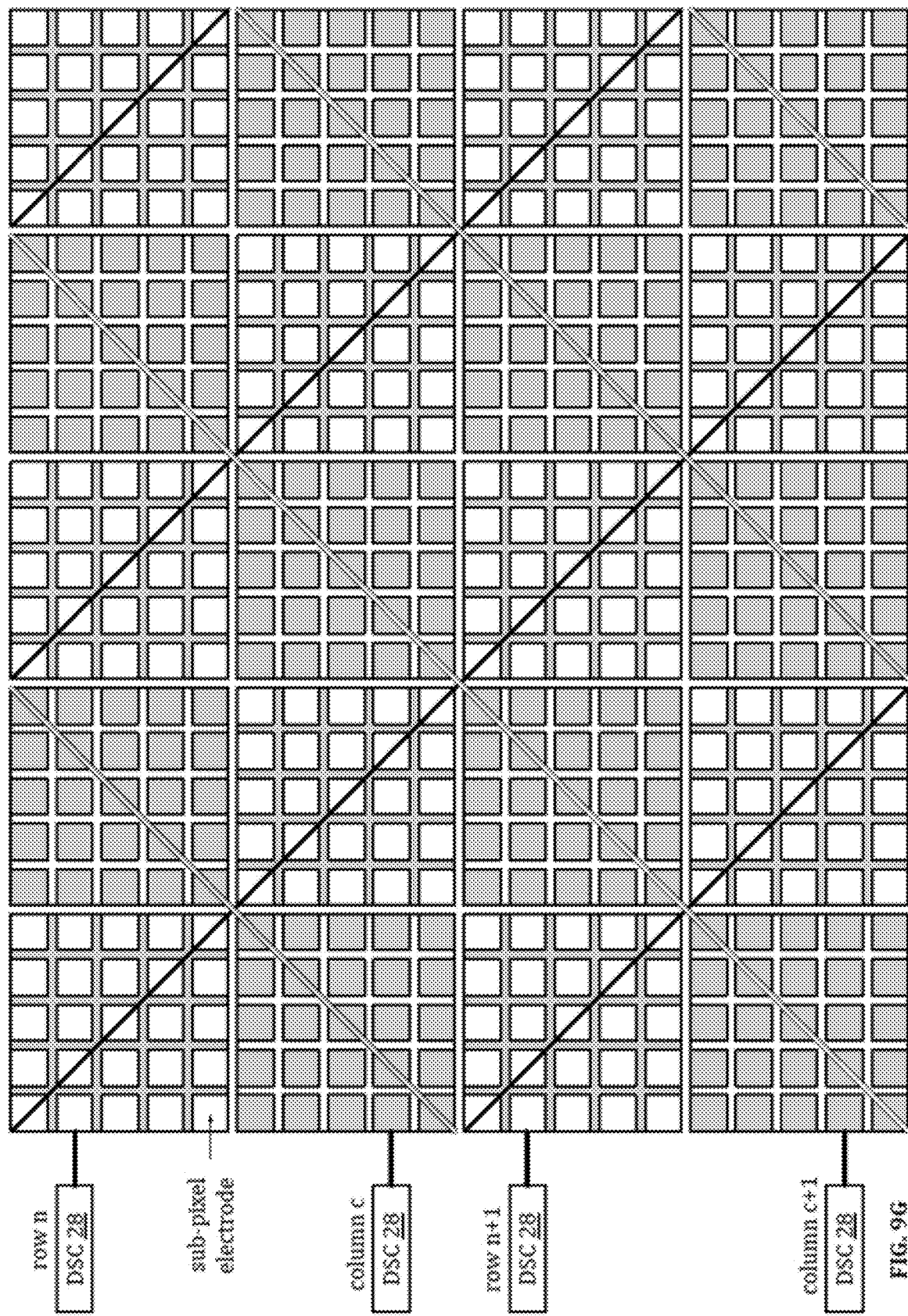
FIG. 9G is a schematic block diagram of an example of sub-pixel electrodes coupled together to form row electrodes and column electrodes of a touch screen sensor in accordance with the present disclosure.

FIG. 9G is a schematic block diagram of an example of sub-pixel electrodes coupled together to form row electrodes and column electrodes of a touch screen sensor on one of the transparent conductive layers 97 or 101. In this example, 5×5 sub-pixel electrodes are coupled together to form a square (or diamond, depending on orientation), or other geometric shape. The 5 by 5 squares are then cross coupled together to form a row electrode or a column electrode.

In this example, white sub-pixel sub-electrodes with a grey background are grouped to form a row electrode for touch sensing and the grey sub-pixels with the white background are grouped to form a column electrode. Each row electrode and column electrode is coupled to a drive sense circuit (DSC) 28. As shown, the row and column electrodes for touch sensing are diagonal. Note that the geometric shape of the row and column electrodes may be of a different configuration (e.g., zig-zag pattern, lines, etc.) and that the number of sub-pixel electrodes per square (or other shape) may include more or less than 25.

Figure 9H:
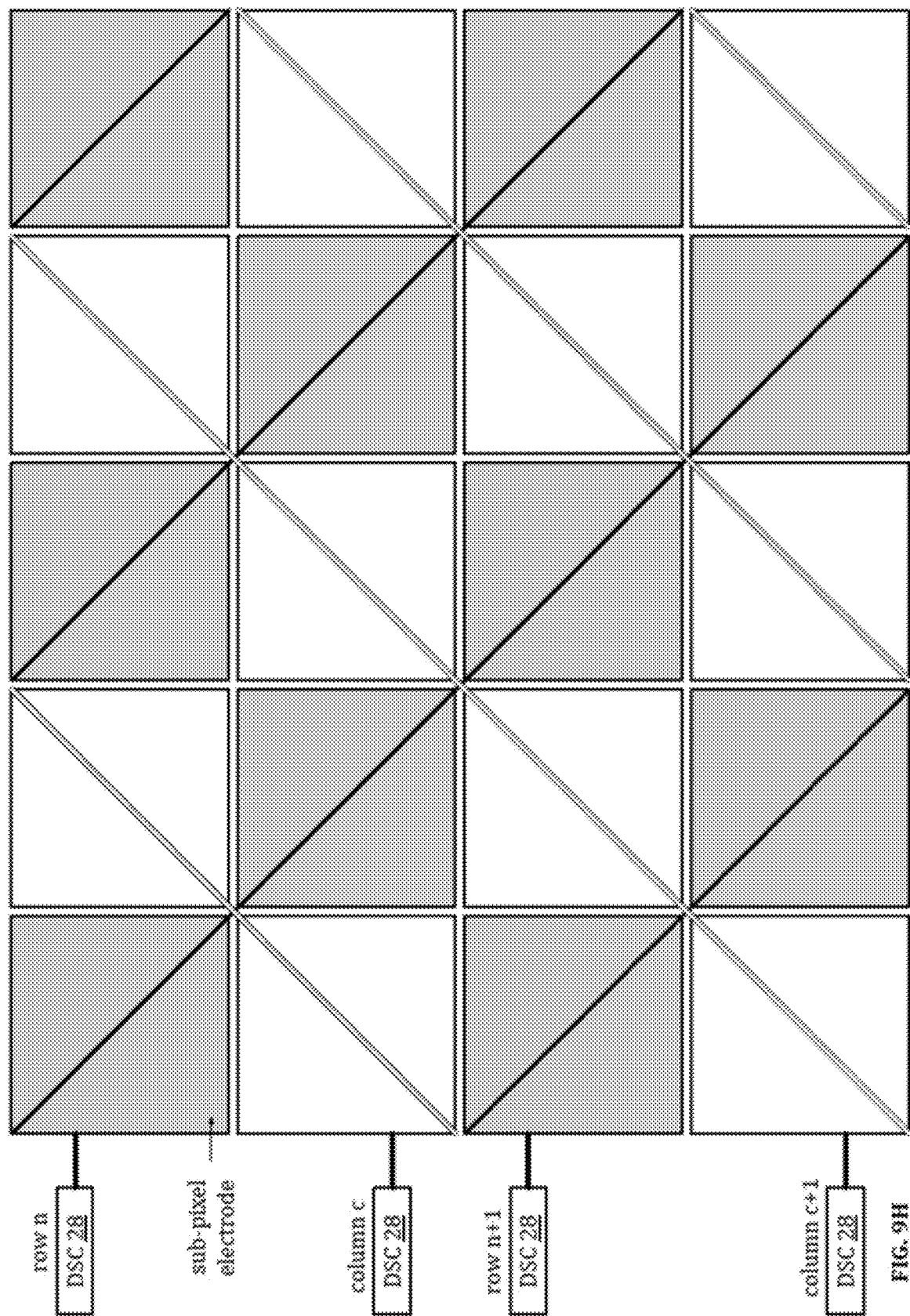
FIG. 9H is a schematic block diagram of an example of a segmented common ground plane forming row electrodes and column electrodes of a touch screen sensor in accordance with the present disclosure.

FIG. 9H is a schematic block diagram of an example of a segmented common ground plane forming row electrodes and column electrodes of a touch screen sensor on the rear transparent conductive layer 101. In this instance, each square (or other shape) corresponds to a segment of a common ground plane that services a group of sub-pixel electrodes on the front transparent layer 97. The squares (or other shape) are coupled together to form row electrodes and column electrodes. The white segmented common ground planes are coupled together to form column electrodes and the grey segmented common ground planes are coupled together to form row electrodes. By implementing the on-cell touch screen row and column electrodes in the common ground plane, display and touch sense functionalities may be concurrently executed with negligible adverse effects on the display functionality.

Figure 9I:
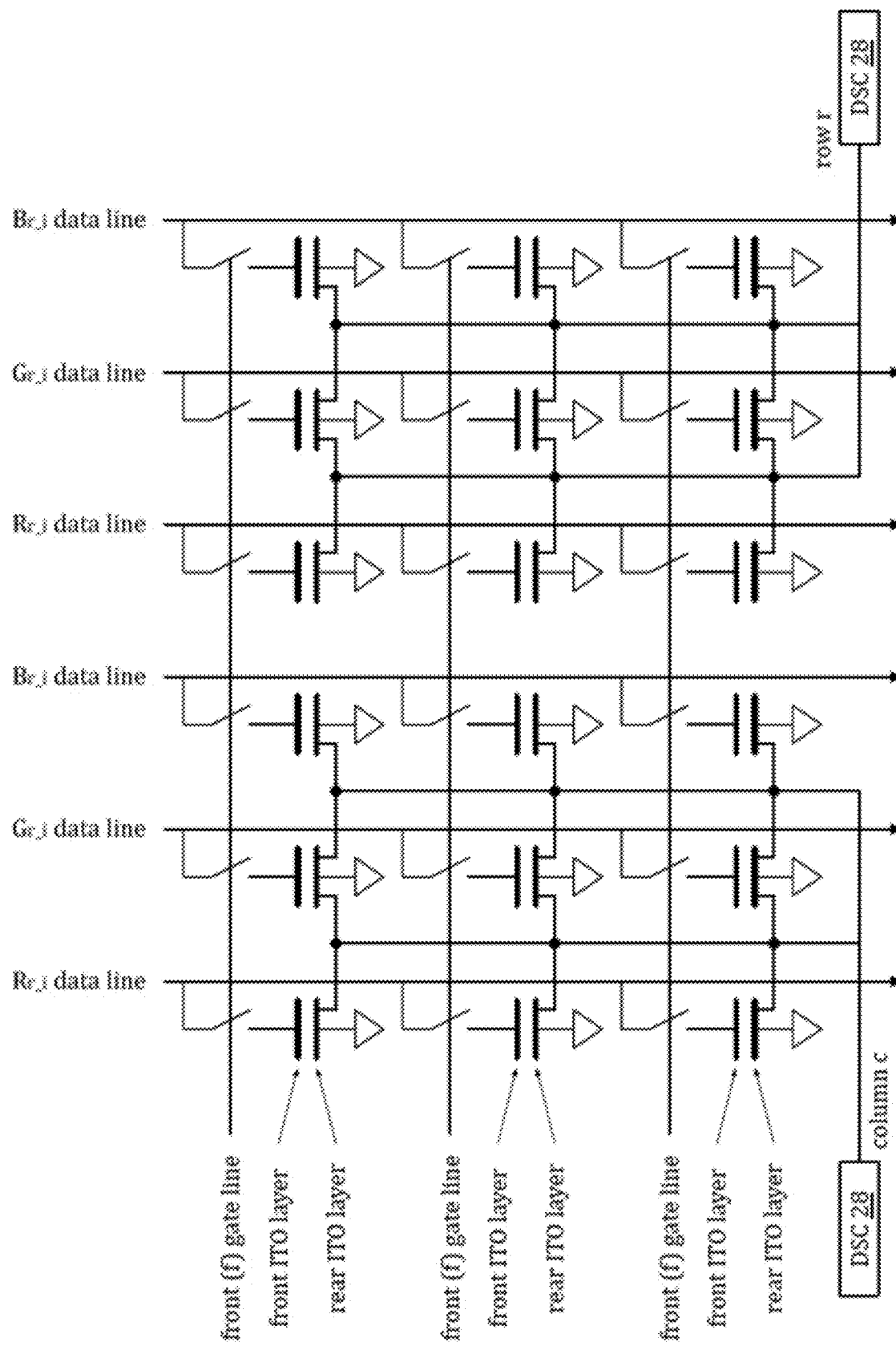
FIG. 9I is a schematic block diagram of another example of sub-pixel electrodes coupled together to form row and column electrodes of a touch screen sensor in accordance with the present disclosure.
Figure 9I:
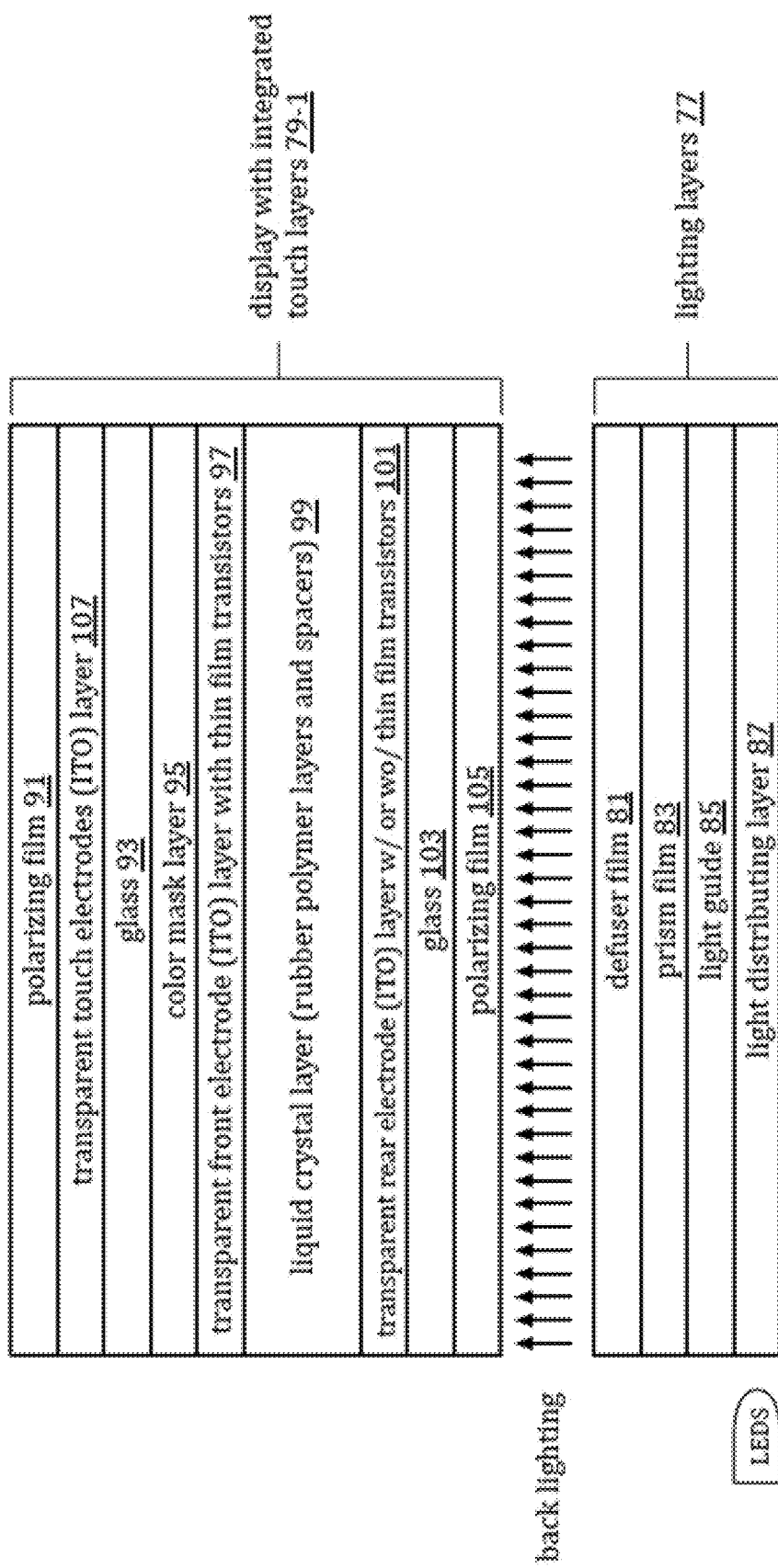

FIG. 9I is a schematic block diagram of another example of sub-pixel electrodes coupled together to form row and column electrodes of a touch screen sensor. In this example, a sub-pixel is represented as a capacitor, with the top plate being implemented in the front ITO layer 97 and the bottom plate being implemented in the back ITO layer 101, which is implemented as a common ground plan. The thin film transistors are represented as switches. In this example, 3×3 sub-pixel electrodes on the rear ITO layer are coupled together to form a portion of a row electrode for touch sensing or a column electrode for touch sensing. With each of the drive sense circuits 28 injecting a common signal for self-capacitance sensing, the common signal has negligible adverse effects on the display operation of the sub-pixels.

FIG. 9J is a cross section schematic block diagram of an example of a touch screen display 83-1 with on-cell touch sensors, which includes lighting layers 77 and display with integrated touch sensing layers 79. The lighting layers 77 include a light distributing layer 87, a light guide layer 85, a prism film layer 83, and a defusing film layer 81. The display with integrated touch sensing layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, a transparent touch layer 107, and a front polarizing film layer 91. Note that one or more protective layers may be applied over the polarizing film layer 91.

The lighting layer 77 and the display with integrated touch sensing layer 79-1 function as described with reference to FIG. 9A for generating a display. A difference lies in how on-cell touch sensing of this embodiment in comparison to the in-cell touch sensing of FIG. 9A. In particular, this embodiment includes an extra transparent conductive layer 107 to provide, or assist, with capacitive-based touch sensing. For example, the extra transparent conductive layer 107 includes row and column electrodes as shown in FIG. 9H. As another example, the extra transparent conductive layer 107 includes row electrodes or column electrodes and another one of the conductive layers 97 or 101 includes the other electrodes (e.g., column electrodes if the extra transparent layer includes row electrodes).

FIG. 10A is a cross section schematic block diagram of a touch screen display 80 without a touch of a finger or a pen. The cross section is taken parallel to a column electrode 85-$c$ and a perpendicular to a row electrode 85-$r$. The column electrode 85-$c$ is positioned between two dielectric layers 140 and 142. Alternatively, the column electrode 85-$c$ is in the second dielectric layer 142. The row electrode 85-$r$ is positioned in the second dielectric layer 142. Alternatively, the row electrode 85-$r$ is positioned between the dielectric layer 142 and the display substrate 144. As another alternative, the row and column electrodes are in the same layer. In one or more embodiments, the row and column electrodes are formed as discussed in one or more of FIGS. 9A-9J.

Each electrode 85 has a self-capacitance, which corresponds to a parasitic capacitance created by the electrode with respect to other conductors in the display (e.g., ground, conductive layer(s), and/or one or more other electrodes). For example, row electrode 85-$r$ has a parasitic capacitance $C_{p2}$ and column electrode 85-$c$ has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the touch screen display 80 includes a plurality of layers 140-144. Each illustrated layer may itself include one or more layers. For example, dielectric layer 140 includes a surface protective film, a glass protective film, and/or one or more pressure sensitive adhesive (PSA) layers. As another example, the second dielectric layer 142 includes a glass cover, a polyester (PET) film, a support plate (glass or plastic) to support, or embed, one or more of the electrodes 85-c and 85-r, a base plate (glass, plastic, or PET), and one or more PSA layers. As yet another example, the display substrate 144 includes one or more LCD layers, a back-light layer, one or more reflector layers, one or more polarizing layers, and/or one or more PSA layers.

FIG. 10B is a cross section schematic block diagram of a touch screen display 80, which is the same as in FIG. 9. This figure further includes a finger touch, which changes the self-capacitance of the electrodes. In essence, a finger touch creates a parallel capacitance with the parasitic self-capacitances. For example, the self-capacitance of the column electrode 85-c is $C_{p1}$ (parasitic capacitance)+Cn (finger capacitance) and the self-capacitance of the row electrode 85-r is $C_{p2}+C_{f2}$. As such, the finger capacitance increases the self-capacitance of the electrodes, which decreases the impedance for a given frequency. The change in impedance of the self-capacitance is detectable by a corresponding drive sense circuit and is subsequently processed to indicate a screen touch.

FIG. 11 is a cross section schematic block diagram of a touch screen display 80, which is the same as in FIG. 9. This figure further includes a mutual capacitance (Cm_0) between the electrodes when a touch is not present.

FIG. 12 is a cross section schematic block diagram of a touch screen display 80, which is the same as in FIG. 9. This figure further includes a mutual capacitance (Cm_1) between the electrodes when a touch is present. In this example, the finger capacitance is effectively in series with the mutual capacitance, which decreasing capacitance of the mutual capacitance. As the capacitance decreases for a given frequency, the impedance increases. The change in impedance of the mutual-capacitance is detectable by a corresponding drive sense circuit and is subsequently processed to indicate a screen touch. Note that, depending on the various properties (e.g., thicknesses, dielectric constants, electrode sizes, electrode spacing, etc.) of the touch screen display, the parasitic capacitances, the mutual capacitances, and/or the finger capacitance are in the range of a few pico-Farads to tens of nano-Farads. In equation form, the capacitance (C) equals:

$$C = \epsilon \frac{A}{d} \text{ where } A \text{ is plate area, } \epsilon \text{ is the dielectric constant(s),}$$

and $d$ is the distance between the plates.

FIG. 13 is an example graph that plots condition verses capacitance for an electrode of a touch screen display. As shown, the mutual capacitance decreases with a touch and the self-capacitance increases with a touch. Note that the mutual capacitance and self-capacitance for a no-touch condition are shown to be about the same. This is done merely for ease of illustration. In practice, the mutual capacitance and self-capacitance may or may not be about the same capacitance based on the various properties of the touch screen display discussed above.

FIG. 14 is an example graph that plots impedance verses frequency for an electrode of a touch screen display. The impedance of an electrode can be primarily based on its capacitance (self and/or mutual) since, in many circumstances, the resistive and inductive components are relatively insignificant. As the frequency increases for a fixed capacitance, the magnitude of the impedance decreases based on $\frac{1}{2\pi fC}$, where f is the frequency and C is the capacitance.

FIG. 15 is a time domain example graph that plots magnitude verses time for an analog reference signal 122. As discussed with reference to FIG. 8, the analog reference signal 122 (e.g., a current signal or a voltage signal) is inputted to a comparator and is compared to the sensor signal 116. The feedback loop of the drive sense circuit 28 functions to keep the senor signal 116 substantially matching the analog reference signal 122. As such, the sensor signal 116 will have a similar waveform to that of the analog reference signal 122.

In an example, the analog reference signal 122 includes a DC component 121 and/or one or more oscillating components 123. The DC component 121 is a DC voltage in the range of a few hundred milli-volts to tens of volts or more. The oscillating component 123 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 123 may vary so that it can be tuned to the impedance of the sensor and/or to be off-set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

FIG. 16 is a frequency domain example graph that plots magnitude verses frequency for an analog reference signal 122. As shown, the analog reference signal 122 includes the DC component 121 at DC (e.g., 0 Hz or near 0 Hz), a first oscillating component 123-1 at a first frequency (f1), and a second oscillating component 123-2 at a second frequency (f2). In an example, the DC component is used to measure resistance of an electrode (if desired), the first oscillating component 123-1 is used to measure the impedance of self-capacitance (e.g. the magnitude), and the second oscillating component 123-2 is used to measure the impedance of mutual-capacitance (e.g. the magnitude). Note that the second frequency may be greater than the first frequency.

Figure 17:
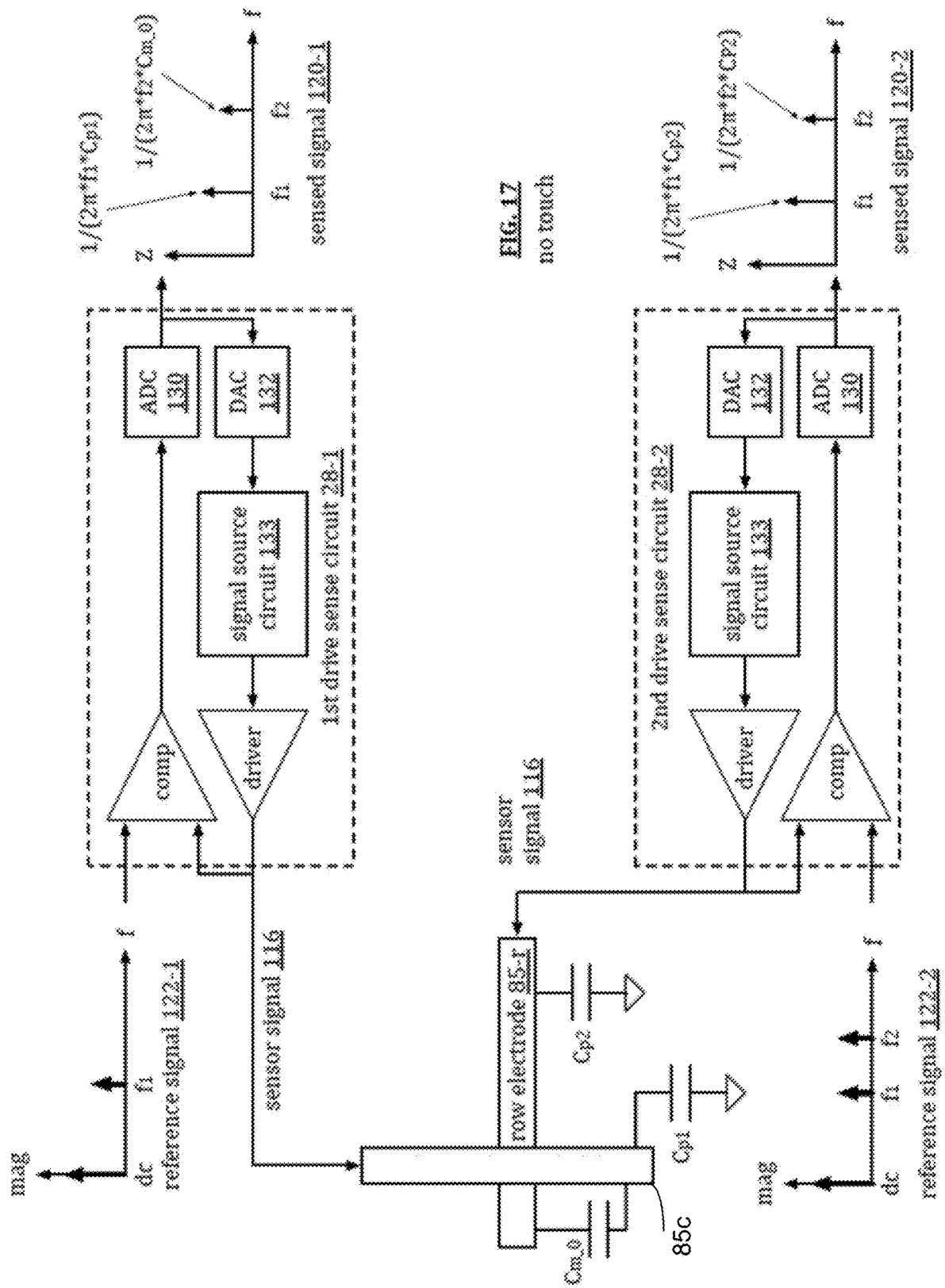
FIG. 17 is a schematic block diagram of an example of a first drive sense circuit coupled to a first electrode and a second drive sense circuit coupled to a second electrode without a touch proximal to the electrodes in accordance with the present disclosure.

FIG. 17 is a schematic block diagram of an example of a first drive sense circuit 28-1 coupled to a first electrode 85-c and a second drive sense circuit 28-2 coupled to a second electrode 85-r without a touch or touchless indication proximal to the electrodes. Each of the drive sense circuits include a comparator, an analog to digital converter (ADC) 130, a digital to analog converter (DAC) 132, a signal source circuit 133, and a driver. The functionality of this embodiment of a drive sense circuit was described with reference to FIG. 8.

As an example, a first reference signal 122-1 (e.g., analog or digital) is provided to the first drive sense circuit 28-1 and a second reference signal 122-2 (e.g., analog or digital) is provided to the second drive sense circuit 28-2. The first reference signal includes a DC component and/or an oscillating at frequency f1. The second reference signal includes a DC component and/or two oscillating components: the first at frequency f1 and the second at frequency f2.

The first drive sense circuit 28-1 generates a sensor signal 116 based on the reference signal 122-1 and provides the sensor signal to the column electrode 85-c. The second drive sense circuit generates another sensor signal 116 based on the reference signal 122-2 and provides the sensor signal to the column electrode.

In response to the sensor signals being applied to the electrodes, the first drive sense circuit 28-1 generates a first sensed signal 120-1, which includes a component at frequency $f_1$ and a component a frequency $f_2$. The component at frequency $f_1$ corresponds to the self-capacitance of the column electrode 85-c and the component a frequency $f_2$ corresponds to the mutual capacitance between the row and column electrodes 85-c and 85-r. The self-capacitance is expressed as $1/(2\pi f1 Cp1)$ and the mutual capacitance is expressed as $1/(2\pi f2 Cm\_0)$.

Also, in response to the sensor signals being applied to the electrodes, the second drive sense circuit 28-1 generates a second sensed signal 120-2, which includes a component at frequency $f_1$ and a component a frequency $f_2$. The component at frequency $f_1$ corresponds to a shielded self-capacitance of the row electrode 85-r and the component a frequency $f_2$ corresponds to an unshielded self-capacitance of the row electrode 85-r. The shielded self-capacitance of the row electrode is expressed as $1/(2\pi f1 Cp2)$ and the unshielded self-capacitance of the row electrode is expressed as $1/(2\pi f2 Cp2)$.

With each active drive sense circuit using the same frequency for self-capacitance (e.g., $f_1$), the row and column electrodes are at the same potential, which substantially eliminates cross-coupling between the electrodes. This provides a shielded (i.e., low noise) self-capacitance measurement for the active drive sense circuits. In this example, with the second drive sense circuit transmitting the second frequency component, it has a second frequency component in its sensed signal, but is primarily based on the row electrode's self-capacitance with some cross coupling from other electrodes carrying signals at different frequencies. The cross coupling of signals at other frequencies injects unwanted noise into this self-capacitance measurement and hence it is referred to as unshielded.

FIG. 18 is a schematic block diagram of an example of a first drive sense circuit 28-1 coupled to a first electrode 85-c and a second drive sense circuit 28-2 coupled to a second electrode 85-r with a finger touch or touchless indication proximal to the electrodes. This example is similar to the one of FIG. 17 with the difference being a finger touch proximal to the electrodes (e.g., a touch that shadows the intersection of the electrodes or is physically close to the intersection of the electrodes). With the finger touch, the self-capacitance and the mutual capacitance of the electrodes are changed.

In this example, the impedance of the self-capacitance at f1 of the column electrode 85-c now includes the effect of the finger capacitance. As such, the magnitude of the impedance of the self-capacitance of the column electrode equals $1/(2\pi f1*(Cp1+Cf1))$, which is included the sensed signal 120-1. The second frequency component at $f_2$ corresponds to the magnitude of the impedance of the mutual-capacitance at f2, which includes the effect of the finger capacitance. As such, the magnitude of the impedance of the mutual capacitance equals $1/(2\pi f2 Cm\_1)$, where $C_{m\_1}=(C_{m\_0}*C_n)/(C_{m\_0}+C_{f1})$.

Continuing with this example, the first frequency component at $f_1$ of the second sensed signal 120-2 corresponds to the magnitude of the impedance of the shielded self-capacitance of the row electrode 85-r at f1, which is affected by the finger capacitance. As such, the magnitude of the impedance of the capacitance of the row electrode 85-r equals $1/(2\pi f1*(Cp2+Cf2))$. The second frequency component at f2 of the second sensed signal 120-2 corresponds to the magnitude of the impedance of the unshielded self-capacitance at f2, which includes the effect of the finger capacitance and is equal to $1/(2\pi f2*(Cp2+Cf2))$.

Figure 19:
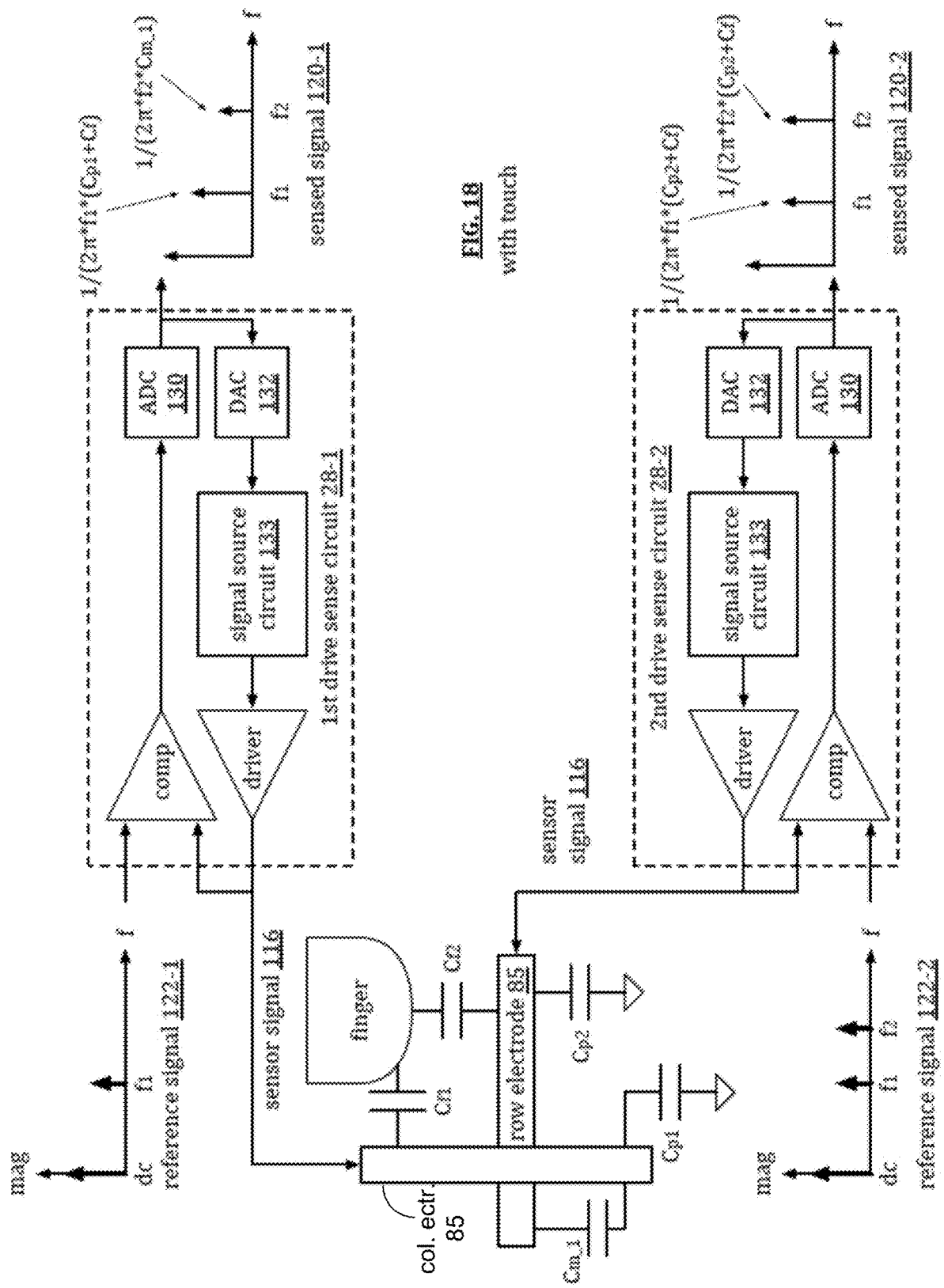
FIG. 19 is a schematic block diagram of an example of a first drive sense circuit coupled to a first electrode and a second drive sense circuit coupled to a second electrode with a pen touch proximal to the electrodes in accordance with the present disclosure.
Figure 19:
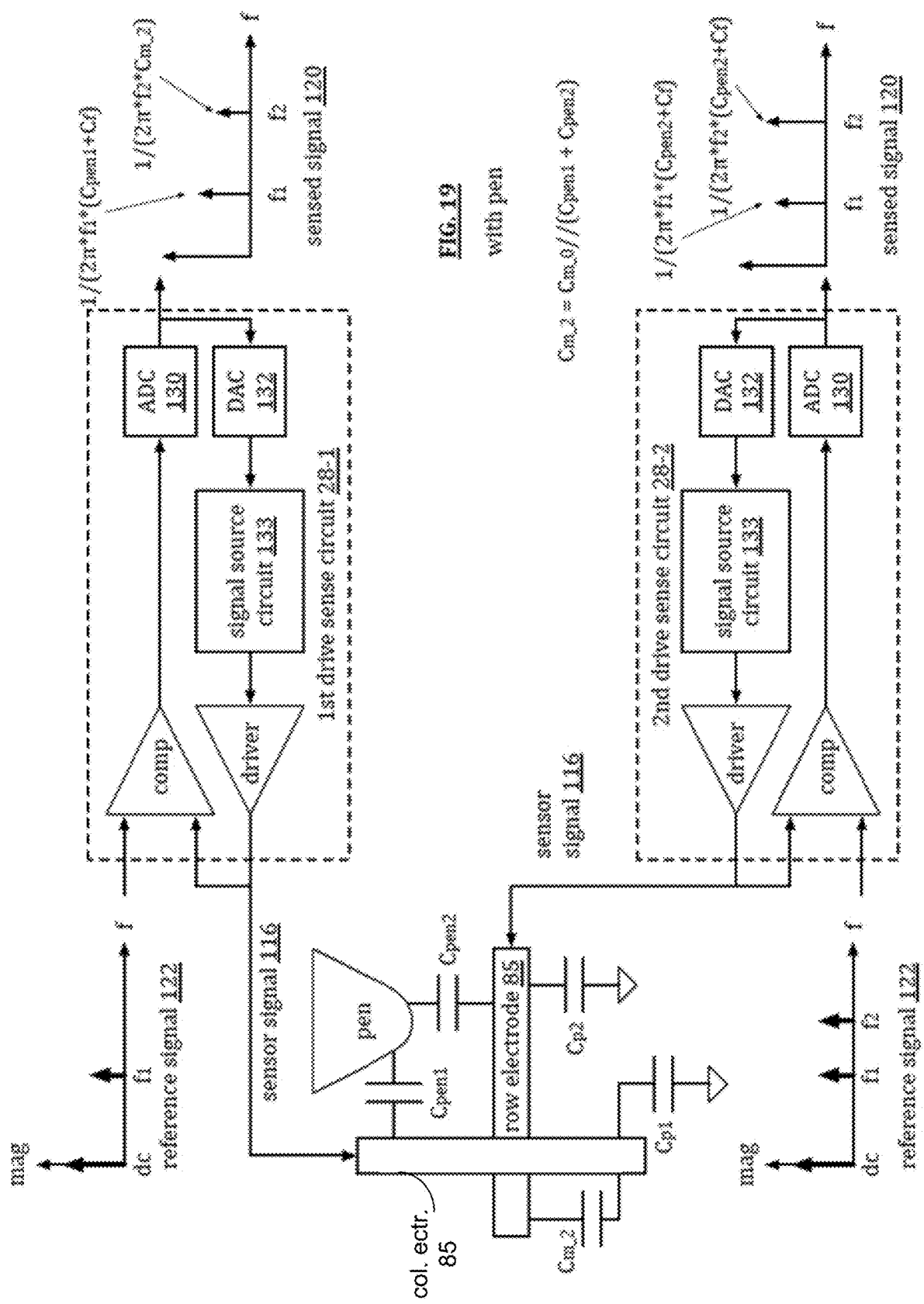

FIG. 19 is a schematic block diagram of an example of a first drive sense circuit 28-1 coupled to a first electrode 85-c and a second drive sense circuit 28-2 coupled to a second electrode 85-r with a pen touch proximal to the electrodes. This example is similar to the one of FIG. 17 with the difference being a pen touch proximal to the electrodes (e.g., a touch that shadows the intersection of the electrodes or is physically close to the intersection of the electrodes). With the pen touch, the self-capacitance and the mutual capacitance of the electrodes are changed based on the capacitance of the pen Cpen1 and $C_{pen2}$.

In this example, the impedance of the self-capacitance at f1 of the column electrode 85-c now includes the effect of the pen's capacitance. As such, the magnitude of the impedance of the self-capacitance of the column electrode equals $1/(2\pi f1*(Cp1+Cpen1))$, which is included the sensed signal 120-1. The second frequency component at f2 corresponds to the magnitude of the impedance of the mutual-capacitance at f2, which includes the effect of the pen capacitance. As such, the magnitude of the impedance of the mutual capacitance equals $1/(2\pi f2 Cm\_2)$, where $C_{m\_2}=(C_{m\_0}*C_{pen2})/(C_{m\_0}+C_{pen1})$.

Continuing with this example, the first frequency component at $f_1$ of the second sensed signal 120-2 corresponds to the magnitude of the impedance of the shielded self-capacitance of the row electrode 85-r at f3, which is affected by the pen capacitance. As such, the magnitude of the impedance of the shielded self-capacitance of the row electrode 85-r equals $1/(2\pi f1*(Cp2+Cpen2))$. The second frequency component at f2 of the second sensed signal 120-2 corresponds to the magnitude of the impedance of the unshielded self-capacitance at $f_2$, which includes the effect of the pen capacitance and is equal to $1/(2\pi f2*(Cp2+Cpen2))$. Note that the pen capacitance is represented as two capacitances, but may be one capacitance value or a plurality of distributed capacitance values.

Figure 20:
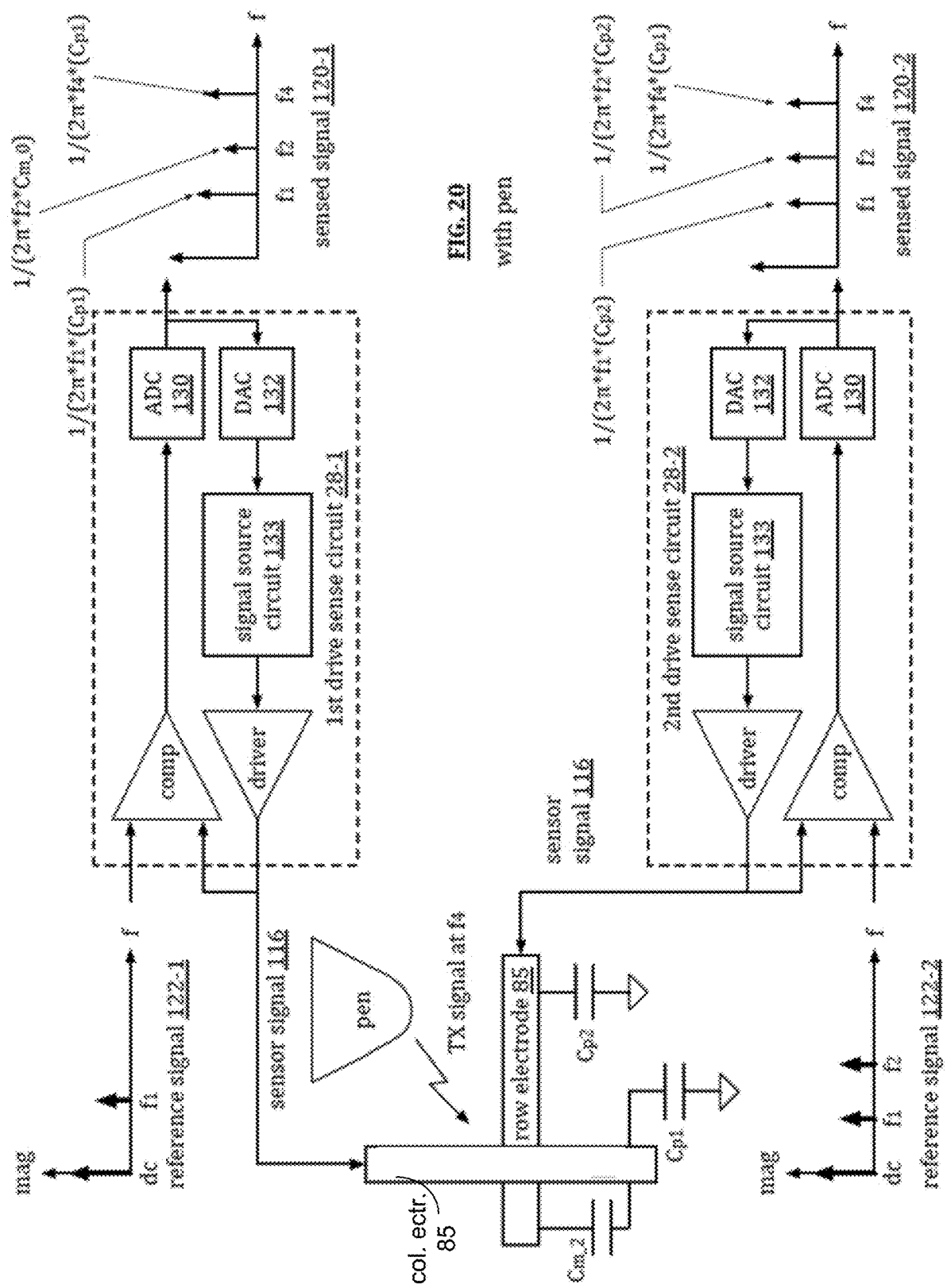
FIG. 20 is a schematic block diagram of another example of a first drive sense circuit coupled to a first electrode and a second drive sense circuit coupled to a second electrode with a pen touch proximal to the electrodes in accordance with the present disclosure.

FIG. 20 is a schematic block diagram of an example of a first drive sense circuit 28-1 coupled to a first electrode 85-c and a second drive sense circuit 28-2 coupled to a second electrode 85-r with a pen proximal to the electrodes. Each of the drive sense circuits include a comparator, an analog to digital converter (ADC) 130, a digital to analog converter (DAC) 132, a signal source circuit 133, and a driver. The functionality of this embodiment of a drive sense circuit was described with reference to FIG. 8. The pen is operable to transmit a signal at a frequency of $f_4$, which affects the self and mutual capacitances of the electrodes 85.

In this example, a first reference signal 122-1 is provided to the first drive sense circuit 28-1. The first reference signal includes a DC component and/or an oscillating component at frequency f1. The first oscillating component at f1 is used to sense impedance of the self-capacitance of the column electrode 85-c. The first drive sense circuit 28-1 generates a first sensed signal 120-1 that includes three frequency dependent components. The first frequency component at f1 corresponds to the magnitude of the impedance of the self-capacitance at f1, which equals $1/(2\pi f1 Cp1)$. The second frequency component at f2 corresponds to the magnitude of the impedance of the mutual-capacitance at f2, which equals $1/(2\pi f2 Cm\_0)$. The third frequency component at f4 corresponds to the signal transmitted by the pen.

Continuing with this example, a second reference signal 122-2 is provided to the second drive sense circuit 28-2. The second analog reference signal includes a DC component and/or two oscillating components: the first at frequency f1 and the second at frequency f2. The first oscillating component at f1 is used to sense magnitude of the impedance of the shielded self-capacitance of the row electrode 85-$r$ and the second oscillating component at f2 is used to sense the unshielded self-capacitance of the row electrode 85-$r$. The second drive sense circuit 28-2 generates a second sensed signal 120-2 that includes three frequency dependent components. The first frequency component at f1 corresponds to the magnitude of the impedance of the shielded self-capacitance at B, which equals $1/(2\pi f1 Cp2)$. The second frequency component at $f_2$ corresponds to the magnitude of the impedance of the unshielded self-capacitance at f2, which equals $1/(2\pi f2 Cp2)$. The third frequency component at f4 corresponds to signal transmitted by the pen.

As a further example, the pen transmits a sinusoidal signal having a frequency of $f_4$. When the pen is near the surface of the touch screen, electromagnetic properties of the signal increase the voltage on (or current in) the electrodes proximal to the touch of the pen. Since impedance is equal to voltage/current (in complex/vector representations) and as a specific example, when the magnitude of the voltage increases for a constant current, the magnitude of the impedance increases. As another specific example, when the magnitude of the current increases for a constant voltage, the magnitude of the impedance increases. The increase in magnitude of the impedance is detectable and is used as an indication of a touch (including touchless indications).

FIG. 21 is a schematic block diagram of another embodiment of a touch screen display 80 that includes the display 83, the electrodes 85, a plurality of drive sense circuits (DSC), and the touch screen processing module 82, which function as previously discussed. In addition, the touch screen processing module 82 generates a plurality of control signals 150 to enable the drive-sense circuits (DSC) to monitor the sensor signals 120 on the electrodes 85. For example, the processing module 82 provides an individual control signal 150 to each of the drive sense circuits to individually enable or disable the drive sense circuits. In an embodiment, the control signal 150 closes a switch to provide power to the drive sense circuit. In another embodiment, the control signal 150 enables one or more components of the drive sense circuit.

The processing module 82 further provides analog reference signals 122 to the drive sense circuits. In an embodiment, each drive sense circuit receives a unique analog reference signal. In another embodiment, a first group of drive sense circuits receive a first analog reference signal and a second group of drive sense circuits receive a second analog reference signal. In yet another embodiment, the drive sense circuits receive the same analog reference signal. Note that the processing module 82 uses a combination of analog reference signals with control signals to ensure that different frequencies are used for oscillating components of the analog reference signal.

The drive sense circuits provide sensed signals 116 to the electrodes. The impedances of the electrodes affect the sensed signal, which the drive sense circuits sense via the received signal component and generate the sensed signal 120 therefrom. The sensed signals 120 are essentially representations of the impedances of the electrodes, which are provided to the touch screen processing module 82.

The processing module 82 interprets the sensed signals 122 (e.g., the representations of impedances of the electrodes) to detect a change in the impedance of one or more electrodes. For example, a finger touch increases the self-capacitance of an electrode, thereby decreasing its impedance magnitude at a given frequency. As another example, a finger touch decreases the mutual capacitance of an electrode, thereby increasing its impedance magnitude at a given frequency. The processing module 82 then interprets the change in the impedance of one or more electrodes to indicate one or more touches of the touch screen display 80.

FIG. 22 is a schematic block diagram of a touchless example of a few drive sense circuits 28 and a portion of the touch screen processing module 82 of a touch screen display 80. The portion of the processing module 82 includes band pass filters 160, 162, 160-1, & 160-2, self-frequency interpreters 164 & 164-1, and 166 & 166-1. As previously discussed, a first drive sense circuit is coupled to column electrode 85$c$ and a second drive sense circuit is coupled to a row electrode 85$r$.

The drive sense circuits provide sensor signals 116 to their respective electrodes 85 and produce therefrom respective sensed signals 120. The first sensed signal 120-1 includes a first frequency component at $f_1$ that corresponds to the self-capacitance of the column electrode 85$c$ and a second frequency component at $f_2$ that corresponds to the mutual capacitance of the column electrode 85$c$. The second sensed signal 120-2 includes a first frequency component at $f_1$ that corresponds to the shielded self-capacitance of the row electrode 85$r$ and/or a second frequency component at $f_2$ that corresponds to the unshielded self-capacitance of the row electrode 85$r$. In an embodiment, the sensed signals 120 are frequency domain digital signals.

The first bandpass filter 160 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 160 passes the portion of the sensed signal 120-1 that corresponds to the self-capacitance of the column electrode 85$c$. In an embodiment, the sensed signal 116 is a digital signal, thus, the first bandpass filter 160 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a self-capacitance value 168-1 for the column electrode. As an example, the frequency interpreter 164 is a processing module, or portion thereof, that executes a function to convert the first bandpass filter sensed signal into the self-capacitance value 168-1, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The second bandpass filter 162 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 160 passes the portion of the sensed signal 120-1 that corresponds to the mutual-capacitance of the column electrode 85$c$ and the row electrode 85$r$. In an embodiment, the sensed signal 116 is a digital signal, thus, the second bandpass filter 162 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 166 receives the second bandpass filter sensed signal and interprets it to render a mutual-capacitance value 170-1. As an example, the frequency interpreter 166 is a processing module, or portion thereof, that executes a function to convert the second bandpass filter sensed signal into the mutual-capacitance value 170-1, which is an actual capacitance value, a relative capacitance value (e.g., in a range of 0-100), and/or a difference capacitance value (e.g., is the difference between a default capacitance value and a sensed capacitance value). As another example, the frequency interpreter 166 is a look up table where the first bandpass filter sensed signal is an index for the table.

For the row electrode 85r, the drive-sense circuit 28 produces a second sensed signal 120-2, which includes a shielded self-capacitance component and/or an unshielded self-capacitance component. The third bandpass filter 160-1 is similar to the first bandpass filter 160 and, as such passes signals in a bandpass region centered about frequency $f_1$ and attenuates signals outside of the bandpass region. In this example, the third bandpass filter 160-1 passes the portion of the second sensed signal 120-2 that corresponds to the shielded self-capacitance of the row electrode 85r.

The frequency interpreter 164-1 receives the second bandpass filter sensed signal and interprets it to render a second and shielded self-capacitance value 168-2 for the row electrode. The frequency interpreter 164-1 may be implemented similarly to the first frequency interpreter 164 or an integrated portion thereof. In an embodiment, the second self-capacitance value 168-2 is an actual capacitance value, a relative capacitance value (e.g., in a range of 0-100), or a difference capacitance value (e.g., is the difference between a default capacitance value and a sensed capacitance value).

The fourth bandpass filter 162-2, if included, is similar to the second bandpass filter 162. As such, it passes, substantially unattenuated, signals in a bandpass region centered about frequency $f_2$ and attenuates signals outside of the bandpass region. In this example, the fourth bandpass filter 162-2 passes the portion of the second sensed signal 120-2 that corresponds to the unshielded self-capacitance of the row electrode 85r.

The frequency interpreter 166-1, if included, receives the fourth bandpass filter sensed signal and interprets it to render an unshielded self-capacitance value 168-2. The frequency interpreter 166-1 may be implemented similarly to the first frequency interpreter 166 or an integrated portion thereof. In an embodiment, the unshielded self-capacitance value 170-2 is an actual capacitance value, a relative capacitance value (e.g., in a range of 0-100), or a difference capacitance value (e.g., is the difference between a default capacitance value and a sensed capacitance value). Note that the unshielded self-capacitance may be ignored, thus band pass filter 162-1 and frequency interpreter 166-1 may be omitted.

FIG. 23 is a schematic block diagram of a finger touch example of a few drive sense circuits and a portion of the touch screen processing module of a touch screen display that is similar to FIG. 22, with the difference being a finger touch as represented by the finger capacitance Cf. In this example, the self-capacitance and mutual capacitance of each electrode is affected by the finger capacitance.

The effected self-capacitance of the column electrode 85c is processed by the first bandpass filter 160 and the frequency interpreter 164 to produce a self-capacitance value 168-1a. The mutual capacitance of the column electrode 85c and row electrode is processed by the second bandpass filter 162 and the frequency interpreter 166 to produce a mutual-capacitance value 170-1a.

The effected shielded self-capacitance of the row electrode 85r is processed by the third bandpass filter 160-1 and the frequency interpreter 164-1 to produce a self-capacitance value 168-2a. The effected unshielded self-capacitance of the row electrode 85r is processed by the fourth bandpass filter 162-1 and the frequency interpreter 166-1 to produce an unshielded self-capacitance value 170-2a.

FIG. 24 is a schematic block diagram of a pen touch example of a few drive sense circuits and a portion of the touch screen processing module of a touch screen display that is similar to FIG. 22, with the difference being a pen touch as represented by the pen capacitance $C_{pen}$. In this example, the self-capacitance and mutual capacitance of each electrode is affected by the pen capacitance.

The effected self-capacitance of the column electrode 85c is processed by the first bandpass filter 160 and the frequency interpreter 164 to produce a self-capacitance value 168-1a. The affected mutual capacitance of the column electrode 85c and row electrode 85r is processed by the second bandpass filter 162 and the frequency interpreter 166 to produce a mutual-capacitance value 170-1a.

The effected shielded self-capacitance of the row electrode 85r is processed by the third bandpass filter 160-1 and the frequency interpreter 164-1 to produce a shielded self-capacitance value 168-2a. The effected unshielded self-capacitance of the row electrode 85r is processed by the fourth bandpass filter 162-1 and the frequency interpreter 166-1 to produce an unshielded self-capacitance value 170-2a.

Figure 25:
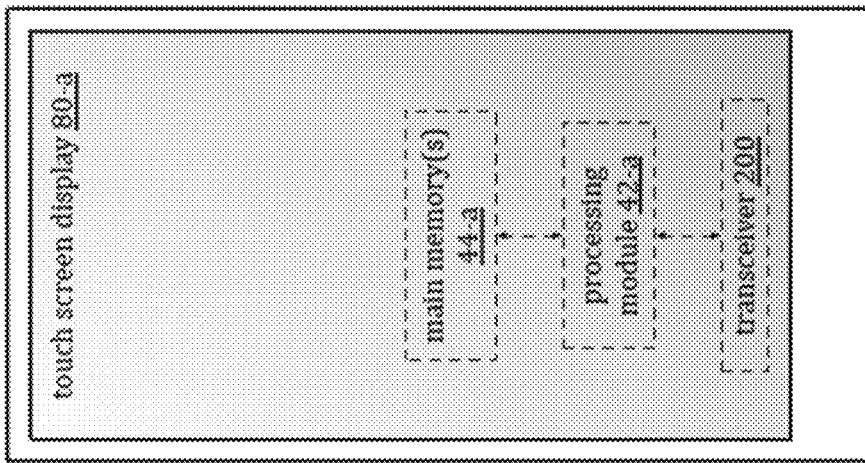
FIG. 25 is a schematic block diagram of an embodiment of a computing device having touch screen display in accordance with the present disclosure.

FIG. 25 is a schematic block diagram of an embodiment of a computing device 14-a having touch screen display 80-a. The computing device 14-a is a cell phone, a personal video device, a tablet, or the like and the touch screen display has a screen size that is equal to or less than 15 inches. The computing device 14-a includes a processing module 42-a, main memory 44-a, and a transceiver 200. An embodiment of the transceiver 200 will be discussed with reference to FIG. 27. The processing module 42-a and the main memory 44-a are similar to the processing module 42 and the main memory 44 of the computing device 14 of FIG. 2.

Figure 26:
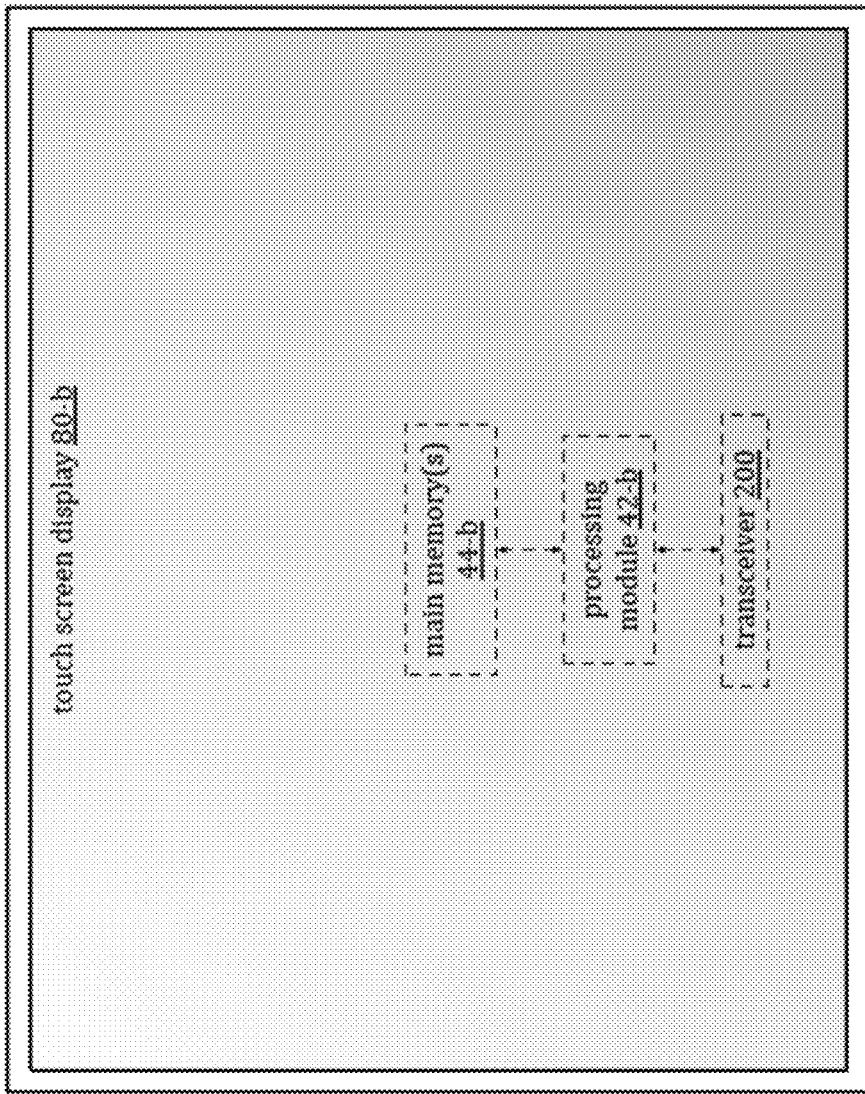
FIG. 26 is a schematic block diagram of another embodiment of a computing device having touch screen display in accordance with the present disclosure.

FIG. 26 is a schematic block diagram of another embodiment of a computing device 14-b having touch screen display 80-b. The computing device 14-b is a computer, an interactive display, a large tablet, or the like and the touch screen display 80-b has a screen size that is greater than 15 inches. The computing device 14-b includes a processing module 42-b, main memory 44-b, and a transceiver 200. An embodiment of the transceiver 200 will be discussed with reference to FIG. 27. The processing module 42-b and the main memory 44-b are similar to the processing module 42 and the main memory 44 of the computing device 14 of FIG. 2.

FIG. 27 is a schematic block diagram of another embodiment of a computing device 14-a and/or 14-b that includes the processing module 42 (e.g., a and/or b), the main memory 44 (e.g., a and/or b), the touch screen display 80 (e.g., a and/or b), and the transceiver 200. The transceiver 200 includes a transmit/receive switch module 173, a receive filter module 171, a low noise amplifier (LNA) 172, a down conversion module 170, a filter/gain module 168, an analog to digital converter (ADC) 166, a digital to analog converter (DAC) 178, a filter/gain module 170, an up-conversion module 182, a power amplifier (PA) 184, a transmit filter module 185, one or more antennas 186, and a local oscillation module 174. In an alternate embodiment, the transceiver 200 includes a transmit antenna and a receiver antenna (as shown using dashed lines) and omit the common antenna 186 and the transmit/receive (Tx/Rx) switch module 173.

In an example of operation using the common antenna 186, the antenna receives an inbound radio frequency (RF) signal, which is routed to the receive filter module 171 via the Tx/Rx switch module 173 (e.g., a balun, a cross-coupling circuit, etc.). The receive filter module 171 is a bandpass or low pass filter that passes the inbound RF signal to the LNA 172, which amplifies it.

The down conversion module 170 converts the amplified inbound RF signal into a first inbound symbol stream corresponding to a first signal component (e.g., RX 1adj) and into a second inbound symbol stream corresponding to the second signal component (e.g., RX 2adj). In an embodiment, the down conversion module 170 mixes in-phase (I) and quadrature (Q) components of the amplified inbound RF signal (e.g., amplified RX 1adj and RX 2adj) with in-phase and quadrature components of receiver local oscillation 181 to produce a mixed I signal and a mixed Q signal for each component of the amplified inbound RF signal. Each pair of the mixed I and Q signals are combined to produce the first and second inbound symbol streams. In this embodiment, each of the first and second inbound symbol streams includes phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]).

The filter/gain module 168 filters the down-converted inbound signal, which is then converted into a digital inbound baseband signal 190 by the ADC 166. The processing module 42 converts the inbound symbol stream(s) into inbound data 192 (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion may include one or more of digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the processing module converts a single inbound symbol stream into the inbound data for Single Input Single Output (SISO) communications and/or for Multiple Input Single Output (IVISO) communications and converts the multiple inbound symbol streams into the inbound data for Single Input Multiple Output (SIMO) and Multiple Input Multiple Output (MIMO) communications.

In an example, the inbound data 192 includes display data 202. For example, the inbound RF signal 188 includes streaming video over a wireless link. As such, the inbound data 192 includes the frames of data 87 of the video file, which the processing module 42 provides to the touch screen display 80 for display. The processing module 42 further processes proximal touch data 204 (e.g., finger or pen touches) of the touch screen display 80. For example, a touch corresponds to a command that is to be wirelessly sent to the content provider of the streaming wireless video.

In this example, the processing module interprets the proximal touch data 204 to generate a command (e.g., pause, stop, etc.) regarding the streaming video. The processing module processes the command as outbound data 194 e.g., voice, text, audio, video, graphics, etc.) by converting it into one or more outbound symbol streams (e.g., outbound baseband signal 196) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the processing module converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The DAC 178 converts the outbound baseband signal 196 into an analog signal, which is filtered by the filter/gain module 180. The up-conversion module 182 mixes the filtered analog outbound baseband signal with a transmit local oscillation 183 to produce an up-converted signal. This may be done in a variety of ways. In an embodiment, in-phase and quadrature components of the outbound baseband signal are mixed with in-phase and quadrature components of the transmit local oscillation to produce the up-converted signal. In another embodiment, the outbound baseband signal provides phase information (e.g., +/−ΔG [phase shift] and/or θ(t) [phase modulation]) that adjusts the phase of the transmit local oscillation to produce a phase adjusted up-converted signal. In this embodiment, the phase adjusted up-converted signal provides the up-converted signal. In another embodiment, the outbound baseband signal further includes amplitude information (e.g., A(t) [amplitude modulation]), which is used to adjust the amplitude of the phase adjusted up converted signal to produce the up-converted signal. In yet another embodiment, the outbound baseband signal provides frequency information (e.g., +/−Δf [frequency shift] and/or f(t) [frequency modulation]) that adjusts the frequency of the transmit local oscillation to produce a frequency adjusted up-converted signal. In this embodiment, the frequency adjusted up-converted signal provides the up-converted signal. In another embodiment, the outbound baseband signal further includes amplitude information, which is used to adjust the amplitude of the frequency adjusted up-converted signal to produce the up-converted signal. In a further embodiment, the outbound baseband signal provides amplitude information (e.g., +/−ΔA [amplitude shift] and/or A(t) [amplitude modulation) that adjusts the amplitude of the transmit local oscillation to produce the up-converted signal.

The power amplifier 184 amplifies the up-converted signal to produce an outbound RF signal 198. The transmit filter module 185 filters the outbound RF signal 198 and provides the filtered outbound RF signal to the antenna 186 for transmission, via the transmit/receive switch module 173.

Note that processing module may produce the display data from the inbound data, the outbound data, application data, and/or system data.

Figure 28:
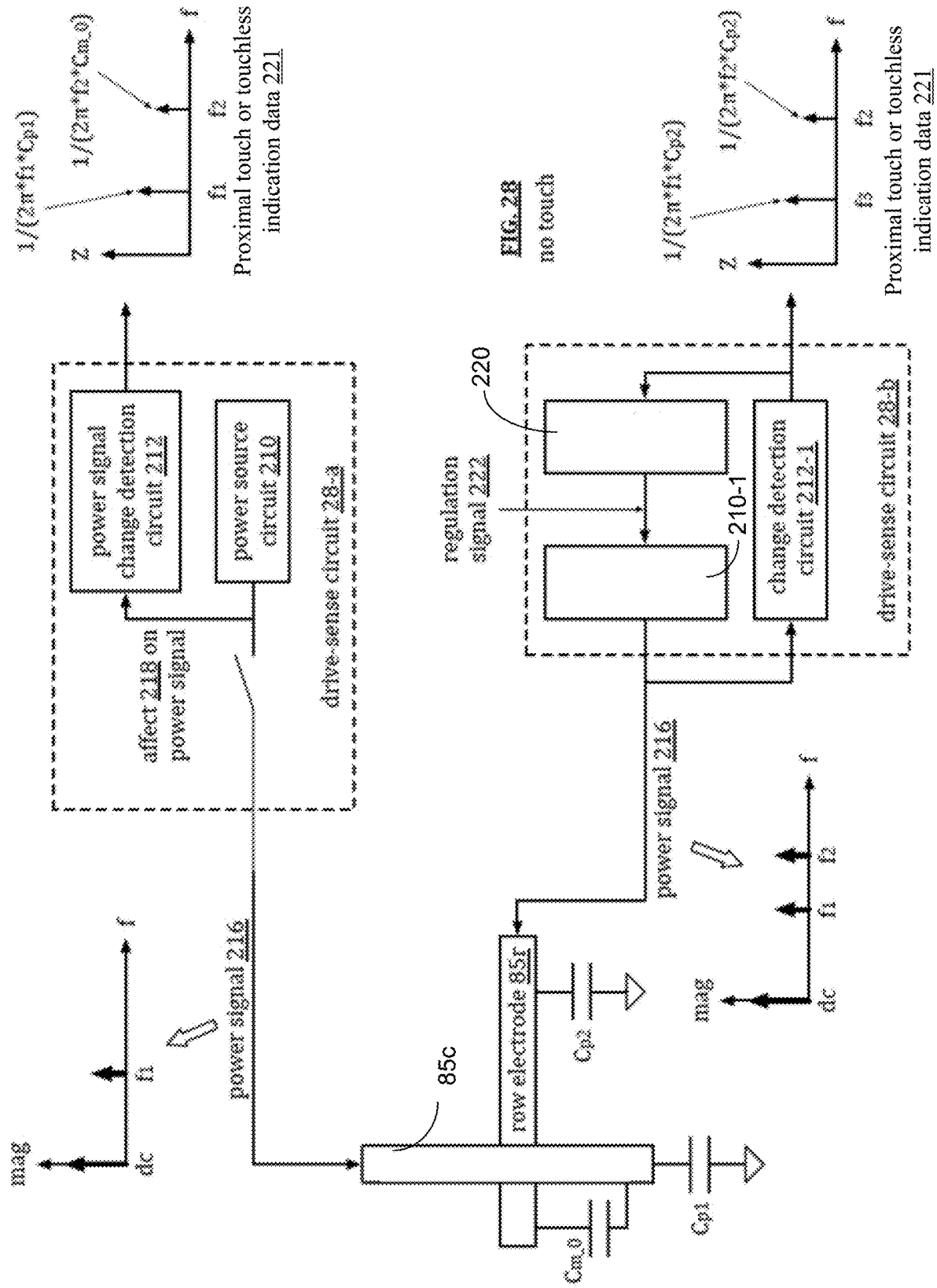
FIG. 28 is a schematic block diagram of another example of a first drive sense circuit coupled to a first electrode and a second drive sense circuit coupled to a second electrode without a touch or touchless indication proximal to the electrodes in accordance with the present disclosure.

FIG. 28 is a schematic block diagram of another example of a first drive sense circuit 28-*a* coupled to a column electrode 85*c* and a second drive sense circuit 28-*b* coupled to a row electrode 85*r* without a touch or touchless indication proximal to the electrodes. The first drive sense circuit 28-*a* includes a power source circuit 210 and a power signal change detection circuit 212. The second drive sense circuit 28-*b* includes a power source circuit 210-1, a power signal change detection circuit 212-1, and a regulation circuit 220.

The power source circuit 210 of the first drive sense circuit 28-*a* is operably coupled to the column electrode 85*c* and, when enabled (e.g., from a control signal from the processing module 42, power is applied, a switch is closed, a reference signal is received, etc.) provides a power signal 216 to the column electrode 85*c*. The power source circuit 210 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provides a desired power level to the sensor and substantially matches the impedance of the sensor. The power source circuit 110 generates the power signal 116 to include a DC (direct current) component and/or an oscillating component.

When receiving the power signal 216, the impedance of the electrode affects 218 the power signal. When the power signal change detection circuit 212 is enabled, it detects the affect 218 on the power signal as a result of the impedance of the electrode. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the electrode changed from 1.5 K Ohms to 1 K Ohms. The power signal change detection circuit 212 determines the change and generates a sensed signal, and/or proximal touch or touchless indication data 221.

The power source circuit 210-1 of the second drive sense circuit 28-*b* is operably coupled to the row electrode 85*r* and, when enabled (e.g., from a control signal from the processing module 42, power is applied, a switch is closed, a reference signal is received, etc.) provides a power signal 216 to the electrode 85*r*. The power source circuit 210-1 may be implemented similarly to power source circuit 210 and generates the power signal 216 to include a DC (direct current) component and/or an oscillating component.

When receiving the power signal 216, the impedance of the row electrode 85*r* affects the power signal. When the change detection circuit 212-1 is enabled, it detects the effect on the power signal as a result of the impedance of the electrode 85*r*. The change detection circuit 210-1 is further operable to generate a sensed signal 120, and/or proximal touch or touchless indication data 221, that is representative of change to the power signal based on the detected effect on the power signal.

The regulation circuit 152, when its enabled, generates regulation signal 22 to regulate the DC component to a desired DC level and/or regulate the oscillating component to a desired oscillating level (e.g., magnitude, phase, and/or frequency) based on the sensed signal 120. The power source circuit 210-1 utilizes the regulation signal 222 to keep the power signal 216 at a desired setting regardless of the impedance changes of the electrode 85*r*. In this manner, the amount of regulation is indicative of the affect the impedance of the electrode has on the power signal.

In an example, the power source circuit 210-1 is a DC-DC converter operable to provide a regulated power signal 216 having DC and AC components. The change detection circuit 212-1 is a comparator and the regulation circuit 220 is a pulse width modulator to produce the regulation signal 222. The comparator compares the power signal 216, which is affected by the electrode, with a reference signal that includes DC and AC components. When the impedance is at a first level, the power signal is regulated to provide a voltage and current such that the power signal substantially resembles the reference signal.

When the impedance changes to a second level, the change detection circuit 212-1 detects a change in the DC and/or AC component of the power signal 216 and generates the sensed signal 120, which indicates the changes. The regulation circuit 220 detects the change in the sensed signal 120 and creates the regulation signal 222 to substantially remove the impedance change effect on the power signal 216. The regulation of the power signal 216 may be done by regulating the magnitude of the DC and/or AC components, by adjusting the frequency of AC component, and/or by adjusting the phase of the AC component.

Figure 29:
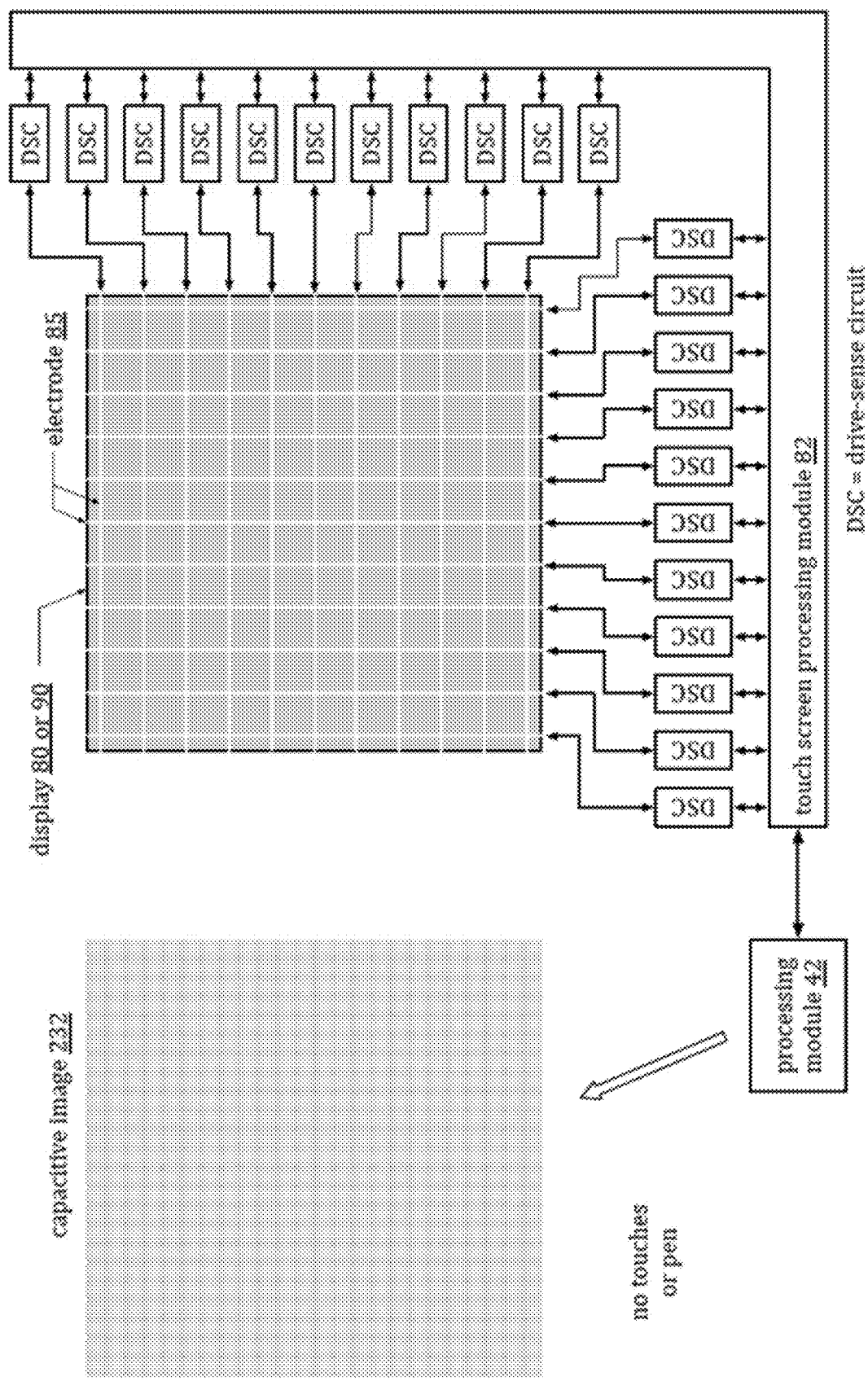
FIG. 29 is a schematic block diagram of an example of a computing device generating a capacitance image of a touch screen display in accordance with the present disclosure.

FIG. 29 is a schematic block diagram of an example of a computing device 14 or 18 that includes the components of FIG. 2 and/or FIG. 3. Only the processing module 42, the touch screen processing module 82, the display 80 or 90, the electrodes 85, and the drive sense circuits (DSC) are shown.

In an example of operation, the touch screen processing module 82 receives sensed signals from the drive sense circuits and interprets them to identify a finger or pen touch. In this example, there are no touches. The touch screen processing module 82 provides touch data (which includes location of touches, if any, based on the row and column electrodes having an impedance change due to the touch(es)) to the processing module 42.

The processing module 42 processes the touch data to produce a capacitance image 232 of the display 80 or 90. In this example, there are no touches or touchless indications, so the capacitance image 232 is substantially uniform across the display. The refresh rate of the capacitance image ranges from a few frames of capacitance images per second to a hundred or more frames of capacitance images per second. Note that the capacitance image may be generated in a variety of ways. For example, the self-capacitance and/or mutual capacitance of each touch cell (e.g., intersection of a row electrode with a column electrode) is represented by a color. When the touch cells have substantially the same capacitance, their representative color will be substantially the same. As another example, the capacitance image is topological mapping of differences between the capacitances of the touch cells.

Figure 30:
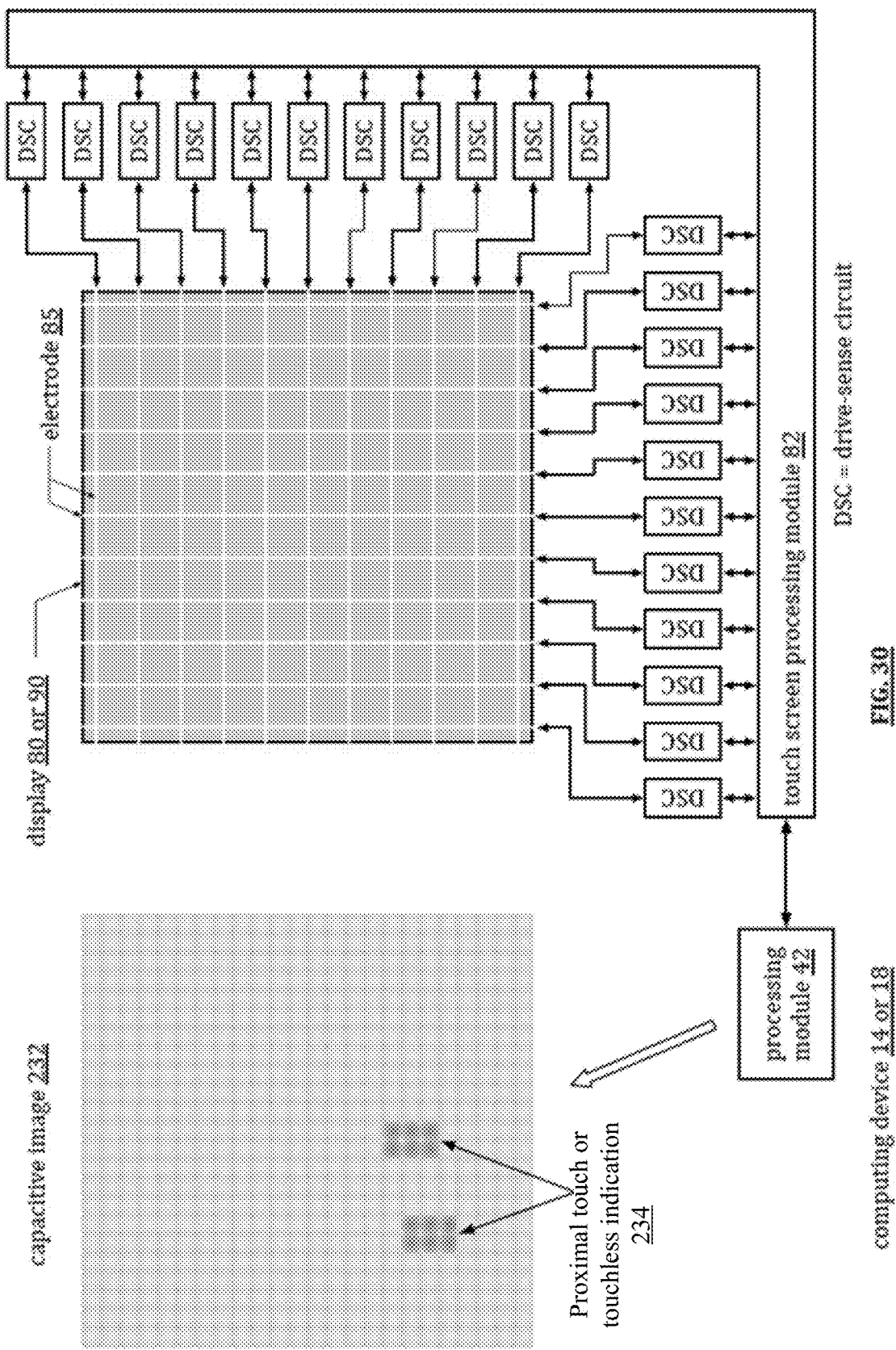
FIG. 30 is a schematic block diagram of another example of a computing device generating a capacitance image of a touch screen display in accordance with the present disclosure.

FIG. 30 is a schematic block diagram of another example of a computing device that is substantially similar to the example of FIG. 29 with the exception that the touch or touchless indication data includes two touches. As such, the touch data generated by the touch screen processing module 82 includes the location of two touches or touchless indications based on effected rows and columns. The processing module 42 processes the touch data to determine the x-y coordinates of the touches on the display 80 or 90 and generates the capacitance image, which includes the touches.

Figure 31:
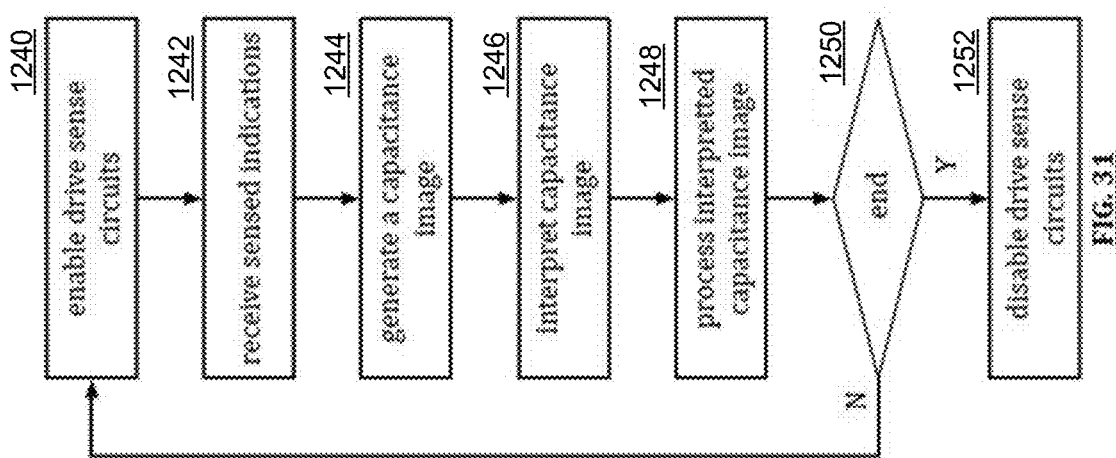
FIG. 31 is a logic diagram of an embodiment of a method for generating a capacitance image of a touch screen display in accordance with the present disclosure.

FIG. 31 is a logic diagram of an embodiment of a method for generating a capacitance image of a touch screen display that is executed by the processing module 42 and/or 82. The method begins at step 1240 where the processing module enables (for continuous or periodic operation) the drive-sense circuits to provide a sensor signals to the electrodes. For example, the processing module 42 and/or 82 provides a control signal to the drive sense circuits to enable them. The control signal allows power to be supplied to the drive sense circuits, to turn-on one or more of the components of the drive sense circuits, and/or close a switch coupling the drive sense circuits to their respective electrodes.

The method continues at step 1242 where the processing module receives, from the drive-sense circuits, sensed indications regarding (self and/or mutual) capacitance of the electrodes. The method continues at step 1244 where the processing module generates a capacitance image of the display based on the sensed indications. As part of step 1244, the processing module stores the capacitance image in memory. The method continues at step 1246 where the processing module interprets the capacitance image to identify one or more proximal touches (e.g., actual physical contact or near physical contact) of the touch screen display.

The method continues at step 1248 where the processing module processes the interpreted capacitance image to determine an appropriate action. For example, if the touch(es) corresponds to a particular part of the screen, the appropriate action is a select operation. As another example, of the touches are in a sequence, then the appropriate action is to interpret the gesture and then determine the particular action.

The method continues at step 1250 where the processing module determines whether to end the capacitance image generation and interpretation. If so, the method continues to step 1252 where the processing module disables the drive sense circuits. If the capacitance image generation and interpretation is to continue, the method reverts to step 1240.

Figure 32:
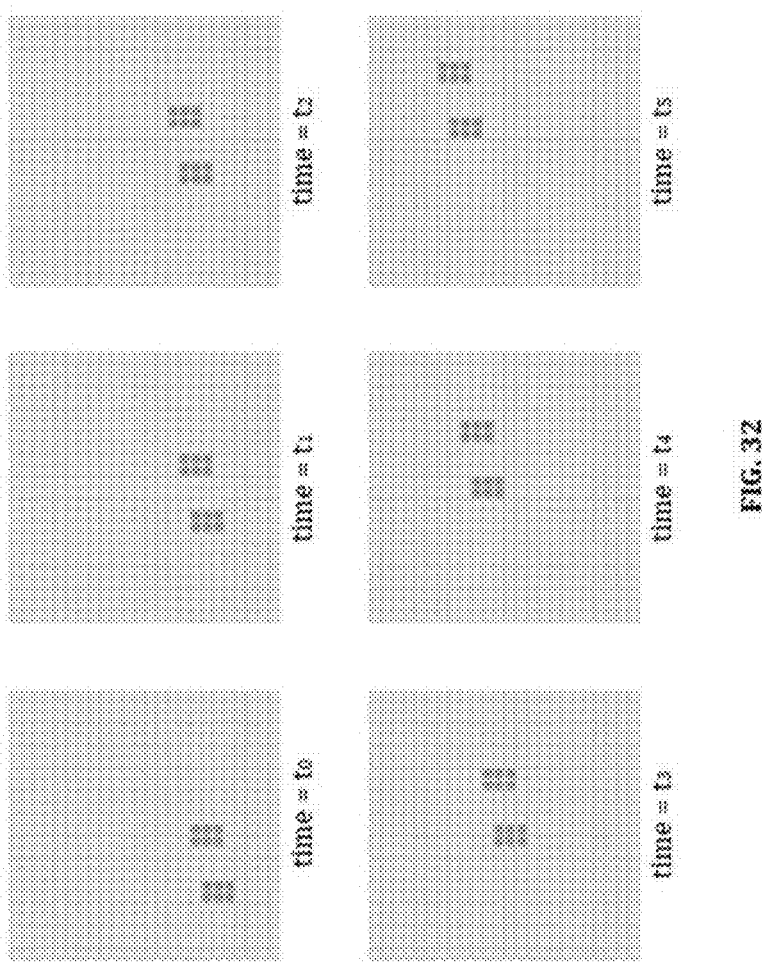
FIG. 32 is a schematic block diagram of an example of generating capacitance images over a time period in accordance with the present disclosure.

FIG. 32 is a schematic block diagram of an example of generating capacitance images over a time period. In this example, two touches are detected at time t0 and move across and upwards through the display over times t1 through t5. The movement corresponds to a gesture or action. For instance, the action is dragging a window across and upwards through the display.

FIG. 33 is a logic diagram of an embodiment of a method for identifying desired and undesired touches using a capacitance image that is executed by processing module 42 and/or 82. The method starts are step 1260 where the processing module detects one or more touches (or touchless indications). The method continues at step 1262 where the processing module determines the type of touch (including touchless indication) for each detected touch. For example, a desired touch is a finger touch or a pen touch or a touchless indication by a finger or a pen. As a further example, an undesired touch is a water droplet, a side of a hand, and/or an object.

The method continues at step 1264 where the processing module determines, for each touch, whether it is a desired or undesired touch. For example, a desired touch or touchless indication of a pen and/or a finger will have a known effect on the self-capacitance and mutual-capacitance of the effected electrodes. As another example, an undesired touch will have an effect on the self-capacitance and/or mutual-capacitance outside of the know effect of a finger and/or a pen. As another example, a finger touch will have a known and predictable shape, as will a pen touch. An undesired touch will have a shape that is different from the known and desired touches.

If the touch (or touchless indication) is desired, the method continues at step 1266 where the processing module continues to monitor the desired touch. If the touch is undesired, the method continues at step 1268 where the processing module ignores the undesired touch.

FIG. 34 is a schematic block diagram of an example of using capacitance images to identify desired and undesired touches. In this example, the desired pen touch 270 will be processed and the undesired hand touch 272 will be ignored.

FIG. 35 is a schematic block diagram of another example of using capacitance images to identify desired and undesired touches. In this example, the desired finger touch 276 will be processed and the undesired water touch 274 will be ignored. The undesired water touch 274 would not produce a change to the self-capacitance of the effected electrodes since the water does not have a path to ground and the same frequency component is used for self-capacitance for activated electrodes.

Figure 36:
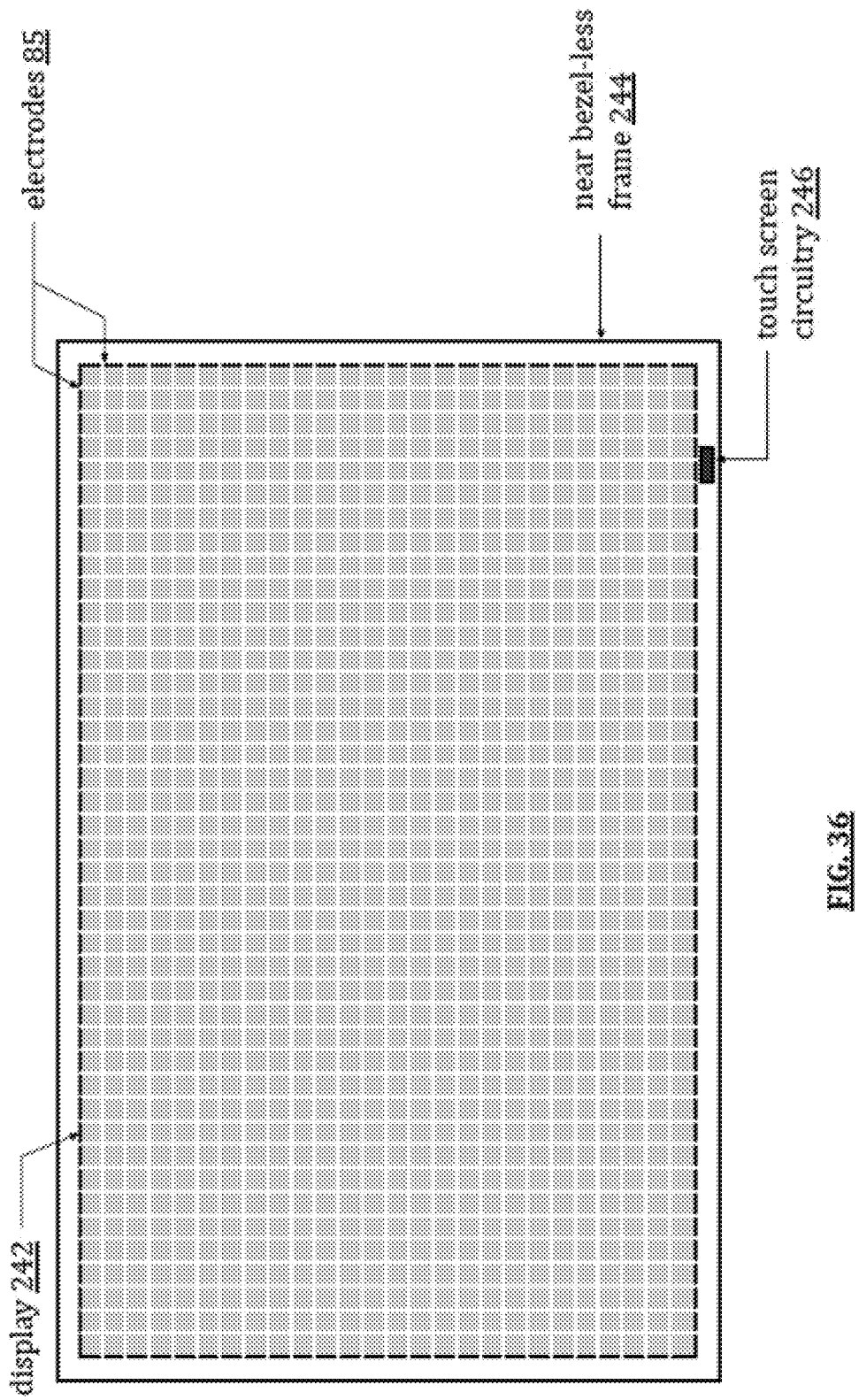
FIG. 36 is a schematic block diagram of an embodiment of a near bezel-less touch screen display in accordance with the present disclosure.

FIG. 36 is a schematic block diagram of an embodiment of a near bezel-less touch screen display 240 that includes a display 242, a near bezel-less frame 244, touch screen circuit 246, and a plurality of electrodes 85. The touch screen display 240 is a large screen, generally considered to have a diagonal dimension of 32 inches or more. The near bezel-less frame 244 has a visible width with respect to the display of one inch or less. In an embodiment, the width of the near bezel-less frame 244 is 12 inch or less on two or more sides. The display 242 has properties in accordance with the Table 1.

An issue with a large display and very small bezel of the frame 244 is running leads to the electrodes 85 from the touch screen circuitry 246. The connecting leads, which are typically conventional wires, need to be located with the frame 244 or they will adversely affect the display. The larger the display, the more electrodes and the more leads that connect to them. To get the connecting leads to fit within the frame, they need to be tightly packed together (i.e., very little space between them). This creates three problems for conventional touch screen circuitry: (1) with conventional low voltage signaling to the electrodes (e.g., signals swinging from rail to rail of the power supply voltage, which is at least 1 volt and typically greater than 1.5), electromagnetic cross-coupling between the leads causes interference between the signals; (2) smaller leads and longer electrodes create higher total resistance, which requires higher voltage signals; and (3) the tight coupling of the leads increases the parasitic capacitance of each lead, which increases the current required to drive the signals. With conventional touch screen circuitry, as the screen becomes larger, the impedance of each electrode (including lead) increases, resulting in more power required to drive touch signals to the touch screen. Because of these issues, display sizes for touch screen displays have been effectively limited to smaller display sizes or touch sensors have to have very low resistance and capacitance.

With the touch screen circuitry 246 disclosed herein, effective and efficient large touch screen displays can be practically realized. For instance, the touch screen circuitry 246 uses very low voltage signaling (e.g., 25-1,250 milli-volt RMS of the oscillating component of the sensor signal or power signal), which reduces power requirements and substantially reduces adverse effects of cross-coupling between the leads. For example, when the oscillating component is a sinusoidal signal at 25 milli-volt RMS and each electrode (or at least some of them) are driven by oscillating components of different frequencies, the cross-coupling is reduced and, what cross-coupled does exist, is easily filtered out. Continuing with the example, with a 25 milli-voltage signal and increased impedance of longer electrodes and tightly packed leads, the power requirement is dramatically reduced. As a specific example, for conventional touch screen circuitry operating with a power supply of 1.5 volts and the touch screen circuitry 246 operating with 25 millivolt signaling, the power requirements are reduced by as much as 60 times.

In an embodiment, the near bezel-less touch screen display 240 includes the display 242, the near bezel-less frame 244, electrodes 85, and the touch screen circuitry 246, which includes drive sense circuits (DSC) and a processing module. The display 242 is operable to render frames of data into visible images. The near bezel-less frame 244 at least partially encircles the display 242. In this example, the frame 244 fully encircles the frame and the touch screen circuitry 246 is positioned in the bezel area to have about the same number of electrode connections on each side of it. In FIG. 40, as will be subsequently discussed, the frame 244 partially encircles the display 242.

The drive-sense circuits are coupled to the electrodes via connections, which are substantially within the near bezel-less frame. The connections include wires and connectors, which are achieved by welds, crimping, soldering, male-female connectors, etc. The drive-sense circuits are operable to provide and monitor sensor signals of the electrodes 85 to detect impedance and impedance changes of the electrodes. The processing module processes the impedances of the electrodes to determine one or more touches on the touch screen display 240.

In the present FIG. 36, the electrodes 85 are shown in a first arrangement (e.g., as rows) and a second arrangement (e.g., as columns). Other patterns for the electrodes may be used to detect touches to the screen. For example, the electrodes span only part of the way across the display and other electrodes span the remaining part of the display. As another example, the electrodes are patterned at an angle different than 90 degrees with respect to each other.

FIG. 37 is a schematic block diagram that further illustrates an embodiment of a near bezel-less touch screen display 242. As shown, the touch screen circuit 246 is coupled to the electrodes 85 via a plurality of connectors 248. The electrodes are arranged in rows and columns, are constructed using a finely patterned or transparent conductive material (e.g., ITO, metal mesh, PEDOT, silver nanowire) and distributed throughout the display 242. The larger the touch screen display, the more electrodes are needed. For example, a touch screen display includes hundreds to thousands, or more, of electrodes.

The connections 248 and the touch screen circuitry 246 are physically located with the near bezel-less frame 244. The more tightly packed the connectors, the thinner the bezel can be. A drive sense circuit of the touch screen circuitry 246 is coupled to an individual electrode 85. Thus, if there are 100 electrodes, there are 100 drive sense circuits and 100 connections. In an embodiment, the connections 248 include traces on a multi-layer printed circuit board, where the traces are spaced at a few microns or less. As another example, the spacing between the connections is a minimum spacing needed to ensure that the insulation between the connections does not break down. Note that the touch screen circuitry 246 may be implemented in multiple integrated circuits that are distributed about the frame 244.

Figure 38:
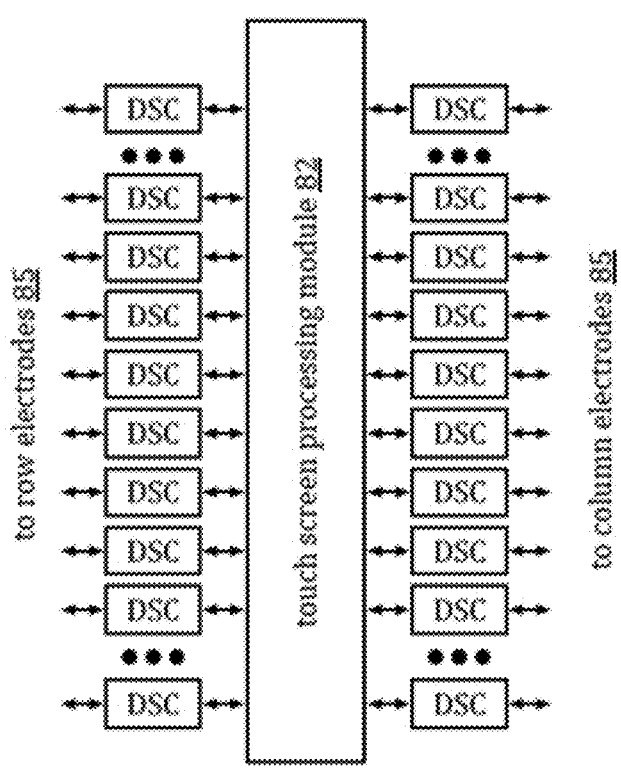
FIG. 38 is a schematic block diagram of an embodiment of touch screen circuitry of a near bezel-less touch screen display in accordance with the present disclosure.

FIG. 38 is a schematic block diagram of an embodiment of touch screen circuitry 246 that includes a touch screen processing module 82 and a plurality of drive sense circuits (DSC). Some of the drive sense circuits are coupled to row electrodes and other drive sense circuits are coupled to column electrodes. The touch screen circuitry 246 may be implemented in one or more integrated circuits. For example, the touch screen processing module 82 and a certain number (e.g., tens to hundreds) of drive sense circuits are implemented one a single die. An integrated circuit may include one or more of the dies. Thus, depending on the number of electrodes in the touch screen display, one or more dies in one or more integrated circuits is needed.

When more than a single die is used, the touch screen circuitry 246 includes more than one processing module 82. In this instance, the processing modules 82 on different dies function as peer processing modules, in that, they communicate with their own drive sense circuits and process the data from the drive sense circuits and then coordinate to provide the process data upstream for further processing (e.g., determining whether touches have occurred, where on the screen, is the touch a desired touch, and what does the touch mean). The upstream processing may be done by another processing module (e.g., processing module 42), as a distributed function among the processing modules 82, and/or by a designed processing module of the processing modules 82.

Figure 39:
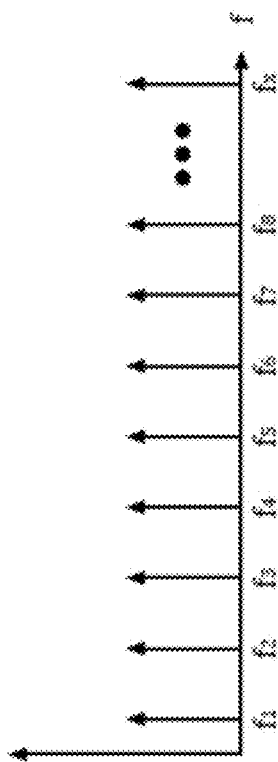
FIG. 39 is a schematic block diagram of an example of frequencies for the various analog reference signals for the drive-sense circuits in accordance with the present disclosure.

FIG. 39 is a schematic block diagram of an example of frequencies for the various analog reference signals for the drive-sense circuits. As mentioned above, to reduce the adverse effects of cross-coupling, the drive sense circuits use a common frequency component for self-capacitance measurements and uses different frequencies components for mutual capacitance measurements. In this example, there are x number of equally-spaced different frequencies. The frequency spacing is dependent on the filtering of the sensed signals. For example, the frequency spacing is in the range of 10 Hz to 10's of thousands of Hz. Note that the spacing between the frequencies does not need to be equal or that every frequency needs to be used. Further note that, for very large touch screen displays having tens to thousands of electrodes, a frequency reuse pattern may be used.

FIG. 40 is a schematic block diagram of another embodiment of a near bezel-less touch screen display 240-1 that includes the display 242, the electrodes 85, the touch screen display circuitry 246, and a near bezel-less frame 244-1. In this embodiment, the frame 244-1 is on two sides of the display 242; the other two sides are bezel-less. The functionality of the display 242, the electrodes 85, the touch screen display circuitry 246 are as previously discussed.

FIG. 41 is a schematic block diagram of another embodiment of multiple near bezel-less touch screen displays 250 that includes a plurality of near bezel-less touch screen displays 240-1. Each of the near bezel-less touch screen displays 240-1 have two sides that are bezel-less and two sides that include a near bezel-less frame. The location of the two bezel-less sides can vary such that the displays 240-1 can be positioned to create one large multiple touch screen display 250.

In an alternate embodiment, a near bezel-less touch screen display includes three sides that are bezel-less and one side that includes a near bezel-less frame. The side having the near bezel-less frame is variable to allow different combinations of the near bezel-less touch screen displays to create a large multiple touch screen display.

Figure 42:
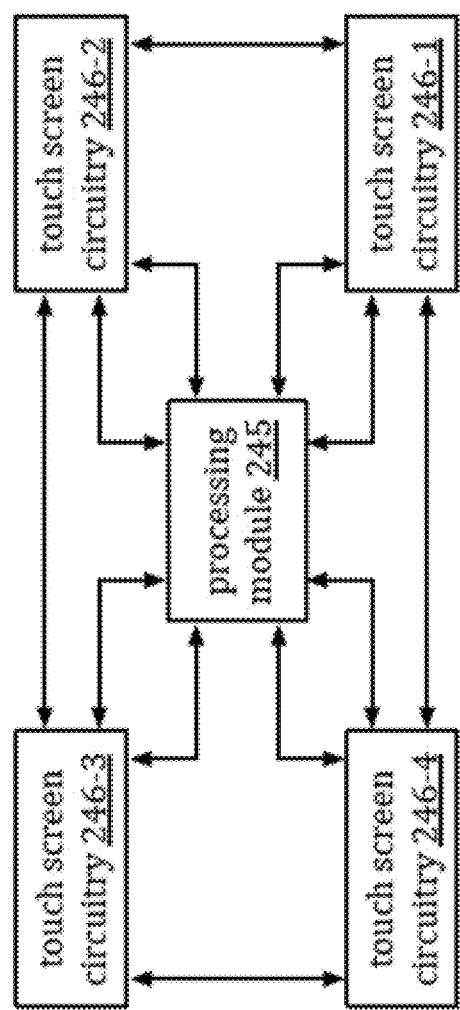
FIG. 42 is a schematic block diagram of an embodiment of processing modules for the multiple near bezel-less touch screen displays of FIG. 41 in accordance with the present disclosure.

FIG. 42 is a schematic block diagram of an embodiment of the touch screen circuitry 246 and one or more processing modules for the multiple near bezel-less touch screen displays of FIG. 41. Each of the displays 240-1 includes touch screen circuitry 246-1 through 246-4, which are coupled together and to a centralized processing module 245. Each of the touch screen circuitry 246-1 through 246-4 interacts with the electrodes of its touch screen display 240-1 to produce capacitance information (e.g., self-capacitance, mutual capacitance, change in capacitance, location of the cells having a capacitance change, etc.).

The centralized processing module 245 processes the capacitance information form the touch screen circuitry 246-1 through 246-4 to determine location of a touch, or touches, meaning of the touch(es), etc. In an embodiment, the centralized processing module 245 is processing module 42. In another embodiment, the centralized processing module 245 is one of the processing modules of the touch screen circuitry 246-1 through 246-4. In yet another embodiment, the centralized processing module 245 includes two or more of the processing modules of the touch screen circuitry 246-1 through 246-4 functioning as a distributed processing module.

Figure 43:
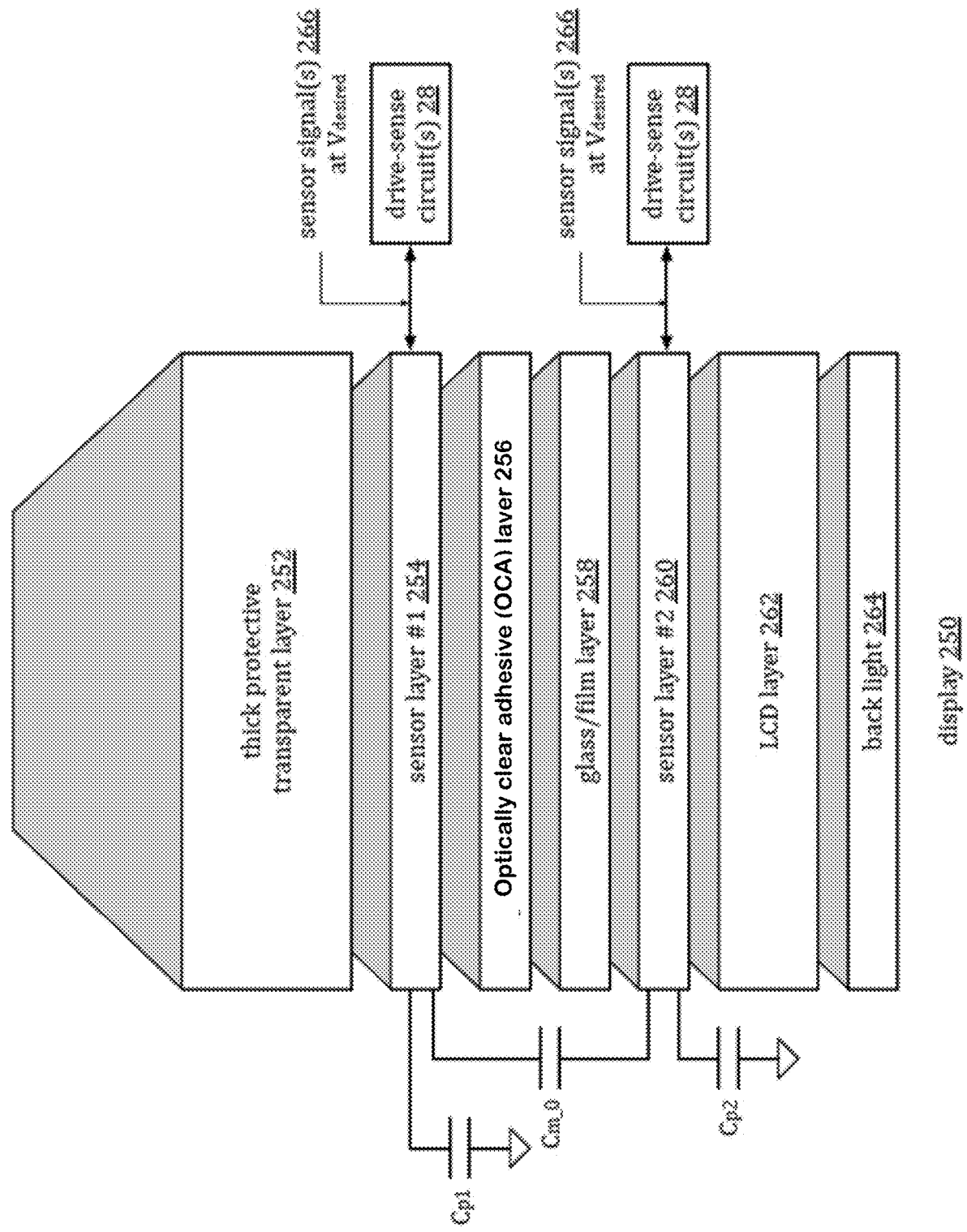
FIG. 43 is a cross section schematic block diagram of an example of a touch screen display having a thick protective transparent layer in accordance with the present disclosure.

FIG. 43 is a cross section schematic block diagram of an example of a touch screen display 80 having a thick protective transparent layer 252. The display 80 further includes a first sensor layer 254, one or more optically clear adhesive (OCA) layers 256, a glass/film layer 258, a second sensor layer 260, an LCD layer 262, and a back-light layer 264. A first group of drive sense circuits 28 is coupled to the first sensor layer 254 and a second group of drive sense circuits 28 is coupled to the second sensor layer 260.

The thick protective transparent layer 252 includes one or more layers of glass, film, etc. to protect the display 250 from damaging impacts (e.g., impact force, impact pressure, etc.). In many instances, the thicker the protective transparent layer 252 is, the more protection it provides. For example, the protective transparent layer 252 is at least a ¼ inch thick and, in some applications, is thicker than 1 inch or more.

The protective transparent layer 252 acts as a dielectric for finger capacitance and/or for pen capacitance. The material, or materials, comprising the protective transparent layer 252 will have a dielectric constant (e.g., 5-10 for glass). The capacitance (finger or pen) is then at least partially based on the dielectric constant and thickness of the protective transparent layer 252. In particular, the capacitance (C) equals:

$$C = \epsilon \frac{A}{d}$$ where $A$ is plate area, $\epsilon$ is the dielectric constant(s), and $d$ is the distance between the plates, which includes the thickness of the protective layer 252.

As such, the thicker the protective transparent layer, the smaller the capacitance (finger and/or pen). As the capacitance decreases, its effect on the self-capacitance of the sensor layers and the effect on the mutual capacitance between the sensor layer is reduced. Accordingly, the drive sense circuits 28 provide the sensor signals 266 at a desired voltage level, which increases as the finger and/or pen capacitance decreases due to the thickness of the protective transparent layer 252. In an embodiment, the first sensor layer includes a plurality of column electrodes and the second sensor layer includes a plurality of row electrodes.

There are a variety of ways to implement a touch sensor electrode. For example, the sensor electrode is implemented using a glass-glass configuration. As another example, the sensor electrode is implemented using a glass-film configuration. Other examples include a film-film configuration, a 2-sided film configuration, a glass and 2-sided film configuration, or a 2-sided glass configuration. Furthermore, it should be noted that layers 256 & 258 can be removed and/or there may be other layers between the protective layer 252, one or both of the sensor layers 254 and 360 and the LCD layer 262. In addition, the LCD layer 262 could be replaced by other layer technologies such as OLED, EL, Plasma, EPD, microLED, etc. Other configurations are possible as well.

Figure 44:
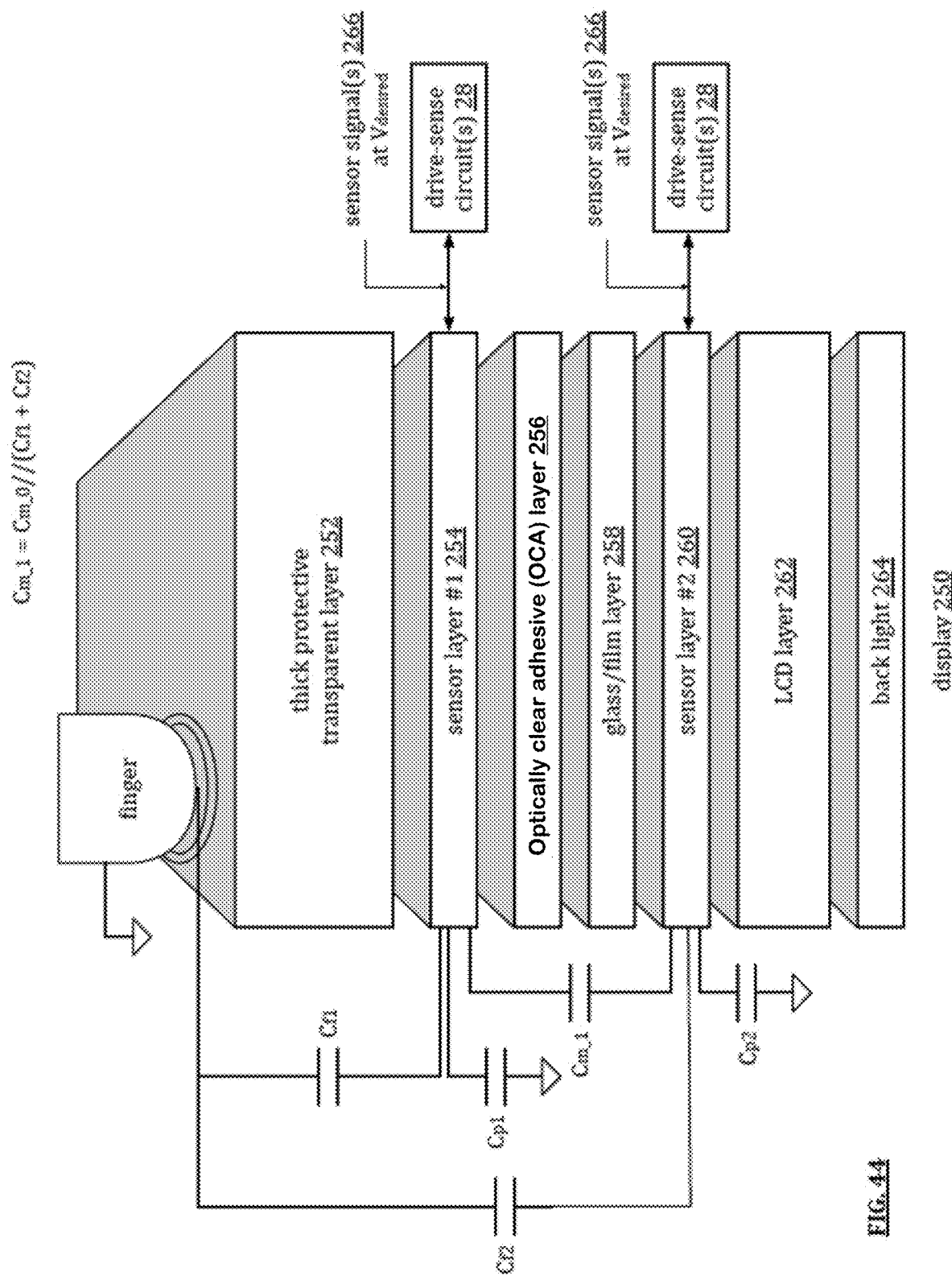
FIG. 44 is a cross section schematic block diagram of another example of a touch screen display having a thick protective transparent layer in accordance with the present disclosure.

FIG. 44 is a cross section schematic block diagram that is similar to FIG. 43, with the exception that this figure includes a finger touch. The finger touch provides a finger capacitance with respect the sensor layers 254 and 260. As is shown, the finger capacitance includes a first capacitance component from the finger to the first sensor layer ($C_{f1}$) and a second capacitance component from the finger to the second sensor layer ($C_{f2}$). As previously discussed, the finger capacitance is effectively in parallel with the self-capacitances ($C_{p0}$ and $C_{p1}$) of the sensor layers, which increases the effective self-capacitance and decreases impedance at a given frequency. As also previously discussed, the finger capacitance is effectively in series with the mutual-capacitance ($C_{m\_0}$) of the sensor layers, which decreases the effective mutual-capacitance ($C_{m\_1}$) and increases the magnitude of the impedance at a given frequency.

Thus, the smaller the finger capacitance due to a thicker protective layer 252, the less effect it has on the self-capacitance and mutual-capacitance. This can be better illustrated with reference to FIGS. 45-50. As previously noted, layers 256 & 258 can be removed and/or there may be other layers between the protective layer 252, one or both of the sensor layers 254 and 360 and the LCD layer 262. In addition, the LCD layer 262 could be replaced by other layer technologies such as OLED, EL, Plasma, EPD, microLED, etc. Other configurations are possible as well.

Figure 45:
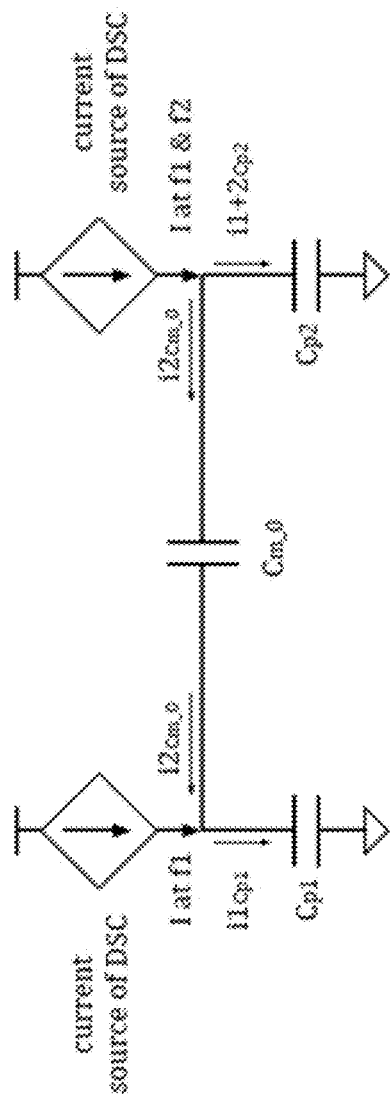
FIG. 45 is a schematic block diagram of an electrical equivalent circuit of two drive sense circuits coupled to two electrodes without a finger touch in accordance with the present disclosure.

FIG. 45 is a schematic block diagram of an electrical equivalent circuit of two drive sense circuits coupled to two electrodes without a finger touch or touchless indication. The drive sense circuits are represented as dependent current sources, the self-capacitance of a first electrode is referenced as $C_{p1}$, the self-capacitance of the second electrode is referenced as $C_{p2}$, and the mutual capacitance between the electrodes is referenced as $C_{m\_0}$. In this example, the current source of the first drive sense circuit is providing a controlled current (I at f1) that includes a DC component and an oscillating component, which oscillates at frequency f1. The current source of the second drive sense circuit is providing a controlled current (I at f1 and at f2) that includes a DC component and two oscillating components at frequency f1 and frequency f2.

The first controlled current (I at f1) has one components: $i1_{Cp1}$ and the second controlled current (I at f1 and f2) has two components: $i1+2_{Cp2}$ and $i2_{Cm\_0}$. The current ratio between the two components for a controlled current is based on the respective impedances of the two paths.

Figure 46:
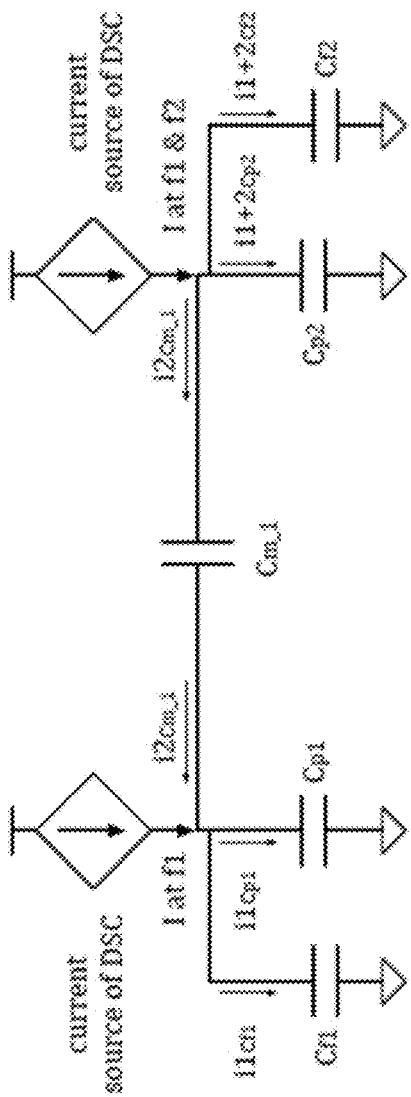
FIG. 46 is a schematic block diagram of an electrical equivalent circuit of two drive sense circuits coupled to two electrodes with a finger touch in accordance with the present disclosure.

FIG. 46 is a schematic block diagram of an electrical equivalent circuit of two drive sense circuits coupled to two electrodes as shown in FIG. 45, but this figure includes a finger touch or touchless indication. The finger touch or touchless indication is represented by the finger capacitances ($C_{f1}$ and $C_n$), which are in parallel with the self-capacitance ($C_{p1}$ and $C_{p2}$). The dependent current sources are providing the same levels of current as in FIG. 45 (I at f1 and I at f1 and f2).

In this example, however, more current is being directed towards the self-capacitance in parallel with the finger capacitance than in FIG. 45. Further, less current is being directed towards the mutual capacitance ($C_{m\_1}$) (i.e., taking charge away from the mutual capacitance, where C=Q/V).

With the self-capacitance effectively having an increase in capacitance due to the finger capacitance, its impedance decreases and, with the mutual-capacitance effectively having a decrease in capacitance, its impedance (magnitude) increases.

The drive sense circuits can detect the change in the magnitude of the impedance of the self-capacitance and of the mutual capacitance when the change is within the sensitivity of the drive sense circuits. For example, $V=I*Z$, $I*t=C*V$, and the magnitude of $Z=½πfC$ (where V is voltage, I is current, Z is the impedance, t is time, C is capacitance, and f is the frequency), thus the magnitude of V=the magnitude of $I*½πfC$. If the change between C is small, then the change in V will be small. If the change in V is too small to be detected by the drive sense circuit, then a finger touch or touchless indication will go undetected. To reduce the chance of missing a touch or touchless indication due to a thick protective layer, the voltage (V) and/or the current (I) can be increased. As such, for small capacitance changes, the increased voltage and/or current allows the drive sense circuit to detect a change in impedance. As an example, as the thickness of the protective layer increases, the voltage and/or current is increased by 2 to more than 100 times.

Figure 47:
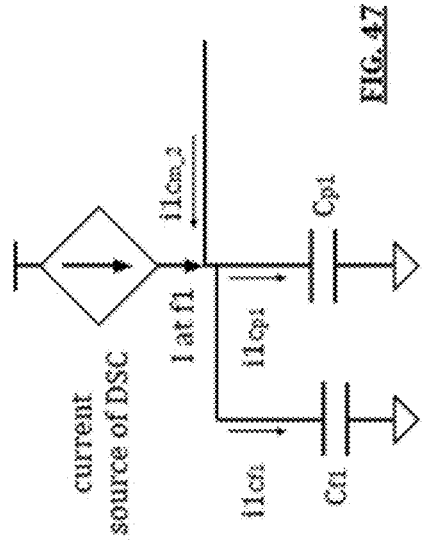
FIG. 47 is a schematic block diagram of an electrical equivalent circuit of a drive sense circuit coupled to an electrode without a finger touch in accordance with the present disclosure.

FIG. 47 is a schematic block diagram of an electrical equivalent circuit of a drive sense circuit coupled to an electrode without a finger touch or touchless indication. This similar to FIG. 45, but for just one drive sense circuit and one electrode. Thus, the current source of the first drive sense circuit is providing a controlled current (I at $f_1$) that includes a DC component and an oscillating component, which oscillates at frequency $f_1$ and the first controlled current (I at $f_1$) has two components: $i1_{cp1}$ and $i1_{cp1}$.

Figure 48:
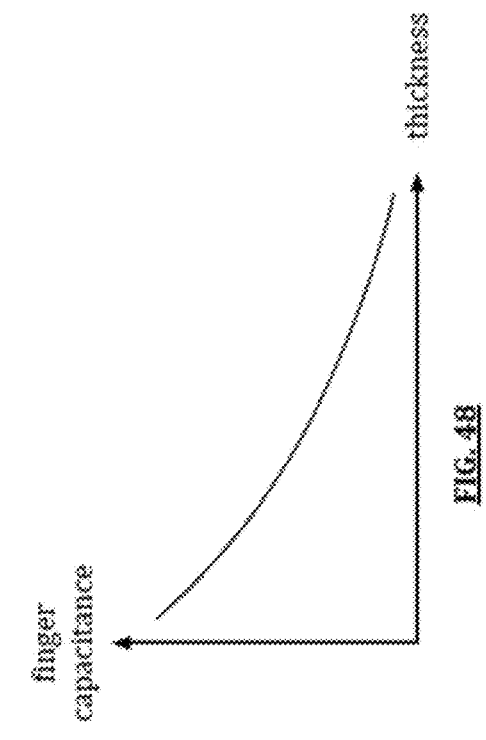
FIG. 48 is an example graph that plots finger capacitance verses protective layer thickness of a touch screen display in accordance with the present disclosure.

FIG. 48 is an example graph that plots finger capacitance verses protective layer thickness of a touch screen display 250. As shown, as the thickness increases, the finger capacitance decreases. This effects changes in the mutual-capacitance as shown in FIG. 49 and in self-capacitance as shown in FIG. 50.

Figure 49:
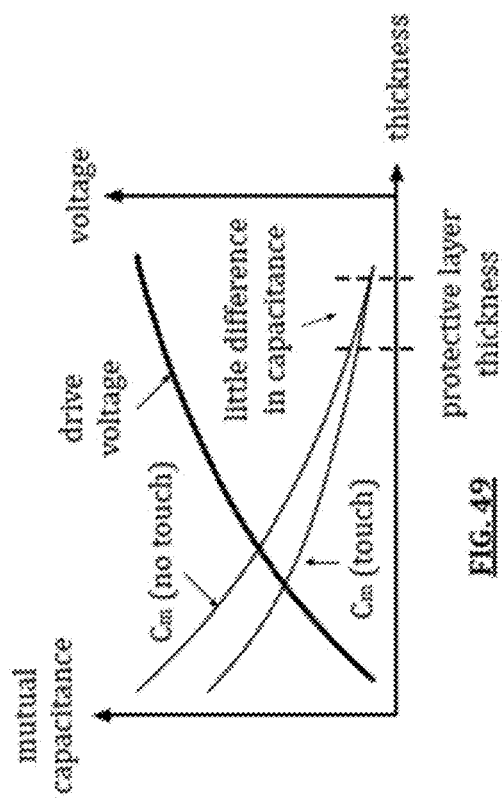
FIG. 49 is an example graph that plots mutual capacitance verses protective layer thickness and drive voltage verses protective layer thickness of a touch screen display in accordance with the present disclosure.

FIG. 49 is an example graph that plots mutual capacitance verses protective layer thickness and drive voltage verses protective layer thickness of a touch screen display 150. As shown, as the thickness increases, the difference between the mutual capacitance without a touch or touchless indication and mutual capacitance with a touch decreases. In order for the decreasing difference to be detected, the voltage (or current) sourced to the electrode increases substantially inversely proportion to the decrease in finger capacitance.

FIG. 50A is a cross section schematic block diagram of another example of a touch screen display 250 having a protective transparent layer 402. This embodiment is similar to the embodiment of FIG. 43 with the exception that this embodiment includes a single sensor layer 255. Similar elements are referred to by common reference numerals. The sensor layer 255 may be implemented in a variety of ways. In various embodiments, the sensor layer 255 includes a plurality of capacitive sensors that operate via mutual capacitance.

Consider the following example. The sensor layer 255 includes a plurality of electrodes integrated into the display to facilitate touch sense functionality based on electrode signals, such as sensor signals 266, having a drive signal component and a receive signal component. The plurality of electrodes includes a plurality of row electrodes and a plurality of column electrodes. The plurality of row electrodes is separated from the plurality of column electrodes by a dielectric material. The plurality of row electrodes and the plurality of column electrodes form a plurality of cross points. A plurality of drive-sense circuit(s) 28 is coupled to at least some of the plurality of electrodes (e.g. the rows or the columns) to generate a plurality of sensed signal(s) 120. Each the plurality of drive-sense circuits 28 includes a first conversion circuit and a second conversion circuit. When a drive-sense circuit 28 is enabled to monitor a corresponding electrode of the plurality of electrodes, the first conversion circuit is configured to convert the receive signal component into a sensed signal 120 and the second conversion circuit is configured to generate the drive signal component from the sensed signal 120. The sensed signals 120 indicate variations in mutual capacitance associated the plurality of cross points. In particular, components of sensed signals 120 that correspond to the capacitive coupling of each cross-point vary from the nominal mutual capacitance value for each cross-point in response to variations in mutual capacitance associated with that cross point. Conditions at cross-point, such as proximal touch conditions by a finger for example, can decrease the mutual capacitance at that cross point, causing an increase in impedance indicated in a corresponding component of sensed signals 120. As previously noted, layers 256 & 258 can be removed and/or there may be other layers between the protective layer 402 and the LCD layer 262. In addition, the LCD layer 262 could be replaced by other layer technologies such as OLED, EL, Plasma, EPD, microLED, etc. Other configurations are possible as well.

Figure 51A:
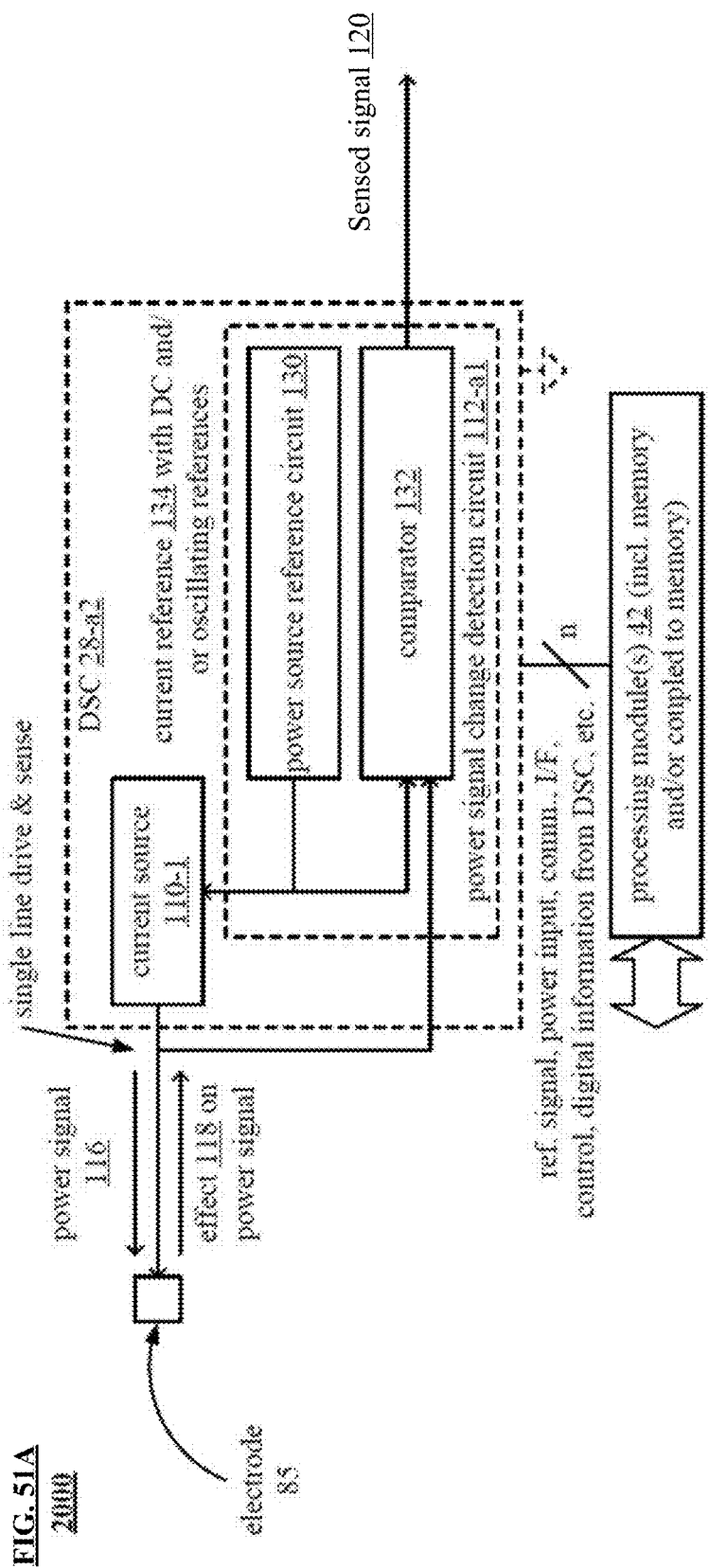
FIG. 51A is a schematic block diagram of an embodiment of a DSC that is interactive with an electrode in accordance with the present disclosure.

FIG. 51A is a schematic block diagram of an embodiment 2000 of a DSC that is interactive with an electrode in accordance with the present disclosure. Similar to other diagrams, examples, embodiments, etc. herein, the DSC 28-*a*2 of this diagram is in communication with one or more processing modules 42. The DSC 28-*a*2 is configured to provide a signal (e.g., a power signal, an electrode signal, transmit signal, a monitoring signal, etc.) to the electrode 85 via a single line and simultaneously to sense that signal via the single line. In some examples, sensing the signal includes detection of an electrical characteristic of the electrode that is based on a response of the electrode 85 to that signal. Examples of such an electrical characteristic may include detection of an impedance (such as the magnitude of the impedance) of the electrode 85 that is dependent on the mutual capacitance of the various cross-points of the electrode 85, detection of one or more signals coupled into the electrode 85 such as from one or more other electrodes, and/or other electrical characteristics such as charge, voltage (magnitude and/or phase), current (magnitude and/or phase), reactance, conductance, resistance, etc.

In some examples, the DSC 28-*a*2 is configured to provide the signal to the electrode to perform any one or more of capacitive imaging of an element (e.g., a touch screen display) that includes the electrode. This embodiment of a DSC 28-*a*2 includes a current source 110-1 and a power signal change detection circuit 112-*a*1. The power signal change detection circuit 112-*a*1 includes a power source reference circuit 130 and a comparator 132. The current source 110-1 may be an independent current source, a dependent current source, a current mirror circuit, etc.

In an example of operation, the power source reference circuit 130 provides a current reference 134 with DC and oscillating components to the current source 110-1. The current source generates a current as the power signal 116 based on the current reference 134. An electrical characteristic of the electrode 85 has an effect on the current power signal 116. For example, if the magnitude of the impedance of the electrode 85 decreases, the current power signal 116 remains substantially unchanged, and the voltage across the electrode 85 is decreased.

The comparator 132 compares the current reference 134 with the affected power signal 118 to produce the sensed signal 120 that is representative of the change to the power signal. For example, the current reference signal 134 corresponds to a given current (I) times a given impedance magnitude (Z). The current reference generates the power signal to produce the given current (I). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

Furthermore, components of the sensed signal 120 having differing frequencies or other distinguishing characteristics can each represent the impedance or other electrical characteristic of the electrode 85 for each of the corresponding cross-points that intersect that electrode 85. When considering all of the row/column electrodes 85 of a touch screen display, this facilitates the creation of capacitance image data associated with the plurality of cross points that indicates the capacitive coupling associated with each individual cross-point and consequently, indicate variations of mutual capacitance at each individual cross-point.

Figure 51B:
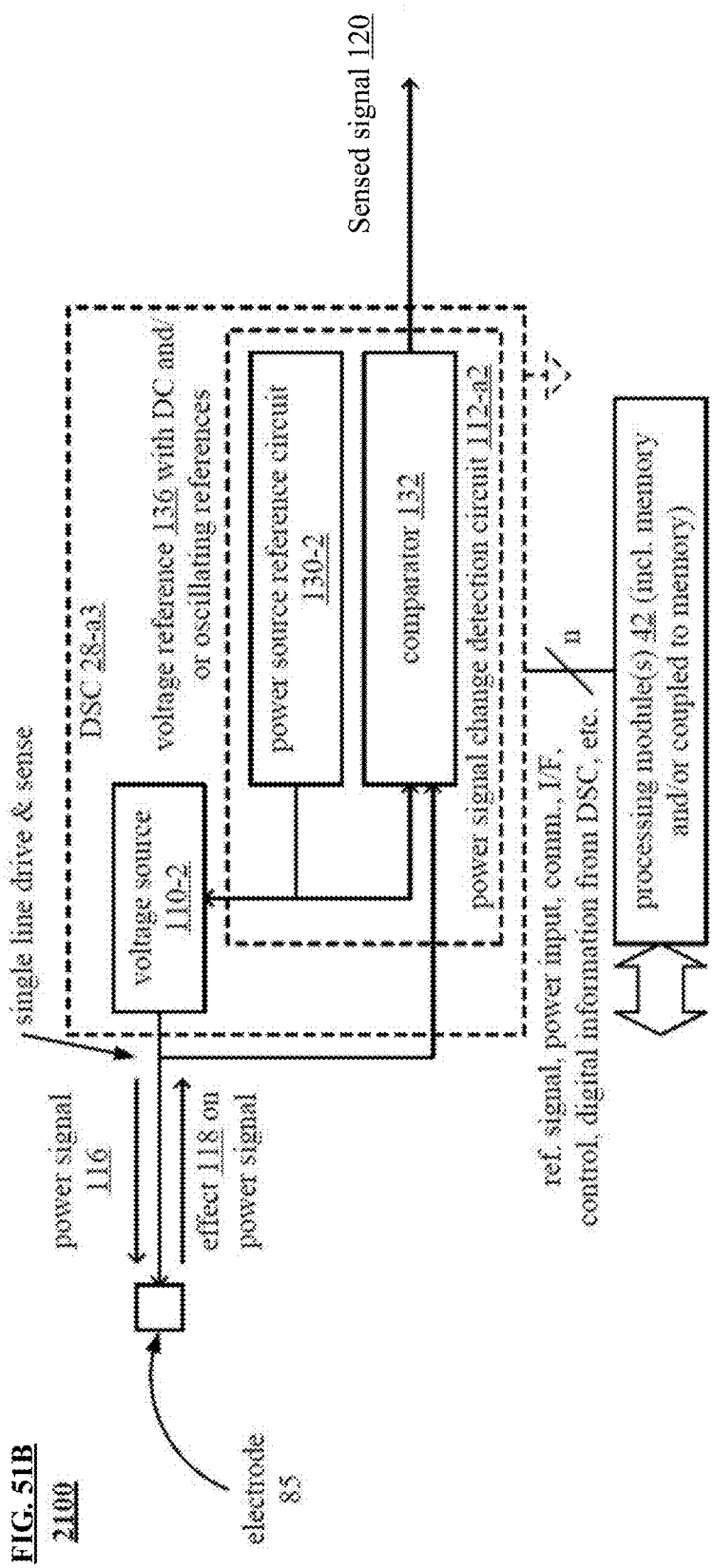
FIG. 51B is a schematic block diagram of another embodiment of a DSC that is interactive with an electrode in accordance with the present disclosure.

FIG. 51B is a schematic block diagram of another embodiment 2100 of a DSC that is interactive with an electrode in accordance with the present disclosure. Similar to other diagrams, examples, embodiments, etc. herein, the DSC 28-*a*3 of this diagram is in communication with one or more processing modules 42. Similar to the previous diagram, although providing a different embodiment of the DSC, the DSC 28-*a*3 is configured to provide a signal to the electrode 85 via a single line and simultaneously to sense that signal via the single line. In some examples, sensing the signal includes detection of an electrical characteristic of the electrode 85 that is based on a response of the electrode 85 to that signal. Examples of such an electrical characteristic may include detection of an impedance of the electrode 85 that depends on a mutual capacitance of the electrode 85, detection of one or more signals coupled into the electrode 85 such as from one or more other electrodes, and/or other electrical characteristics.

This embodiment of a DSC 28-*a*3 includes a voltage source 110-2 and a power signal change detection circuit 112-*a*2. The power signal change detection circuit 112-*a*2 includes a power source reference circuit 130-2 and a comparator 132-2. The voltage source 110-2 may be a battery, a linear regulator, a DC-DC converter, etc.

In an example of operation, the power source reference circuit 130-2 provides a voltage reference 136 with DC and oscillating components to the voltage source 110-2. The voltage source generates a voltage as the power signal 116 based on the voltage reference 136. An electrical characteristic of the electrode 85 has an effect on the voltage power signal 116. For example, if the magnitude of the impedance of the electrode 85 decreases, the voltage power signal 116 remains substantially unchanged and the current through the electrode 85 is increased.

The comparator 132 compares the voltage reference 136 with the affected power signal 118 to produce the signal 120 that is representative of the change to the power signal. For example, the voltage reference signal 134 corresponds to a given voltage (V) divided by a given impedance (Z). The voltage reference generates the power signal to produce the given voltage (V). If the impedance of the electrode 85 substantially matches the given impedance (Z), then the comparator's output is reflective of the impedances substantially matching. If the magnitude of the impedance of the electrode 85 is greater than the given impedance (Z), then the comparator's output is indicative of how much greater the impedance of the electrode 85 is than that of the given impedance (Z). If the magnitude of the impedance of the electrode 85 is less than the given impedance (Z), then the comparator's output is indicative of how much less the impedance of the electrode 85 is than that of the given impedance (Z).

With respect to many of the following diagrams, one or more processing modules 42, which includes and/or is coupled to memory, is configured to communicate and interact with one or more DSCs 28 the coupled to one or more electrodes of the panel or a touchscreen display. In many of the diagrams, the DSCs 28 are shown as interfacing with electrodes of the panel or touchscreen display (e.g., via interface 86 that couples to roll electrodes and interface 87 that couples to column electrodes). Note that the number of lines that coupled the one or more processing modules 42 to the respective one or more DSCs 28, and from the one or more DSCs 28 to the respective interfaces 86 and 87 may be varied, as shown by n and m, which are positive integers greater than or equal to 1. Other diagrams also show different values, such as o, p, etc., which are also positive integers greater than or equal to 1. Note that the respective values may be the same or different within different respective embodiments and/or examples herein.

Note that the same and/or different respective signals may be driven simultaneously sensed by the respective one or more DSCs 28 that couple to electrodes 85 within any of the various embodiments and/or examples herein. In some examples, different respective signals (e.g., different respective signals having one or more different characteristics) are implemented in accordance with mutual signaling as described below.

For example, as previously discussed the different respective signals that are driven and simultaneously sensed via the electrodes 85 may be distinguished/differentiated from one another. For example, appropriate filtering and processing can identify the various signals given their differentiation, orthogonality to one another, difference in frequency, etc. Note that the differentiation among the different respective signals that are driven and simultaneously sensed by the various DSCs 28 may be differentiated based on any one or more characteristics such as frequency, amplitude, modulation, modulation & coding set/rate (MCS), forward error correction (FEC) and/or error checking and correction (ECC), type, etc.

Other examples described herein and their equivalents operate using any of a number of different characteristics other than or in addition to frequency. Differentiation between the signals based on frequency corresponds to a first signal has a first frequency and a second signal has a second frequency different than the first frequency. Differentiation between the signals based on amplitude corresponds to a that if first signal has a first amplitude and a second signal has a second amplitude different than the first amplitude. Note that the amplitude may be a fixed amplitude for a DC signal or the oscillating amplitude component for a signal having both a DC offset and an oscillating component. Differentiation between the signals based on DC offset corresponds to a that if first signal has a first DC offset and a second signal has a second DC offset different than the first DC offset.

Differentiation between the signals based on modulation and/or modulation & coding set/rate (MCS) corresponds to a first signal has a first modulation and/or MCS and a second signal has a second modulation and/or MCS different than the first modulation and/or MCS. Examples of modulation and/or MCS may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.). For example, a first signal may be of a QAM modulation, and the second signal may be of a 32 APSK modulation. In an alternative example, a first signal may be of a first QAM modulation such that the constellation points there and have a first labeling/mapping, and the second signal may be of a second QAM modulation such that the constellation points there and have a second labeling/mapping.

Differentiation between the signals based on FEC/ECC corresponds to a first signal being generated, coded, and/or based on a first FEC/ECC and a second signal being generated, coded, and/or based on a second FEC/ECC that is different than the first modulation and/or first FEC/ECC. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. For example, a first signal may be generated, coded, and/or based on a first LDPC code, and the second signal may be generated, coded, and/or based on a second LDPC code. In an alternative example, a first signal may be generated, coded, and/or based on a BCH code, and the second signal may be generated, coded, and/or based on a turbo code. Differentiation between the different respective signals may be made based on a similar type of FEC/ECC, using different characteristics of the FEC/ECC (e.g., codeword length, redundancy, matrix size, etc. as may be appropriate with respect to the particular type of FEC/ECC). Alternatively, differentiation between the different respective signals may be made based on using different types of FEC/ECC for the different respective signals.

Differentiation between the signals based on type corresponds to a first signal being or a first type and a second signal being of a second generated, coded, and/or based on a second type that is different than the first type. Examples of different types of signals include a sinusoidal signal, a square wave signal, a triangular wave signal, a multiple level signal, a polygonal signal, a DC signal, etc. For example, a first signal may be of a sinusoidal signal type, and the second signal may be of a DC signal type. In an alternative example, a first signal may be of a first sinusoidal signal type having first sinusoidal characteristics (e.g., first frequency, first amplitude, first DC offset, first phase, etc.), and the second signal may be of second sinusoidal signal type having second sinusoidal characteristics (e.g., second frequency, second amplitude, second DC offset, second phase, etc.) that is different than the first sinusoidal signal type.

Note that any implementation that differentiates the signals based on one or more characteristics may be used in this and other embodiments, examples, and their equivalents to distinguish and identify variations in capacitive coupling/mutual capacitance between each cross point between the row and column electrodes in a sensing layer.

In addition, within this diagram above as well as any other diagram described herein, or their equivalents, the one or electrodes 85 (e.g., touch sensor electrodes such as may be implemented within a device operative to facilitate sensing of touch, proximity, gesture, etc.) may be of any of a variety of one or more types including any one or more of a touch sensor device, a touch sensor element (e.g., including one or more touch sensors with or without display functionality), a touch screen display including both touch sensor and display functionality, a button, an electrode, an external controller, one or more rows of electrodes, one or more columns of electrodes, a matrix of buttons, an array of buttons, a film that includes any desired implementation of components to facilitate touch sensor operation, and/or any other configuration by which interaction with the touch sensor may be performed.

Note that the one or more electrodes 85 may be implemented within any of a variety of devices including any one or more of a touchscreen, a pad device, a laptop, a cell phone, a smartphone, a whiteboard, an interactive display, a navigation system display, an in-vehicle display, etc., and/or any other device in which one or more touch electrodes 85 may be implemented.

Note that such interaction of a user with an electrode 85 may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor including proximity detection, gesture detection, etc.). With respect to the various embodiments, implementations, etc. of various respective electrodes as described herein, note that they may also be of any such variety of one or more types. For example, electrodes may be implemented within any desired shape or style (e.g., lines, buttons, pads, etc.) or include any one or more of touch sensor electrodes, capacitive buttons, capacitive sensors, row and column implementations of touch sensor electrodes such as in a touchscreen, etc.

Figure 51C:
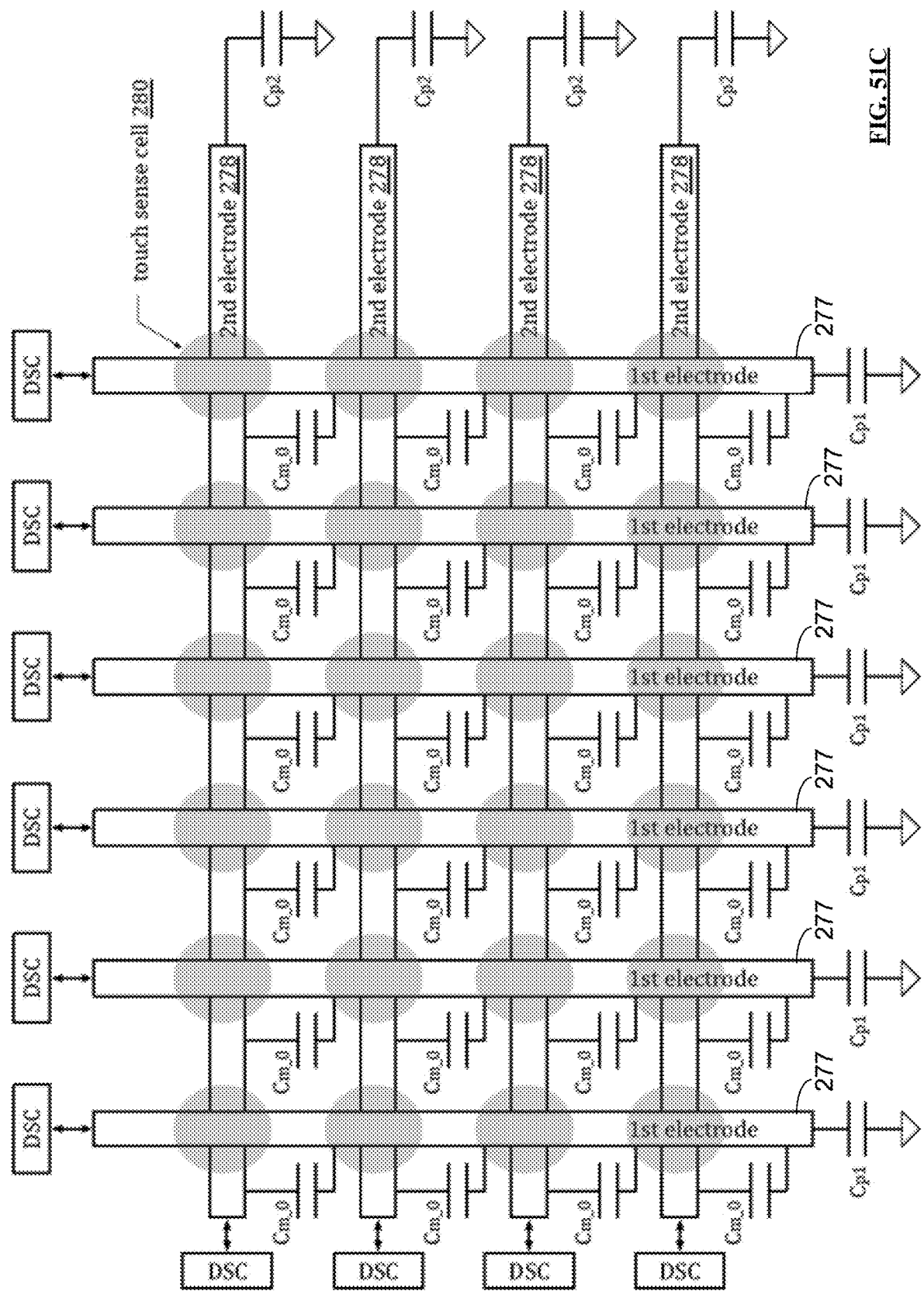
FIG. 51C is a schematic block diagram of an embodiment of a plurality of electrodes creating a plurality of touch sense cells 280 within a display.

FIG. 51C is a schematic block diagram of an embodiment of a plurality of electrodes creating a plurality of touch sense cells 280 within a display. In this embodiment, a few second electrodes 278 are perpendicular and on a different layer of the display than a few of the first electrodes 277. For each cross-point of a first electrode and a second electrode, a touch sense cell 280 is created. At each touch sense cell 280/cross-point, a mutual capacitance ($C_{m\_0}$) is created between the crossing electrodes at each cross-point.

A drive sense circuit (DSC) is coupled to a corresponding one of the electrodes. The drive sense circuits (DSC) provides electrode signals to the electrodes and generates sensed signals 120 that indicates the loading on the electrode signals of the electrodes. When no touch or touchless indication is present, each touch cell 280 will have a similar mutual capacitance, $C_{m\_0}$. When a traditional proximal touch or touchless indication is applied on or near a touch sense cell 280 by a finger, for example, the mutual capacitance of the cross point will decrease (creating an increased impedance). Based on these impedance changes of the various distinguishing components of sensed signals 120, the processing module can generate capacitance image data as, for example, captured frames of data that indicate the magnitude of the capacitive coupling at each of the cross-points indicative of variations in their mutual capacitance and further can be analyzed to determine the location of touch(es), or touchless indication(s) and or other conditions of the display.

Figures 51D, 51E:
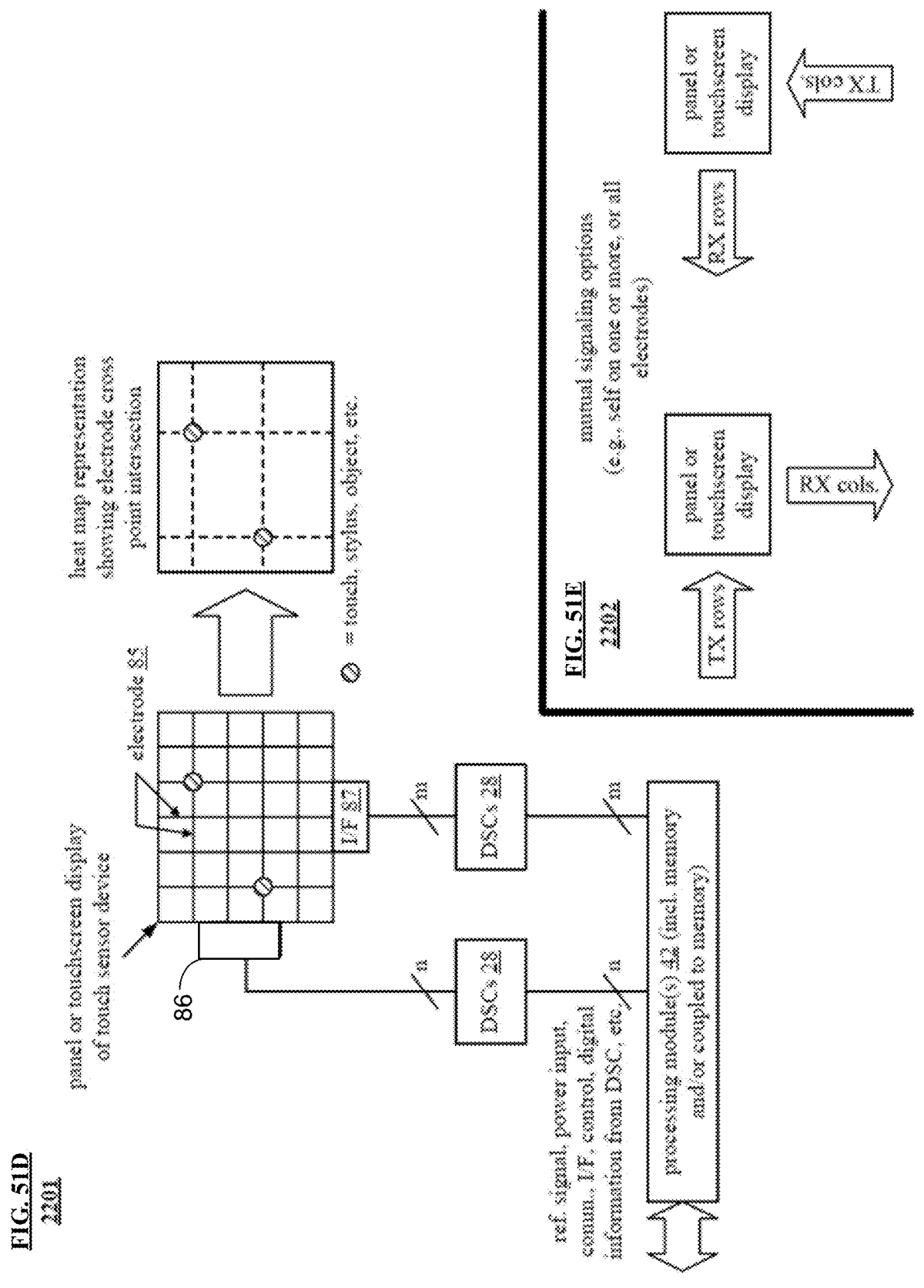

FIG. 51D is a schematic block diagram of another embodiment 2201 of a touch sensor device in accordance with the present disclosure. This diagram shows a panel or touchscreen display with touch sensor device that includes electrodes 85 that are arranged in rows and columns. One or more processing modules 42 is implemented to communicate and interact with the first set of DSCs 28 that couple to the row electrodes via interface 86 and a second set of DSCs 28 that are coupled to the column electrodes the interface 87.

With respect to signaling provided from the DSCs 28 to the respective column and row electrodes, note that mutual signaling is performed in certain examples. With respect to mutual signaling, different signals are provided via the respective DSCs 28 that couple to the row and column electrodes. For example, a first mutual signal is provided via a first DSC 28 to a first row electrode via the interface 86, and a second mutual signals provided via second DSC 28 to a second row electrode via the interface 86, etc. Generally speaking, different respective mutual signals are provided via different respective DSCs 28 to different respective row electrodes via the interface 86 and those different respective mutual signals are then detected via capacitive coupling into one or more of the respective column electrodes via the different respective DSCs 28 that couple to the row electrodes via the interface 87. Then, the respective DSCs 28 that couple to the column electrodes via interface 87 are implemented to detect capacitive coupling of those signals that are provided via the respective row electrodes via the interface 86 to identify the location of any interaction with the panel or touchscreen display.

From certain perspectives and generally speaking, mutual signaling facilitates not only detection of interaction with the panel or touchscreen but can also provide disambiguation of the location of the interaction with the panel or touchscreen. In certain examples, one or more processing modules 42 is configured to process both the signals that are transmitted, received, and simultaneously sensed, etc. in accordance with mutual signaling with respect to a panel or touchscreen display.

For example, as a user interacts with the panel or touchscreen display, such as based on a touch or touchless indication from a finger or portion of the user's body, a stylus, etc., there will be capacitive coupling of the signals that are provided via the row electrodes into the column electrodes proximally close to the cross-points of each of those row and column electrodes. Based on detection of the signal that has been transmitted via the row electrode into the column electrode, has facilitated based on the capacitive coupling that is based on the user interaction with the panel or touchscreen display via, for example, a stylus, pen or finger). The one or more processing modules 42 is configured to identify the location of the user interaction with the panel or touchscreen display based on changes in the sensed signals 120 caused by changes in mutual capacitance at the various cross-points. In addition, note that non-user associated objects may also interact with the panel or touchscreen display, such as based on capacitive coupling between such non-user associated objects with the panel or touchscreen display that also facilitate capacitive coupling between signals transmitted via a row electrode into corresponding column electrodes at a corresponding cross-points in the row, or vice versa.

Consider two respective interactions with the panel touchscreen display as shown by the hashed circles, then a corresponding heat map or other capacitance image data showing the electrode cross-point intersection may be generated by the one or more processing modules 42 interpreting the signals provided to it via the DSCs 28 that couple to the row and column electrodes.

In addition, with respect to this diagram and others herein, the one or more processing modules 42 and DSC 28 may be implemented in a variety of ways. In certain examples, the one or more processing modules 42 includes a first subset of the one or more processing modules 42 that are in communication and operative with a first subset of the one or more DSCs 28 (e.g., those in communication with one or more row electrodes of a panel or touchscreen display a touch sensor device) and a second subset of the one or more processing modules 42 that are in communication and operative with a second subset of the one or more DSCs 28 (e.g., those in communication with column electrodes of a panel or touchscreen display a touch sensor device).

In even other examples, the one or more processing modules 42 includes a first subset of the one or more processing modules 42 that are in communication and operative with a first subset of one or more DSCs 28 (e.g., those in communication with one or more row and/or column electrodes) and a second subset of the one or more processing modules 42 that are in communication and operative with a second subset of one or more DSCs 28 (e.g., those in communication with electrodes of another device entirely, such as another touch sensor device, an e-pen, etc.).

In yet other examples, the first subset of the one or more processing modules 42, a first subset of one or more DSCs 28, and a first subset of one or more electrodes 85 are implemented within or associated with a first device, and the second subset of the one or more processing modules 42, a second subset of one or more DSCs 28, and a second subset of one or more electrodes 85 are implemented within or associated with a second device. The different respective devices (e.g., first and second) may be similar type devices or different devices. For example, they may both be devices that include touch sensors (e.g., without display functionality). For example, they may both be devices that include touchscreens (e.g., with display functionality). For example, the first device may be a device that include touch sensors (e.g., with or without display functionality), and the second device is an e-pen device.

In an example of operation and implementation, with respect to the first subset of the one or more processing modules 42 that are in communication and operative with a first subset of one or more DSCs 28, a signal #1 is coupled from a first electrode 85 that is in communication to a first DSC 28 of the first subset of one or more DSCs 28 that is in communication and operative with the first subset of the one or more processing modules 42 to a second electrode 85 that is in communication to a first DSC 28 of the second subset of one or more DSCs 28 that is in communication and operative with the second subset of the one or more processing modules 42.

When more than one DSC 28 is included within the first subset of one or more DSCs 28, the signal #1 may also be coupled from the first electrode 85 that is in communication to a first DSC 28 of the first subset of one or more DSCs 28 that is in communication and operative with the first subset of the one or more processing modules 42 to a third electrode 85 that is in communication to a second DSC 28 of the second subset of one or more DSCs 28 that is in communication and operative with the second subset of the one or more processing modules 42.

Generally speaking, signals may be coupled between one or more electrodes 85 that are in communication and operative with the first subset of the one or more DSCs 28 associated with the first subset of the one or more processing modules 42 and the one or more electrodes 85 that are in communication and operative with the second subset of the one or more DSCs 28 (e.g., signal #1, signal #2). In certain examples, such signals are coupled from one electrode 85 to another electrode 85.

In some examples, these two different subsets of the one or more processing modules 42 are also in communication with one another (e.g., via communication effectuated via capacitive coupling between a first subset of electrodes 85 serviced by the first subset of the one or more processing modules 42 and a second subset of electrodes 85 serviced by the first subset of the one or more processing modules 42, via one or more alternative communication means such as a backplane, a bus, a wireless communication path, etc., and/or other means). In some particular examples, these two different subsets of the one or more processing modules 42 are not in communication with one another directly other than via the signal coupling between the one or more electrodes 85 themselves.

A first group of one or more DSCs 28 is/are implemented simultaneously to drive and to sense respective one or more signals provided to a first of the one or more electrodes 85. In addition, a second group of one or more DSCs 28 is/are implemented simultaneously to drive and to sense respective one or more other signals provided to a second of the one or more electrodes 85.

For example, a first DSC 28 is implemented simultaneously to drive and to sense a first signal via a first sensor electrode 85. A second DSC 28 is implemented simultaneously to drive and to sense a second signal via a second sensor electrode 85. Note that any number of additional DSCs implemented simultaneously to drive and to sense additional signals to additional electrodes 85 as may be appropriate in certain embodiments. Note also that the respective DSCs 28 may be implemented in a variety of ways. For example, they may be implemented within a device that includes the one or more electrodes 85, they may be implemented within a touchscreen display, they may be distributed among the device that includes the one or more electrodes 85 that does not include display functionality, etc.

FIG. 51E is a schematic block diagram of an embodiment 2202 of mutual signaling within a touch sensor device in accordance with the present disclosure. Note that mutual signaling may be performed in a variety of different ways. For example, mutual signaling may be performed such that signals are transmitted via the row electrodes of the panel or touchscreen display and detection of capacitive coupling of those signals into the column electrodes is detected via the column electrodes as variations in sensed signals 120. Alternatively, mutual signaling may be performed such that signals are transmitted via the column electrodes of the panel or touchscreen display and detection of capacitive coupling of those signals into the row electrodes is detected via the row electrodes as variations in sensed signals 120. Regardless of the particular implementation by which mutual signaling is performed, note that a respective DSC 28 is configured to transmit a signal via the respective electrode to which it coupled and simultaneously to sense that same signal via that respective electrode including to sense any other signal that is coupled into that respective electrode (e.g., such as with respect to capacitive coupling of signals from one or more other electrodes based on user interaction with the panel or touchscreen display).

Note that certain examples of signaling as described herein relate to mutual signaling such that a one or more signals are transmitted via row electrodes of one or more panels or touchscreen displays and, based on capacitive coupling of those one or more signals into column electrodes of the one or more panels are touchscreen displays, disambiguation of the location of any interaction of a user, device, object, etc. may be identified by one or more processing modules 42 that are configured to interpret the signals provided from one or more DSCs 28.

Figure 51F:
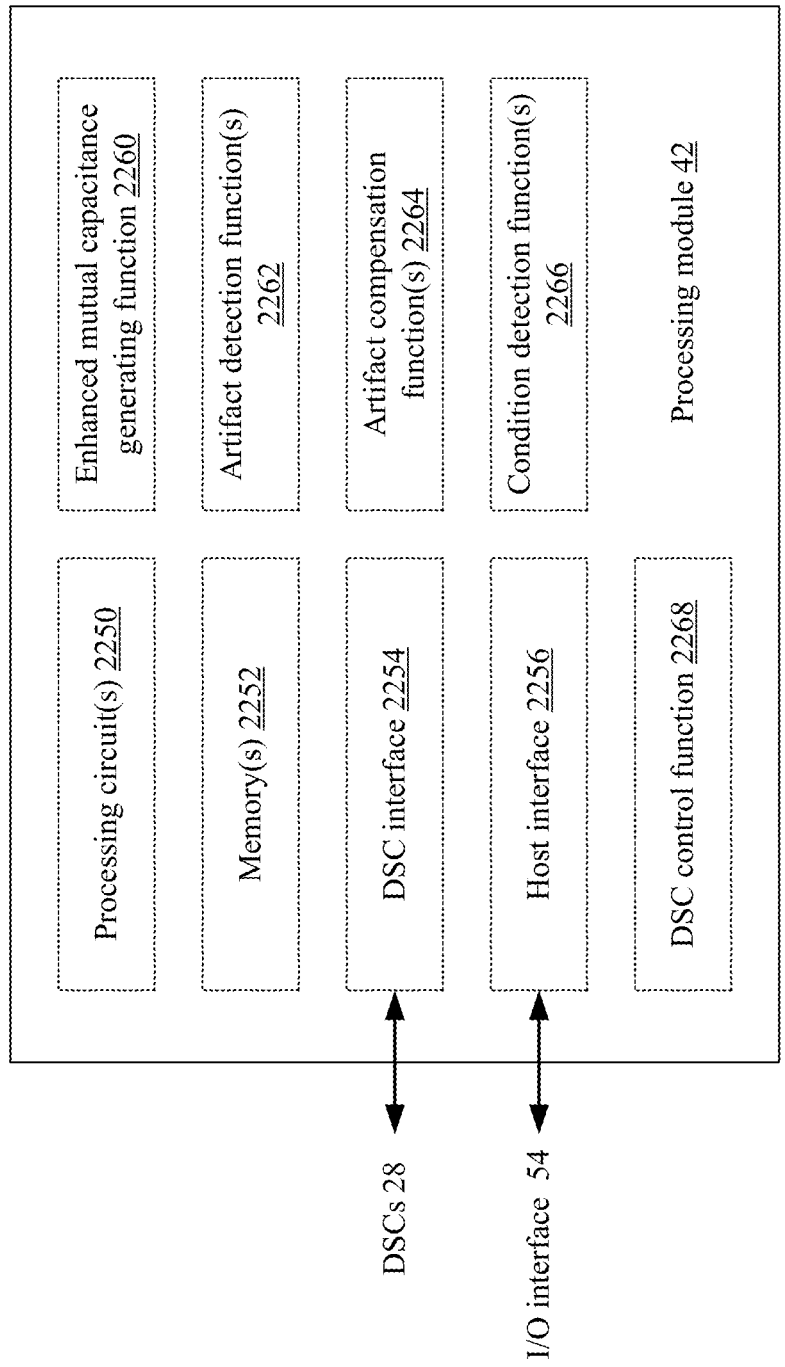
FIG. 51F is a schematic block diagram of an embodiment of a processing module in accordance with the present disclosure.

FIG. 51F is a schematic block diagram of an embodiment of a processing module in accordance with the present disclosure. In particular, a processing module 42 is presented as a further embodiment of processing module 42, and/or other processing modules disclosed herein with display 250, 250' and/or other touch screen displays disclosed herein. The processing module 42 improves the technology of touch screens, such as Projected Capacitive (PCAP) touch screens and associated touch screen controllers by employing enhanced mutual capacitance, namely the ability to detect both increases and decreases in the amplitude of mutual capacitance signals with the processing module 42 or other touch controller. This enhanced mutual capacitance capability allows for improved performance in the presence of noise, interference and/or other artifacts. It further provides an improved ability to detect, identify, characterize and track proximal touch conditions by an object or finger, pressure conditions and other conditions of a touch screen display.

The processing module 42 includes one or more processing circuits 2250 and one or more memories 2252. The processing module 42 also includes a DCS interface 2254, such as a serial or parallel I/O interface or other interface device for receiving sensed signals 120 from the DSC(s) 28 and/or for controlling their operation, e.g. via selectively enabling or disabling groups or individual DSC(s) 28. The processing module 42 also includes a host interface 2254, such as a serial or parallel I/O interface or other interface device for receiving commands from core computer 14 or other host device and for sending condition data and/or other touch screen data to a core computer 14 or other host device indicating, for example, the presence or absence of various touch conditions of the touch screen display, tracking and location data as well as other parameters associated the various touch conditions of the touch screen display that identify and/or characterize various artifacts or conditions.

In operation, the memory(s) 2252 store operational instructions and the processing circuit(s) execute the instructions to perform operations that can include selectively enabling or disabling groups or individual DSC(s) 28 and receiving sensed signals 120 via the DSC interface 2254. In addition, the operations can include other operations such as executing enhanced mutual capacitance generating function 2260, artifact detection function(s) 2262, artifact compensation function(s) 2264, condition detection function(s) 2266 and/or other functions and operations associated with a touch screen display.

In various embodiments, the enhanced mutual capacitance generating function 2260 can include one or more of the following operations:

Analyzing sensed signals 120 to distinguish the separate components, e.g. impedances or other electrical characteristics indicating capacitive coupling/mutual capacitance corresponding to each individual cross-point. This can include differentiation of individual components by frequency, time, modulation, coding and/or other distinguishing characteristic as discussed herein.

Formatting the separate components as capacitance image data. This can include capturing the magnitude of the separate components corresponding to each individual cross-point and a corresponding coordinates indicating the position of the cross-point in the touch screen display, and generating capacitive image data, for example as frames of data formatted to indicate these magnitudes and positions as a two-dimensional image or other array. In particular, the magnitude portion of the capacitance image data includes positive capacitance variation data corresponding to positive variations of the capacitance image data from a nominal value and negative capacitance variation data corresponding to negative variations of the capacitance image data from the nominal value.

Examples of positive capacitance variation data and negative capacitance variation data including several alternatives will be discussed further in conjunction with FIG. 52 that follows.

Figure 52A:
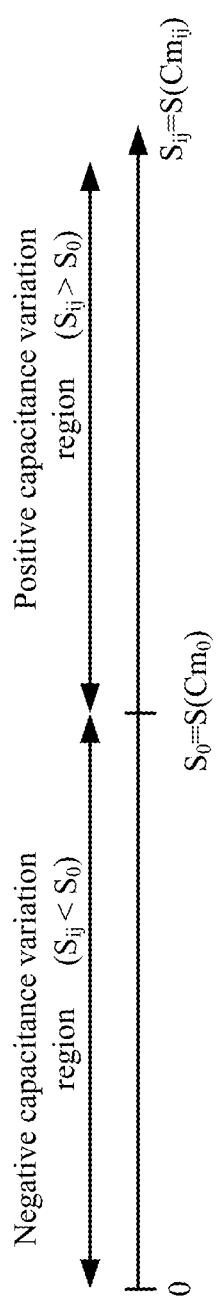
FIG. 52 is a graphical diagram of an embodiment of capacitance image data in accordance with the present disclosure.

FIG. 52 is a graphical diagram 300 of an embodiment of capacitance image data in accordance with the present disclosure. As previously discussed, components of the sensed signal 120 having differing frequencies or other differentiating characteristics can each represent the impedance or other electrical characteristic of an electrode 85 for each of the corresponding cross-points that intersect that electrode 85. When considering all of the row/column electrodes 85 of a touch screen display, this facilitates the creation of capacitance image data associated with the plurality of cross points that indicates the capacitive coupling associated with each individual cross-point and consequently, indicate variations of mutual capacitance at each individual cross-point. In particular, components of sensed signals 120 vary from the nominal mutual capacitance value for each cross-point in response to variations in mutual capacitance associated with that cross point.

Consider a component of sensed signals 120 for a cross-point with coordinate position (i, j) of the touch screen display and in a corresponding coordinate position in the capacitance image data to be represented by $S_{ij}$. This component can be expressed as a function S of the actual mutual capacitance of the cross-point with coordinate position (i, j) or $Cm_{ij}$.

$$S_{ij} = S(Cm_{ij})$$

As previously discussed, the function S can be proportional to the magnitude of the impedance of the cross-point (i, j) at the particular operating frequency, in which case, the value of $S_{ij}$ increases in response to a decrease in the value of the mutual capacitance $Cm_{ij}$. As also noted, in other examples, the function S can be proportional to other electrical characteristic(s) of the mutual capacitance of the cross-point.

Consider further, the nominal value of $S_{ij}$—corresponding to a quiescent state—such as the absence of a proximal touch or touchless condition of the touch screen display, noise, pressure or other artifacts, etc. This nominal value can be represented by $S_0$, where, $$S_0 = S(Cm_0)$$

and $Cm_0$ (or $Cm_{\_0}$) represents a nominal mutual capacitance, such as the mutual capacitance of the particular cross-point (i, j) in the quiescent state. In a further example, the nominal mutual capacitance $Cm_0$ can be predetermined value and assumed to be the same, or substantially the same for all of the cross-points within a predetermined or industry-accepted tolerance such as 1%, 5%, 10% or some other value and the same value of $Cm_0$ is used for all cross-points. In the alternative, $Cm_0$ can be calculated as an average mutual capacitance calculated over all of the cross-points of the touch screen display in the quiescent state or other operating state in the presence of normal operating noise. In a further example, $Cm_0$ can be calculated individually for all of the cross-points of the touch screen display in the quiescent state or other operating state in the presence of normal operating noise, with each individual value being used for its corresponding cross-point. While described above in terms of values of $Cm_0$, predetermined or calculated values of $S_0$ could similarly be used directly.

As used herein, a frame of capacitance image data for an N×M touch screen includes, an N×M array of magnitude data $S_{ij}$, at corresponding cross-point coordinate positions $1 \leq i \leq N$ and $1 \leq j \leq M$. The magnitude portion of the capacitance image data $S_{ij}$ can include positive capacitance variation data corresponding to positive variations of the capacitance image data from the nominal value $S_0$ in the positive capacitance region shown where, $$(S_{ij} > S_0)$$

The magnitude portion of the capacitance image data $S_{ij}$ can also include negative capacitance variation data corresponding to negative variations of the capacitance image data from the nominal value $S_0$ in the negative capacitance region shown where, $$(S_{ij} < S_0)$$

It should be noted, when the function S is proportional to the magnitude of the impedance of the cross-point (i, j) at the particular operating frequency, negative variations in mutual capacitance from the nominal mutual capacitance $Cm_0$ result in positive capacitance variation data. Conversely, positive variations in mutual capacitance from the nominal mutual capacitance $Cm_0$ result in negative capacitance variation data.

FIG. 53A is a flow diagram of an embodiment of a method in accordance with the present disclosure. In particular a method is presented for use in conjunction with the processing module 42, display 250, 250' and/or other processing modules and touch screen displays disclosed herein. Step 310 includes receiving sensed indications of mutual capacitance. This step can be performed, for example, via DSC interface 2254. Step 312 includes generating capacitance image data including positive capacitance variation data and negative capacitance variation data. This step can be performed, for example, via enhanced mutual capacitance generating function 2260. Step 314 includes identifying artifacts in the capacitance image data and compensating for those artifacts. This step can be performed, for example, via artifact detection function(s) 2262 and/or artifact compensation function(s) 2264. In some embodiments, artifact compensation is performed only if one or more artifacts are identified. In other examples, such as noise compensation, artifact compensation can be performed repeatedly, continuously and/or periodically. Step 316 includes processing the capacitance image data to identify the presence and/or absence of various conditions and to characterize the conditions that were identified. This step can be performed, for example, via condition detection function(s) 2266.

Returning back to FIG. 51F, in various embodiments, the artifact detection function(s) 2262 process the capacitance image data to detect, identify and/or characterize one or more conditions of the touch screen display corresponding to artifacts in the capacitance image data—conditions that differ from the ordinary proximal touch or touchless conditions, by fingers, a stylus, etc. and/or that differ from other conditions of the touch screen display that occur during the intended operation of the touch screen display. Examples of such artifacts include noise in the capacitance image data, interference caused by the presence of devices in proximity to the display that emit electromagnetic fields having frequencies that overlap with the operating frequency or frequencies of the touch screen display and/or variations in the capacitance image data caused by the presence of water or salt-water on the surface of the touch screen display, the presence of other foreign objects on the surface of the touch screen display or in proximity to the display including conductive objects, dielectric objects and non-conductive objects that are not intended by the user to invoke touch operations and/or other artifacts in the capacitance image data caused by other undesirable conditions.

The operations of the artifact detection function(s) 2262 can include one or more of the following operations:

Processing the positive capacitance variation data and/or the negative capacitance variation data via one or more inference functions corresponding to each possible artifact to be detected. Examples of such inference functions can include signal analysis, statistical noise analysis, statistical pattern recognition functions, other pattern recognition functions, texture recognition functions, artificial intelligence (AI) models such as convolutional neural networks, deep-learning functions, clustering algorithms, machine learning functions trained on sets of training data with capacitance image data corresponding to known conditions of various kinds, and/or other image processing techniques. In various embodiments, the capacitance image data is processed via each of the inference functions to determine if an artifact corresponding to each particular inference function is present or absent.

If the presence of a particular artifact is detected, the particular artifact can be identified and/or characterized based on one or more parameters of the artifact. In this fashion, for example, noise or interference can be identified and characterized based on noise or interference levels, signal to noise ratio, signal to noise and interference ratio, interference frequencies, etc. In a further example, the presence of water droplets on the display can be identified and or characterized by amount or level.

When one or more artifacts are detected via the artifact detection function(s) 2262, one or more artifact compensation function(s) 2264 corresponding to the identified artifact or artifacts can be selected and enabled to compensate for these particular artifact(s) in the capacitance image data. In particular the goal of the artifact compensation function(s) 2264 is to generate compensated capacitance image data that permits the continued normal and desired touch operation of the touch screen display. The operations of the artifact compensation function(s) 2264 can include one or more of the following operations:

Determining locations and/or other portions of the positive capacitance variation data and/or the negative capacitance variation data corresponding to the artifact(s). For example, the presence of noise can result in high frequency variations in both the positive capacitance variation data and the negative capacitance variation data within a noise zone about $S_0$. The magnitude of the noise determined statistically or based on peak signal levels by the artifact detection functions(s) 2262 can be used to determine the size of the noise zone. In another example, the presence of water on the display can result in static or slowly varying variations in both the positive capacitance variation data and the negative capacitance variation data about $S_0$. The signal variation artifacts caused by the water in the positive capacitance variation data and the negative capacitance variation data can be identified.

Generating compensated capacitance image data by subtracting, ignoring or removing the portions of the positive capacitance variation data and/or the negative capacitance variation data corresponding to the artifact(s).

The condition detection function(s) 2266 can operate to detect and/or identify a desired condition of the touch screen display, i.e. an intended actual proximal touch and/or touchless operation. Examples of such desired conditions include a proximal touch or touchless indication by a finger, e-pen or stylus, touch pressure by a conductive, non-conductive or dielectric object, the presence of an object with a particular shape on the surface of the display, and/or other desired conditions. The operation of the condition detection function(s) 2266 can include:

Processing the positive capacitance variation data and/or the negative capacitance variation data from the capacitance image data (in the absence of artifacts) or from the compensated capacitance image data (in the presence of one or more artifacts) to identify one or more touch conditions or other desired condition. For example, the presence of a spike in the positive capacitance variation data above a touch or touchless indication threshold can be used to identify proximal finger touches. In a further example, an object of one or more particular shape(s) on or near the surface of the display can be detected based on analysis by one or more inference functions corresponding to these particular shapes. Examples of such inference functions can include statistical pattern recognition functions, other pattern recognition functions, texture recognition functions, artificial intelligence (AI) models such as convolutional neural networks, deep-learning functions, clustering algorithms, machine learning functions trained on sets of training data with capacitance image data corresponding to known conditions of various kinds, and/or other image processing techniques.

If a particular condition is detected, condition data can be generated that indicates the condition, and/or parameters of the condition. Such condition data can be sent via the host interface 2256 for use by a host device, running app, the core computer 14 etc. Examples of such condition data include the identification and location of one or more touches, or touchless indications, the locations and identification of one or more particular shapes and/or their orientation and/or other characterization parameters.

An embodiment of a condition detection function 2266 is discussed in further detail in conjunction with FIG. 55A. The further operation of the processing module 42, including several optional functions and features, will be described in conjunction with the figures that follow.

FIG. 53B is a schematic block diagram of an embodiment of an artifact detection function and artifact compensation function in accordance with the present disclosure. As previously discussed, the artifact detection function(s) 2262 can detect one or more differing artifacts such as the presence of water or salt-water on the surface of the touch screen display, the presence of other foreign objects on the surface of the touch screen display or in proximity to the display including conductive objects, dielectric objects and non-conductive objects, and/or other artifacts in the capacitance image data caused by other undesirable conditions.

In various embodiments, the artifact detection function(s) 2262 can be implemented via differing inference functions or other detection functions for each of the possible artifacts. In the presence of a single artifact, the particular artifact detection function 2262 corresponding to single artifact operates to signal the presence of that artifact—while the other artifact detection functions 2262 corresponding to other artifacts operate to signal the absence of their corresponding artifacts. In the presence of a more than one artifact, the particular artifact detection functions 2262 corresponding to artifact detected each operate to signal the presence of their corresponding artifact—while the other artifact detection functions 2262 corresponding to other artifacts operate to signal the absence of their corresponding artifacts.

Furthermore, the artifact compensation function(s) 2264 can be implemented via differing inference functions or other compensation functions for each of the possible artifacts. When a single artifact is identified as being present, the particular artifact compensation function 2262 is enabled to compensate for the presence of artifact data corresponding to the artifact in the capacitance image data. When more than one artifact is identified as being present, the corresponding artifact compensation function(s) 2262 are each enabled to compensate for the presence of the corresponding artifacts in the capacitance image data.

Capacitance image data 1300-1, including the positive capacitance variation data and the negative capacitance variation data is analyzed by an artifact detection function 2262-1 corresponding to an undesirable condition, for example, the presence of conductive liquids on the surface of the display. The artifact detection function 2262-1 can operate to detect the presence of the water on the surface of the display via a statistical pattern recognition function, other pattern recognition function, and/or texture recognition functions that recognizes a pattern or texture corresponding to the presence of water on the surface. In a further example, the artifact detection function 2262-1 can operate to detect the presence of the water on the surface of the display via an artificial intelligence (AI) model such as a convolutional neural network, deep-learning function, clustering algorithm, or other machine learning function trained on sets of training data corresponding to capacitance image data with known artifacts of various kinds. In yet another example, the capacitance image data 1300-1 can be transformed into a 2-D frequency domain, via a discrete Fourier transform, and the resulting frequencies are analyzed to identify one or more frequencies or a band of frequencies determined to correspond to water or other conductive liquid.

Once the presence of water or other conductive liquid is detected by the artifact detection function 2262-1, indication of this detection can be sent to the artifact compensation function 2264-1 corresponding to this artifact. In response to this indication, the artifact compensation function 2264-1 can be enabled to generate compensated capacitance image data 1325-1 from the capacitance image data 1300-1. As previously discussed, the presence of conductive liquid on the display can result in static or slowly varying variations in both the positive capacitance variation data and the negative capacitance variation data about $S_0$. This signal variation artifacts caused by the water in the positive capacitance variation data and the negative capacitance variation data can be identified and located, particularly when water is determined to be present on only a portion of the display. The compensated capacitance image data 1325-1 can be generated by subtracting from the capacitance image data 1300-1, the portions of the positive capacitance variation data and the negative capacitance variation data corresponding to this artifact.

In another example, compensated capacitance image data 1325-1 can be generated by:
  determining a zone in the positive capacitance variation data and the negative capacitance variation data corresponding to variations caused by this artifact. For example, the zone can be defined by the region between an upper threshold corresponding to a highest positive peak in the positive capacitance variation data and a lower threshold corresponding to a lowest negative peak in the negative capacitance variation data.
  generating the capacitance image data 1325-1 by removing from the capacitance image data 1300-1, the portions of the positive capacitance variation data and the negative capacitance variation data within this zone or otherwise ignoring the portions of the positive capacitance variation data and the negative capacitance variation data within this zone.
    This technique can be used, for example when droplets of water are not localized to a small region and instead are scattered over more than a predetermined percentage of the surface of the display.

Figure 52B:
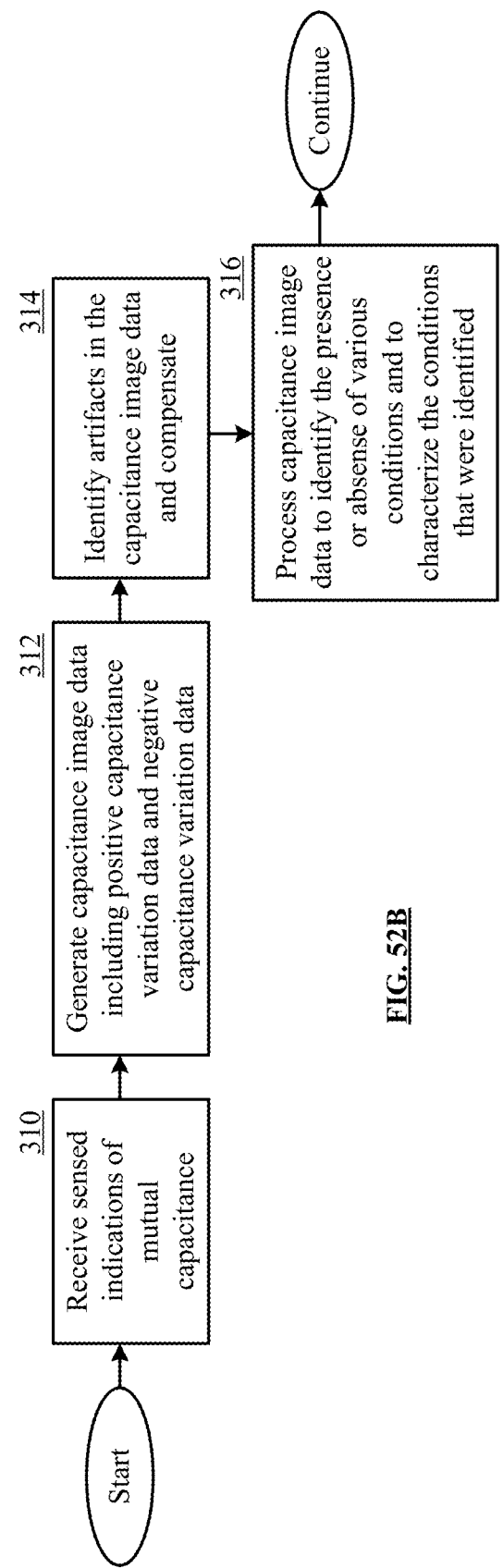

FIG. 54A is a flow diagram of an embodiment of a method in accordance with the present disclosure. In particular a method is presented for use in conjunction with the processing module 42, display 250, 250' and/or other processing modules and touch screen displays disclosed herein. Common elements with FIG. 52B are referred to by common reference numerals. Step 314-1' includes identifying noise in the capacitance image data. This step can be performed, for example, via a corresponding artifact detection function 2262 designed for this purpose, for example, as discussed in conjunction with FIG. 54B. Step 314-2' includes compensating for the noise in the capacitance image data. This step can be performed, for example, via an artifact compensation function 2264, for example, as discussed in conjunction with FIG. 54B. While shown as separate steps 314-1' and 314-2', these functions can be performed together to, for example, determine the amount of noise present in the capacitance image data and to compensate for that noise.

FIG. 54B is a schematic block diagram of an embodiment of an artifact detection function and artifact compensation function in accordance with the present disclosure. The presence of noise in the capacitance image data can result in variations in both the positive capacitance variation data and the negative capacitance variation data about $S_0$. This signal variation caused by the noise in the positive capacitance variation data and the negative capacitance variation data can be identified. As previously discussed, the artifact detection function(s) 2262 can operate to detect the presence of noise in the capacitance image data and identify the noise, for example by a noise level, noise energy, signal to noise ratio, etc.

In various embodiments, an artifact detection function 2262-2 can be implemented via signal analysis, statistical noise analysis or other noise detection technique. For example, the artifact detection function 2262-2 can be the same as or different from artifact detection function 2262-1, for example, based on being implemented to detect the presence of noise. Once the noise has been identified by the artifact detection function 2262-2, an indication of the noise can be sent to the artifact compensation function 2264-2 for compensation of the noise. In response to this indication, the artifact compensation function 2264-2 can be enabled to generate compensated capacitance image data 1325-1 from the capacitance image data 1300-1. In the alternative, the artifact compensation function 2264-2 can be in continuous/periodic operation to compensate for the current noise conditions.

Once the noise level is identified, compensated capacitance image data 1325-1 can be generated by:
- determining a noise zone in the positive capacitance variation data and the negative capacitance variation data corresponding to variations caused by this artifact. For example, the noise zone can be defined by the region between an upper threshold (e.g. an upper baseline) corresponding to the highest positive peak in the positive capacitance variation data or highest average positive noise deviation and a lower threshold (e.g. a lower baseline) corresponding to the lowest negative peak or lowest average negative noise deviation in the negative capacitance variation data and/or based on other indications of noise energy, levels or noise statistics.
- generating the capacitance image data 1325-1 by subtracting or removing from the capacitance image data 1300-1, the portions of the positive capacitance variation data and the negative capacitance variation data within this zone or otherwise ignoring the portions of the positive capacitance variation data and the negative capacitance variation data within this zone.
- By generating a noise zone, with a upper baseline value to represent a traditional PCAP touch controller baseline floor and an additional lower baseline value, which is used for the negative capacitance variation data, allows for the measurement of the negative capacitance variation data with the noise above to be subtracted, removed or ignored.

When the display is remotely located from the processing module 42 or other controller, there could be increased baseline noise, which will be addressed by the implementation of a noise zone. Also, when connecting two or more sensors with common parallel same/shared mutual signals, which is when the TX (transmitted) and/or RX (received) channels have cabling between the sensors, there is an increase of noise generated from the cabling, that increases the noise floor, with the artifact compensation function 2264-2 can increase the range between the upper baseline and the lower baseline, which will increase the range of the values to subtract, remove, or ignore from the measure values. Furthermore, when connecting two or more sensors that have cabling between the sensors with common parallel same/shared mutual signals, unique noise zones can be created by the artifact compensation function 2264-2 for each of sensor's measured signal content.

In addition, when connecting a multi-ended sensor with common parallel same/shared mutual signals, on a single large sensor or a high trace resistance sensor, there is an increase of noise generated on the cabling routed across/around the two or more ends of the sensors channels, that increases the noise floor. The artifact compensation function 2264-2 can compensate by increasing the range of the upper baseline and the lower baseline, which will increase the range of the values to subtract, remove, or ignore from the measure values.

FIG. 55A is a schematic block diagram of an embodiment of a condition detection function in accordance with the present disclosure. The condition detection function 2266-1 operates based on capacitance image data 1300-1 or compensated capacitance image data 1325-1, in the event that one or more artifacts were detected and compensated.

In particular a condition detection function 2266-1 is presented corresponding to a touchless indication by a finger. Further discussion of the touchless indication condition is presented in conjunction with FIG. 56.

In various embodiments, the presence of a spike in the positive capacitance variation data above a touchless indication threshold and below a touch threshold can be used to identify one or more proximal touchless indication(s) by finger(s). The touch threshold and/or touchless indication threshold can be predetermined thresholds or dynamic thresholds that are adjusted based on the presence of one or more artifacts, such as noise, water, the presence of foreign objects, etc.

If a proximal touchless condition is detected, condition data 1350-1 can be generated that indicates the touchless indication, and/or parameters of the touchless indication. Examples of condition data 1350-1 include the identification and location, size, boundaries, strength, path, trajectory and/or other parameters of one or more touchless indications, etc. Such condition data 1350-1 can be sent via the host interface 2256 for use by a host device, a running app, the core computer 14, etc.

In particular, alternatively or in addition to detecting physical touch to the touch screen, one or more embodiments of the touch screen 16 described herein can be configured to detect objects, such as a hand and/or one or more individual fingers of a user, hovering over the touch screen 16, without touching the touch screen 16. As used herein "hovering" can correspond to being adjacent to the touch screen without touching the touch screen, in any orientation relative to the direction of gravity. In particular, "hovering" over a touch screen 16 as discussed herein is relative to an orientation of the corresponding touch screen 16.

Figures 55B, 55C:
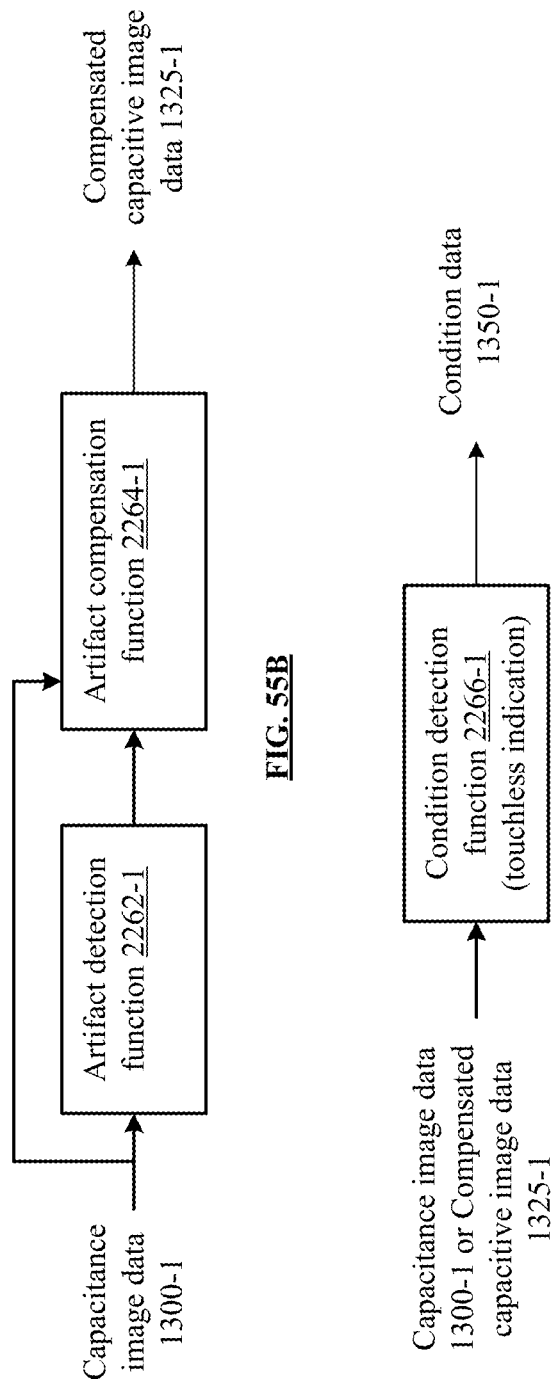
FIG. 55B is a pictorial diagram of an embodiment of electrodes of a touch screen display in accordance with the present disclosure.

FIG. 55B is a pictorial diagram 320-2 of an embodiment of a touch screen 16 that includes electrode columns 85 of a touch screen utilized to detect an object in proximity, but not touching, the touch screen 16 such as a hand, in a same or similar fashion as utilized to detect touch as discussed previously.

In some embodiments, a smaller number of electrode rows and/or columns than implemented in other embodiments discussed herein, and/or electrode rows and/or columns with larger spacing than implemented in other embodiments discussed herein, can be implemented by touch screen 16 to facilitate presence detection by touch screen 16. In some embodiments, this can be based on leveraging the presence of electric field induced by presence of a hovering object such as a hand. For example, the electric field can be detected and/or measured, where properties of the detected electric field can be processed by processing module 42 to implement presence detection and/or a location and/or characteristics of a hovering one or more objects in proximity to the electrode rows and/or columns. This can be ideal to capture large gestures and/or touchless indications, or to otherwise detect a person is in proximity.

Figure 56:
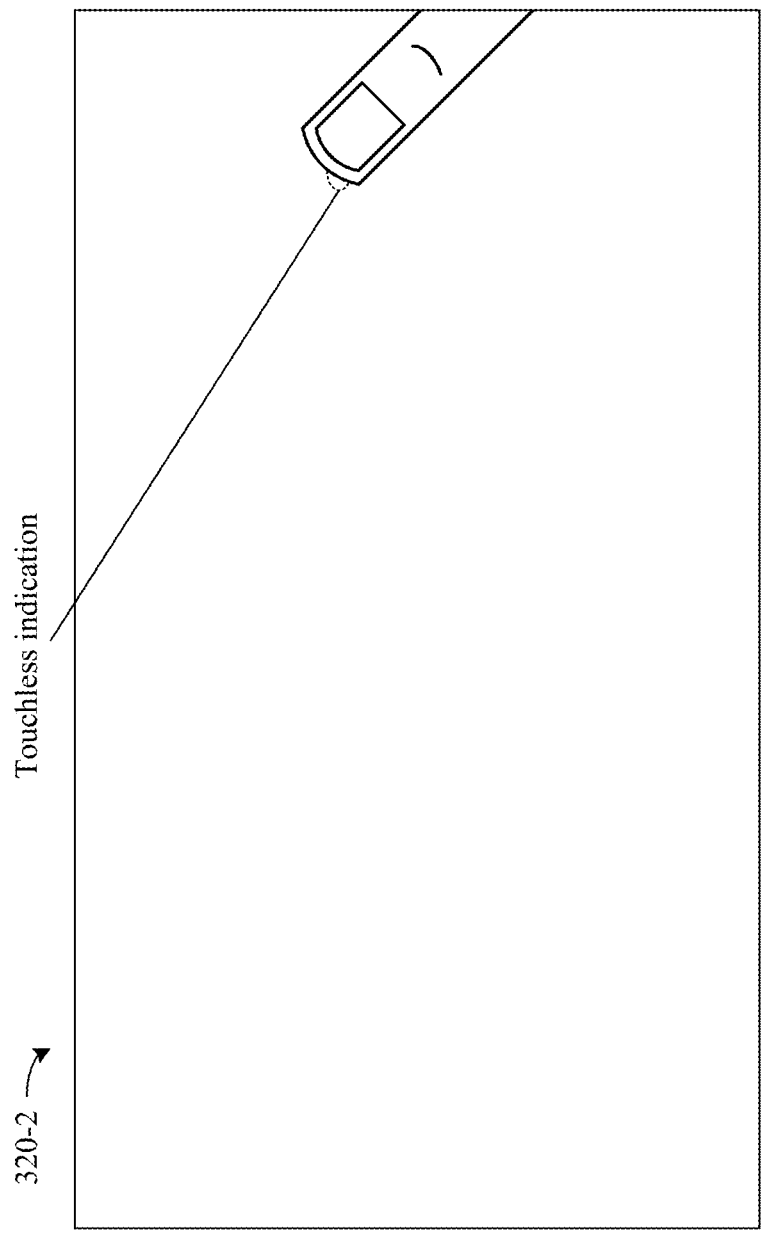
FIG. 56 is a pictorial diagram of an embodiment of a surface of a touch screen display in accordance with the present disclosure.

FIG. 56 is a pictorial diagram 320-2 of another embodiment of a touch screen display in accordance with the present disclosure. In particular, more detailed capacitance image data can be generated by touch screen 16 for hovering objects, such as particular fingers of a hand, for example, based on implementing electrode rows and/or columns, such as a number of electrode rows and/or columns of other embodiments discussed herein and/or based on implementing a same spacing of electrode rows and/or columns implemented in other embodiments discussed herein. This can be ideal to capture minute gestures and/or touchless indications by particular fingers, without necessitating physical touching of the touchscreen.

As depicted in FIG. 56, the surface of the touch screen 16 can define and/or be parallel with an x-y plane with an x-axis and y-axis, and a distance between the user's finger and the touch screen projected upon a z-axis orthogonal to the x-y plane can be a non-zero hover distance 602.1, based on the finger hovering over the touch screen without touching the touchscreen.

When the hover distance 602 is sufficiently small, such as less than 1 centimeter, less than 10 centimeters, and/or otherwise close enough to render detectable changes to the self-capacitance and the mutual capacitance of the electrodes, a corresponding location on the touch screen over which the finger or object is hovering can be identified. In this example, a hover region 605.1 upon the x-y plane is identified, for example, based on detecting capacitance variation data at corresponding cross points of the plurality of electrodes indicating a hovering finger and/or object at this region. For example, the hover region 605 corresponds to portions of the hovering finger within sufficient hover distance 602 to render detection. This detection of an object hovering over the screen without touching can be similar to the detection of actual touch of the screen described herein, for example, where different threshold capacitance variations are utilized to detect a hovering finger and/or object. For example, threshold self-capacitance and/or mutual capacitance indicating physical touch can be higher than the threshold self-capacitance and/or mutual capacitance indicating a hovering object.

The identification of hover region 605 can be utilized to detect a corresponding touchless indication 610 by a user. For example, a user can use their finger, pen, or other object can interact with graphical image data, such as a graphical user interface or other displayed image data displayed via touch screen 16, via one or more touchless indications, for example, in a same or similar fashion as interaction with image data displayed via touch screen 16 via physical touch. The touchless indication 610 can correspond to a detectable condition detected via condition detection function 2266-1 as discussed in conjunction with FIG. 55A.

In some embodiments, a user can optionally interact with the graphical image data displayed by a touch screen 16 entirely via touchless indications 610, where the user need not physically touch the screen to "click on" buttons, select options, scroll, zoom in and/or out, etc. Alternatively, a user can optionally interact with the graphical image data displayed by a touch screen 16 via touchless indications in addition to touch-based indications, for example, to distinguish the same or different types of different commands and/or selections when interacting with displayed graphical image data.

These touchless indications 610 can include: statically hovering over the touch screen 16 at hover distance 602, for example, to interact with a corresponding portion of graphical image data displayed via a corresponding portion of the x-y plane; dynamically hovering over the touch screen 16 with movements along the x-y plane at hover distance 602, for example, to perform a gesture-based command and/or to interact with different portions of graphical image data displayed via different corresponding portions of the x-y plane; dynamically hovering over the touch screen 16 with movements along the z-axis to change the hover distance 602, for example, to perform a gesture-based command and/or to interact with a corresponding portion of graphical image data displayed via a corresponding portion of the x-y plane; and/or other hover-based and/or gesture-based indications that optionally do not involve any physical touching of the touch screen 16.

In some embodiments, different types of touchless indications 610 can optionally correspond to different gesture-based commands utilized to invoke different types of interaction with the graphical image data, for example, where one type of touchless gesture-based command is processed to cause scrolling of the graphical image data, where another type of touchless gesture-based command is detected processed to cause zooming in of the graphical image data, where another type of touchless gesture-based command detected is processed to cause zooming out of the graphical image data, where another type of touchless gesture-based command is detected and processed to cause selection of a selectable element of the graphical image data, such as a button displayed by the graphical image data, and/or where one or more additional types of touchless gesture-based command are also detected and processed to cause other interaction with the graphical image data.

Figure 57A:
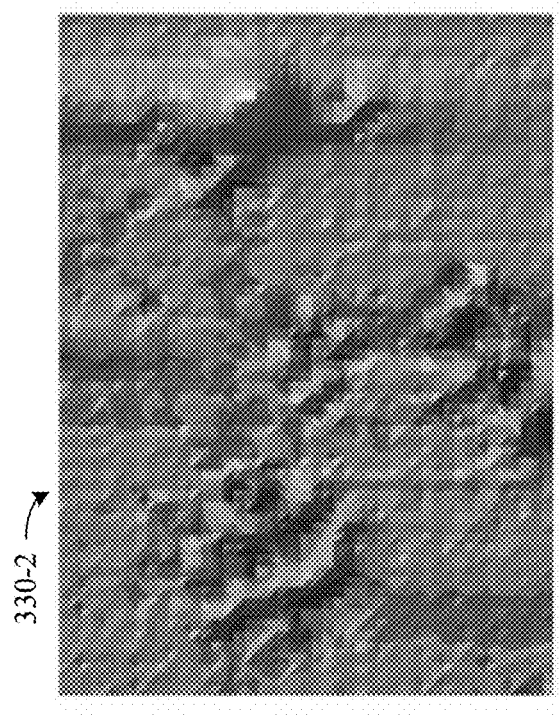
FIG. 57A is a graphical diagram of an embodiment of capacitance image data in accordance with the present disclosure.
Figure 57B:
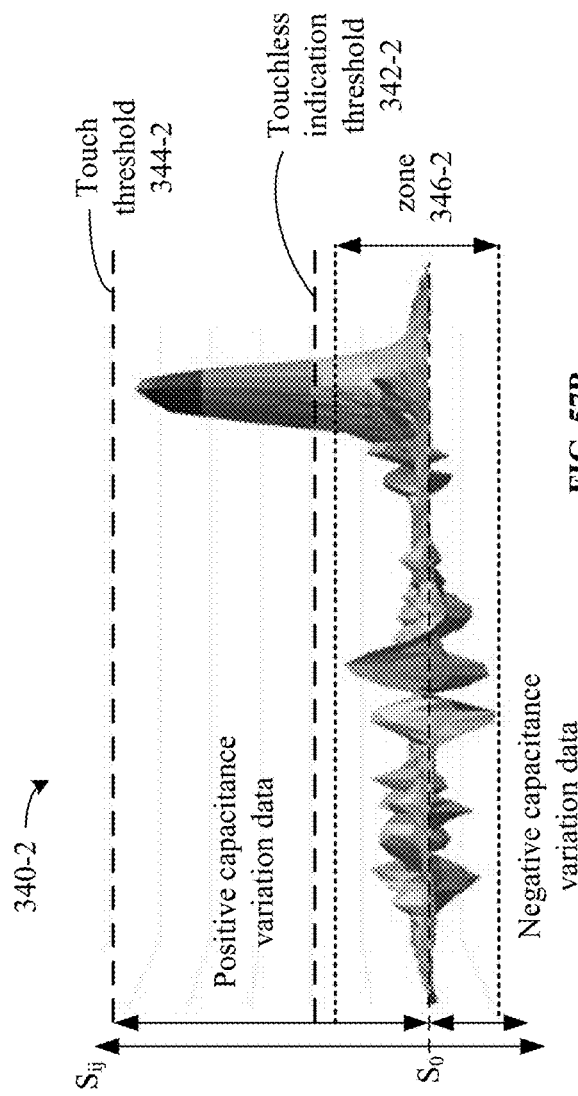
FIG. 57B is a graphical diagram of a detected hover region in accordance with the present disclosure.

FIGS. 57A and 57B are graphical diagrams 330-2 and 340-2 of an embodiment of capacitance image data in accordance with the present disclosure. In particular, capacitance image data is presented in response to the touchless indication presented in conjunction with FIG. 56. FIG. 57A presents a 2-D heat map representation where differing colors represent the magnitude of the positive capacitance variation data and the negative capacitance variation data. The two dimensions heatmap of FIG. 57A can correspond to the x axis and y axis of the x-y plane of touch screen 16, where the heatmap depicts positive capacitance variation data and the negative capacitance variation data detected across various locations of the x-y area of touch screen 16. FIG. 57B presents a 3-D heat map representation where differing colors represent the magnitude of the positive capacitance variation data and the negative capacitance variation data.

In particular, the presence of the touchless indication is clearly indicated by the peak in positive capacitance touch data that is above the touchless indication threshold 342-2 but below the touch threshold 344-2. For example, the detected hover region can be determined based on portions of the heatmap 57A with positive capacitance variation data exceeding the touchless indication threshold 342-2. Compensated capacitance image data can subtract, remove or ignore portions of the positive capacitance variation data and the negative capacitance variation data within the zone 346-2 and/or by increasing the touchless indication threshold 342-2 to be above this zone 346-2. A condition detection function 2266 corresponding to a touchless indication can detect and identify that a finger is in close proximity to the display surface based on the location of the positive peak in the positive capacitance variation data that exceeds the touchless indication threshold 342-2 but below the touch threshold 344-2. In the example shown, the touchless threshold 342-2 is placed slightly above, such as a predetermined value above, the upper threshold of the zone 346-2. In other examples, the touchless indication threshold 342-2 can be set at the upper threshold of the zone 346-2.

In addition, a further condition detection function 2266 corresponding to a touch can detect and identify that a finger is physically touching the surface of the display based on the location of the positive peak in the positive capacitance variation data that exceeds the touch threshold 344-2.

FIG. 57C illustrates the detected hover region 605.1 detected as discussed based on processing the capacitance image data of FIGS. 57A and 57B. In particular, FIG. 57C illustrates the projection of the detected hover region 605.1 upon the corresponding x-y plane, for example, corresponding to the two-dimensional plane of display 50 and/or otherwise corresponding to the planar surface of the touch screen 16 and/or the planar display of graphical image data by the touchscreen. The boundary of detected hover region 605.1 illustrated in FIG. 57C corresponds to the boundary of corresponding capacitance variance data in the two-dimensional heat map of FIG. 57A that compares favorably to the touchless indication threshold. This hover region 605 thus depicts the portion of the touch screen 16 over which an object is detected to be hovering, such as the finger of FIG. 56 at the hover distance 602.1 in this example. This hover region 605 can be further processed, for example, to induce corresponding selections and/or interactions with the graphical image data displayed at corresponding portions of the x-y plane, as described in further detail herein.

FIG. 58 presents another pictorial representation of another touchless indication 610.2 upon touchscreen 16. In this case, a new hover region 605.2 is detected in a different location upon the x-y plane, for example, due to movement of the finger with respect to the x-y plane from the position depicted in FIG. 56. The corresponding hover distance 602.2 can be larger than the hover distance 602.1 of FIG. 56, for example, due to movement of the finger orthogonal to the x-y plane from the position depicted in FIG. 56.

FIGS. 59A and 59B are graphical diagrams 330-4 and 340-4 of an embodiment of capacitance image data in accordance with the present disclosure. In particular, capacitance image data is presented in response to the touchless indication presented in conjunction with FIG. 58. FIG. 59A presents a 2-D heat map representation where differing colors represent the magnitude of the positive capacitance variation data and the negative capacitance variation data. The two dimensions heatmap of FIG. 59A can correspond to the x axis and y axis of the x-y plane of touch screen 16, where the heatmap depicts positive capacitance variation data and the negative capacitance variation data detected across various locations of the x-y area of touch screen 16.

FIG. 59B presents a 3-D heat map representation where, again, differing colors represent the magnitude of the positive capacitance variation data and the negative capacitance variation data. Note that the magnitude of the depicted peak of FIG. 59B can be smaller than the magnitude of the depicted peak of FIG. 57B, for example, based on the hover distance 602.2 of FIG. 58 being larger than the hover distance 602.1 of FIG. 56, and thus inducing a smaller variation in positive capacitance.

While differences in hover distance 602.1 and 602.2 in FIGS. 56 and 59, respectively, are presented to illustrate corresponding effects on the positive capacitance variation data, the illustrated distances relative to the size and/or orientation of the finger are not necessarily drawn to scales that would impose the exact example positive capacitance variation data presented in FIGS. 57A and 57B, and 59A and 59B, respectively.

In the example shown, the presence of the touchless indication is clearly indicated by the peak in positive capacitance touch data. Compensated capacitance image data can subtract, remove or ignore portions of the positive capacitance variation data and the negative capacitance variation data within the zone 346-4 and/or by increasing the touchless indication threshold 342-4 and touch threshold 344-4 to amount(s) above this zone 346-4. In other embodiments, the touchless indication threshold 342-4 and/or touch threshold 344-4 can be the same as the touchless indication threshold 342-2 and/or touch threshold 344-2 of FIG. 57B.

A condition detection function 2266-1 corresponding to a touchless indication can detect and identify the touch indication based on the location of the positive peak in the positive capacitance variation data that exceeds the touchless indication threshold 342-4 and falls below the touch threshold 344-4. In the example shown, the touchless indication threshold 342-4 is placed above, such as a predetermined value above, the upper threshold of the zone 346-4. In other examples, the touchless indication threshold 342-4 can be set at the upper threshold of the zone 346-4. While zones 346-2 and 346-4 have been described in term of compensation for water and salt water artifacts, similar zones can be generated to compensate for other artifacts such as noise, interference, other foreign objects, etc. Furthermore, such zones can be used to set or adjust thresholds corresponding to both positive capacitance variation data and negative capacitance variation data for other conditions such as pressure, shape detection, etc.

FIG. 59C illustrates the detected hover region 605.2 detected as discussed based on processing the capacitance image data of FIGS. 59A and 59B, similarly to the illustration of FIG. 57C. The boundary of detected hover region 605.2 illustrated in FIG. 59C corresponds to the boundary of corresponding capacitance variance data in the two-dimensional heat map of FIG. 59A that compares favorably to the touchless indication threshold. This hover region 605 thus depicts the portion of the touch screen 16 over which an object is detected to be hovering, such as the finger of FIG. 58 at the hover distance 602.2 in this example.

Figure 60:
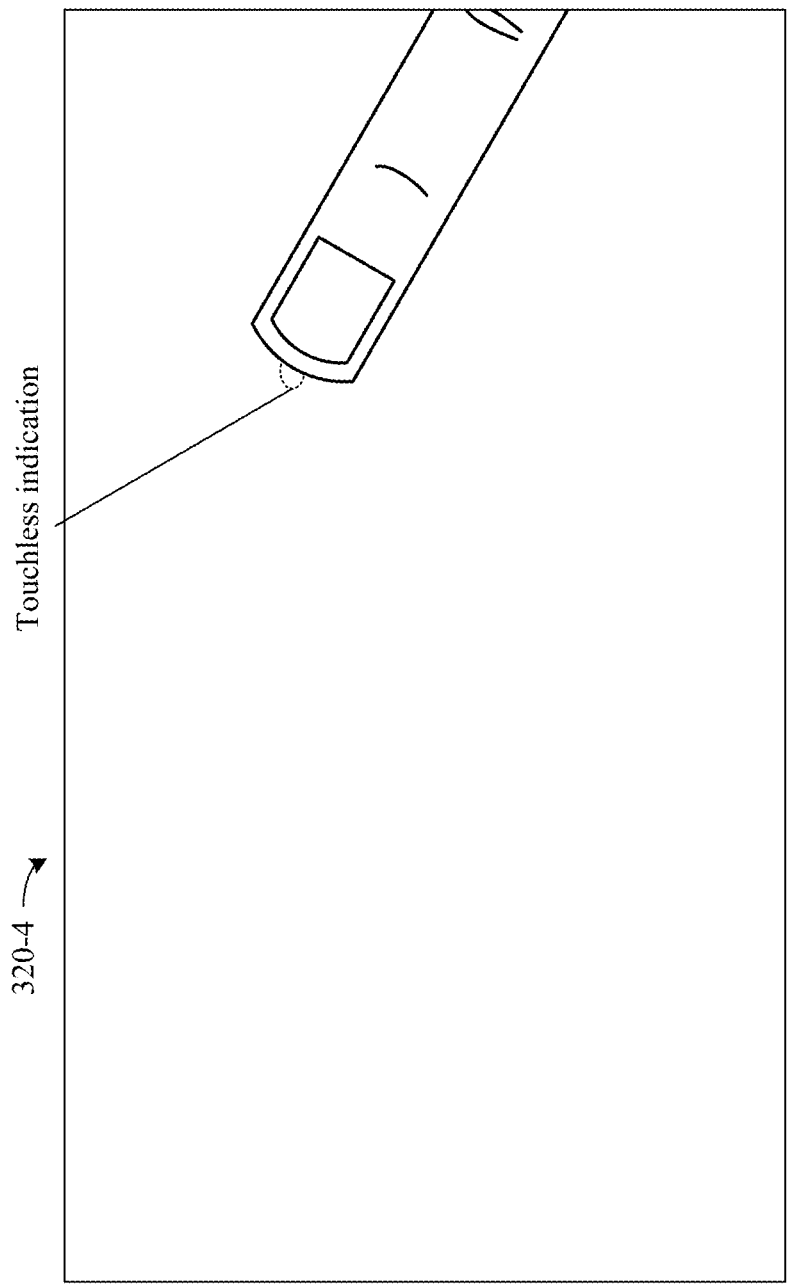
FIG. 60 is a flow diagram of an embodiment of a method in accordance with the present disclosure.

FIG. 60 illustrates a flow diagram of an embodiment of a method in accordance with the present disclosure. In particular a method is presented for use in conjunction with the processing module 42, touch screen 16, and/or other processing modules and/or touch screen displays disclosed herein, Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 386 includes processing the capacitance image data to detect a touchless indication. For example, performing step 386 includes performing step 316 and/or otherwise includes process capacitance image data to identify the presence or absence of various conditions, such as presence of absence of a condition corresponding to at least one touchless indication, and/or to characterize the conditions that were identified, such as characterizing the touchless indication. Performing step 386 can include performing condition detection function 2266-1. The touchless indication can be detected based on identifying portions of the capacitance image data, such as a hover region 605, having capacitance variation data comparing favorably to a touchless indication threshold such as touchless indication threshold 342. The touchless indication can optionally be detected based on identifying portions of the capacitance image data, such as a hover region 605, having capacitance variation data comparing favorably to the touchless indication threshold, and also comparing unfavorably to a touch threshold such as touch threshold 344.

Figure 61A:
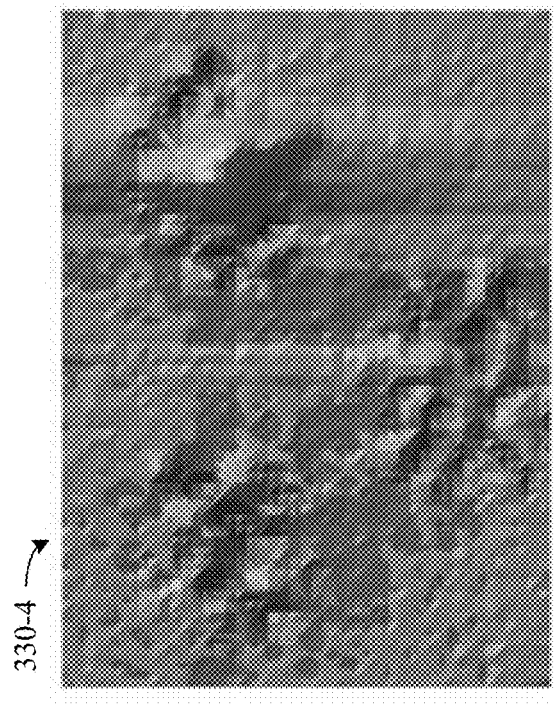
FIG. 61A is a schematic block diagram of an embodiment of a touchless indication determination function in accordance with the present disclosure.
Figure 61B:
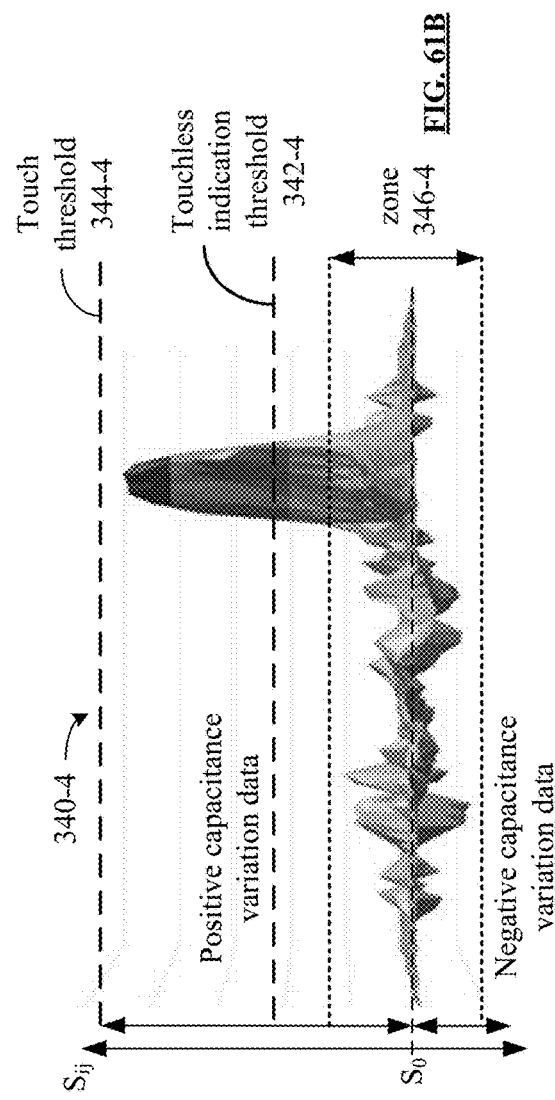
FIG. 61B is an illustration of graphical image data displayed by a touch screen in accordance with the present disclosure.

FIGS. 61A-61C present embodiments of touch screen 16 where true touchless indications are detected and differentiated from false touchless indications. Some or all features and/or functionality of embodiments of touch screen 16 and/or processing module 42 described in conjunction with FIGS. 61A-61C can be utilized to implement the touch screen 16 described in conjunction with FIGS. 57-60, and/or any other embodiment of touch screen 16 and/or processing module 42 described herein.

For example, artifacts and/or noise, such as objects hovering over and/or physically touching the surface of the touch screen but not intended to impose user interaction with the graphical image data displayed by the touchscreen, can present capacitance variations upon the x-y plane that compare favorably to the touchless indication threshold 342, but do not correspond to true and/or intended touchless indications 610 by a user. These "false" touchless indications can be distinguished from "true" touchless indications, and can be similarly removed when generating compensated capacitance image data as discussed previously and/or can otherwise be ignored, where only "true" touchless indications are processed as user input to render interactions with the graphical image data. For example, when a hover region 605 is detected based on corresponding capacitance variation data comparing favorably to the touchless indication threshold 342, the hover region 605 can be identified as a "potential" touchless indication. Characteristics of the hover region 605 and/or other portions of the capacitance image data at the given time and/or across one or more prior temporal periods can be processed to determine whether the potential touchless indication is a true touchless indications or a false touchless indications.

In some embodiments, distinguishing these false touchless indications from true touchless indications can include performing one or more artifact detection functions 2262 and/or artifact compensation functions 2264. In some embodiments, identifying true touchless indication from true touchless indications includes performing a condition detection function 2266, such as the condition detection function 2266-1.

In some embodiments, distinguishing these false touchless indications from true touchless indications can include detecting undesired water touches 274 as false touchless indication and/or undesired hand touches 272 as false touchless indication. In some embodiments, undesired hand hovering, where a hand is hovering rather than touching the display as an undesired hand touch 272, can be similarly detected as a false touchless indications. Other undesired artifacts that are physically touching and/or hovering can be detected and/or processed in a same or similar fashion as the undesired hand touches 272 of FIG. 34 and/or the undesired water touches 274 of FIG. 35.

In some embodiments, distinguishing these false touchless indications from true touchless indications can include detecting desired pen hovering, where a pen or other object that is hovering rather than touching the display as a desired pen touch 270 can be similarly detected as a true touchless indications, for example, based on comparison to the touchless indication threshold 342 rather than the touch threshold 344. In some embodiments, distinguishing these false touchless indications from true touchless indication can include detecting desired finger hovering, where a finger or other object that is hovering rather than touching the display as a desired finger touch 276 can be similarly detected as a true touchless indication, for example, based on comparison to the touchless indication threshold 342 rather than the touch threshold 344.

In some embodiments, desired finger touches 276 and/or desired pen touches 270, where the pen and/or finger are physically touching the screen, are similarly considered true touchless indications based on comparing favorably to the touchless indication threshold 342 and/or otherwise indicating desired interaction with the graphical image data. For example, objects such as pens and fingers that are utilized by a user to interact with graphical image data via either physical touch or touchless indication are thus processed as true indications by the user for corresponding interaction with the graphical image data.

Alternatively, such finger touches and/or pen touches where the pen and/or finger are physically touching the screen are instead detected and processed as false touchless indications, for example, based on determining the corresponding capacitance variation data was induced via physical touching, for example, based on comparing favorably with the touch threshold 344. In such embodiments, only indications achieved via hovering, and not via physical touch, are identified and processed as true touchless indications, for example, based on presuming that only touchless indication by the user will be imparted by the user, and thus assuming that objects physically touching the surface are undesired artifacts.

FIG. 61A is a schematic block diagram of an embodiment of a touchless indication determination function 630 in accordance with the present disclosure. The touchless indication determination function 630 operates based on processing potential touchless indication data 631, such as one or more detected hover regions 605 of capacitance image data 1300 and/or compensated capacitance image data 1325, to generate touchless indication determination data indicating whether the potential touchless indication data 631 is a true touchless indication or a false touchless indication. For example, the touchless indication determination function 630 can be implemented as a type of condition detection function 2266, such as the condition detection function 2266-1 operable to detect touchless indications. The touchless indication determination function 630 can otherwise be performed by processing module 42 in processing capacitance image data.

In some embodiments, distinguishing false touchless indications from true touchless indications can include determining whether the given hover region 605 and/or the capacitance image data as a whole compares favorably to touchless indication threshold parameter data 615. The touchless indication threshold parameter data 615 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined.

In some embodiments, distinguishing false touchless indications from true touchless indications can include generating touchless indication determination data for a potential touchless indication to identify whether the potential touchless indication corresponds to a true touchless indication or a false touchless indication, for example, based on the touchless indication threshold parameter data 615. For example, any hover region in capacitance image data identified based on having capacitance variation data comparing favorably to the touchless indication threshold 342 and/or also comparing unfavorably to the touch threshold 344 can be treated as denoting a potential touchless indication, and can be processed accordingly to generate the touchless indication determination data.

In such embodiments, determining whether a given hover region 605 corresponds to a true touchless indication or a false touchless indication can be a function of at least one of: an area of the given hover region 605, a shape of the given hover region 605, a temporal stability of the given hover region 605, a proximity of the given hover region 605 to at least one selectable element displayed in the graphical image data, and/or other characteristics of the given hover region 605.

The touchless indication threshold parameter data 615 can indicate at least one threshold parameter. For example, any hover region in capacitance image data identified based on having capacitance variation data comparing favorably to the touchless indication threshold 342 and/or also comparing unfavorably to the touch threshold 344 can be treated as denoting a potential touchless indication, and is only deemed a true touchless indication if the detected hover region compares favorably to every parameter of the touchless indication threshold parameter data 615 and/or at least a threshold number of parameters of the touchless indication threshold parameter data 615. Alternatively, the parameters of hover region can be otherwise processed in accordance with corresponding threshold parameters to generate the touchless indication determination data.

Such parameters of the touchless indication threshold parameter data 615 can include a minimum area size parameter, for example, indicating a threshold minimum area size. Such parameters of the touchless indication threshold parameter data 615 can alternatively or additionally include a maximum area size parameter, for example, indicating a threshold maximum area size. The threshold maximum area size and/or the threshold minimum area size can be configured based on a known and/or expected area induced by hovering of one or more fingers, a pen, and/or another object configured to interact via touchless hovering with touch screen 16. For example, the detected hover region 605 is identified as a false touchless indication, and is thus not processed as a touchless indication, when: the area of the detected hover region 605 is less than, or otherwise compares unfavorably to, the threshold minimum area size, and/or when the area of the detected hover region 605 is greater than, or otherwise compares unfavorably to, the threshold maximum area size. In such cases, the detected hover region 605 is only identified as a true touchless indication when the area of the detected hover region 605 compares favorably to the threshold minimum area size and compares favorably to the threshold maximum area size. Alternatively or in addition, the touchless indication determination data is generated as a function of the difference between the area of the detected hover region 605 and the threshold minimum area size and/or the threshold maximum area size.

Such parameters of the touchless indication threshold parameter data 615 can alternatively or additionally include area shape requirement parameters relating to requirements for the shape of a hover region corresponding to a true touchless indication. For example, the detected hover region 605 is identified as a false touchless indication, and is thus not processed as a touchless indication, when the shape of the detected hover region is dissimilar to or otherwise compares unfavorably to area shape requirement parameters. In such cases, the detected hover region 605 is only identified as a true touchless indication when the shape of the detected hover region 605 compares favorably to the area shape requirement parameters. Alternatively or in addition, the touchless indication determination data is generated as a function of the difference between the shape of detected hover region 605 and area shape requirement parameters.

The area shape requirement parameters can be configured based on a known and/or expected shape induced by hovering of one or more fingers, a pen, and/or another object configured to interact via touchless hovering with touch screen 16, such as a circular and/or oblong shape. In some embodiments, a circular, rectangular, and/or polygonal border surrounding the outer points of a detected hover region must have a length and/or width, such as a major axis and a minor axis, that fall within corresponding maximum and/or minimum threshold, and/or that have a ratio adhering to threshold maximum and/or minimum ratio requirements. In some embodiments, a predefined shape with a predefined area, such as a predefined oblong shape corresponding to an expected hover region of a finger, must overlap with the given detected hover region 605 by a threshold amount and/or must not differ from the given detected hover region 605 by more than a threshold amount.

In some embodiments, the shape parameters include orientation requirements relative to the x-y plane, for example, based on a presumed orientation of the user's finger and/or pen when hovering. Alternatively, the shape parameters are independent of orientation. In some embodiments, the hover region 605 is required to be a contiguous region.

In some embodiments, a smoothing function is optionally applied to the hover region and/or the capacitance image data a whole prior to processing, for example, to smooth and/or remove noise and/or other erroneous capacitance variation measurements in the capacitance image data, such as outlier measurements generated for a small number of individual cross points of the row electrodes and column electrodes. For example, the border of hover region is smoothed as a rounded and/or oblong shape prior to generating the touchless indication determination data.

Such parameters of the touchless indication threshold parameter data 615 can alternatively or additionally include temporal stability threshold parameters relating to the hover region's stability in capacitive image data captured over time. For example, a given hover region tracked over time can be determined to correspond to a true touchless indication based on having movement and/or characteristics indicative of typical and/or expected types of user interaction with the graphical image data, such as moving at a reasonable rate, not changing drastically in size and/or shape, statically hovering in given place, performing a movement corresponding to a touchless gesture command, or otherwise being identified as having behavior indicative of a true touchless indication.

The temporal stability threshold parameters can indicate a minimum threshold temporal period, such as minimum number of milliseconds or other units of time, that the same hover region 605 is consistently included in the capacitive image data. Determining that the same hover region 605 can be based on detecting an initial hover region at a given time, and measuring changes in size, shape, orientation, and/or position. The amount and/or rate of measured changes in these parameters can be utilized to determine whether the corresponding hover region 605 indicates a true touchless indication, for example, based on being sufficiently stable, matching known gesture patterns, and/or otherwise matching threshold maximum amounts and/or threshold maximum rates of change of hover region size, shape, orientation, and/or position.

The shape and/or size of an initial hover region can be determined based on determining a border of the hover region, with or without applying a smoothing function. The shape and/or size of subsequently detected hover regions at subsequent times can be determined based on detecting the border of the subsequently detected hover regions, with or without applying the smoothing function. The measured sizes can be compared over time to determine whether the amount of and/or rate of change in size, for example, within the predetermined temporal period, compares favorably to the threshold maximum amounts and/or threshold maximum rates of change in shape and/or size, where the hover region is only identified as a true touchless indication when its measured sizes within the temporal period compare favorably to the threshold amount of and/or rate of change in size. Alternatively or in addition, the touchless indication determination data is generated as a function of the difference between the amount and/or rate of change in size and/or shape of detected hover region 605 to the threshold maximum amounts and/or threshold maximum rates of change in shape and/or size.

The position of an initial hover region can be determined based on determining a centroid of the hover region, for example, as a centroid of a shape defined by the corresponding measured border, with or without applying a smoothing function. The positions of subsequently detected hover regions at subsequent times can be determined based on similarly detecting the centroids of the subsequently detected hover regions, with or without applying the smoothing function. The distances between the measured centroids be compared over time to determine whether the amount of and/or rate of change in position, for example, within the predetermined temporal period, compares favorably to the threshold maximum amounts and/or threshold maximum rates of change in position, where the hover region is only identified as a true touchless indication when its measured positions within the temporal period compare favorably to the threshold amount of and/or rate of change in position. In some embodiments, a shape outlining the measured centroids over time can be utilized to determine whether the hover regions over time compare favorably to a corresponding gesture and/or to other touchless indication behavior that is known and/or expected in interaction with the graphical image data. Alternatively or in addition, the touchless indication determination data is generated as a function of the difference between the amount and/or rate of change in size and/or shape of detected hover region 605 to the threshold maximum amount of change in position, a threshold maximum and/or minimum speed of centroid movement with respect to the x-y plane, and/or a threshold maximum and/or minimum change in velocity of centroid movement with respect to the x-y plane.

Such parameters of the touchless indication threshold parameter data 615 can alternatively or additionally include selectable element proximity parameters relating to the hover region's proximity to a selectable region 720, such as a button or other interface feature, of the graphical image data displayed by the display device of the touch screen 16 with respect to corresponding projections upon the x-y plane. For example, the selectable element proximity parameters can indicate a threshold distance from a given selectable region and/or an area surrounding a displayed selectable element, such as a displayed button, within which touchless indications can be registered. The hover region is only identified as a true touchless indication when its position compares favorably to the selectable region proximity parameters of a given selectable element displayed by the touch screen. This can be based on the hover region overlapping with the selectable region and/or having a centroid that is within a threshold distance from a centroid of the selectable element. Alternatively or in addition, the touchless indication determination data is generated as a function of a distance between the position of the detected hover region and the position and/or boundary of the selectable element.

FIG. 61B is a pictorial representation of a proximity of a detected hover region 605 and a selectable region 720 displayed in graphical image data 700 by the display 50 of the touch screen, with respect to the x-y plane. An embodiment indicating proximity between a hover region 605 and a selectable region with respect to the x-y plane is illustrated in FIG. 61B. In this example a proximity measure 718 indicates proximity as a distance between the centroid of the detected hover region 605 on the x-y plane and a centroid of the selectable region 720 on the x-y plane. In particular, the position of the hover region 605 with respect to x-y plane can be based on projecting the hover region 605 upon x-y plane relative to its position within the corresponding touch screen area on the x-y plane, and the position of the selectable region 720 with respect to x-y plane can be based on projecting the selectable region 720 upon x-y plane relative to its position in graphical image data on the x-y plane.

Parameters of the touchless indication threshold parameter data 615 can alternatively or additionally include capacitance variance uniformity parameters relating to the uniformity of the capacitance variance data within the hover region. For example, a given hover region can be deemed a true touchless indication based on a measured variance and/or standard deviation of its capacitance variance data being less than and/or comparing favorably to a threshold variance and/or standard deviation threshold, and can be deemed a false touchless indication based on a measured variance and/or standard deviation of its capacitance variance data exceeding and/or comparing unfavorably to the threshold variance and/or standard deviation threshold. Alternatively or in addition, the touchless indication determination data is generated as a function of the variance and/or standard deviation of the capacitance variance data measured within a detected hover region 605.

Parameters of the touchless indication threshold parameter data 615 can alternatively or additionally include hover distance temporal stability parameters. For example, multiple instances of the hover region tracked over time, such as within a temporal period, can be deemed a true touchless indication based on a measured amount and/or rate of change of its minimum, maximum, and/or average capacitance variance data being less than and/or comparing favorably to a threshold maximum amount and/or maximum rate of change. Multiple instances of the hover region tracked over time, such as within a temporal period, can be deemed a false touchless indication based on a measured amount and/or rate of change of its minimum, maximum, and/or average capacitance variance data exceeding and/or comparing unfavorably to the threshold maximum amount and/or maximum rate of change. In some embodiments, the minimum, maximum, and/or average capacitance variance data measured over time is compared to parameters corresponding to a known touchless gesture, such as timing and/or hover distances of a hovered click motion where the finger is detected to move towards and then away from the touch screen along a path orthogonal to the touch screen, all whilst not touching the touch screen. Alternatively or in addition, the touchless indication determination data is generated as a function of the capacitance variance data measured for a hover region tracked across a temporal period.

Parameters of the touchless indication threshold parameter data 615 can alternatively or additionally include hover region count parameters, for example, indicating parameters relating to how many distinct hover regions can correspond to distinct touchless indications simultaneously, and/or within a same temporal period. For example, multiple detected hover regions can correspond to multiple fingers, noise, artifacts, and/or other objects. A maximum number of hover regions indicated in the hover region count parameters can be configured based on a number of fingers and/or other simultaneous interaction with the touchscreen in different places that is expected, that is required for one or more touchless gestures, that is required and/or expected for interaction with displayed interface elements, and/or that is otherwise known and/or expected. For example, if a user is allowed and/or expected to interact with the touch screen via a single finger or pen and multiple distinct hover regions are identified, some of these hover regions can be ignored as artifacts, such as additional ones of the users fingers not being utilized to actively invoke touchless indications. Alternatively, in some cases, a user can be expected to interact with the touch screen via multiple hover regions, for example, when interacting with a keyboard and/or when performing a touchless gesture requiring multiple fingers.

The hover region count parameters can be applied to flag a number of hover regions as false touchless indications to ensure that less than or equal to the threshold maximum number of hover regions is flagged as a true touchless indication. For example, when more than the threshold maximum number of hover regions are detected, the least favorable ones of the set of hover regions, such as the hover regions comparing least favorably to other ones of the touchless indication threshold parameter data 615, can be identified as false touchless indications. In some cases, all detected hover regions at a given time are identified as false touchless indications, for example, based on all comparing unfavorably to other ones of the touchless indication threshold parameter data 615. In some cases, the application of the hover region count parameters can guarantee that no more than the maximum number of hover regions are identified as true touchless indications at a given time. In some cases, the application of the hover region count parameters can be utilized to identify multiple hover regions detected in different locations within a given temporal period as a same hover region that has moved over time, for example, due to movement of a single finger, rather than different hover regions, for example, due to presence of multiple fingers and/or undesired objects.

Parameters of the touchless indication threshold parameter data 615 can alternatively or additionally include positive capacitance variance data threshold parameters, such as the touchless indication threshold 342 and/or the touch threshold 344, for example, relative to the zone 346. This can include parameters relating to conditions and/or functions for shifting the touchless indication threshold 342 and/or the touch threshold 344, to make these relative thresholds stricter or looser for hover region detection and/or validation as a true touchless indication under different conditions. In some embodiments, the touchless indication threshold parameter data 615 is utilized to detect the hover regions 605 based on its capacitance variance data threshold parameters, for example, to detect a potential touchless indication and/or a true touchless indication based on detecting a hover region having maximum, minimum, and/or average capacitance variance data comparing favorably to the touchless indication threshold 342 and/or the touch threshold 344 as described previously.

In some cases, the positive capacitance variance data threshold parameters are optionally expressed as hover distance threshold parameters. The positive capacitance variance data can otherwise be considered an inverse function of absolute and/or relative hover distance 602.

For example, an estimated hover distance, and/or relative change in hover distance, of a hover region can be a measurable parameter of a given hover region that is detected and/or tracked over time, computed as a function of the capacitance variance data of the hover region, such as the maximum, minimum, and/or average capacitance variance data of the hover region, and/or computed as a function of changes in the capacitance variance data of the hover region as the hover region is tracked over a temporal period. The hover distance threshold parameters can optionally indicate: a maximum and/or minimum threshold hover distance 602, and/or a maximum and/or minimum threshold amount and/or rate of change, for example in a given temporal period. The touchless indication determination data can otherwise be generated as a function of a computed hover distance, a computed change in hover distance, and/or a computed rate of change in hover distance.

The positive capacitance variance data parameters can alternatively or additionally include peak parameter data for a peak identified in capacitance image data, for example, as discussed and illustrated in conjunction with FIGS. 57C and 59C. The peak parameter data can include parameters relating to and/or indicating thresholds for: shape of the peak, slope of the peak, symmetry of the peak, and/or other characteristics of an identified peak denoting whether this peak be identified as a true touchless indication. The touchless indication determination data can otherwise be generated as a function of the shape of the peak, slope of the peak, symmetry of the peak, and/or other characteristics of an identified peak.

Parameters of the touchless indication threshold parameter data 615 can alternatively or additionally include anatomical feature mapping parameters, such as the parameters relating to the anatomical feature mapping data that is tracked and detected in capacitance image data as discussed in conjunction with FIGS. 62A-62C. This can include parameters relating to requirements for orientation and/or configuration of the right hand, the left hand, the palm of either hand, and/or one or more fingers upon either hand. This can include parameters denoting that a corresponding finger, hand, or other identifiable anatomical feature or identifiable object such as a pen, must be detected as hovering over the touch screen in anatomical feature mapping data generated for the capacitance image data to identify a true touchless indication, for example, where a hover region that does not correspond to a detected properties of a hovering hand, finger, and/or pen is deemed as a false touchless indication and/or is otherwise identified as noise or an artifact to be ignored and/or removed.

Parameters of the touchless indication threshold parameter data 615 can include other types of thresholds relating to the hover region and/or capacitance image data at a single point of time and/or across a temporal period. Parameters of the touchless indication threshold parameter data 615 can alternatively or additionally include relative weights and/or a function definition for utilizing corresponding parameters of a detected hover region in generating the touchless indication determination data 632, for example, as binary output and/or quantitative output for comparison to a corresponding threshold. Some or all of the touchless indication threshold parameter data 615, and/or corresponding computed parameters of a given detected hover region and/or given capacitance image data prior to and/or after compensation, can otherwise be processed via any other predetermined and/or learned means to generate the touchless indication determination data 632 The touchless indication determination data 632 can optionally be generated via same or different means for different users, different types of graphical image data, and/or different types of touch screens 16, for example, where some or all of the corresponding touchless indication threshold parameter data 615 is the same or different for different users, different types of graphical image data, and/or different types of touch screens 16.

FIG. 61C illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 61C can be performed in conjunction with some or all steps method of FIG. 60, and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 416 includes processing the capacitance image data to detect a potential touchless indication. For example, performing step 416 is performed in conjunction with performing step 386. Performing step 416 can include detecting at least one hover region 605 in given capacitance image data at a given time and/or across a temporal period and/or processing the hover region 605 as a potential touchless indication. The potential touchless indication can be detected based on identifying portions of the capacitance image data, such as a hover region 605, having capacitance variation data comparing favorably to a touchless indication threshold such as touchless indication threshold 342. The touchless indication can optionally be detected based on identifying portions of the capacitance image data, such as a hover region 605, having capacitance variation data comparing favorably to the touchless indication threshold, and also comparing unfavorably to a touch threshold such as touch threshold 344.

Performing step 416 can include performing step 316 and/or can otherwise include processing capacitance image data to identify the presence or absence of various conditions, such as presence of absence of a condition corresponding to at least one potential touchless indication, and/or to characterize the conditions that were identified, such as characterizing the corresponding hover region.

Step 418 includes generating touchless indication determination data based on detecting the potential touchless indication. This can include comparing the potential touchless indication, such as the corresponding hover region and/or capacitance image data, to touchless indication threshold parameter data 615. For example, performing step 418 includes performing the touchless indication determination function 630. Performing step 418 can include performing step 316 and/or otherwise includes process capacitance image data to identify the presence or absence of various conditions, such as presence of absence of a condition corresponding to at least one true touchless indication, and/or to characterize the conditions that were identified, such as characterizing the potential touchless indication as either a true touchless indication or a false touchless indication. Performing step 416 and/or 418 can include performing condition detection function 2266-1.

Step 420 includes processing the potential touchless indication as a touchless indication only when the touchless indication determination data indicates the potential touchless indication is a true touchless indication. For example, processing the potential touchless indication as a touchless indication can include utilizing the touchless indication as input to a graphical user interface displayed by the touch screen, such as a corresponding click and/or other command, and/or updating the graphical user interface based on the touchless indication. When the potential touchless interaction is identified as a false touchless indication, the corresponding the potential touchless indication is ignored and/or not processed, for example, where this potential touchless indication is not utilized as input to the graphical user interface displayed by the touch screen and/or where the graphical user interface is not updated based on the potential touchless indication not being processed as a touchless indication.

FIGS. 62A-62C present embodiments of touch screen 16 where the capacitance image data is processed to identify the presence of some or all parts of a hand, where one or more individual fingers are identified. This can be utilized to detect which fingers and/or portions of the hand that are detected to be hovering over the screen at a given time should be ignored as artifacts, and which fingers and/or portions of the hand that are detected to be hovering should be utilized to detect corresponding touchless indications. Some or all features and/or functionality of embodiments of touch screen 16 and/or processing module 42 described in conjunction with FIGS. 62A-62C can be utilized to implement the touch screen 16 described in conjunction with FIGS. 57-60, and/or any other embodiment of touch screen 16 and/or processing module 42 described herein.

FIG. 62A illustrates a schematic block diagram of an anatomical feature mapping data generator function 710 in accordance with the present disclosure. The anatomical feature mapping data generator function 710 operates to generate anatomical feature mapping data 730 for given capacitance image data. The touchless indication determination function 630 can otherwise be performed by processing module 42 in processing capacitance image data.

The anatomical feature mapping data 730 can indicate a physical mapping of anatomical features or other detected objects hovering over the touch screen 16, based on detecting the corresponding features in capacitance image data 1300, prior to and/or after compensation. For example, this mapping is a projection of the detected anatomical features upon the x-y plane, and/or a mapping of these features in the three-dimensional space that includes the x-y plane, relative to the position of the x-y plane. The mapping can indicate a position and/or orientation of various features, and can further identify the detected features as particular anatomical features, such as particular fingers and/or parts of the hand. For example, the anatomical feature mapping data 730 identifies and further indicates position and/or orientation of some or all anatomical features of a given finger, of a given hand, of multiple hands, and/or of objects such as a pen held by one or more hands. The anatomical feature mapping data generator function 710 can generate the anatomical feature mapping data 730 based on processing the capacitance image data 1300 at a particular time and/or in capacitance image data generated across a temporal period, for example, to track the detected features as they change position and/or orientation.

The anatomical feature mapping data generator function 710 can generate the anatomical feature mapping data 730 based on utilizing anatomical feature parameter data 725. Given capacitance image data can be processed based on and/or compared to the anatomical feature parameter data 725 to enable identification and/or characterization of particular anatomical features detected to be hovering over the touch screen.

The anatomical feature parameter data 725 can be predetermined, stored in memory accessible by processing module 42, received from a server system via a network connection, configured by a user of the touch screen 16, generated automatically, for example, based on learned characteristics of the hand of a user interacting with of the touch screen 16 over time, and/or can otherwise be determined.

The anatomical feature parameter data 725 can indicate a known structure and/or known characteristics of one or more anatomical features for detection. In particular, the anatomical feature parameter data 725 can indicate and/or be based on known and/or expected size and/or shape of the hand, various movements and/or positions of the hand, shape and/or length of individual fingers, relative position of different fingers on the right hand and on the left hand, various movements and/or positions of the fingers relative to the hand, and/or other parameters characterizing hands and/or fingers, and/or characteristics of capacitance image data for various configurations of the hand when hovering over a corresponding touch screen. In some embodiments, non-anatomical features can similarly be detected and mapped in a similar fashion.

Performing the anatomical feature mapping data generator function 710 can be based on performing at least one image processing function. For example, performing the image processing function can include utilizing a computer vision model trained via a training set of capacitance image data, for example, imposed via various configurations of the hand hovering over a corresponding touch screen display. For example, labeling data for capacitance image data in the training set of capacitance image data can indicate the presence of hover regions, the location and/or bounds of hover regions, a particular finger and/or other particular anatomical feature to which the hover region corresponds, a corresponding orientation and/or configuration of the hand inducing the capacitance image data, and/or other labeling data. The computer vision model can be trained via at least one machine learning function and/or technique and/or at least one artificial intelligence function and/or technique. Performing the anatomical feature mapping data generator function can include utilizing at least one machine learning function and/or technique and/or at least one artificial intelligence function and/or technique.

FIG. 62B illustrates a pictorial representation of how detected patterns of hover regions in capacitance image data can be utilized to: detect a one or more hands hovering over the touch screen; map the location of individual fingers of the hand and/or the palm of the hand; and/or determine an orientation of the hand and/or of the individual fingers with respect to the x-y plane and/or with respect to the z-axis. In particular, anatomical feature mapping data 730 can be generated to detect particular anatomical features, such as the thumb, index finger, middle finger, ring finger, pinky finger, and/or palm of the right hand and/or the left hand based on utilizing known anatomical structure of the hand to identify corresponding patterns corresponding to different parts of the hand, and/or other anatomical features hovering over the touch screen such as a face, in the capacitance image data. The anatomical feature mapping data 730 can indicate the position of these various anatomical features, such as different fingers of the hand, in two dimensional and/or three dimensional space relative to the touch screen based on corresponding capacitance variance data induced by the hand, and based on leveraging known structure of the hand to detect the features of the hand in the capacitance image data.

For example, FIG. 62C depicts the anatomical feature mapping data 730 as a corresponding heat map in the x-y plane, indicated by corresponding capacitance image data, for example, as discussed in conjunction with FIGS. 56-59B. The anatomical feature mapping data 730 can indicate areas on the x-y plane where different particular fingers and/or the palm are hovering over the touch screen. In the example illustrated in FIG. 62C, darker shading indicates higher detected positive capacitance variation data based on fingers that are closer to the touch screen can have hover regions in the capacitance image data with higher positive capacitance variation data, while fingers that are further from the touch screen can have hover regions in the capacitance image data with lower positive capacitance variation data.

In some cases, multiple fingers can induce hover regions 605 based on having capacitance variation data comparing favorably to the touchless indication threshold. In some cases, only one finger is actually intended to render a touchless interaction, where the other fingers should be ignored. In some cases, the finger actually intended to render a touchless interaction may have lower average and/or lower maximum capacitance variance data measured in its hover region 605 than other fingers, for example, due to being further away from the screen during some or all of its interaction with the graphical image data displayed by the touch screen.

The mapping and tracking of one or more hands can be accomplished based on the capacitance image data and/or based on known properties of the hand. This can be utilized to identify some or all fingers and/or parts of the hand as artifacts and/or as false touchless indications, where one or more fingers utilized to perform touchless interactions are detected and tracked in the capacitance image data over time.

In some cases, this can include determining a particular one or more fingers responsible for interaction with the graphical image data displayed by the touch screen, such as the thumb and/or the index finger. This can be based on expected fingers utilized for particular touchless gestures, for interaction with particular types of graphical image data, and/or other touchless indications. Alternatively or in addition, this can be based on user configuration and/or learned user behavior over time to determine preferred fingers and/or a preferred hand of the user for performing various touchless gestures, for interacting with various types of graphical image data, and/or performing any other touchless indications. The determined one or more fingers expected and/or known to be responsible for performing touchless interactions can be identified in the capacitance image data, for example, relative to other portions of the hand that are detected, and/or can be tracked over time accordingly.

In some embodiments, the hover regions 605 for these determined fingers can be processed as true touchless indications, for example, when applicable based on otherwise meeting the touchless indication threshold parameter data 615 at various times. In some embodiments, the hover regions 605 for other fingers can be processed as false touchless indications at all times and/or can have stricter corresponding touchless indication threshold parameter data 615 required to determine their interactions are true touchless indications, for example, due to being less commonly used and/or less likely to be used. In some embodiments, other hover regions 605 detected but determined not to be a part of the mapped hand can be processed as false touchless indications at all times based on being identified as artifacts. Alternatively, in some embodiments, a pen or other tool held by the user can similarly be mapped and tracked to render corresponding true touchless indications.

In this example, the thumb and index finger are detected as being closest to the screen based on being differentiated from the other fingers based on their relative ordering upon the hand, and based on their corresponding hover regions having highest capacitance variance data. In some embodiments, only the index finger's hover region in this example is determined to correspond to a true touchless indication based on being detected to be closest to the screen, based on the index finger being determined to be most likely to perform touchless indications, and/or based on the hover region count parameters indicating use of only one finger. In other embodiments, both the index finger's hover region and the thumb's hover region in this example are determined to correspond to true touchless indications based on both being detected to be closest to the touch screen, based on the index finger being determined to be most likely to perform touchless indications, based on the hover region count parameters indicating use of two fingers, and/or based on the user performing a touchless gesture involving the use of two fingers, such as the index finger and the thumb.

FIG. 62C illustrates a flow diagram of an embodiment of a method in accordance with the present disclosure. In particular a method is presented for use in conjunction with the processing module 42, touch screen 16, and/or other processing modules and/or touch screen displays disclosed herein. Some or all steps of FIG. 62C can be performed in conjunction with some or all steps method of FIG. 60, and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 426 includes processing the capacitance image data to generate anatomical feature mapping data. Performing step 426 can include detecting at least one hover region 605 in given capacitance image data at a given time and/or across a temporal period and/or processing the hover region 605 as a potential touchless indication. The anatomical feature mapping data can be detected based on identifying portions of the capacitance image data, such as a hover region 605, having capacitance variation data comparing favorably to a touchless indication threshold such as touchless indication threshold 342. The anatomical feature mapping data can optionally be detected based on identifying hover regions 605 with shapes and/or relative positions comparing favorably to known anatomy of a hand and/or a finger.

Performing step 426 can include performing step 316 and/or can otherwise include processing capacitance image data to identify the presence or absence of various conditions, such as presence of absence of a condition corresponding to detection of one or more hover regions corresponding to parts of a hand, and/or to characterize the conditions that were identified, such as characterizing the orientation of the hand, identifying whether the hand is the right hand or the left hand, characterizing the relative position of some or all individual fingertips of the hand, and/or other parts the hand relative to the x-y plane and/or relative to the x-axis.

Step 428 includes detecting a touchless interaction based on the anatomical feature mapping. For example, performing step 428 is performed in conjunction with performing step 386.

This can include determining one or more particular fingers in the anatomical feature mapping as fingers responsible for touchless indications, and/or determining one or more particular fingers in the anatomical feature mapping as artifacts to be ignored. For example, step 428 is performed in conjunction with performing step 418. Performing step 428 can include performing step 316 and/or otherwise includes process capacitance image data to identify the presence or absence of various conditions, such as presence of absence of a condition corresponding to at least one touchless indication by a particular finger of the hand, and/or to characterize the conditions that were identified. Performing step 426 and/or 428 can include performing condition detection function 2266-1.

FIGS. 63A-63H present embodiments of touch screen 16 where detected hover regions 605 are processed to identify a particular touchless indication point 745 within the hover region. In particular, in instances where a user is hovering over a touch screen to interact with the touchscreen via touchless "clicks" or gestures, granularity may be required to identify a particular point or points upon the graphical image data that the user is selecting, or otherwise indicating via a touchless indication, at a particular time. Some or all features and/or functionality of the touch screen 16 and/or processing module 42 of embodiments discussed in conjunction with FIGS. 63A-63H can be utilized to implement the touch screen 16 and/or processing module 42 of FIGS. 57-60, and/or any other embodiment of touch screen 16 and/or processing module 42 described herein.

The touchless indication point 745 can be determined as a point in x-y space, for example, corresponding to a particular pixel and/or small set of adjacent pixels of the graphical image data displayed by display 50 the touch screen 16. The touchless indication point 745 can be a singular point, for example, with no corresponding area. Alternatively, the touchless indication point 745 can have a small area that is, for example, smoothed from the hover region 605 and/or substantially smaller than the area of a corresponding hover region 605.

FIG. 63A illustrates a schematic block diagram of a touchless indication point identification function 740 in accordance with the present disclosure. The touchless indication point identification function 740 operates to determine a touchless indication point within a given detected hover region 605, such as a hover region 605 of a particular finger in the anatomical feature mapping data 730 and/or a hover region identified as corresponding to a true touchless indication in the touchless indication determination data. For example, the touchless indication point identification function 740 can be implemented as a type of condition detection function 2266, such as the condition detection function 2266-1 operable to detect touchless indications, where the output of condition detection function 2266-1 includes detection of a particular touchless indication point. The touchless indication determination function 630 can otherwise be performed by processing module 42 in processing capacitance image data.

In particular, the touchless indication point 745 can be computed and/or otherwise identified as a function of the corresponding detected hover region 605. Performing touchless indication point identification function 740 can include processing a given hover region 605 to identify the shape and bounds of the hover region 605 projected upon the x-y plane, for example, as a contiguous region, and identifying a particular touchless indication point 745 as a point upon the x-y plane that is within the hover region projected upon the x-y plane. Performing touchless indication point identification function 740 can include processing other portions of the corresponding capacitance image data, and/or processing recent positions of the hover region 605 in previously captured capacitance image data, for example, as the given hover region is tracked across a temporal period.

In some embodiments, performing touchless indication point identification function 740 can include computing the touchless indication point 745 as a centroid of the hover region 605. Such an example is illustrated in FIG. 63B, where a centroid of a detected hover region 605 is computed and identified as the touchless indication point 745. For example, the hover region 605 of the example of FIG. 63B can correspond to the hover region 605.2 of FIGS. 59A-59D and/or can otherwise be detected as a region upon the x-y plane discussed herein.

Alternatively or in addition, performing touchless indication point identification function 740 can include performing a smoothing function upon the detected hover region 605 to update the identified the hover region 605 as a smoothed hover region 744, such as a circle and/or oblong shape, and/or a region having a size and/or shape of a fingertip and/or tip of a pen or stylus. The touchless indication point 745 can be identified as a centroid of the smoothed hover region 744 within the smoothed shape. FIG. 63C illustrates such an example of identification of a centroid of an example smoothed hover region 644. For example, the smoothed hover region 644 of FIG. 63C is generated by performing a smoothing function upon hover region 605.2 of FIGS. 59A-59D and/or another detected hover region 605.

In some embodiments, rather than identifying the touchless indication point 745 as a centroid of a raw and/or smoothed hover region 605, performing touchless indication point identification function 740 can alternatively or additionally include identifying a point in the hover region having a maximal positive capacitance variance relative to all other points within the detected hover region, and identifying this point as the touchless indication point 745. In cases where adjacent points within the detected hover region have higher positive capacitance variance relative to some or all other points within the detected hover region, such as a set of adjacent points comparing favorably to a touchless point threshold that is higher than the touchless indication threshold 342, a centroid of these adjacent points can be computed as the touchless indication point 745.

FIGS. 63D and 63E illustrate such an example where a local maxima 748 of a hover region 605 with respect to the capacitance image data is identified and utilized as the touchless indication point 745. FIG. 63D illustrates detection of this local maxima 748, for example, based on having a maximal capacitance variation value indicated in the corresponding capacitance image data across all values within the hover region 605. FIG. 63E illustrates the corresponding detected hover region and touchless indication point 745, identified as the local maxima 748 illustrated in FIG. 63D, upon the x-y plane. For example, the hover region 605 of the example of FIGS. 63D and 63E can correspond to the hover region 605.2 of FIGS. 59A-59D and/or can otherwise be detected as a region upon the x-y plane discussed herein.

The touchless indication point 745 can be identified via other means not illustrated in the examples of FIGS. 63B-63E. In some embodiments, the touchless indication point 745 is identified based on anatomical features of the hand and/or finger. For example, where a tip of the finger or other predetermined point upon the finger, for example, relative to the hand and/or based on mapped structure of the finger, is always utilized as the touchless indication point 745. In some embodiments, the touchless indication point 745 is adjacent to and/or upon the border of the hover region 605, for example, where the user optionally "underlines" the point on the touch screen with their finger that they wish to select or otherwise indicate. This can be ideal in embodiments where the user benefits from seeing the portion of the screen they wish to indicate, rather than the touchless indication point 745 being obscured by their finger, pen, or hand based on being directly under their finger, pen, or hand.

The touchless indication point 745 can otherwise be identified via any other predetermined and/or learned means. The touchless indication point 745 can optionally be identified in same or different means for different users, different types of graphical image data, and/or different types of touch screens 16.

The identified touchless indication point 745, rather than the corresponding hover region 605 as a whole, can be utilized in identifying and/or generating command data for interactions with the graphical image data displayed by touch screen 16. For example, as the user moves their hovered finger with respect to the x-y plane, the touchless indication point 745 can act as a cursor upon graphical image data and/or can be utilized to identify the location upon graphical image data indicated by a corresponding cursor. As another example, the touchless indication point 745 can indicate a discrete point of the graphical image data, within the hover region 605 projected upon the graphical image data, corresponding to selection by the user and/or corresponding to a given gesture.

Such functionality can be favorable in embodiments of touch screen 16 involving interaction with a user interface element with multiple small discrete selectable regions, such as different letters of a keyboard display, that may necessitate that a small point within a detected hover region, rather than the full hover region, be applied to distinguish selection between the multiple small discrete selectable regions. Such functionality can alternatively or additionally be favorable in embodiments of touch screen 16 involving interaction with a user interface requiring tracing of a thin shape, such as a an interface element where a user supplies a signature via a touchless interaction or sketches a shape via a touchless interaction, may require such granularity in identifying a series of small connected points of a granular width, such as a small number of pixels substantially smaller in width than a width of a hover region induced by a finger, to form the thin shape.

A particular example of distinguishing touchless interaction as selection of one selectable region from a set of small selectable regions in close proximity is illustrated in FIG. 63F. In this example, despite the hover region 405 being detected as overlapping both selectable region 720.1 and 720.2 of graphical image data displayed by the display 50 of the touch screen 16, only selectable region 720.2 is determined to be selected by the user based on the touchless indication point 745 being included in the selectable region 720.2 and not the selectable region 720.1. As a particular example, the selectable regions 720.1, 720.2, and 720.3 correspond to adjacent keys on a keyboard interface element displayed by the touch screen 16 and/or correspond to adjacent numbers of a number pad interface element displayed by the touch screen 16.

A particular example of touchless interaction as tracing a thin shape, such as a signature, is illustrated in FIG. 63G. In this example, as the user traces their signature via correspond movement of a finger with respect to the x-y axis while hovering over the touch screen, only the tracked position of the touchless indication point as the finger moves over time is utilized to render the corresponding shape, such as the signature depicted in FIG. 63G. For example, a corresponding selectable region 720.4 of graphical image data 700 can be configured for interaction by a user to trace their signature within this selectable region 720.4. Such functionality can be ideal in embodiments where the touch screen 16 is implemented as a publicly-used touch screen at a point of sale where customers can supply a signature as part of performing a transaction via hovering over the publicly-used touch screen to achieve a touchless transaction.

FIG. 63H illustrates a flow diagram of an embodiment of a method in accordance with the present disclosure. In particular a method is presented for use in conjunction with the processing module 42, touch screen 16, and/or other processing modules and/or touch screen displays disclosed herein. Some or all steps of FIG. 63H can be performed in conjunction with some or all steps method of FIG. 60, and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 436 includes processing the capacitance image data to determine a hover region. Performing step 436 can include detecting at least one hover region 605 in given capacitance image data at a given time and/or across a temporal period, and/or can include first processing the hover region 605 as a potential touchless indication to identify the hover region as a true touchless indication. For example, step 436 is performed in conjunction with performing step 416 and/or 418. The hover region can be detected based on identifying portions of the capacitance image data having capacitance variation data comparing favorably to a touchless indication threshold such as touchless indication threshold 342. The hover region can be detected based on identifying a corresponding finger in anatomical feature mapping data. The determined hover region can correspond to a raw hover region from the capacitance image data and/or can correspond to a smoothed hover region generated by applying a smoothing function to the raw hover region.

Performing step 436 can include performing step 316 and/or can otherwise include processing capacitance image data to identify the presence or absence of various conditions, such as presence of absence of a condition corresponding to detection of a hover regions, and/or to characterize the conditions that were identified, such as characterizing the hover region.

Step 438 includes identifying, based on the hover region, a touchless indication point within the two-dimensional area corresponding to a touchless indication. For example, performing step 438 includes performing the touchless indication point identification function 740, and/or otherwise includes identifying the touchless indication point as a point included in and/or otherwise based on the detected hover region.

Step 436 and/or 438 can be performed in conjunction with performing step 386. Performing step 436 and/or 438 can include performing condition detection function 2266-1.

FIGS. 64A-64I present embodiments of touch screen 16 where detected and/or processed touchless indications 610 are visually presented via the image data displayed by the touch screen display. In particular, a detected hover region and/or corresponding touchless indication point can be visually overlaid upon the graphical image data and/or otherwise visually depicted to enable a corresponding user to view that a touchless indication, such as by a finger or pen, is detected, and/or the location of this touchless indication upon the screen. This can be useful in enabling the user to identify exactly where they are detected to be hovering, despite not physically touching a corresponding point on the touch screen surface. Some or all features and/or functionality of the touch screen 16 and/or processing module 42 of embodiments discussed in conjunction with FIGS. 64A-64I can be utilized to implement the touch screen 16 and/or processing module 42 of FIGS. 57-60, and/or any other embodiment of touch screen 16 and/or processing module 42 described herein.

In other embodiments of touch screen 16 described herein, the display 50 optionally displays no visible data identifying detection of touchless indications and/or corresponding hover regions or touchless indication points, and instead simply processes the detected touchless indications as discussed herein without visibly indicating these touchless indications.

FIG. 64A illustrates a schematic block diagram of a touchless indication display data generator function 750 in accordance with the present disclosure. The touchless indication display data generator function 750 operates to generate touchless indication display data 755 for display by the touch screen display based on identifying a corresponding touchless indication by a user interacting with graphical image data displayed via the touch screen display. For example, the touchless indication display data 755 is displayed in conjunction with the existing graphical image data by being overlaid upon the existing graphical image data. As another example, the touchless indication display data 755 is generated as an update to the existing graphical image data, where the updated graphical image data is displayed to replace display of the existing graphical image data.

The touchless indication determination function 630 can be performed by processing module 42 in processing capacitance image data to generate the touchless indication display data 755. The resulting touchless indication display data 755 can be sent to and/or processed by the video graphics processing module 48 and/or other processing resources of the touch screen 16 to produce rendered data in accordance with the characteristics of the display, and/or provides the rendered data to the display 50 for display by the display 50 as discussed previously, in conjunction with given graphical image data 700.

The touchless indication display data 755 generated for a given touchless indication can be generated as a function of: a corresponding hover region 605 identified for the given touchless indication 610; a corresponding touchless indication point 745 identified for the given touchless indication 610; capacitance variation data of the touchless indication 610, for example, in corresponding capacitance image data; a type of touchless gesture corresponding to given touchless indication; and/or other characteristics and/or data regarding the given touchless indication.

FIG. 64B illustrates a particular example where touchless indication display data 755 indicates a corresponding detected hover region 605, for example, that was identified as a true touchless indication. The touchless indication display data 755 depicting the hover region 605 can correspond to the size and/or shape of a raw hover region 605 and/or a smoothed hover region 644 generated via performing a smoothing function. As the hover region is detected to move to different locations upon the x-y plane, the corresponding hover region depicted by the touchless indication display data 755 can similarly move in similar patterns. The depicted movements, such as the change in position of the detected hover region 605 and/or the touchless indication point 745, can be smoothed via a smoothing function to facilitate less jittery and/or smoother animation of these movements.

In some embodiments, as the shape and/or size of the hover region 605 detected in the capacitance image data changes over time, for example, due to noise, change in orientation and/or distance of a corresponding finger from the screen, or other factors, some or all of these changes in the hover region 605 are depicted accordingly, where the touchless indication display data 755 animates these changes in shape and/or size of the depicted hover region accordingly as they are detected over time.

In other embodiments, the depicted hover region is constantly depicted as touchless indication display data 755 with fixed shape and/or size, for example despite fluctuations in the corresponding raw hover region detected in capacitance image data across a temporal period where the user maintains their hovering over the touch screen in a static position and/or via dynamic movements. For example, the touchless indication display data 755 is implemented as a circle, oblong shape, or other shape that maintains a fixed size and/or orientation. In some embodiments, this fixed shaped and sized hover region of the touchless indication display data 755 is fitted to and/or centered within and/or around the detected hover region 605 and/or is centered at the identified touchless indication point 745.

In some embodiments, the touchless indication display data 755 can be translucent and/or have a transparency relative to other graphical image data 700, where the touchless indication display data 755 is overlaid upon the graphical image data 700 but portions of the graphical image data 700, such as text, interface features, pictures, or other graphical image data displayed in this portion of the display, are distinguishable under the touchless indication display data 755. For example, the corresponding portion of the graphical image data 700 is highlighted by a shape and/or at a location denoted by the corresponding hover region. As another example, a corresponding portion of the graphical image data 700 is outlined by a shape and/or at a location denoted by the corresponding hover region.

FIG. 64C illustrates a particular example where touchless indication display data 755 indicates a corresponding detected touchless indication point 745, for example, that was identified as a true touchless indication and/or identified based on processing a corresponding detected hover region. The touchless indication display data 755 depicting the touchless indication point 745 can correspond to a cursor shape as depicted in FIG. 64B that points to the currently detected position of touchless indication point 745, where the cursor of touchless indication display data 755 moves with respect to the graphical image data 700 accordingly as the touchless indication point 745 is detected to move due to corresponding movements by the hovering finger of the user with respect to the x-y plane. In some embodiments, alternatively to display of a cursor icon, a line is traced and displayed based on detected movement of the touchless indication point 745 and/or a simple small dot or other shape denoting the touchless indication point 745 is displayed.

In some cases, a size, color, shading, and/or level of transparency of the touchless indication display data 755 changes as a function of the positive capacitance variation data of the hover region, such as the maximum positive capacitance variation data of the hover region and/or an average positive capacitance variation data of the hover region. For example, as the user moves their finger towards and away from the screen, where hover distance 602 changes accordingly, this change in distance with respect to the z-axis is detected by corresponding increases and decreases of the positive capacitance variation data of the hover region 605, and these changes can be reflected in the touchless indication display data 755 by corresponding changes in color to indicate to the user that their movements with respect to the z-axis are actively being detected.

In some cases, rather than overlaying a cursor and/or visually depicted hover region as touchless indication display data 755, features included in the graphical image data 700 can change based on the touchless indication 610. In such embodiments, generating the touchless indication display data 755 can include updating the graphical image data 700 itself, rather than simply overlaying new image data atop the existing graphical image data 700. This can include moving, enlarging, changing color, shading, and/or highlighting of, animating, and/or otherwise changing one or more portions of the given graphical image data 700, such as one or more selectable interface elements and/or other selectable regions, to render updated graphical image data 701 for display.

For example, while not illustrated, text or other portions of graphical image data over which a user is detected to be hovering can be highlighted and/or magnified, where the highlighted and/or magnified portion of the displayed text or other image data changes as the user moves their finger, for example, as they trace the text of a book, article, or messaging data that they are reading via hovering their finger over this text, and/or optionally under this text with respect to the x-y axis as to not obscure their view of the text.

As another example, a selectable region 720 over which and/or near which a user is hovering, indicating a selection command, and/or contemplating selection via a selection command as they hover, can be highlighted, enlarged, and/or shifted in position towards the user's touchless indication.

An example where the touchless indication display data 755 is implemented as highlighting, shading of, changing color of, and/or otherwise visibly distinguishing a particular selectable region 720 based on the hover region and/or touchless indication point 745 being within and/or sufficiently close to the selectable region 720 is illustrated in FIG. 64D. In this example, selectable region 720.2, such as a button and/or other interface feature that is selectable, is shaded a different color in response to a touchless indication point 745 being detected within the selectable region 720. For example, the selectable region 720.2 was previously unshaded when the touchless indication point 745 was not detected as being within the selectable region 720.2, and the updated graphical image data 701 corresponds to changing the selectable region 720 as being shaded. Other neighboring selectable regions are unshaded based on the touchless indication point 745 not being within these regions. In other embodiments, the visual depiction of selectable region 720.2 can change in a different fashion in response to touchless indication point 745 being detected within the selectable region 720.2, such as by being animated to flash different colors, being outlined, and/or otherwise being visually presented differently.

An example where the touchless indication display data 755 is implemented as movement of the position of a selectable region based on the hover region and/or touchless indication point 745 being within and/or sufficiently close to the selectable region 720 is illustrated in FIGS. 64E and 64F. In this example, selectable region 720, such as a button and/or other interface feature that is selectable, is moved from a first position at time t0, illustrated in FIG. 64E, to a second position at time t1, illustrated in FIG. 64F. For example, time t1 is immediately and/or very soon after detection of a given touchless indication point 745 and/or a corresponding hover region 605 at time t0. The selectable region 720 can be repositioned nearer to this touchless indication point 745 and/or a corresponding hover region 605. In this example, the selectable region 720 is repositioned to be centered at the touchless indication point 745. In other embodiments, the selectable region 720 is repositioned to be nearer to and/or to include the touchless indication point 745. The touchless indication point 745 detected at time t0 may still be at and/or near this point at time t1 based on the user maintaining their hover position and/or based on the time frame between time t0 and time t1 being small, such as within a millisecond and/or a small number of milliseconds. In other embodiments, alternatively or in addition to shifting the position of the selectable region 720, the selectable region 720 is largened to include the touchless indication point 745 while maintaining the center of its given position, and/or has its shape changed to include the touchless indication point 745.

In some cases where touchless indication display data 755 is implemented as changes in size, shape, or position of one or more selectable regions 720, the selectable regions 720 is optionally changed in size, shape, or position to be closer to and/or centered at the detected touchless indication point 745, such as the most recently detected and/or processed touchless indication point 745. In some cases, the selectable regions 720 is only moved and/or changed in response to: the hover region overlapping with the selectable region 720; the touchless indication point 745 being within the selectable region 720; and/or a proximity measure 718 between selectable region 720 and the hover region 605 or the touchless indication point being within and/or comparing favorably to a proximity measure threshold.

In some embodiments where the user's hovering is visually tracked via touchless indication display data 755 as described in conjunction with FIGS. 64A-64F, this hovering does not correspond to the same type of interaction induced when a user physically touches a corresponding interface feature. For example, while selectable interface elements may move and/or be highlighted to indicate the user is detected to be hovering over the given selectable interface element, such touchless indication display data 755 can be displayed to invoke and/or prompt the user to select the given selectable interface element, for example, via a touchless gesture corresponding to a click or a selection, and/or via physically touching the corresponding portion of the screen to invoke the click or the selection.

In such cases, the touchless indication display data 755 can optionally be implemented to include text and/or another prompt displayed in conjunction with the graphical image data, encouraging the user to perform the corresponding selection command for the interface element where they are hovering in proximity. For example, such an embodiment is depicted in FIG. 64G, where touchless indication display data 755 includes displayed text prompting the user to add an item to their cart for purchase via a touch-based or touchless selection command.

In some embodiments where the user's hovering is visually tracked via touchless indication display data 755, this hovering does can correspond to the same type of interaction induced when a user physically touches a corresponding interface feature. For example, when selectable interface elements move and/or are highlighted to indicate the user is detected to be hovering over the given selectable interface element, such touchless indication display data 755, this can visually indicate to the user that they have selected and/or clicked on the corresponding interface element, for example, as a command induced by the corresponding touchless indication 610, where the touchless indication 610 is processed as a command denoting this selection or other corresponding interaction with the selectable region or other corresponding portion of the graphical image data.

In such cases, the touchless indication display data 755 can optionally be implemented to include text and/or another prompt displayed in conjunction with the graphical image data, asking for verification as to whether the user indeed intended to perform the corresponding selection command for the interface element where they are hovering in proximity. This can be ideal in some embodiments to ensure that touchless indications, which could perhaps render a greater rate of false-positives than touch-based indications due to greater noise and/or artifacts, are verified before being processed, for example, in cases where the corresponding interface corresponds to a financial transaction and/or managing of private and/or important data. For example, such an embodiment is depicted in FIG. 64H where touchless indication display data 755 includes displayed text prompting the user to confirm their detected selection of a purchase button, for example, via performance of subsequent touch-based or touchless selection command to confirm the intent to perform the purchase transaction.

FIG. 64I illustrates a flow diagram of an embodiment of a method in accordance with the present disclosure. In particular a method is presented for use in conjunction with the processing module 42, touch screen 16, and/or other processing modules and/or touch screen displays disclosed herein. Some or all steps of FIG. 64I can be performed in conjunction with some or all steps method of FIG. 60, and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 446 includes processing the capacitance image data to identify a touchless indication relative to displayed graphical image data. Performing step 446 can include detecting at least one hover region 605 and/or corresponding touchless indication point 745 in given capacitance image data at a given time and/or across a temporal period, and/or can include first processing the hover region 605 as a potential touchless indication to identify the hover region as a true touchless indication. For example, step 446 is performed in conjunction with performing step 416 and/or 418, and/or in conjunction with performing step 436.

Step 448 includes generating touchless indication display data indicating the touchless indication for display in conjunction with display of the graphical image data. For example, performing step 448 includes sending the touchless indication display data to a video graphics processing module and/or a display device, where the touchless indication display data is displayed via the display device.

FIG. 64J illustrates a flow diagram of an embodiment of a method in accordance with the present disclosure. In particular a method is presented for use in conjunction with the processing module 42, touch screen 16, and/or other processing modules and/or touch screen displays disclosed herein. Some or all steps of FIG. 64J can be performed in conjunction with some or all steps method of FIG. 60, with some or all steps of FIG. 64I, and/or some or all steps of other methods described herein.

Step 282 includes displaying graphical image data. For example, the graphical image data is received and/or generated by a video graphics processing module and/or display device to render display of the graphical image data by a corresponding display, such as display 50, of a corresponding touch screen 16.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 456 includes processing the capacitance image data to determine a hover region and/or a touchless indication point. Performing step 446 can include detecting at least one hover region 605 and/or corresponding touchless indication point 745 in given capacitance image data at a given time and/or across a temporal period, and/or can include first processing the hover region 605 as a potential touchless indication to identify the hover region as a true touchless indication. For example, step 446 is performed in conjunction with performing step 416 and/or 418, in conjunction with performing step 436, and/or in conjunction with performing step 446.

Step 458 includes displaying updated graphical image data that is different from the graphical image data based on the hover region and/or the touchless indication point. This can include generating the updated graphical image data from the existing graphical image data. For example, updated graphical image data is generated based on magnifying, highlighting, animating, moving position of, or otherwise changing one or more portions of the existing graphical image data. For example, performing step 458 includes sending the updated graphical image data to a video graphics processing module and/or a display device, and/or processing the updated graphical image data via a video graphics processing module and/or a display device, where the updated graphical image data is rendered for display via a corresponding display. For example, step 458 is performed in conjunction with performing step 448.

FIGS. 65A-65B present embodiments of touch screen 16 where a detected hover region and/or corresponding touchless indication point is tracked over time. In particular, once an initial hover region is detected and/or deemed a true touchless indication, the persistence of this hover region at subsequent times can be expected, for example, in the same location or neighboring locations on the x-y plane. Continued detection of this given hover region can be based on loosened parameters, for example, that are loosened from and/or different from another set of parameters utilized to initially detect this hover region. Some or all features and/or functionality of the touch screen 16 and/or processing module 42 of embodiments discussed in conjunction with FIGS. 65A-65B can be utilized to implement the touch screen 16 and/or processing module 42 of FIGS. 57-60, and/or any other embodiment of touch screen 16 and/or processing module 42 described herein.

FIG. 65A is a schematic block diagram of an embodiment of an initial touchless indication detection function 762 and a maintained touchless indication detection function 768 in accordance with the present disclosure. The initial touchless indication detection function 762 and/or the maintained touchless indication detection function 768 can be performed by processing module 42 in conjunction with processing capacitance image data 1300, prior to and/or after compensation.

The initial touchless indication detection function 762 can operates based on processing raw and/or compensated capacitance image data 1300 captured within an initial temporal period t0, such as a single capacitance image data 1300 at a single time or a stream of sequentially generated capacitance image data 1300 heat maps 1300.1-1300.$i$ captured within a temporal period t0 to first identify detection of a touchless indication in generating touchless indication detection data 764.

The touchless indication detection data 764 can indicate a hover region 605, a corresponding touchless indication point 745, a touchless gesture, or can otherwise indicate detection of a touchless indication. In some embodiments, performing the initial touchless indication detection function 762 includes processing potential touchless indication data 631 of the capacitance image data 1300 of temporal period t0 to determine whether a true touchless indication is detected as discussed in conjunction with FIG. 61A, where the touchless indication detection data 764 indicates detection of a touchless indication based on the potential touchless indication data being determined to correspond to a true touchless indication.

In some embodiments, initially detecting a given touchless indication can include determining whether the given capacitance image data of temporal period t0 compares favorably to initial touchless threshold parameter data 765. The initial touchless threshold parameter data 765 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined. In some embodiments, the initial touchless threshold parameter data 765 is implemented touchless indication threshold parameter data 615 discussed in conjunction with 61A, and/or performing the initial touchless indication detection function involves processing of some or all of the types of parameters and/or threshold requirements discussed in conjunction with 61A.

Once touchless indication detection data 764 is detected, a maintained touchless indication detection function 768 can be processed to generate subsequent touchless indication detection data 764 in a temporal period t1 following t0. This subsequently generated subsequent touchless indication detection data 764 can be based on detecting and/or tracking persistence of initially detected touchless indication, and/or to detect further touchless indications after the initially detected touchless indication, in subsequently generated raw and/or compensated capacitance image data, such as a set of sequentially generated capacitance image data 1300 $i+1$-1300.$j$ within the temporal period t1 and/or any other capacitance image data generated after temporal period t0.

For example, the touchless indication detection data 764 indicates detection of a touchless indication based on initially detecting a finger that has begun hovering over the touch screen, that has initiated a touchless gesture, that has completed a first touchless gesture, and/or has otherwise initiated interaction with the touchscreen, potentially with further touchless indications to come. Subsequently generated subsequent touchless indication detection data 764 can be generated via performance of the maintained touchless indication detection function 768 to track movement of the given finger in the x-y plane and/or perpendicular to the touch screen once it has been initially detected, to track completion of a touchless gesture and/or identify the touchless gesture once completed, to detect subsequent touchless indications to the touch screen after an initial touchless interaction, to process with generating a mapping of the hand as anatomical feature mapping data or to otherwise detect introduction of new fingers and process these new fingers as fingers providing subsequent touchless indications or as artifacts, and/or to otherwise facilitate continued detection of touchless interaction after initially detecting touchless interaction.

The maintained touchless indication detection function 768 can utilize touchless indication detection data 747 generated previously by the initial touchless indication determination, for example, to facilitate tracking of a given hover region and/or touchless indication point. In particular, given touchless indication detection data 764 can be generated based on prior touchless indication detection data 764, for example, to track a stable position of and/or movement of a given touchless indication. This can include identifying a new position of the hover region and/or touchless indication point 745 with respect to the x-y plane and/or the z-axis as a function of the most recently tracked prior position of the hover region and/.or touchless indication point 745, for example, where the new position of the hover region and/or touchless indication point 745 indicates a reasonably small and/or expected type of shift in position and/or intensity of the hover region and/or touchless indication point 745.

The most recent position of the of the hover region and/or touchless indication point 745 can optionally be weighted and/or otherwise processed to identify the new hover region and/or touchless indication point 745 as being in the same location or a similar location. Probabilities of various types of movements, such as probability of stability vs movement of the hover region along the x-y plane, probability of stability vs movement of the hover region along the z-axis, probability of various speeds and/or directions of movements of the hover region along the x-y plane, and/or probability of various speeds and/or directions of movements of the hover region along the z-axis, can be predetermined and/or learned over time, and can be optionally utilized to determine the new position of the hover region. For example, if stability of the hover region has a high probability, ambiguity in the most recent touchless indication detection data can be processed by presuming that the hover region has maintained its same position, while if stability of the hover region has a lower probability, ambiguity in the most recent touchless indication detection data can be processed by presuming that the hover region has moved from its given position to a new position.

Such probabilities can optionally be a function of a corresponding type of graphical image data being displayed, types of selectable regions being displayed, and/or learned behavior of the given user. Such probabilities can optionally be a function of corresponding types of gestures, where initialization of a type of gesture can be detected, and the user can be presumed to continue a type of movement corresponding to completion of the type of gesture.

Furthermore, the maintained touchless indication detection function 768 can optionally be configured to leverage the knowledge that a current and/or recent touchless indication has been detected via initial touchless indication detection function 762. For example, once a touchless indication has been detected, the maintained touchless indication detection function 768 can operate on the presumption that this touchless indication is likely to persist and/or that further touchless indication are likely to follow. In particular, the probability of true existence of touchless indications in capacitance image data 1300.$i$+1 can be presumed to be significantly higher than the probability of true existence of touchless indications in capacitance image data 1300.1, as the user is expected to continue interaction with the touch screen for at least some period of time after initial touchless interaction is detected. For example, ambiguity in subsequent capacitance image data can be processed to presume that the user has maintained interaction with the touch screen, and that a hover region is more likely to exist.

The maintained touchless indication detection function 768 can thus generate touchless indication detection data 764 based on determining whether the given capacitance image data of temporal period t1 compares favorably to maintained touchless indication threshold parameter data 767. In particular, some or all of the maintained touchless indication threshold parameter data 767 can be looser than the initial touchless indication threshold parameter data 767, where some or all corresponding threshold requirements for detection are less strict than that of the initial touchless indication threshold parameter data 767.

The maintained touchless indication threshold parameter data 767 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined. In some embodiments, the maintained touchless indication threshold parameter data 767 is implemented touchless indication threshold parameter data 615 discussed in conjunction with 61A, and/or performing the maintained touchless indication detection function involves processing of some or all of the types of parameters and/or threshold requirements discussed in conjunction with 61A.

For example, in some embodiments, a touchless indication threshold 342 of the initial touchless threshold parameter data 765 can be higher than and/or otherwise stricter than the touchless indication threshold 342 of the maintained touchless threshold parameter data 767. Alternatively or in addition, a touch threshold 344 of the initial touchless threshold parameter data 765 can be lower than and/or otherwise stricter than a touch threshold 344 of the maintained touchless threshold parameter data 767. Alternatively or in addition, a threshold minimum area size of the initial touchless threshold parameter data 765 can be greater than, or otherwise stricter than, a threshold minimum area size of the maintained touchless threshold parameter data 767. Alternatively or in addition, a threshold maximum area size of the initial touchless threshold parameter data 765 can be smaller than, or otherwise stricter than, a threshold maximum area size of the maintained touchless threshold parameter data 767. Alternatively or in addition, area shape requirement parameters of the initial touchless threshold parameter data 765 can be stricter than area shape requirement parameters of the maintained touchless threshold parameter data 767. Alternatively or in addition, temporal stability parameters of the initial touchless threshold parameter data 765 can be stricter than area shape requirement parameters of the maintained touchless threshold parameter data 767. For example, the minimum threshold temporal period of the initial touchless threshold parameter data 765 can be stricter than the minimum threshold temporal period of the maintained touchless threshold parameter data 767; the threshold maximum amounts and/or threshold maximum rates of change in shape and/or size of the initial touchless threshold parameter data 765 can be stricter than the threshold maximum amounts and/or threshold maximum rates of change in shape and/or size of the maintained touchless threshold parameter data 767; the threshold maximum and/or minimum speed of centroid movement with respect to the x-y plane of the initial touchless threshold parameter data 765 can be stricter than the threshold maximum and/or minimum velocity of centroid movement with respect to the x-y plane of the maintained touchless threshold parameter data 767; the threshold maximum and/or minimum speed of centroid movement with respect to the x-y plane of the initial touchless threshold parameter data 765 can be stricter than the threshold maximum and/or minimum velocity of centroid movement with respect to the x-y plane of the maintained touchless threshold parameter data 767; the threshold distance from a given selectable region of the initial touchless threshold parameter data 765 can be stricter than the threshold distance from a given selectable region of the maintained touchless threshold parameter data 767; the capacitance variance uniformity parameters of the initial touchless threshold parameter data 765 can be stricter than the capacitance variance uniformity parameters of the maintained touchless threshold parameter data 767; the hover distance temporal stability parameters of the initial touchless threshold parameter data 765 can be stricter than the hover distance temporal stability parameters of the maintained touchless threshold parameter data 767; the hover region count parameters of the initial touchless threshold parameter data 765 can be stricter than the hover region count parameters of the maintained touchless threshold parameter data 767; and/or other parameters and/or requirements for maintained detection of touchless indication after initial detection of touchless indication can otherwise be looser than that utilized for this initial detection of touchless indication.

Once touchless indication detection data no longer indicates detection and/or tracking of touchless indication, for example, based on a user ending their given interaction with the touch screen, subsequent interaction can again require detection via the initial touchless indication determination function 762, where the process of tracking touchless interaction is repeated for a new initially detected touchless interaction.

FIG. 65B illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 65B can be performed in conjunction with some or all steps method of FIG. 60 and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 466 includes processing the capacitance image data to identify an initial hover region and/or touchless indication point. For example, performing step 466 is performed in conjunction with performing step 386 and/or steps 416-418. The hover region can be detected based on identifying portions of the capacitance image data having capacitance variation data comparing favorably to a touchless indication threshold such as touchless indication threshold 342. Performing step 466 can include performing the initial touchless indication detection function 762.

Step 468 includes processing updated capacitance image data to identify an updated hover region and/or an updated touchless indication point. For example, performing step 468 is performed in conjunction with performing step 386 and/or steps 416-418. Performing step 468 can include performing the maintained touchless indication detection function 768.

FIGS. 66A-66C present embodiments of touch screen 16 where one or more types of touchless gestures are detected. In particular, one or more types of touchless gestures performed via hover over touch screen 16 within a temporal period, for example, via one or more fingers, can correspond to various types of interface commands utilized to facilitate various types of user interaction with graphical image data. Some or all features and/or functionality of the touch screen 16 and/or processing module 42 of embodiments discussed in conjunction with FIGS. 66A-66C can be utilized to implement the touch screen 16 and/or processing module 42 of FIGS. 57-60, and/or any other embodiment of touch screen 16 and/or processing module 42 described herein.

FIG. 66A is a schematic block diagram of an embodiment of a touchless gesture identification function 820 in accordance with the present disclosure. For example, the touchless gesture identification function 820 can be implemented as a type of condition detection function 2266 operable to detect touchless gestures, such as the condition detection function 2266-1 operable to detect touchless indications, where these touchless indications correspond to touchless gestures. This can include detecting the presence or absence of various conditions corresponding to one or more types of touchless gestures, and/or to characterize the conditions that were identified, such as distinguishing the type of touchless gesture, its corresponding location, and/or corresponding command data corresponding to performance of the particular touchless gesture. The touchless indication determination function 630 can otherwise be performed by processing module 42 in processing capacitance image data.

The touchless gesture identification function 820 can be performed by processing a capacitance image data stream 805, for example, that includes a stream of sequentially generated capacitance image data 1300, prior to and/or after compensation, to enable detect and/or tracking of movements of hovering fingers and/or objects based on corresponding changes in capacitance image data of the capacitance image data stream 805 across a temporal period. This can include: detecting and tracking one or more hover regions 605 in the stream of sequentially generated capacitance image data within a temporal period; detecting and tracking one or more touchless indication points 745 in the stream of sequentially generated capacitance image data within a temporal period; detecting and tracking anatomical feature mapping data 730 in the stream of sequentially generated capacitance image data within a temporal period; and/or otherwise detecting changes in the capacitance image data denoting performance of particular gestures by one or more fingers, hands, or objects hovering over the touch screen 16.

Performing the touchless gesture identification function 820 can include generating corresponding touchless gesture identification data 825 identifying a particular touchless gesture type 813, for example, from a set of different possible touchless gestures of a touchless gesture set 812. A given touchless gesture type 813 can be identified based on the capacitance image data stream 805 comparing favorably to corresponding touchless gesture pattern data 815 of the given touchless gesture type 813. Different touchless gesture types 813 can have different touchless gesture pattern data 815, indicating respective differences in these different gestures. The touchless gesture pattern data 815 for each touchless gesture type 813 of the touchless gesture set 812 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined.

Given gesture pattern data 815 can indicate: a number of fingers and/or other hovering objects involved in the corresponding type of gesture; threshold minimum and/or maximum time frames for performing the gesture as a whole and/or for performing discrete segments of the gesture; shape, speed, direction, and/or ordering of movement to perform the gesture with respect to the x-y plane; speed, direction, and/or ordering of movement to perform the gesture with respect to the z-axis; portions of the x-y plane upon which the gesture can be performed and/or detected, and/or other parameters defining the gesture and/or indicating threshold requirements for detection of the gesture. The gesture pattern data 815 for one or more types of gestures can be optionally implemented as touchless indication threshold parameter data 615, and/or can otherwise include and/or involve processing of one or more corresponding parameters discussed in conjunction with the touchless indication threshold parameter data 615.

The gesture pattern data 815 can optionally indicate relative position and/or orientation of anatomical features and/or other identifiable objects in performing the gesture, or movement patterns relating to the relative position and/or orientation of anatomical feature and/or other identifiable objects in performing the gesture, such as various finger and/or hand manipulation. For example, performing the touchless gesture identification function 820 to identify a given gesture can include generating and/or processing anatomical feature mapping data 730 to identify static and/or dynamic properties of various features, such as various fingers, in the anatomical feature mapping data 730 that match and/or compare favorably to gesture pattern data 815 of a given type of gesture.

In some embodiments, the gesture pattern data 815 can indicate a corresponding gesture pattern performed based on changes in configuration of one or more joints of a particular finger via anatomical properties of individual fingers, such as patterns relating to bending at or straightening at one or more joints of the given finger, and/or moving towards and/or away from other fingers. For example, one given gesture pattern can involve one or more fingers statically maintaining and/or moving in or out of a straightened position, while another one given gesture pattern can involve one or more fingers statically maintaining and/or moving in or out of a bent position, such as the forming of a fist.

In some embodiments, the gesture pattern data 815 can indicate a corresponding gesture pattern performed based on changes in position and/or orientation of the hand via anatomical properties via anatomical properties of the hand, such as patterns relating to bending and/or rotating about the wrist, motion and/or rotation induced by bending and/or rotating about the elbow and/or shoulder. For example, one given gesture pattern can involve the hand rotating about the wrist, where the top of the hand moves towards and/or away from the top of the forearm, while another given gesture pattern can involve the hand rotating about another direction such as orthogonal direction, based on the top of the hand and the forearm rotating together from the elbow.

In some cases, the gesture pattern data 815 can involve at least one touch to the touch screen, for example, by one or more particular fingers, but the corresponding type of gesture can be distinguished from other types of gestures based on static and/or dynamic characteristics of other fingers and/or parts of the hand that are hovering over the touch screen. For example, one given gesture pattern can involve touching the screen via a given finger, such as the index finger, while the remainder of the fingers are bent to form a fist, another given gesture pattern can also involve touching the screen via the given finger, while the remainder of the fingers are extended, and/or another given gesture pattern can also involve touching the screen via the index finger, while the thumb dynamically moves up and down while hovering. In such cases, while touch-based detection of the given finger touching may be involved in these touchless gestures, distinguishing of a given gesture, and thus identification of a particular corresponding command, requires detection and characterizing of hovering features, such as the other fingers of the hand, for example, based on generating and processing anatomical feature mapping data 730.

Performing the touchless gesture identification function 820 can include identifying the touchless gesture as a true touchless indication, for example, based on performing the touchless indication determination function 630. Performing the touchless gesture identification function 820 can include identifying initiation of the touchless gesture, and then tracking the remainder of the performance of the touchless gesture, for example, based on first performing the initial touchless indication detection function 762 to identify initiation of a touchless gesture, and performing the maintained touchless indication detection function 768 to track the movements involved in touchless gesture to ultimately identify the touchless gesture.

The touchless gesture identification data 825 can optionally indicate a gesture starting position, gesture ending position, and/or tracked movement from the starting position to the ending position. The starting position and/or the ending position can be an x-y position, such as a hover region 605 and/or touchless indication point 745. The starting position, the ending position, and/or respective movement can optionally have a z-component, based on respective hover distance and/or changes in hover distance when performing the gesture. If multiple fingers, hands and/or object are involved in performing the gesture, the touchless gesture identification data 825 can further indicate gesture starting position, ending position, and/or tracked movement from the starting position to the ending position for each finger, hand, and/or object.

The starting position, ending position, and/or tracked movement can further identify particular interaction and/or command indicated by the gesture, for example, based on an interface element and/or properties of a selectable region at the starting position and/or ending position. As a particular example, a type of gesture can be identified as a touchless selection gesture, and a hover region and/or touchless indication point identified for the touchless selection gesture can indicate touchless selection of a selectable region, such as a particular button, at the hover region and/or touchless indication point.

The type of gesture and this additional information denoted by some or all of the tracked movement can be utilized to facilitate corresponding interaction with the graphical image data, for example, based on being processed as a corresponding command by the processing module 42. This can include updating the graphical image data and/or transmitting data to a corresponding server system hosting a corresponding application executed by the touch screen and/or a corresponding webpage accessed via a web browser application executed by the touch screen. This can include processing the corresponding the touchless gesture in a same or similar fashion as one or more commands induced by one or more types of touch-based interactions with the touch screen.

For example, the touchless gestures set 812 can include touchless gesture types 813 corresponding to interactive interface commands, such as: selection of a selectable interface element, such as a button, displayed by graphical image data 700 at a touchless indication point or hover region indicated by the touchless gesture; zooming in on the graphical image data 700 at a touchless indication point indicated by the touchless gesture; zooming out on the graphical image data 700 at a touchless indication point indicated by the touchless gesture; scrolling up, down, left, or right on the graphical image data 700; configuring and/or changing other parameters corresponding to display of the graphical image data 700; configuring and/or changing other parameters corresponding touch screen 16 such as display brightness, speaker volume; selection of a particular application for execution by the touch screen 16 and/or exiting from execution of a particular application being executed by touch screen 16; inducing execution of instructions by application data currently executed by the touchscreen and/or corresponding to the graphical image data 700; inducing transmission of data to a server system corresponding to an application and/or web browser currently displayed by the touchscreen and/or corresponding to the graphical image data 700; entering a touchless mode of operation; exiting a touchless mode of operation; facilitating execution of a command that can be induced via a touch-based gesture or indication by the given touch screen and/or by other touch screens; and/or other instructions.

FIG. 66B illustrates performance and detection of an example touchless gesture 810. A touchless gesture can correspond to a type of touchless indication 610, where some or all touchless indications described herein are optionally implemented as a touchless gesture 810, and/or as part of a touchless gesture, for example, at a particular point in time within the performance of a touchless gesture 810.

The touchless gesture 810 of FIG. 66B can correspond to an example touchless gesture type 813 corresponding to a touchless selection gesture performed across three consecutive temporal periods i, i+1, i+2 of same or different lengths. The hover regions 605, absolute hover distances 602, and/or relative hover distances 602, can be in capacitance image data across these three consecutive temporal periods for comparison with touchless gesture pattern data 815 to identify a type of gesture corresponding to the touchless selection gesture.

In this example, the touchless selection gesture can have corresponding touchless gesture pattern data 815 denoting a pattern of a single finger, or other object: hovering at a first hover distance 602.*a* in a first temporal period i; transitioning, in a second temporal period i+1 following the first temporal period, from the first hover distance 602.*a* to a second hover distance 602.*b* that is smaller than the first hover distance 602.*a*, for example, by at least a threshold amount; and transitioning, in a third temporal period i+2 following the second temporal period, from the second hover distance 602.*b* to a third hover distance 602.*c* that is greater than second hover distance 602.*b*, for example, by at least a threshold amount, and/or that is similar to the first hover distance 602.*a*.

The touchless gesture pattern data 815 for the touchless selection gesture can optionally indicate a threshold difference in hover distance between the first hover distance 602.*a* and the second hover distance 602.*b*, and/or between the second hover distance 602.*b* and the third hover distance 602.*c*. The touchless gesture pattern data 815 for the touchless selection gesture can indicate a threshold difference in hover distance between the first hover distance 602.*a* and the second hover distance 602.*b*, and/or between the second hover distance 602.*b* and the third hover distance 602.*c*. The touchless gesture pattern data 815 can indicate threshold minimum and/or maximum distances for the first hover distance 602.*a*, the second hover distance 602.*b*, and/or the third hover distance 602.*c*. The hover distance for a potential and/or true touchless indication can be computed and/or estimated as a function of positive capacitance variation data of a corresponding hover region and/or touchless indication point as discussed previously.

The touchless gesture pattern data 815 for the touchless selection gesture can optionally indicate a threshold minimum and/or maximum time for the transition between the first hover distance and the second hover distance, and/or for the transition between the second hover distance and the third hover distance. This can include a threshold minimum and/or maximum time span for temporal period i, i+1, and/or i+2.

The touchless gesture pattern data 815 for the touchless selection gesture can indicate maximum and/or minimum threshold rates of change of hover distance, for example, as the speed of the finger in transitioning between different hover distances.

The touchless gesture pattern data 815 for the touchless selection gesture can indicate maximum threshold movement of the corresponding hover region in the x-y plane, for example, where detection of the touchless selection gesture requires that the hover region position remain relatively stable, for example, by remain within a threshold area size, and/or not moving in position by more than a threshold amount during performance of the gesture.

The touchless indication point of the touchless selection gesture can be utilized to determine a corresponding "click" point for the corresponding touchless gesture. This can be based on an average touchless indication point across the duration of the touchless gesture, an initial touchless indication point of the hover region in temporal period i, touchless indication point of the hover region in temporal period i+1, for example, with maximum positive capacitance variance data and/or minimal hover distance within the touchless selection gesture, a final touchless indication point of the hover region in temporal period i+2, or based on other processing of hover regions across the some or all of the tracked touchless selection gesture.

While not depicted, other types of gestures can correspond to other types of patterns involving movement relative to the z-axis similar to the example of FIG. 66B where hover distance changes with respect to a corresponding touchless gesture pattern. While not depicted, other types of gestures can correspond to other types of patterns involving movement relative to the x-y plane, where the position of hover region changes with respect to a corresponding touchless gesture pattern. While not depicted, other types of gestures can correspond to other types of patterns involving movement relative to the x-y plane and/or the z-axis for multiple hover regions, corresponding to fingers of the same or different hand, where the position of hover region changes with respect to a corresponding touchless gesture pattern. Some types of gestures can correspond to other types of patterns involving particular movement of one or both hands, for example, detected based on anatomical feature mapping data tracked over a temporal period indicating the user's hand moved in accordance with the respective pattern.

FIG. 66C illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 66C can be performed in conjunction with some or all steps method of FIG. 60 and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 474 includes generating capacitance image data across a temporal period based on the plurality of sensed signals. For example, performing step 474 includes performing step 384, step 312, and/or otherwise includes generating capacitance image data including positive capacitance variation data and negative capacitance variation data. The capacitance image data can be generated for multiple points in time across a temporal period, where a stream of sequential capacitance image data is generated within the temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 476 includes processing the capacitance image data to identify a touchless gesture occurring within the temporal period. For example, performing step 476 is performed in conjunction with performing step 386, step 466 and/or step 468, and/or steps 416-418. The touchless gesture can be detected based on identifying portions of the capacitance image data generated within the time period comparing favorably to touchless gesture pattern data 815. The touchless gesture can be identified as a given type of gesture of a set of different types of touchless gestures, for example, based on the capacitance image data generated within the time period comparing more favorably to the touchless gesture pattern data 815 of the given type of gesture than the touchless gesture pattern data of some or all other types of gestures. The identified touchless gesture can optionally be processed as a command for interaction with graphical image data displayed by a display of the touch screen, for example, to induce a change in the display of the graphical image data, to induce performance of operations in response to selection of a selectable region via the touchless gesture, and/or to otherwise process and/or execute some or all of the corresponding command.

FIGS. 67A-67B present embodiments of touch screen 16 where detection of a particular touchless gesture is utilized to enter a touchless mode of operation, and/or to otherwise indicate and/or confirm other touchless indications preceding the particular touchless gesture and/or following the given touchless gesture. In particular, to help ensure that a user intends to perform a corresponding touchless indications detected as potential and/or true touchless indication, the touch screen 16 can be operable to detect a touchless indication initialization gesture, such as a simple and/or distinctive touchless gesture 810, to confirm that one or more touchless indications to follow are indeed touchless indications, rather than erroneous noise or artifacts detected to be hovering over the touch screen. Some or all features and/or functionality of the touch screen 16 and/or processing module 42 of embodiments discussed in conjunction with FIGS. 67A-67B can be utilized to implement the touch screen 16 and/or processing module 42 of FIGS. 57-60, and/or any other embodiment of touch screen 16 and/or processing module 42 described herein.

FIG. 67A is a schematic block diagram of an embodiment of a touchless mode initiation function 835 in accordance with the present disclosure. For example, the touchless mode initiation function 835 can be implemented as a type of condition detection function 2266 operable to detect a touchless indication initiation gesture. In some embodiments, the touchless mode initiation function 835 can be implemented in a same or similar fashion as the touchless gesture identification function 820, where this touchless indication initialization gesture corresponds to a particular touchless gesture type 813 and has corresponding touchless gesture pattern data 815. The touchless indication determination function 630 can otherwise be performed by processing module 42 in processing capacitance image data.

The touchless gesture identification function 820 can be performed by processing a capacitance image data stream 805, for example, that includes a stream of sequentially generated capacitance image data 1300, prior to and/or after compensation, to enable detect and/or tracking of movements of hovering fingers and/or objects based on corresponding changes in capacitance image data of the capacitance image data stream 805 across a temporal period. The stream of capacitance image data can be processed in a same or similar fashion as discussed in conjunction with FIG. 66A to detect and/or track hover regions, touchless indication points, anatomical features, or other changes in capacitance image data indicating that the touchless indication initialization gesture has been performed.

This detection can be based on initiation touchless gesture pattern data 828. The initiation touchless gesture pattern data 828 can be implemented as touchless gesture pattern data 815 for a corresponding touchless gesture implemented as the touchless indication initiation gesture. The initiation touchless gesture pattern data 828 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined.

In some embodiments, the touchless indication initialization gesture, when detected in performing touchless mode initiation function 835, can be cause processing module 42 to enter a touchless mode of operation 830. For example, performing the touchless mode initiation function 835 include setting and/or changing a mode of operation of the touch screen to a touchless mode of operation 830 based on detecting the touchless indication initialization gesture in the capacitance image data stream 805 within a given temporal period, and/or can otherwise include initiation of further detection of other touchless gestures and/or other types of touchless indications.

In such embodiments, some or all other touchless indications 610 discussed herein can optionally be detected and/or processed based on being detected the touch screen operates in accordance with this touchless mode of operation 830. For example, the processing module 42 detects and/or processes various touchless indications 610 in accordance with some or all embodiments described herein only while operating in the touchless mode of operation 830, and/or optionally does not detect and/or processes various touchless indications 610 in accordance with some or all embodiments described herein while operating in different modes of operation and/or when not in the touchless mode of operation.

The processing module 42 can operate in accordance with this touchless mode of operation 830 for a predetermined amount of time after entering the touchless mode of operation 830 until later determining to exit the touchless mode of operation 830. In some embodiment, the processing module determines to exit the touchless mode of operation 830 based on not detecting further touchless indications for at least a threshold amount of time. In some embodiments, the same or different touchless gesture and/or other type of user input can be performed to exit the touchless mode of operation.

When not operating in the touchless mode of operation 830, the processing module 42 can optionally operate in a touch-based mode of operation, for example, where only detected touches to the touch screen are detected and processed, for example, in accordance with utilizing the touch threshold 344 to detect various touch-based indications. Alternatively, the processing module 42 can always operate in accordance with the touchless mode of operation 830, where capacitance image data is always processed for detection and processing of touchless indications as described herein.

In some embodiments, the touchless mode initiation function 835 can be implemented as initial touchless indication detection function 762, where the maintained touchless indication detection function 768 is performed, for example, in conjunction with the touch screen entering the touchless mode of operation 830 based on the touchless indication detection data 764 outputted by initial touchless indication detection function 762 indicating and/or being generated based on detection of the touchless indication initialization gesture. In some embodiments, the touchless mode of operation is exited based on the touchless indication detection data 764 outputted by the maintained touchless indication detection function 768 indicating that a given touchless indication is no longer being performed and/or that further touchless indications have not been performed for at least a threshold amount of time.

In some embodiments, the touchless indication initialization gesture can otherwise be processed confirm a given corresponding touchless indication touchless mode of operation, such as a gesture or other touchless indication that follows or precedes this touchless indication initialization gesture. For example, the touchless indication determination function 630 can be implemented to detect the touchless indication initialization gesture, where the touchless indication determination data is generated to indicate that potential touchless indication data 631 corresponds to a true touchless interaction when the touchless indication initialization gesture is detected.

In some embodiments, the touchless indication initialization gesture is not implemented as a touchless gesture 810, but is instead implemented via another type of user input. For example, the touchless mode of operation is entered and/or a touchless indication is confirmed based on touch-based input to the touch screen 16, audio input such as voice input to speakers of the touch screen 16 and/or otherwise associated with the processing module 42, input to a physical button or other physical input device of the touch screen 16, and/or other types of user input.

FIG. 67B illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 67B can be performed in conjunction with some or all steps method of FIG. 60 and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. The capacitance image data can be generated for multiple points in time across a temporal period, where a stream of sequential capacitance image data is generated within the temporal period. For example, performing step 384 includes performing step 474 and/or otherwise includes processing a stream of capacitance image data generated across a temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 486 includes processing the capacitance image data to detect a touchless interaction initiation gesture. For example, performing step 486 includes performing step 476 and/or step 486 is performed in conjunction with performing step 386, step 466 and/or step 468, and/or steps 416-418. The touchless interaction initiation gesture can be detected based on determining the capacitance image data compares favorably to initiation touchless gesture pattern data. The touchless interaction initiation gesture can be detected based on performing the touchless mode initiation function 835, and/or the touchless gesture identification function 820.

Step 488 includes process subsequent capacitance image data, after detecting the touchless interaction initiation gesture to detect at least one subsequent touchless interaction. For example, step 488 is performed based on having entered and/or operating in a touchless mode of operation 830. For example, the touchless mode of operation is initiated based on detecting the touchless interaction initiation gesture in step 486. Performing step 488 can include performing step 386, step 466 and/or step 468, and/or steps 416-418.

FIGS. 68A-68B present embodiments of touch screen 16 where both touchless indications and touch-based indications are detected and processed. In particular, the touch screen 16 can be operable to enable a user can interact with various graphical image data via a combination of touch-based indications and touchless indications 610. Some or all features and/or functionality of the touch screen 16 and/or processing module 42 of embodiments discussed in conjunction with FIGS. 68A-68B can be utilized to implement the touch screen 16 and/or processing module 42 of FIGS. 57-60, and/or any other embodiment of touch screen 16 and/or processing module 42 described herein.

FIG. 68A is a schematic block diagram of an embodiment of a touchless indication detection function 842 and a touch-based indication detection function 841 in accordance with the present disclosure. The touchless indication detection function 842 and/or a touch-based indication detection function 841 can be performed by processing module 42 in processing capacitance image data prior to and/or after compensation. The touchless indication detection function 842 and touch-based indication detection function 841 can be performed simultaneously, can be performed at different times based on the current mode of operation, can be performed in parallel without coordination, and/or can be performed in conjunction as part of performing a common indication detection function to detect any interaction with touch screen 16, whether touch-based or touchless.

The touchless indication detection function 842 can be operable to generate touchless indication detection data 844. For example, the touchless indication detection function 842 can be implemented as the condition detection function 2266-1 operable to detect touchless indications 610 as discussed previously, where the touchless indication detection data 844 indicates detection of and/or characteristics of touchless indications 610. This can include distinguishing between true and false touchless indications, mapping and/or tracking the hand and/or individual fingers upon the hand as anatomical feature mapping data 730; detecting and/or tracking hover regions 605, identifying and/or tracking touchless indication points 745, identifying touchless gestures 810, detecting touchless indications based on having entered the touchless mode of operation 830, and/or processing other types and/or characteristics of touchless indications 610 as discussed herein. For example, performing the touchless indication detection function 842 includes performing one or more of: touchless indication determination function 630. anatomical feature mapping data generator function 710, touchless indication point identification function 740, initial touchless indication detection function 762 and/or maintained touchless indication detection function 768, touchless gesture identification function 820, and/or touchless mode initiation function 835.

Performing the touchless indication detection function can be based on performing at least one image processing function. For example, performing the image processing function can include utilizing a computer vision model trained via a training set of capacitance image data, for example, imposed via various touchless indications described herein. The computer vision model can be trained via at least one machine learning function and/or technique and/or at least one artificial intelligence function and/or technique. Performing the touchless indication detection function can include utilizing at least one machine learning function and/or technique and/or at least one artificial intelligence function and/or technique.

The touch-based indication detection function 841 can be operable to generate touch-based indication detection data 843. For example, the touch-based indication detection function 8421 can be implemented as another condition detection function 2266 operable to detect touch-based indications.

Performing the touch-based indication detection function can be based on performing at least one image processing function. For example, performing the image processing function can include utilizing a computer vision model trained via a training set of capacitance image data, for example, imposed via various touch-based indications described herein. The computer vision model can be trained via at least one machine learning function and/or technique and/or at least one artificial intelligence function and/or technique. Performing the touchless indication detection function can include utilizing at least one machine learning function and/or technique and/or at least one artificial intelligence function and/or technique.

The touch-based indication detection data 843 can be detected in a same or similar fashion as touchless detection data, where a different threshold is utilized to distinguish touch-based indications from touchless indications. In particular, detected hover regions having positive capacitance variance data falling below or otherwise comparing unfavorably to the touch threshold 344 can be identified as touchless indications by the touchless indication detection function 842 when the positive capacitance variance data also is greater than or equal to the touchless indication threshold 342 as discussed previously. Meanwhile detected hover regions having positive capacitance variance data greater than or equal to, or otherwise comparing favorably to the touch threshold 344, can be identified as touch-based indications by the touch-based indication detection function 843.

Other than having different capacitance variance thresholds, touch-based indications can optionally be processed in a same or similar fashion as touchless indication described herein. For example: a touch region of a touch-based indication can be identified in a same or similar fashion as hover region 605, where the touch threshold 344 is utilized instead of the touchless indication threshold 342 to identify touch regions; a touch indication point of a touch-based indication can be identified within a detected touch region in a same or similar fashion as identifying a touchless indication point 745 for a given hover region 605; true touch-based indications can be distinguished from false touch-based indications in a same or similar fashion as distinguishing true touchless indications from false touchless indications, by utilizing corresponding touch-based indication parameter threshold data that is similar to touchless indication parameter threshold data 615, with differences that include different positive capacitance variation thresholds corresponding to a closer proximity to and/or physical touch of the surface of the touch screen; touch-based gestures can be detected in a same or similar fashion as identifying a touchless gestures, where some or all patterns of touch-based gestures with respect to the x-y axis types optionally correspond same or different patterns with respect to the x-y axis for some or all types of touchless gestures in the touchless gesture set 812; and/or can otherwise be processed similarly to and/or differently from touchless indications.

In this fashion, various touchless indications detected in capacitance image data over time can be distinguished from, and optionally induce different commands or otherwise be processed differently from, various touch-based indications detected in capacitance image data over time. For example, a given touchless gesture with a particular pattern with respect to the x-y axis can be detected and can correspond to a first command or otherwise induce a first type of interaction with the graphical image data, while a given touch-based gesture with the same or similar particular pattern with respect to the x-y axis can be detected, distinguished from the corresponding touchless gesture, and can correspond to a second command or otherwise induce a second type of interaction with the graphical image data. As another example, a user detected to be hovering over the touch screen can induce display of touchless indication display data but is not processed as commands, for example, to a corresponding application executed by the touch screen, but once the user further engages with the touch screen 16 via touch-based indications, these touch-based indications are distinguished from the hovering movements, and are processed as corresponding commands, for example, to a corresponding application executed by the touch screen.

Alternatively, various touchless indications detected in capacitance image data over time can be processed in a same fashion, where both touch-based and touchless indications are detected, but are optionally not distinguished from one another. For example, rather than separately identifying touch-based and touchless indications, all hover regions and/or indication points detected as comparing favorably to the touchless indication threshold 342 can be treated in the same fashion, regardless of whether they compared favorably to unfavorably to the touch threshold 344. In this fashion a user can elect to engage with the touch screen via touch-based interactions, or identical touchless interactions, to induce the same effect.

In some embodiments, rather than being operable to identify both touch-based and touchless indications in given capacitance image data, the means by which the capacitance image data is processed depends on whether the touch screen 16 is operating in the touchless mode of operation 830 or a touch-based mode of operation. For example, while in the touch-based mode of operations, touchless indications are not detected, where touchless indication detection function 842 is optionally not performed and/or where touchless indication detection data 844 is not processed to induce interaction with graphical image data. Alternatively or in addition, while in the touchless mode of operations, touch-based indications are not detected, where touch-based indication detection function 841 is optionally not performed and/or where touch-based indication detection data 843 is not processed to induce interaction with graphical image data.

In some embodiments, the touch screen can optionally operate in a mode of operation where both touch-based and touchless indications are detected and processed, for example, based on being in both the touchless mode of operation and the touch-based mode of operation at a given time. Alternatively, the touch screen can operate in either the touchless mode of operation or the touch-based mode of operation at given time, but not both, but is operable to shift between these modes of operations based on determining to shift from one mode of operation to the other mode of operation, for example, based on detection of a corresponding condition utilized to change between modes of operation.

In some embodiments, the processing module enters the touch-based mode of operation based on detecting a touch-based indication, for example as an initiation gesture to enter the touch-based mode of operation, in touch-based indication detection data 843. Alternatively or in addition, the processing module enters the touchless mode of operation based on detecting a touchless indication, for example as a touchless indication initiation gesture to enter the touchless mode of operation as discussed in conjunction with FIGS. 67A-67B, in touchless indication detection data 844.

In some embodiments, the processing module operates in accordance with the touch-based mode of operation based on displaying a particular type of graphical image data 700 and/or based on executing a particular type of application, and operates in accordance with the touchless mode of operation based on displaying another particular type of graphical image data 700 and/or based on executing another particular type of application. For example, while a given application is being executed, the processing module operates in accordance with the touch-based mode of operation, and switches to the touchless mode of operation based on a different application being executed.

In some embodiments, at a given time while displaying particular graphical image data 700, the processing module can be operable to detect interaction with different interface elements of the graphical image data 700, for example, with respect to the x-y axis, in accordance with the different modes of operation. For example, at a given time, the graphical image data 700 displays a first interface feature, such as a first button, slider, hyperlink, keyboard, or other selectable region that includes an interactable interface element, in a first location with respect to the x-y plane, in accordance with the touch-based mode of operation, where only touch-based interaction, and not touchless interaction, is detected and/or processed as command data in the region of the graphical image data 700. At this same given time, the graphical image data 700 also displays a second interface feature, such as a second button, slider, hyperlink, keyboard, or other selectable region that includes an interactable interface element, in a second location with respect to the x-y plane, in accordance with the touchless mode of operation, where touchless interaction is detected and/or processed as command data in this region of the graphical image data 700.

In some embodiments, the different types of graphical image data 700 and/or types of applications that induce operation under these different modes of operation can be based on a speed and/or precision of dexterity required to interact with the corresponding graphical image data 700 and/or type of application. For example, interface elements of graphical image data and/or application requiring greater speed and/or greater precision, such as keyboard elements and/or gaming applications, induce the touch-based mode of operation, while interface elements of graphical image data and/or application requiring slower speed and/or lower precision, such as media player applications and/or social media applications, induce the touch-based mode of operation.

In some embodiments, the different types of graphical image data 700 and/or types of applications that induce operation under these different modes of operation can be based on a level of public-facing interaction of the graphical image data and/or the corresponding application. For example, a touch screen implemented as a tablet at a commercial establishment, such as a restaurant and/or at a point-of-sale at the commercial establishment, operates under the touchless mode of operation when displaying graphical user interface features requiring customer interaction, such as supplying of a signature, selection of a tip amount, and/or indicating a receipt be printed, emailed, and/or texted to the customer. The touch screen implemented as a tablet at the commercial establishment can operate under the touch-based mode of operation when displaying graphical user interface features requiring merchant interaction, such as selection of items or services purchased by a corresponding customer, assignment of the user to a table, or other interface features of the same or different application relating to the point of sale or the commercial establishment for interaction via personnel of the establishment.

In some embodiments, the different types of graphical image data 700 and/or types of applications that induce operation under these different modes of operation can be based on importance and/or severity of consequence of inadvertently detected indications. For example, banking applications, interface features corresponding to execution of a financial transaction, interface elements associated with transmission of data to a server system, or other applications and/or interface elements associated with a high level of severity can be executed in accordance with the touch-based mode of operation. Other applications and/or interface elements associated with a lower level of severity, such as media player applications, interface elements for scrolling, or other lower severity applications, can be executed in accordance with the touchless mode of operation.

In some embodiments, the different types of graphical image data 700 and/or types of applications that induce operation under these different modes of operation can be configured based on user preferences. For example, a touch screen used exclusively or primarily by a given user can be configured to operate in the touch-based mode, touchless mode, or both, for various interface features and/or applications, based on user-configured and/or automatically learned personal preferences of the user. For example, a user may elect that use of a recipe application, or display of data of a particular website corresponding to display of recipes, be executed in accordance with the touchless mode of operation to reduce the need to touch the touch screen with sticky fingers while cooking. As another example, a user may elect that interaction with a web browser application or other application that hosts ads that, when clicked on, direct the user to an advertiser's webpage, be executed in accordance with the touch-based mode of operation, as to mitigate risk of the touch screen interacting with an advertisement due to inadvertent hovering by the user. As another example, some users may prefer to interact with particular types of interface features, such as keyboards, in the touchless mode of operations, while other users may prefer to interact with particular types of interface features in the touch-based mode of operations.

In some embodiments, alternatively or in addition to processing interaction with different interface features and/or applications with either the touch-based or touchless mode of operation, the touchless mode of operation can be further configured, for example, to enable lower and/or higher sensitivity of detection of touchless indications, based on the different interface features and/or applications. For example, various threshold requirements and/or other parameters of the touchless indication threshold parameter data 615 can be configured differently for different interface features and/or applications. Such configurations can be determined automatically, for example, based on same or similar criteria as discussed with regards to selection between the touch-based and touchless mode of operation. Alternatively or in addition, such configurations can be determined based on user-configured and/or automatically learned user preferences.

In some embodiments, the mode of operation, and/or the given touchless indication threshold parameter data 615, can be configured based on other detected conditions instead of or in addition to the given application and/or the given interface features. For example, a mode of operation and/or touchless indication threshold parameter data 615 for a touch screen implemented via a mobile device can be determined and/or changed based on the location of the touch screen, such as geolocation data or other location generated by the mobile device. As another example, a mode of operation and/or touchless indication threshold parameter data 615 for a touch screen can be determined and/or changed based on the touch screen connecting with another device, such as speakers, a display device, or another device via a wired and/or short range wireless connection, such as a Bluetooth connection.

In some embodiments, a mode of operation and/or touchless indication threshold parameter data 615 for a touch screen can be determined and/or changed based on other mode of operation of a corresponding device implementing the touch screen. For example, a vehicle operates in accordance with the touchless mode of operation while detected to be motion and/or while detected to be in a drive mode, and can operates in accordance with the touch-based mode of operation, alternatively or in addition to the touchless mode of operation, while detected to be static and/or while detected to be in a park mode.

FIG. 68B illustrates a flow diagram of an embodiment of a method in accordance with the present disclosure. In particular, a method is presented for use in conjunction with the processing module 42, touch screen 16, and/or other processing modules and/or touch screen displays disclosed herein, Some or all steps of FIG. 68B can be performed in conjunction with some or all steps method of FIG. 60 and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. The capacitance image data can be generated for multiple points in time across a temporal period, where a stream of sequential capacitance image data is generated within the temporal period. For example, performing step 384 includes performing step 474 and/or otherwise includes processing a stream of capacitance image data generated across a temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 506 includes processing the capacitance image data to detect a touch-based indication. The touch-based interaction can be detected based on determining the capacitance image data compares favorably to a touch threshold 344 and/or other touch-based indication threshold parameter data. The touch-based interaction can be detected based on performing the touch-based indication detection function 841.

Step 508 includes processing the capacitance image data to detect a touchless indication. For example, performing step 508 includes performing step 386. The touchless interaction can be detected based on determining the capacitance image data compares favorably to a touchless indication threshold 342, compares unfavorably to a touch threshold 344, and/or compares favorably other touchless indication threshold parameter data 615. The touchless interaction can be detected based on performing the touchless indication detection function 842.

FIG. 68C illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 68C can be performed in conjunction with some or all steps method of FIG. 60 and/or some or all steps of other methods described herein.

Step 512 includes displaying a type of graphical image data. For example, the type of graphical image data corresponds to a type of interface feature displayed as some or all of graphical image data 700 at a given time. As a particular example, the type of graphical image data is displayed at a given time as a portion of graphical image data 700 in a first location, such as a particular interface feature and/or selectable region, where the graphical image data also displays one or more other types of graphical image data at the given time in one or more other portions of the graphical image data 700 in other locations. As another example, the type of graphical image data corresponds to a type of application, where the touch screen stores application data for a plurality of applications in memory resources of different types, and is operable to execute different applications via execution of corresponding application data.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. The capacitance image data can be generated for multiple points in time across a temporal period, where a stream of sequential capacitance image data is generated within the temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 516 includes processing the capacitance image data to detect a touchless interaction based on the type of graphical image data. For example, performing step 516 includes performing step 386. The touchless interaction can be detected based on determining the capacitance image data compares favorably to a touchless indication threshold 342, compares unfavorably to a touch threshold 344, and/or compares favorably to other touchless indication threshold parameter data 615. The touchless interaction can be detected based on performing the touchless indication detection function 842.

In some embodiments, processing the capacitance image data to detect a touchless interaction based on the type of graphical image data can include operating in a touchless mode of operation based on the type of graphical image data. For example, other types of graphical image data are displayed and processed in accordance with a touch-based mode of operation and/or are not processed in accordance with the touchless mode of operation.

Alternatively or in addition, processing the capacitance image data to detect a touchless interaction based on the type of graphical image data can include utilizing touchless indication threshold parameter data 615 based on the type of graphical image data, where other touchless indication threshold parameter data 615 is utilized to detect touchless interactions for other types of graphical image data that are displayed at a same given time and/or at a different time.

FIG. 68D illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 68D can be performed in conjunction with some or all steps method of FIG. 60 and/or some or all steps of other methods described herein.

Step 522 includes determining touchless indication configuration data. For example, the touchless indication configuration data corresponds to one or more of a plurality of types of graphical image data, where one or more different types of graphical image data can have different corresponding touchless indication configuration data. Alternatively, all types of graphical image data have same touchless indication configuration data, which can be different from touchless indication configuration data of other touch screens and/or other users.

In some embodiments, touchless indication configuration data for a first type of graphical image data can indicate operating in accordance with a touchless mode of interaction for the first type of graphical image data, and touchless indication configuration data for a second type of graphical image data can indicate operating in accordance with a touch-based mode of interaction for the second type of graphical image data and/or not operating in accordance with the touchless mode of operation.

In some embodiments, touchless indication configuration data for a first type of graphical image data can indicate touchless indications be detected in accordance with first touchless indication threshold parameter data 615, and touchless indication configuration data for a second type of graphical image data can indicate touchless indications be detected in accordance with second touchless indication threshold parameter data 615 that is different from the first touchless indication threshold parameter data 615, for example, based on the second touchless indication threshold parameter data 615 including one or more thresholds that is stricter than and/or looser than corresponding thresholds of the first touchless indication threshold parameter data 615.

The touchless indication configuration data can be determined based on receiving the touchless indication configuration data and/or storing and/or accessing the touchless indication configuration data in accessible memory resources. In some embodiments, the touchless indication configuration data can be generated based on user input, for example, to other graphical image data previously displayed, as one or more touchless and/or touch-based indications, and/or based on another type of user input. In other embodiments, the touchless indication configuration data can be generated automatically, for example, as learned touchless indication configuration data based on one or more touchless and/or touch-based indications detected for previously displayed graphical image data.

In some embodiments, the method includes performing step 512 or otherwise includes displaying one of the plurality of types of application data. For example, the type of graphical image data corresponds to a type of interface feature displayed as some or all of graphical image data 700 at a given time. As a particular example, the type of graphical image data is displayed at a given time as a portion of graphical image data 700 in a first location, such as a particular interface feature and/or selectable region, where the graphical image data also displays one or more other types of graphical image data at the given time in one or more other portions of the graphical image data 700 in other locations. As another example, the type of graphical image data corresponds to a type of application, where the touch screen stores application data for a plurality of applications in memory resources of different types, and is operable to execute different applications via execution of corresponding application data.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. The capacitance image data can be generated for multiple points in time across a temporal period, where a stream of sequential capacitance image data is generated within the temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 526 includes processing the capacitance image data to detect a touchless indication based on the touchless indication configuration data. For example, performing step 526 includes performing step 386. The touchless indication can be detected based on determining the capacitance image data compares favorably to a touchless indication threshold 342 indicated by the touchless indication configuration data, compares unfavorably to a touch threshold 344 indicated by the touchless indication configuration data, and/or compares favorably to other touchless indication threshold parameter data 615 indicated by the touchless indication configuration data. The touchless indication can be detected based on performing the touchless indication detection function 842.

Performing step 526 can include detecting a touchless interaction to the one type of graphical image data of the plurality of types of graphical image data based on utilizing touchless indication configuration data corresponding to the one type of graphical image data, which can be different from touchless indication configuration data of other types of graphical image data displayed at the same or different times.

FIGS. 69A-69B present embodiments of touch screen 16 where touchless indications detected over time are aggregated and/or characterized to automatically update corresponding touchless indication threshold parameter data over time, for example, based on learned characteristics of touchless indications specific to the user of the touch screen 16 and/or based on learned characteristics of prior use of the given touch screen 16. Some or all features and/or functionality of the touch screen 16 and/or processing module 42 of embodiments discussed in conjunction with FIGS. 69A-69B can be utilized to implement the touch screen 16 and/or processing module 42 of FIGS. 57-60, and/or any other embodiment of touch screen 16 and/or processing module 42 described herein.

FIG. 69A is a schematic block diagram of an embodiment of a touchless detection parameter data learning function 850 in accordance with the present disclosure. The touchless detection parameter data learning function 850 can be performed by processing module 42 or other processing resources to generate learned touchless indication threshold parameter data 615. The learned touchless indication threshold parameter data 615 can be generated based on processing various touchless indication detection data 844 generated previously by performing an initial touchless indication detection function 842.$i$, for example, based on corresponding initial touchless indication threshold parameter data 615.$i$, in processing various capacitance image data in a first temporal period. The learned touchless indication threshold parameter data 615 can thus be considered touchless indication threshold parameter data 615.$i$+1, as an updated set of touchless indication threshold parameter data from the initial touchless indication threshold parameter data 615.$i$ utilized previously in collecting the touchless indication detection data 844 utilized to generate this updated set of touchless indication threshold parameter data. The touchless indication detection function 842 can be performed on subsequently generated capacitance image data in a second temporal period after the first temporal period as an updated touchless indication detection function 842.$i$+1, based on utilizing these learned touchless indication threshold parameter data 615, to generate subsequent touchless indication detection data 844. For example, the subsequent touchless indication detection data 844 is generated based on the learned parameters based on the corresponding user's characteristics to more accurately discern between true and false touchless indications and/or to more accurately capture the intended touchless indications made by the user.

The touchless detection parameter data learning function 850 can be implemented via at least one aggregation function, at least one statistical analytics function, at least one supervised and/or unsupervised machine learning function and/or technique, and/or at least one artificial intelligence function and/or technique. For example, a plurality of touchless indication detection data generated via the initial touchless indication detection function 842.$i$ is utilized as a training set of training data to a machine learning function, for example, as output labels for corresponding capacitance image data 1300 in which each of the plurality of touchless indication detection data was detected. Alternatively or in addition, performing the touchless detection parameter data learning function 850 can include determining and/or processing measured parameters, such as size, shape, speed and/or type of movement, hover distance, and/or other characteristics of corresponding hover regions, anatomical feature mapping data, and/or touchless indication points in the previous capacitance image data 1330 to identify user-specific characteristics of their touchless interaction, for example, via at least one statistical analytics function performed upon the measured characteristics over time, to improve identification of intended touchless interaction in the future. This process can be repeated over time to further generate subsequent iterations of the touchless indication detection function 842 and/or the corresponding touchless indication threshold parameter data 615 to further characterize user behavior in performing touchless indications based on an increased amount of prior data and/or to adapt to changes in the user's touchless indication behavior over time.

The touchless detection parameter data learning function 850 can be implemented to processing a plurality of potential touchless indication detected over time in the first temporal period, in conjunction with corresponding correction data supplied by the user and/or determined automatically for false touchless indications mischaracterized as true touchless indications, or vice versa. In particular, the touchless detection parameter data learning function 850 can improve the updated touchless indication detection function 842.$i$+1 from the initial touchless indication detection function 842.$i$ based on improving the false-positive touchless indications identification rate and/or the false-negative touchless indications identification rate, for example, in generating the touchless indication determination data.

Generating the learned touchless indication threshold parameter data 615 can optionally include distinguishing behavior under different conditions based on processing the previous capacitance image data 1330 and the corresponding touchless indication detection data 844 in conjunction with the conditions under which this data was generated. This can include distinguishing touchless behavior for different conditions such as: interactions with different locations upon on the x-y plane; interactions with the touch screen while in different orientations, for example, relative to the direction of gravity; interactions with the touch screen while the touch screen is static vs. in one or more types of motion, for example, relative to the user and/or relative to the earth; interaction with the touch screen via different hands and/or fingers of the user; interactions for different types of applications stored and executed by the touch screen; different types of interface features displayed by the touch screen; interactions in different geographic locations; interactions for different conditions and/or state of a vehicle, mobile device, or other device implementing the touch screen; interactions at different times of day, week, month, and/or year; interactions under different lighting conditions, such as interactions made outside vs. inside; interactions while the user is engaged in different types of activities in conjunction with use of the touch screen; and/or other detected conditions of the touch screen while generating various capacitance image data 1330 and the corresponding touchless indication detection data 844 over time within the first temporal period.

In some embodiments, performing touchless detection parameter data learning function 850 is based on touchless indication detection data 844 generated over time via normal use of the touch screen by the user, for example, in the background without notifying the user of this process. In other embodiments, performing touchless detection parameter data learning function 850 can be based on actively prompting the user to perform a series of touchless indications, such as particular touchless gestures or interactions with different interface features, as a more active training protocol presented via prompts displayed via the touch screen to collect some or all of the touchless indication detection data 844 utilized to generate the learned touchless indication threshold parameter data 615. This can further include displaying prompts to the user to provide correction data via touch-based or touchless user input to the touch screen to identify times when a touchless indication was intended but not detected, or when a touchless indication was detected but not intended, for example, to improve the generation of touchless indication determination data when processing potential touchless indications. The learned touchless indication threshold parameter data 615 can optionally be implemented as touchless indication configuration data discussed in conjunction with FIG. 68D, particularly when the user actively participates in responding to such prompts to configure their touchless interaction with the touch screen.

In some embodiments, learned touchless indication threshold parameter data 615 can be generated based on learned characteristics of prior use aggregate and/or generalized across multiple different touch screens 16 used by the given user and/or multiple users. For example, the touch screen 16 can collect and transmit its touchless indication detection data 844 via a transmitter and/or network interface, for example, to a server system associated with a plurality of touch screens 16 via a wired and/or wireless communication network, such as the Internet. The server system can collect the touchless indication detection data 844 generated by and received from a plurality of touch screen 16 over time, and can perform the touchless detection parameter data learning function 850 via its own processing resources to generate the learned touchless indication threshold parameter data 615. This learned touchless indication threshold parameter data 615 can be transmitted to the plurality of touch screens 16, for example, via the wired and/or wireless communication network, for use by their respective processing modules 42 in performing a corresponding updated touchless indication detection function 842 to generating subsequent touchless indication detection data 844.

In such embodiments, the touchless detection parameter data learning function 850 can be performed across multiple users of multiple different types of touch screens to generate learned touchless indication threshold parameter data 615 for use across all different users and/or all different touch screens. Alternatively or in addition, as different types of touch screens may have different sizes and/or other different properties that induce different types of touchless interaction, touchless detection parameter data learning function 850 for touchless indication detection data 844 collected by each of a plurality of types of touch screens 16 can be segmented and processed by touch screen type to render a plurality of corresponding learned touchless indication threshold parameter data 615, where each learned touchless indication threshold parameter data 615 corresponds to a particular one of the plurality of types of touch screens 16 and/or where each touchless indication threshold parameter data 615 is sent only to ones of the plurality of touch screens 16 of the corresponding type for use by their respective processing modules 42 in performing a corresponding updated touchless indication detection function 842 to generating subsequent touchless indication detection data 844.

Alternatively or in addition, as different individual users and/or demographics of users may have different preferences and/or usage characteristics that induce different types of touchless interaction, touchless detection parameter data learning function 850 for touchless indication detection data 844 collected by each of a plurality of touch screens 16 can be segmented and processed per individual user, or per user demographic-based category, to render a plurality of corresponding learned touchless indication threshold parameter data 615, where each learned touchless indication threshold parameter data 615 corresponds to a particular one of the plurality users and/or user demographics, and/or where each touchless indication threshold parameter data 615 is sent only to ones of the plurality of touch screens 16 of the corresponding individual user and/or of a user corresponding to the corresponding user demographic. In the case where touchless indication threshold parameter data 615 is generated for an individual user, the touchless indication threshold parameter data 615 can be stored in a user profile of the corresponding user for use by multiple different touch screens 16 owned by and/or used by the given user.

Alternatively or in addition, as different types of applications stored and executed by touch screens and/or interface features displayed by touch screens may induce different types of touchless interaction as discussed previously, touchless detection parameter data learning function 850 for touchless indication detection data 844 collected by each of a plurality of touch screens 16 can be segmented and processed per application, per application type, and/or per interface feature type, to render a plurality of corresponding learned touchless indication threshold parameter data 615, where each learned touchless indication threshold parameter data 615 corresponds to a particular application, application type, and/or interface feature type and/or where the plurality of touchless indication threshold parameter data the plurality of touch screens 16 for use in detecting and processing touchless interactions for different particular applications, different types of applications, and/or different types of interface features.

FIG. 69B illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 69B can be performed in conjunction with some or all steps method of FIG. 60 and/or some or all steps of other methods described herein.

Step 532 includes receiving a first plurality of sensed signals. For example, performing step 532 includes performing step 382 and/or step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 534 includes generating a first plurality of capacitance image data based on the first plurality of sensed signals. Performing step 532 can include performing step 384. The first plurality of capacitance image data can be across a first a temporal period, where a stream of sequential capacitance image data is generated within the temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 538 includes generate learned detection parameter data, such as learned touchless indication threshold parameter data 615 or other detection parameters, based on the first plurality of capacitance image data. Performing step 538 can include performing an initial touchless indication detection function upon the first plurality of capacitance image data to generate a first plurality of touchless indication detection data indicating detection and/or characteristics of various touchless indications in the first plurality of capacitance image data. This can include utilizing initial detection parameter data to generate the first plurality of touchless indication detection data, where the learned detection parameter data is different from and/or improved from the initial detection parameter data. Performing step 538 can include performing the touchless detection parameter data learning function 850 utilizing the first plurality of capacitance image data and/or the first plurality of touchless indication detection data.

Step 539 includes generating a second plurality of capacitance image data based on receiving a second plurality of sensed signals. Step 539 can be performed in a same or similar fashion as performing steps 532 and 534, where steps 532 and 534 are performed prior to generating the learned detection parameter data in step 538, and where step 539 is performed after generating the learned detection parameter data in step 538. The second plurality of sensed signals can be received in a second temporal period that is strictly after a first temporal period when the first plurality of sensed signals were be received, and/or the second plurality of capacitance image data can be generated in a second temporal period that is strictly after a first temporal period when the first plurality of capacitance image data was generated.

Step 540 includes processing the second plurality of capacitance image data based on the learned detection parameter data to detect a second plurality of touchless interactions. Performing step 538 can include performing an updated touchless indication detection function that utilizes the learned detection parameter data upon the second plurality of capacitance image data to generate a second plurality of touchless indication detection data indicating detection and/or characteristics of various touchless indications in the second plurality of capacitance image data. The second plurality of capacitance image data can be processed differently from the first plurality of capacitance image data in detecting touchless indications based on the second plurality of capacitance image data being processed in conjunction with the learned detection parameter data that was generated from the first plurality of capacitance image data.

FIGS. 70A-70B present embodiments of touch screen 16 where detection data denoting hover regions or other touchless indications to particular display content of graphical image data that was received from and/or otherwise corresponds to content generated by and/or associated with a particular content provider can be communicated to the content provider. Some or all features and/or functionality of the touch screen 16 and/or processing module 42 of embodiments discussed in conjunction with FIGS. 70A-70B can be utilized to implement the touch screen 16 and/or processing module 42 of FIGS. 57-60, and/or any other embodiment of touch screen 16 and/or processing module 42 described herein.

FIG. 70A illustrates an embodiment of a touch screen 16 operable to receive displayable content 868.1-868.V from a plurality of server systems 865.1-865.V of a plurality of content provider entities 1—V. For example, the displayable content 868.1-868.V is received via one or more networks 26, such as the Internet, by a receiver and/or network interface of the touch screen 16. The displayable content 868 can includes: application data for an application generated by and/or corresponding to the corresponding content provider entities for display via touch screen 16 in graphical image data 700; webpage display data for a webpage generated by and/or corresponding to the corresponding content provider entities for display via touch screen 16 in graphical image data 700; advertisement display data for an advertisement generated by and/or corresponding to the corresponding content provider entities for display via touch screen 16 in graphical image data 700; media display data such as video and/or audio content, such as particular songs, television shows, and/or movies owned and/or produced by the content provider entities for display via touch screen 16 in graphical image data 700; and/or other displayable content 868 that is displayed as some or all of graphical image data 700 displayed by the touch screen 16 at a given time.

As the user views graphical image data 700 displayed by the touch screen 16 over time and interacts with the touch screen 16 via touchless indications, detection of these touchless indications can be collected and communicated to content provider entities. Various touchless indications 610 can be detected for user interaction with portions of graphical image data 700 corresponding to different types of applications, interface features, selectable regions, and/or otherwise portions of the screen displaying content provided by different content provider entities. For example, a first set of touchless indications is detected for user interaction with graphical image data corresponding to a first content provider entity, a second set of touchless indications is detected for user interaction with graphical image data corresponding to a second content provider entity. Sets of touchless indication detection data 843.1-843.V can thus be collected and transmitted via network 26 to respective ones of the set of server systems 865.1-865.V, for example, via a transmitter and/or network interface of the touch screen. The touchless indication detection data 844 can be collected and transmitted instead of or in addition to transmitting touch-based indication detection data indicating clicks or other touch-based indications of the displayable content of content provider entities.

In some embodiments, processing resources of the content provider entity can perform at least one analytical function to generate aggregate statistics relating to user interaction with the content provider's display content. For example, advertisement data corresponding to advertisements for products and/or services of particular company can be received displayed by touch screen, and a user hovering over the advertisement, for example, contemplating clicking upon the advertisement or spending more time viewing the advertisements communicated to the particular company and/or an advertising agency processing advertisement data for the particular company to enable advertisements analytics data to be generated for the company. In some cases, hover regions of touchless indications can be distinguished from and/or treated differently from touch-based indications. For example, clicking on an advertisement via a touch-based interaction or particular type of touchless gesture can be processed as a first type of interaction with the advertisement data, such as an active interaction with the advertisement, while hovering over an advertisement via a detected hover region and/or second type of touchless gesture can be processed as a second type of interaction with the advertisement data, such as a passive interaction with the advertisement indicating potential user interest in the corresponding good and/or product such as a finger hovering over the advertisement, touchless interaction to zoom-in upon a portion of the advertisement, or other touchless interaction which that is not as strong as the interest indicated when interacting via the active interaction, such as via clicking upon the advertisement to be directed to a webpage hosted by the advertisement.

In some embodiments, processing resources of the content provider entity can perform at least one analytical function to generate recommendation data and/or user characterization data relating to user interaction with the content provider's display content. For example, a content provider corresponding to a company enabling a point-of-sale can receive data indicating a user hovering over a particular product for purchase and/or to complete a purchase, such as hovering over a button indicating "add to cart" or "checkout" and/or zooming in upon a picture of a good or product for sale that is displayed via the graphical image data 700. This can indicate the user is strongly contemplating completing a purchase, without actively activating the purchase via a touch-based indication to the button or other particular touchless gesture. The content provider can determine to serve the user with further advertisements relating to these products contemplated by the user, send discount data to the user to further persuade the user to buy the product, and/or to remind the user with emails, texts, and/or prompts for display to prompt the user to purchase these contemplated items.

As another example, media data corresponding to videos received displayed by touch screen, and a user hovering over video, for example, pointing at particular portions of the video clicking upon the particular actors, locations, and/or objects portrayed in the video, can enable analytics data to be generated for the user. This can be utilized to recommend additional content to the user, such as subsequent videos for viewing. This can be further aggregated across multiple users to determine popular elements of various videos.

FIG. 70B illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 70B can be performed in conjunction with some or all steps method of FIG. 60 and/or some or all steps of other methods described herein.

Step 542 includes displaying graphical image data corresponding to a content provider entity. For example, performing step 542 includes performing step 512 and/or step 282. The method can optionally include receiving corresponding displayable content via a network, for example, from a server system corresponding to the content provider entity, where the graphical image data includes this displayable content.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. The capacitance image data can be generated for multiple points in time across a temporal period, where a stream of sequential capacitance image data is generated within the temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 546 includes processing the capacitance image data to identify a hover region in proximity to the graphical image data corresponding to the content provider entity. Alternatively or in addition, other attributes or a potential and/or true touchless indication corresponding to the hover region are detected. For example, performing step 546 includes performing step 386. The hover region can be detected based on determining the capacitance image data compares favorably to a touchless indication threshold 342 compares unfavorably to a touch threshold 344, and/or compares favorably to other touchless indication threshold parameter data 615. The hover region can be detected based on performing a touchless indication detection function 842.

Step 548 includes transmitting a notification indicating the detection of the hover region to a server system associated with the content provider entity, for example, via a network. The notification can indicate other attributes or a potential and/or true touchless indication corresponding to the hover region. For example, the notification is implemented as and/or indicates some or all data of touch-based indication detection data 843 generated in detecting the given hover region.

FIGS. 71A-71B present embodiments of a touch screen 16 implemented as a publicly-used touch screen at a public location, such as a commercial location to facilitate point-of-sale interactions by customers at the commercial location, where the public-use of touch screen 16 involves mostly and/or only touchless interaction via detection and/or processing of touchless gestures 810 and/or other touchless indications 610 as described herein. Some or all features and/or functionality of the touch screen 16 and/or processing module 42 of embodiments discussed in conjunction with FIGS. 71A-71B can be utilized to implement the touch screen 16 and/or processing module 42 of FIGS. 57-60, and/or any other embodiment of touch screen 16 and/or processing module 42 described herein.

Note that as described herein, a touch screen 16 can optionally be configured to only process touchless indications 610, and not touch-based indications, despite being referred to a "touch" screen herein. For example, the touch screen 16 can optionally be configured to be interacted with via mostly and/or only touchless indications 610 based on being implemented at a public point-of-sale, being implemented by a commercial entity and/or at a public location, and/or displaying a used interactive user interface intended for public use at the public location. The technology described herein enabling detection of touchless indications 610 to identify user interaction with graphical image data can be leveraged by touch screens implemented as such publicly-used touch screens, for example, to require and/or encourage various users of the publicly-used touch screen 16 to interact with the touch screen 16 via only touchless indications 610. Facilitating entirely touchless interactions by these publicly-used touch screens can be ideal, for example, by preventing the spread of germs and/or by preventing wear and tear to the surface of the touchscreen or to buttons that would otherwise be pushed and/or touched to facilitate interaction with the touch screen.

FIG. 61A is a schematic block diagram of an embodiment of a transaction data generator function 870 in accordance with the present disclosure. The transaction data generator function 870 can be performed by processing module 42 or other processing resources, for example of a publicly-used touch screen 16 at a public location, to generate transaction data 872 and/or otherwise facilitate performance of a touchless transaction.

The transaction data generator function 870 can process one or more touchless indications 610, for example, indicated in touchless indication detection data 844 generated via performance of touchless indication detection function 842 as discussed previously. The transaction data generator function 870 can generate transaction data based on interface features, such as particular displayed buttons and/or options depicted at different portions of the screen, that are detected as being selected in the touchless indication detection data 844.

A corresponding payment transaction or other type of transaction can be facilitated at the public location based on the touchless indications to the corresponding publicly-used touch screen 16 by a given users. This can include the touch screen 16 transmitting the transaction data 872 to a server system via the network, where the server system processes the transaction. For example, the server system corresponds to a banking entity, a credit card company, a debit card company, or other entity that facilitates financial transactions at points-of-sale. Multiple payment transactions or other types of transactions can be facilitated over time for multiple users, such as various customers, interacting with this publicly-used touch screen 16 over time.

The touchless indication detection data 844 can indicate selection of a type of payment, such as payment via a credit card or a debit card. For example, the graphical image data 700 indicates a first selectable region indicating selection of payment via a credit card, and a second selectable region indicates selection of payment via a debit card. The touchless indication detection data 844 can indicate selection of either one of these selectable regions, for example, based on a user performing a corresponding touchless gesture 810 and/or other touchless indication 610 denoting selection of a given one of these selectable regions. The transaction data 872 can correspond to a transaction facilitated via the type of payment.

The touchless indication detection data 844 can alternatively or additionally indicate a passcode, such as a PIN, ZIP code, rewards number and/or discount code, or other identifying passcode of letters and/or numerals supplied by the user identifying the user and/or required for facilitating a transaction via their form of payment, such as a PIN for a debit card of the user and/or an area code for a credit card of the user. For example, the graphical image data 700 indicates a set of selectable regions different letters and/or numbers for selection, such as a displayed number pad and/or keyboard. This can optionally include implementing features of touch screen 16 illustrated and discussed in conjunction with FIG. 63F. The touchless indication detection data 844 can indicate ordered selection of these selectable regions denoting a corresponding PIN or other passcode, for example, based on a user performing a corresponding touchless gesture 810 and/or other touchless indication 610 denoting selection of a given one of these selectable regions. The transaction data 872 can correspond to a transaction facilitated via the provided and/or another passcode. Alternatively, the passcode corresponds to a secret configured gesture performed by the user rather than an alphanumeric passcode, where the transaction data 872 can correspond to a transaction facilitated via a touchless gesture performed by the user matching their secret configured gesture.

The touchless indication detection data 844 can alternatively or additionally indicate a signature of the user. For example, the graphical image data 700 indicates a selectable region for supplying a signature via a touchless motion hovering over the selectable region. This can optionally include implementing features of touch screen 16 illustrated and discussed in conjunction with FIG. 63G. The touchless indication detection data 844 can indicate a signature supplied by the user via a touchless motion. The transaction data 872 can correspond to a transaction facilitated via the provided and/or another passcode.

The touchless indication detection data 844 can alternatively or additionally indicate a selection for form of payment receipt, such as an option to text, email, and/or print a receipt for the user's records. For example, the graphical image data 700 indicates selectable regions for some or all of these receipt receival options. This can optionally include implementing features of touch screen 16 illustrated and discussed in conjunction with FIG. 63F. The user can optionally interact with a keypad to supply their email address and/or phone number via subsequent touchless interactions. The transaction data 872 can correspond to a transaction facilitated via providing a payment receipt to the user via the selected means.

The touchless indication detection data 844 can alternatively or additionally indicate other selections by the user made via touchless gestures and/or other touchless indications to select corresponding selectable regions of the graphical image data, where the transaction data 872 can correspond to a transaction facilitated via other configured selections by the user.

The touch screen 16 can further include, can be coupled to, and/or can be implemented via a computing device in conjunction implementing a point-of-sale terminal device, such as a payment terminal for reading of a credit card or debit card of the user. This can include a contactless payment terminal, such as a near field communication (NFC) terminal, card reader, and/or another point-of-sale terminal. Corresponding credit card, debit card, and/or other payment information can be read, received, and/or otherwise generated via the point-of-sale terminal, where the transaction data 872 further includes and/or is based on this credit card, debit card, and/or other payment information.

The touch screen 16 implementing the transaction data generator function 870 can be implemented as a publicly-used touch screen 16 of a point-of-sale terminal and/or point-of-sale computing device at a store, restaurant, airport or other transportation terminal gas station pump, vending machine, and/or other commercial establishment that processes payment cards and/or otherwise sells goods or services to customers. The touch screen 16 implementing the transaction data generator function 870 can alternatively or additionally be implemented as a publicly-used touch screen 16 of an automated teller machine (ATM).

A publicly-used touch screen 16 can optionally be implemented for other interaction at public places, where touchless interaction is preferred due to the germ spreading and/or wear and tear that can be induced in touch-based public use of such systems as described previously. Such interaction can optionally involve non-payment and/or non-transaction types of interaction. touch screen 16.

For example, some or all features and/or functionality of touch screen 16 described herein to detect and/or process various touchless indications 610 can optionally be implemented as a publicly-used touch screen 16 of an interactive kiosk at an airport, hotel, or other transportation terminal for: printing boarding passes for pre-sold tickets; facilitating immigration and/or customs processing; facilitating printing of luggage tags for checked luggage; facilitating check-in to a previously reserved hotel room, and/or other public interaction at the airport terminal.

As another example, some or all features and/or functionality of touch screen 16 described herein to detect and/or process various touchless indications 610 can optionally be implemented as a publicly-used touch screen 16 of an interactive information kiosk at a mall, amusement park, hiking trail trail-head, music festival, recreational space, and/or other public space for: presenting map information; providing a list of stores, restaurants, restrooms, and/or other services; supplying routing information to points of interest within the public space, and/or public interaction at the public space.

As another example, some or all features and/or functionality of touch screen 16 described herein to detect and/or process various touchless indications 610 can optionally be implemented as a publicly-used touch screen 16 of a service-ordering and/or entertainment platform at a table at a bar or restaurant, or on the seat back of an airplane or train for: presenting a menu of food and/or service options for sale and/or selection, such as food menu items at a restaurant to be served to the table; presenting video streaming content, such as movies presented via a touch screen 16 to an individual user while riding a plane, train, or other publicly-used mode of transportation; presenting gaming and/or trivia content to users at the table and/or seat at the restaurant and/or onboard the transportation vehicle, or other to provide other entertainment and/or services.

FIG. 71B illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 71B can be performed in conjunction with some or all steps method of FIG. 60 and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. The capacitance image data can be generated for multiple points in time across a temporal period, where a stream of sequential capacitance image data is generated within the temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 456 includes processing the capacitance image data to detect a touchless interaction indicating payment transaction data. For example, performing step 456 includes performing a touchless indication detection function 842 to generate touchless indication detection data 844, and/or includes performing a transaction data generator function 870 to generate the payment transaction data based on one or more selections and/or other information supplied to selectable regions and/or other interface elements of the graphical image data as indicated by the touchless indication detection data 844.

Step 458 includes processing the payment transaction data in conjunction with facilitating a touchless payment transaction. This can include transmitting the payment transaction data to a payment entity, vendor entity, and/or point-of-sale entity associated with processing and/or performing the payment transaction. In some embodiments, the method includes collecting credit card and/or debit card data, for example, via a contactless point-of-sale terminal, where processing the payment transaction data further includes processing the collected credit card and/or debit card data to facilitate a touchless payment transaction.

In various embodiments, a touch screen display, such as touch screen 16, includes a display configured to render frames of data into visible images, for example, as graphical image data 700. The touch screen display can further include a plurality of electrodes integrated into the display to facilitate touch sense functionality based on electrode signals having a drive signal component and a receive signal component. The plurality of electrodes can include a plurality of row electrodes and a plurality of column electrodes, where the plurality of row electrodes is separated from the plurality of column electrodes by a dielectric material and where the plurality of row electrodes and the plurality of row electrodes form a plurality of cross points. The touch screen display can further include a plurality of drive-sense circuits coupled to at least some of the plurality of electrodes to generate a plurality of sensed signals. Each of the plurality of drive-sense circuits can include a first conversion circuit and a second conversion circuit. When a drive-sense circuit of the plurality of drive-sense circuits is enabled to monitor a corresponding electrode of the plurality of electrodes, the first conversion circuit can be configured to convert the receive signal component into a sensed signal of the plurality of sensed signals and the second conversion circuit can be configured to generate the drive signal component from the sensed signal of the plurality of sensed signals. The touch screen display can further include a processing module that includes at least one memory that stores operational instructions and at least one processing circuit that executes the instructions to perform operations.

In various embodiments, the variations in capacitance associated the plurality of cross points vary from a nominal capacitance. In various embodiments, the nominal capacitance corresponds to an average capacitance of the plurality of cross points in an absence of the touchless indication. In various embodiments, the sensed signals indicate an impedance of the plurality of cross points. In various embodiments, the nominal value is proportional to a nominal impedance corresponding to each of the cross points of the plurality of cross points in an absence of the touchless indication.

In various embodiments, the first conversion circuit includes a comparator to compare the electrode signal to an analog reference signal to produce an analog comparison signal and/or an analog to digital converter operable to convert the analog comparison signal into the sensed signal. In various embodiments, the second conversion circuit includes a digital to analog converter operable to convert the sensed signal into an analog feedback signal, a signal source circuit operable to generate a regulated source signal based on the analog feedback signal, and/or a driver operable to increase power of the regulated source signal to produce the drive signal component.

In various embodiments, each of the electrodes include a transparent conductive trace placed in a layer of the touch screen display. The transparent conduction trace can be constructed of: Indium Tin Oxide (ITO), Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and/or or poly(3,4-ethylenedioxythiophene) (PEDOT).

In various embodiments, the operations performed by the processing module can include receiving the plurality of sensed signals, where the sensed signals indicate variations in capacitance associated with the plurality of cross points. The operations can further include generating, based on the plurality of sensed signals, capacitance image data associated with the plurality of cross points that includes capacitance variation data corresponding to variations of the capacitance image data from a nominal value.

In various embodiments, the operations can further include processing the capacitance image data to determine a touchless indication proximal to the touch screen display based on a touchless indication threshold. In various embodiments, determining the touchless indication proximal to the touch screen display can be further based on a touch threshold. In various embodiments, determining the touchless indication proximal to the touch screen display is based on determining a portion of the capacitance image data that compares favorably to the touchless indication threshold and that further compares unfavorably to the touch threshold.

In various embodiments, the touchless indication proximal to the touch screen display can be determined based on an area size in the capacitance image data where the capacitance variation data compares favorably to the touchless indication threshold, such as an area size of the hover region 605. In various embodiments, the touchless indication proximal to the touch screen display is determined based a temporal stability of at least one parameter the area in the capacitance image data where the capacitance variation data compares favorably to the touchless indication threshold, such as the hover region 605. In various embodiments, the at least one parameter of the area includes at least one of: a centroid of the area or a boundary of the area.

In various embodiments, the touchless indication proximal to the touch screen display is determined based a proximity of a parameter of the area in the capacitance image data where the capacitance variation data compares favorably to the touchless indication threshold, such as hover region 605, to a selectable region on the touch screen display, such as a selectable region 720. In various embodiments, the parameter of the area indicates at least one of: a centroid of the area or a boundary of the area.

In various embodiments, the operations include processing the capacitance image data to generate anatomical feature mapping data. In various embodiments, the operations include detecting at least one touchless interaction based on the anatomical feature mapping data.

In various embodiments, anatomical feature mapping data indicates a location and/or orientation of a set of fingers of a hand. In various embodiments, the location and/or orientation of each of the set of fingers is with respect to a two-dimensional projection corresponding to an area of the touch screen display. In various embodiments, the location and/or orientation of each of the set of fingers is further with respect to an axis orthogonal to the two-dimensional projection to indicate a three-dimensional location and/or orientation of each of the set of fingers with respect to a position and/or orientation of the touch screen.

In various embodiments, the anatomical feature mapping data identifies a set of individual fingers of a right hand and/or of a left hand. In In various embodiments, the anatomical feature mapping data indicates a level of bending of one or more joints of at least one of the set of individual fingers. In various embodiments, the anatomical feature mapping data indicates relative positions and/or orientations of each of the set of individual fingers relative to: other ones of the set of individual fingers, an identified palm of the hand, and/or an identified wrist of the hand.

In various embodiments, the at least one touchless interaction is identified based on identifying at least one corresponding hover region induced by at least one finger identified in the anatomical feature mapping data. In various embodiments, the operations include determining a particular finger for performing touchless indications, where the least one touchless interaction is identified based on identifying the particular finger in the anatomical feature mapping data, and based on identifying a hover region induced by a fingertip of the particular finger. In various embodiments, the at least one touchless interaction is identified based on identifying a touchless gesture involving multiple fingers based on identifying movements of the multiple fingers in the anatomical feature mapping data comparing favorably to gesture pattern parameter data of the touchless gesture.

In various embodiments, the operations include processing the capacitance image data to detect a potential touchless indication based on having capacitance variation data comparing favorably to touchless indication threshold parameter data. In various embodiments, the operations include generating touchless indication determination data based on detecting the potential touchless indication. The touchless indication determination data can indicate that potential touchless indication is a true touchless indication, or that the potential touchless indication is a false touchless indication. In various embodiments, the operations include processing the potential touchless indication as a touchless indication only when the touchless indication determination data indicates the potential touchless indication is a true touchless indication.

In various embodiments, generating the touchless indication determination data includes comparing the capacitance variation data to true touchless indication parameter data. In various embodiments, the touchless indication determination data indicates the potential touchless indication is a true touchless indication when the capacitance variation data compares favorably to the true touchless indication parameter data and/or the touchless indication determination data indicates the potential touchless indication is a false touchless indication when the capacitance variation data compares unfavorably to the true touchless indication parameter data. The true touchless indication parameter data can be implemented as some or all of touchless indication threshold parameter data 615.

In various embodiments, the true touchless indication parameter data includes a minimum hover region area threshold, a maximum hover region area threshold, hover region shape parameter data, touchless indication gesture parameter data, and/or temporal stability parameter data. In various embodiments, generating the touchless indication determination data includes comparing a position of a corresponding potential hover region upon a two-dimensional projection corresponding to an area of the display to a position of at least one selectable region of graphical display data displayed by the display. In various embodiments, the touchless indication determination data is generated as a function of a distance upon the two-dimensional projection between the position of a corresponding potential hover region and the position of at least one selectable region.

In various embodiments, the capacitance image data associated with the plurality of cross points includes capacitance variation data corresponding to variations of the capacitance image data from a nominal value within a two-dimensional area corresponding to a surface of the display. The operations can further include processing the capacitance image data to determine a hover region within the two-dimensional area based on having capacitance variation data comparing favorably to a touchless indication threshold. The operations can further include identifying, based on the hover region, a touchless indication point within the two-dimensional area corresponding to a touchless indication.

In various embodiments, the touchless indication point is within the hover region. In various embodiments, the touchless indication point is identified as a centroid point of the hover region. In various embodiments, the touchless indication point is identified based on a having a maximum capacitance variation value of a plurality of capacitance variation values of the capacitance variation data for the hover region.

In various embodiments, the touchless indication point is identified based on at least one of: a size of the area of the hover region, or a shape of the area of the hover region. In various embodiments, the hover region is identified as a contiguous region having capacitance variation data comparing favorably to a touchless indication threshold in the capacitance image data. In various embodiments, the hover region is identified based on comparing favorably to a minimum hover region area threshold, a maximum hover region area threshold, and/or hover region shape parameter data. In various embodiments, the minimum hover region area threshold, the maximum hover region area threshold, and/or the hover region shape parameter data is configured based on a fingertip size and/or a fingertip shape.

In various embodiments, the operations further include generating input data to a graphical user interface displayed via the display based on the touchless indication point. In various embodiments, the graphical user interface is displayed within the two-dimensional area, and a selectable element of the graphical user interface is displayed via a given region of the two-dimensional area. In various embodiments, the input data corresponds to selection of the selectable element of the graphical user interface within a first temporal period based on the touchless indication point being included within the given region of the two-dimensional area within the first temporal period.

In various embodiments, the operations further include generating, based on the plurality of sensed signals, updated capacitance image data for a second temporal period after the first temporal period, processing the updated capacitance image data to determine an updated hover region within the two-dimensional area based on having updated capacitance variation data comparing favorably to the touchless indication threshold, and/or identifying, based on the updated hover region, a new touchless indication point within the two-dimensional area corresponding to a new touchless indication. The new touchless indication point can be different from the touchless indication point. In various embodiments, input data to the graphical user interface within the second temporal period does not include selection of the selectable element based on the new touchless indication not being included within the given region of the two-dimensional area. In various embodiments, the updated hover region intersects with the given region.

In various embodiments, the operations include processing the capacitance image data to determine a hover region within the two-dimensional area based on having capacitance variation data comparing favorably to a touchless indication threshold. In various embodiments, generating hover region display data indicating the hover region for display by the display in conjunction with the frames of data. In various embodiments, generating the hover region display data is based on identifying a corresponding touchless indication based on the capacitance variation data.

In various embodiments, the hover region display data is overlaid upon the frames of data at the hover region of the two-dimensional area. In various embodiments, the operations include performing a smoothing function upon the hover region to identify a smoothed hover region, where the hover region display data indicates the smoothed hover region.

In various embodiments, the hover region display data is displayed as a perimeter of the hover region overlaid upon the frames of data. In various embodiments, the hover region display data indicates a shaded area corresponding to the hover region for overlay upon the frames of data. In various embodiments, the hover region display data indicates a touchless point within the hover region for overlay upon the frames of data.

In various embodiments, displaying the hover region display data includes magnifying a corresponding portion of the frames of data displayed by the display. In various embodiments, displaying the hover region display data includes visually indicating at least one selectable element of a graphical user interface displayed by the display based on a region of the touchless display that includes the selectable element overlapping with the hover region.

In various embodiments, the capacitance image data is processed in a first temporal period to determine the hover region for the first temporal period, where the hover region display data is displayed by the display in the first temporal period. The operations can further include generating, based on the plurality of sensed signals, updated capacitance image data for a second temporal period after the first temporal period. The operations can further include processing the updated capacitance image data to determine an updated hover region at a new location within the two-dimensional area based on having updated capacitance variation data comparing favorably to the touchless indication threshold. The operations can include generating updated hover region display data indicating the updated hover region for display by the display in conjunction with the frames of data at the new location within the two-dimensional area.

In various embodiments, the operations include processing the capacitance image data to determine a hover region based on having capacitance variation data comparing favorably to a touchless indication threshold. In various embodiments, the operations include displaying updated graphical image data that is different from the graphical image data based on the hover region.

In various embodiments, the operations further include determining a touchless indication based on the hover region. The graphical image data can include at least one selectable element, where the touchless indication indicates selection of the at least one selectable element, and/or where the updated graphical image data is generated based on the selection of the at least one selectable element.

In various embodiments, the graphical image data includes at least one selectable element. In various embodiments, the updated graphical image data is generated based on changing the display of the at least one selectable element based on determining a proximity of the hover region from the at least one selectable element upon the two-dimensional projection compares favorably to a proximity threshold.

In various embodiments, determining the proximity of the hover region from the at least one selectable element upon the two-dimensional projection compares favorably to a proximity threshold based on determining an area of the overlap of the hover region and the at least one selectable element upon the two-dimensional projection compares favorably to an overlap threshold and/or or determining a distance upon the two-dimensional projection from a centroid of the selectable element and a touchless point identified based on the hover region compares favorably to a distance threshold.

In various embodiments, changing the display of the at least one selectable element includes changing a position of the at least one selectable element within the two-dimensional area based on the hover region. In various embodiments, changing the position of the at least one selectable element within the two-dimensional area includes moving the position of the at least one selectable element towards a touchless point identified based on the hover region.

In various embodiments, changing the display of the at least one selectable element includes changing a size of the at least one selectable element based on the hover region. In various embodiments, the size of the at least one selectable element in the updated graphical image data is larger than a size of the at least one selectable element in the graphical image data based on the based on the hover region being in proximity to the at least one selectable element in a temporal period corresponding to the updated graphical image data.

In various embodiments, the operations include processing the capacitance image data to identify an initial hover region and/or touchless indication point. In various embodiments, the operations include processing updated capacitance image data after identifying the initial hover region to identify an updated hover region and/or an updated touchless indication point.

In various embodiments, the initial hover region is identified based on first touchless indication parameter data. In various embodiments, the updated hover region is identified based on second touchless indication parameter data that is less strict than the first touchless indication parameter data based on having identified the initial hover region.

In various embodiments, the operations include generating, based on the plurality of sensed signals, a stream of capacitance image data associated with the plurality of cross points that includes capacitance variation data corresponding to variations of capacitance image data in the stream of capacitance image data from a nominal value across a plurality of times within a temporal period. In various embodiments, the operations include processing the capacitance image data to detect a touchless gesture occurring within the temporal period. In various embodiments, detecting the touchless gesture includes determining the stream of capacitance image data compares favorably to touchless pattern data.

In various embodiments, the touchless pattern data indicates a motion pattern with respect to a two-dimensional plane corresponding to a surface of the display. In various embodiments, detecting the touchless gesture includes tracking a motion of a hover region in the stream of capacitance image data and/or determining that a projection of the motion upon the two-dimensional plane compares favorably to the motion pattern.

In various embodiments, the touchless pattern data indicates a motion pattern with respect to a two-dimensional plane corresponding to a surface of the display. In various embodiments, detecting the touchless gesture includes identifying a tracked movement of a hover region in the stream of capacitance image data, and/or determining that a projection of the motion upon the two-dimensional plane compares favorably to the motion pattern.

In various embodiments, identifying the tracked movement of a hover region includes detecting the hover region in capacitance image data of the stream of capacitance data for multiple ones of the plurality of times in the temporal period and/or identifying the tracked movement of the hover region based on changes in location of the hover region in capacitance image data across the multiple of the plurality of times. In various embodiments, the changes in location of the hover region is based on a change of location of a touchless indication point of the hover region and/or a center of the hover region. In various embodiment, the hover region is detected and/or bounded based on including capacitance variance data comparing favorably to a touchless indication threshold and/or based on further comparing unfavorably to a touch threshold.

In various embodiments, the touchless pattern data indicates a motion pattern involving changes in a hover distance from a surface of the display. In various embodiments, detecting the touchless gesture includes identifying changes in hover distance of a hover region tracked in the stream of capacitance image data, and/or determining that the changes in hover distance of the hover region compare favorably to the motion pattern.

In various embodiments, identifying the changes in hover distance of the hover region includes detecting the hover region in capacitance image data of the stream of capacitance data for multiple ones of the plurality of times in the temporal period, and/or identifying the changes in hover distance of the hover region based on changes in magnitude of capacitance variation data within the hover region in capacitance image data across the multiple of the plurality of times.

In various embodiments, the touchless gesture is detected based on all of the changes in changes in magnitude of the capacitance variation data within the hover region comparing favorably to a touchless indication threshold during the temporal period. In various embodiments, the touchless gesture is detected based on all of the changes in changes in magnitude of the capacitance variation data compare unfavorably to a touchless indication threshold during the temporal period.

In various embodiments, the motion pattern involves a first transition from a first hover distance to a second hover distance that is smaller than the first hover distance, and/or a second transition from the second hover distance to a third hover distance that is greater than the second hover distance. In various embodiments, the touchless gesture is detected based on detecting the first transition and/or the second transition.

In various embodiments, the first transition and/or the second transition of the motion pattern has a threshold minimum change in hover distance and/or a threshold maximum change in hover distance. In various embodiments, the touchless gesture is detected based on detecting the difference in magnitude of the first hover distance and the second hover distance, and/or the difference in magnitude of the second hover distance and the third hover distance compare favorably to the threshold minimum change in hover distance and/or the threshold maximum change in hover distance.

In various embodiments the motion pattern further indicates a threshold maximum temporal period for completion of the first transition; a threshold maximum temporal period for completion of the second transition; and/or a threshold maximum temporal period for completion of both the first transition and the second transition. In various embodiments, the touchless gesture is detected based on the temporal period comparing favorably to the threshold maximum temporal period.

In various embodiments, the motion pattern further indicates a threshold movement of the hover region with respect to a two-dimensional plane corresponding to a surface of the display during at least one or: the first transition or the second transition. In various embodiments, the touchless gesture is detected based on the tracked movement of the hover region projected upon the two-dimensional plane during the first transition and/or the second transition comparing favorably to threshold movement.

In various embodiments, the touchless pattern data is one of a set of touchless pattern data. In various embodiments, each touchless pattern data of the set of touchless pattern data corresponds to one of a set of touchless gesture types. In various embodiments, detecting the touchless gesture includes identifying the touchless gesture as the one of the set of touchless gesture types corresponding to the touchless pattern data.

In various embodiments, the stream of capacitance image data compares unfavorably to all other ones of the set of touchless pattern data. In various embodiments, identifying the identifying the touchless gesture as the one of the set of touchless gesture types is based on the stream of capacitance image data comparing unfavorably to all other ones of the set of touchless pattern data.

In various embodiments, the set of touchless gesture types includes at least one of an interface feature selection type; a zoom-in type; a zoom-out type; a scroll type; a touch screen configuration selection type; or any other type of touchless gesture identifying: a corresponding command to update the graphical image data; a corresponding command to change a configuration of the touch screen such as display, audio, and/or processing settings; and/or a corresponding command to select a portion of the graphical image data, such as an interface feature or selectable region, corresponding to the location of a detected hover region.

In various embodiments, the operations include processing the capacitance image data in a first temporal period to detect a touch-based indication based on having capacitance variation data comparing favorably to touch-based indication threshold parameter data. In various embodiments, the operations include processing the capacitance image data in a second temporal period after the first temporal period to detect a touchless indication based on having capacitance variation data comparing favorably to touchless indication threshold parameter data and comparing unfavorably to the touch-based indication threshold parameter data.

In various embodiments, the operations include processing the touch-based indication as first interaction data for graphical image data displayed by the display, and/or processing the touchless indication as second interaction data for the graphical image data displayed by the display. In various embodiments, the first interaction data corresponds to a first type of interaction based on the corresponding indication being touch-based and the second interaction data corresponds to a second type of interaction based on the corresponding indication being touchless, where the first type of interaction is different from the second type of interaction. In various embodiments, the first interaction data and the second interaction data corresponds to a same type of interaction.

In various embodiments, the operations include processing the capacitance image data in the first temporal period in accordance with a touch-based mode of operation, wherein the touch-based indication is identified based on processing the capacitance image data in accordance with the touch-based mode of operation in the first temporal period. In various embodiments, processing the capacitance image data in the second temporal period in accordance with a touchless mode of operation, wherein the touchless indication is identified based on processing the capacitance image data in accordance with the touchless mode of operation in the second temporal period.

In various embodiments, the operations include changing from processing the capacitance image data in accordance with the touch-based mode of operation to processing the capacitance image data in accordance with the touchless mode of operation in the second temporal period based on determining to change from processing the capacitance image data in accordance with the touch-based mode of operation to processing the capacitance image data in accordance with the touchless mode of operation.

In various embodiments, the operations include displaying graphical image data via the display. In various embodiments, the operations include processing the capacitance image data to detect a touchless interaction initiation gesture based on having capacitance variation data comparing favorably to touchless interaction initiation gesture detection threshold parameters. In various embodiments, the operations include processing subsequent capacitance image data, after detecting the touchless interaction initiation gesture in accordance with entering a touchless interaction mode based on identifying the touchless interaction initiation gesture, to detect at least one subsequent touchless interaction based on having capacitance variation data comparing favorably to touchless detection threshold parameters.

In various embodiments, the operations include displaying a type of graphical image data. In various embodiments, the operations include processing the capacitance image data to detect a touchless indication based on the type of graphical image data. In various embodiments, the operations include determining a set of touchless indication threshold parameter data, wherein each one set of touchless indication threshold parameter data corresponds to a corresponding one of a plurality of types of graphical image data, wherein the touchless indication is detected based on the capacitance image data comparing favorably to the touchless indication threshold parameter data for the type of graphical image data.

In various embodiments, the operations include determining touchless indication configuration data. In various embodiments, the operations include processing the capacitance image data to detect a touchless indication based on the touchless indication configuration data.

In various embodiments, the touchless indication configuration data indicates the touchless indication threshold parameter data and/or a set of touchless indication threshold parameter data each corresponding to a different condition of a set of conditions. The set of conditions can include a set of different types of applications and/or a set of different types of interface features.

In various embodiments, the determining touchless indication configuration data is generated based on user input to the display in response to at least one prompt displayed by the display to provide the touchless indication configuration data. In various embodiments, the user input to the display includes at least one touchless indication and/or at least one touch-based indication.

In various embodiments, the operations include receiving a first plurality of sensed signals, generating a first plurality of capacitance image data based on the first plurality of sensed signals, and/or processing the first plurality of capacitance image data to detect a first plurality of touchless interactions.

In various embodiments, the operations include generating learned detection parameter data based on the first plurality of capacitance image data. In various embodiments, generating the learned detection parameter data includes generating training data based on the first plurality of capacitance image data and performing a machine learning function upon the training data. In various embodiments, generating the learned detection parameter data includes generating user-specific touchless indication characterization data based on the first plurality of capacitance image data.

In various embodiments, the operations include generating a second plurality of capacitance image data based on receiving a second plurality of sensed signals and/or processing the second plurality of capacitance image data based on the learned detection parameter data to detect a second plurality of touchless interactions.

In various embodiments, the operations include displaying graphical image data corresponding to a content provider entity. In various embodiments, the operations include processing the capacitance image data to identify a hover region in proximity to the graphical image data. In various embodiments, the operations include transmitting a notification indicating the detection of the hover region to a server system associated with the content provider entity.

In various embodiments, the content provider entity corresponds to an advertisement provider the graphical image data corresponds to an advertisement, and the capacitance image data indicates a hover region of a user's finger hovering over the advertisement.

In various embodiments, the operations include processing the capacitance image data to detect a touchless interaction indicating payment transaction data. In various embodiments, the operations include processing the payment transaction data in conjunction with facilitating a touchless payment transaction. In various embodiments, the touch screen is implemented as a publicly-used touch screen at a commercial location.

In various embodiments, the payment transaction data includes: a PIN selected via touchless interaction to a displayed keypad and/or a zip code selected via touchless interaction to a displayed keypad. In various embodiments, the payment transaction data includes as signature generated via touchless interaction to a displayed region of the touch screen. In various embodiments, the payment transaction data includes selection of either a credit card or a debit card.

In various embodiments, the operations further include receiving credit card information and/or debit card information via a contactless point-of-sale terminal coupled to the touch screen, where the touchless payment transaction is based on the payment transaction data identified based on the touchless interaction and is further based on the credit card information and/or debit card information received via the contactless point-of-sale terminal.

Also, note that any of the various aspects, embodiments, and/or examples of the invention (and/or their equivalents) may be implemented using panels or touchscreen devices of the same or different size, same or different resolution, same or different numbers of row electrodes and/or column electrodes, same or different patterns of electrodes, etc.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A touch screen display comprises:
    a display device configured to render data into visible images;
    a plurality of electrodes configured to facilitate touch sense functionality of the display device based on electrode signals having a drive signal component and a receive signal component, wherein the plurality of electrodes includes electrodes in a first direction and electrodes in a second direction, wherein the electrodes in the first direction are separated from the electrodes in the second direction by a dielectric material and wherein the electrodes in the first direction and the electrodes in the second direction form a plurality of cross points;
    a plurality of drive-sense circuits coupled to at least some of the plurality of electrodes to generate a plurality of sensed signals, wherein each the plurality of drive-sense circuits includes a first conversion circuit and a second conversion circuit, and wherein, when a drive-sense circuit of the plurality of drive-sense circuits is enabled to monitor a corresponding electrode of the plurality of electrodes, the first conversion circuit is configured to convert the receive signal component into a sensed signal of the plurality of sensed signals and the second conversion circuit is configured to generate the drive signal component from the sensed signal of the plurality of sensed signals;
    a processing module that includes at least one memory that stores operational instructions and at least one processing circuit that executes the instructions to perform operations that include:
        receiving the plurality of sensed signals, wherein the sensed signals indicate variations in capacitance associated with the plurality of cross points;
        generating, based on the plurality of sensed signals, capacitance image data associated with the plurality of cross points that includes capacitance variation data corresponding to variations of the capacitance image data from a nominal value; and
        processing the capacitance image data to determine a touchless indication proximal to the touch screen display based on a touchless indication threshold.

2. The touch screen display of claim 1, wherein the variations in capacitance associated the plurality of cross points vary from a nominal capacitance.

3. The touch screen display of claim 1, wherein the nominal capacitance corresponds to an average capacitance of the plurality of cross points in an absence of the touchless indication.

4. The touch screen display of claim 1, wherein the sensed signals indicate an impedance of the plurality of cross points.

5. The touch screen display of claim 4, wherein the nominal value is proportional to a nominal impedance corresponding to each of the cross points of the plurality of cross points in an absence of the touchless indication.

6. The touch screen display of claim 1,
    wherein the first conversion circuit includes:
        a comparator to compare the electrode signal to an analog reference signal to produce an analog comparison signal; and
        an analog to digital converter operable to convert the analog comparison signal into the sensed signal;

wherein the second conversion circuit includes:
a digital to analog converter operable to convert the sensed signal into an analog feedback signal;
a signal source circuit operable to generate a regulated source signal based on the analog feedback signal; and
a driver operable to increase power of the regulated source signal to produce the drive signal component.

7. The touch screen display of claim 1, wherein each of the electrodes comprise:
a transparent conductive trace placed in a layer of the touch screen display, wherein the transparent conduction trace is constructed of one or more of: Indium Tin Oxide (ITO), Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), or poly(3,4-ethylenedioxythiophene) (PEDOT).

8. The touch screen display of claim 1, wherein the touchless indication proximal to the touch screen display is determined based on an area size in the capacitance image data where the capacitance variation data compares favorably to the touchless indication threshold.

9. The touch screen display of claim 8, wherein the touchless indication proximal to the touch screen display is determined based a temporal stability of a parameter the area in the capacitance image data where the capacitance variation data compares favorably to the touchless indication threshold.

10. The touch screen display of claim 9, wherein the parameter of the area includes at least one of: a centroid of the area or a boundary of the area.

11. The touch screen display of claim 8, wherein the touchless indication proximal to the touch screen display is determined based a proximity of a parameter of the area in the capacitance image data where the capacitance variation data compares favorably to the touchless indication threshold to a selectable region on the touch screen display.

12. The touch screen display of claim 11, wherein the parameter of the area indicates at least one of: a centroid of the area or a boundary of the area.

13. A method for use in a touch screen display comprises:
providing a display device configured to render data into visible images;
providing a plurality of electrodes configured to facilitate touch sense functionality of the display device based on electrode signals having a drive signal component and a receive signal component, wherein the plurality of electrodes includes electrodes in a first direction and electrodes in a second direction, wherein the electrodes in the first direction are separated from the electrodes in the second direction by a dielectric material and wherein the electrodes in the first direction and the electrodes in the second direction form a plurality of cross points;
generating, via a plurality of drive-sense circuits coupled to at least some of the plurality of electrodes, a plurality of sensed signals, wherein each the plurality of drive-sense circuits includes a first conversion circuit and a second conversion circuit, and wherein, when a drive-sense circuit of the plurality of drive-sense circuits is enabled to monitor a corresponding electrode of the plurality of electrodes, the first conversion circuit is configured to convert the receive signal component into a sensed signal of the plurality of sensed signals and the second conversion circuit is configured to generate the drive signal component from the sensed signal of the plurality of sensed signals;
receiving, at a processing module that includes at least one memory and at least one processing circuit, the plurality of sensed signals, wherein the sensed signals indicate variations in mutual capacitance associated with the plurality of cross points;
generating, via the processing module and based on the plurality of sensed signals, capacitance image data associated with the plurality of cross points that includes capacitance variation data corresponding to variations of the capacitance image data from a nominal value; and
processing, via the processing module, the capacitance image data to determine a touchless indication proximal to the touch screen display based on a touchless indication threshold.

14. The method of claim 13, wherein the variations in capacitance associated the plurality of cross points vary from a nominal capacitance.

15. The method of claim 13, wherein the sensed signals indicate an impedance of the plurality of cross points.

16. The method of claim 13,
wherein the first conversion circuit includes:
a comparator to compare the electrode signal to an analog reference signal to produce an analog comparison signal; and
an analog to digital converter operable to convert the analog comparison signal into the sensed signal;
wherein the second conversion circuit includes:
a digital to analog converter operable to convert the sensed signal into an analog feedback signal;
a signal source circuit operable to generate a regulated source signal based on the analog feedback signal; and
a driver operable to increase power of the regulated source signal to produce the drive signal component.

17. The method of claim 13 wherein the touchless indication proximal to the touch screen display is determined based on an area size in the capacitance image data where the capacitance variation data compares favorably to the touchless indication threshold.

18. The method of claim 17, wherein the touchless indication proximal to the touch screen display is determined based a temporal stability of a parameter the area in the capacitance image data where the capacitance variation data compares favorably to the touchless indication threshold.

19. The method of claim 17, wherein the touchless indication proximal to the touch screen display is determined based a proximity of a parameter of the area in the capacitance image data where the capacitance variation data compares favorably to the touchless indication threshold to a selectable region on the touch screen display.

20. The method of claim 19, wherein the parameter of the area indicates at least one of: a centroid of the area or a boundary of the area.

* * * * *